(12) United States Patent
Cho et al.

(10) Patent No.: US 11,252,545 B2
(45) Date of Patent: Feb. 15, 2022

(54) APPARATUS AND METHOD FOR USING CONNECTED VEHICLES AS AN ADVERTISEMENT PLATFORM

(71) Applicant: AD CONNECTED, INC., Seoul (KR)

(72) Inventors: Inje Cho, Seoul (KR); Hoonje Cho, Seoul (KR)

(73) Assignee: AD CONNECTED, INC., Seoul (KR)

( * ) Notice: Subject to any disclaimer, the term of this patent is extended or adjusted under 35 U.S.C. 154(b) by 0 days.

(21) Appl. No.: 16/403,547

(22) Filed: May 5, 2019

(65) Prior Publication Data

US 2019/0268743 A1    Aug. 29, 2019

Related U.S. Application Data

(63) Continuation-in-part of application No. 16/248,991, filed on Jan. 16, 2019, and a continuation-in-part of
(Continued)

(51) Int. Cl.
*H04W 4/46* (2018.01)
*G06Q 30/02* (2012.01)
(Continued)

(52) U.S. Cl.
CPC .......... *H04W 4/46* (2018.02); *G01C 21/3407* (2013.01); *G05D 1/0212* (2013.01);
(Continued)

(58) Field of Classification Search
CPC ............ G06Q 30/0266; G06Q 30/0265; B60R 11/0235; B60R 2011/004; H04W 4/023;
(Continued)

(56) References Cited

U.S. PATENT DOCUMENTS

| 6,812,888 B2 | 11/2004 | Drury et al. |
| 2007/0061057 A1 | 3/2007 | Huang et al. |

(Continued)

FOREIGN PATENT DOCUMENTS

| JP | 2004227162 A | 8/2004 |
| JP | 2013089096 A | 5/2013 |

(Continued)

OTHER PUBLICATIONS

John Greenough, The Connected Car as a Digital Platform: The consumer market for in-car apps, ads, and internet services, 2015 (Year: 2015).*

(Continued)

*Primary Examiner* — Tarek Elchanti
(74) *Attorney, Agent, or Firm* — Ichthus International Law PLLC

(57) ABSTRACT

By way of example, various methods for reproducing advertisements using a plurality of advertisement vehicles as well as controlling the plurality of advertisement vehicles are provided. In one example, a method for controlling a plurality of advertisement vehicles is provided as follows. Initially, information on the plurality of advertisement vehicles that are going to carry out a specific event is verified. Information on the specific event is sent to the plurality of advertisement vehicles and real-time traffic and/or people density information in an area in which the specific event is to be carried out is collected. A starting location of the specific event may also be determined based on at least one of: the real-time traffic density information or real-time location information of the plurality of advertisement vehicles. Then, driving route guidance with an initial destination set to the starting location of the specific event is sent to the plurality of advertisement vehicles such that the (Continued)

plurality of advertisement vehicles convenes at the starting location of the specific event.

10 Claims, 55 Drawing Sheets

Related U.S. Application Data application No. 16/288,062, filed on Feb. 27, 2019, which is a continuation of application No. 16/286,336, filed on Feb. 26, 2019, application No. 16/403,547, which is a continuation-in-part of application No. 16/288,089, filed on Feb. 27, 2019, which is a continuation of application No. 16/286,336, filed on Feb. 26, 2019.

(60) Provisional application No. 62/618,569, filed on Jan. 17, 2018, provisional application No. 62/636,065, filed on Feb. 27, 2018.

(51) Int. Cl.
*G08G 1/0967* (2006.01)
*G05D 1/02* (2020.01)
*G09F 21/04* (2006.01)
*G01C 21/34* (2006.01)
*G09F 27/00* (2006.01)

(52) U.S. Cl.
CPC ..... *G06Q 30/0246* (2013.01); *G06Q 30/0261* (2013.01); *G06Q 30/0266* (2013.01); *G08G 1/096791* (2013.01); *G09F 21/048* (2013.01); *G09F 27/005* (2013.01); *G09F 2027/001* (2013.01)

(58) Field of Classification Search
CPC ...... H04W 4/44; H04W 4/23; B60Y 2200/91; G05D 1/0088; G09F 2027/001; G09F 27/00; G09F 21/04; G09F 27/005; G08G 1/20; B60Q 5/008; B60Q 9/00; B60Q 1/503; B60Q 5/005
USPC .............................................. 705/14.1, 14.63
See application file for complete search history.

(56) References Cited

U.S. PATENT DOCUMENTS

| | | |
|---|---|---|
| 2013/0243390 A1 | 9/2013 | Yoshio et al. |
| 2014/0249913 A1* | 9/2014 | Endo ................ G06Q 30/02 705/14.45 |
| 2015/0348112 A1 | 12/2015 | Ramanujam |
| 2017/0032402 A1 | 2/2017 | Patsiokas et al. |
| 2017/0276935 A1 | 9/2017 | Toyota et al. |
| 2018/0075481 A1* | 3/2018 | Adoni ................ G06F 16/285 |

FOREIGN PATENT DOCUMENTS

| | | | |
|---|---|---|---|
| KR | 100418095 B1 | 2/2004 | |
| KR | 1020130073278 A | 7/2013 | |
| KR | 101371930 B1 | 3/2014 | |
| WO | WO-2014007567 A1 * | 1/2014 | ............ G06Q 40/04 |
| WO | WO2017040924 A1 | 3/2017 | |

OTHER PUBLICATIONS

International Search Report and Written Opinion in PCT/KR2019/000724 dated May 16, 2019, pp. 11.
International Search Report and Written Opinion in PCT/KR2019/002394 dated Jul. 9, 2019, pp. 13.
International Search Report and Written Opinion in PCT/KR2019/005429 dated Aug. 14, 2019, pp. 11.

\* cited by examiner

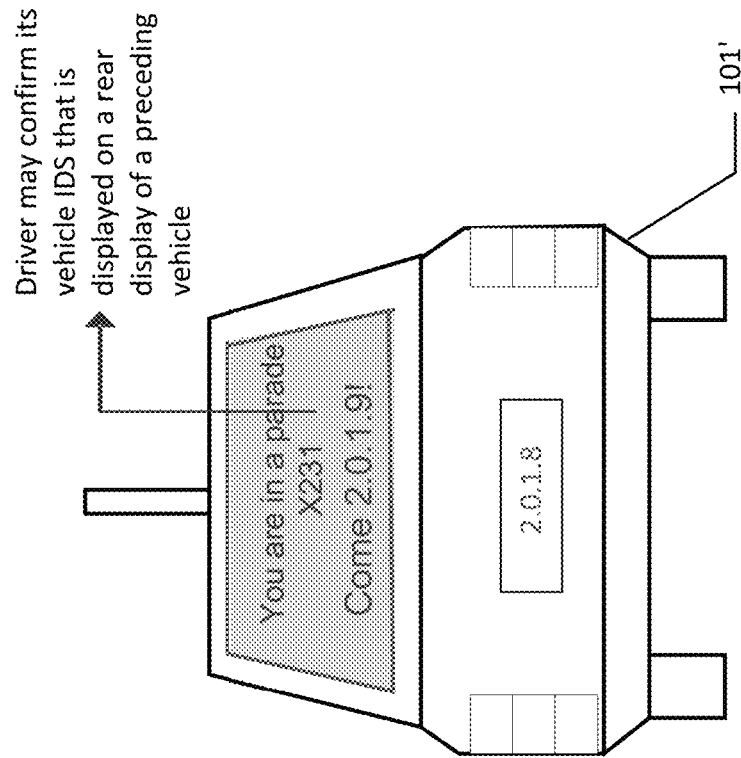
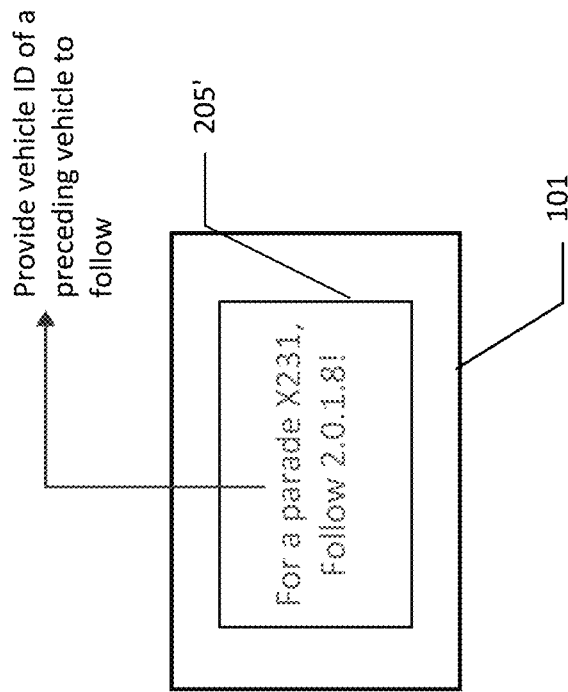
FIG. 12B
FIG. 12A

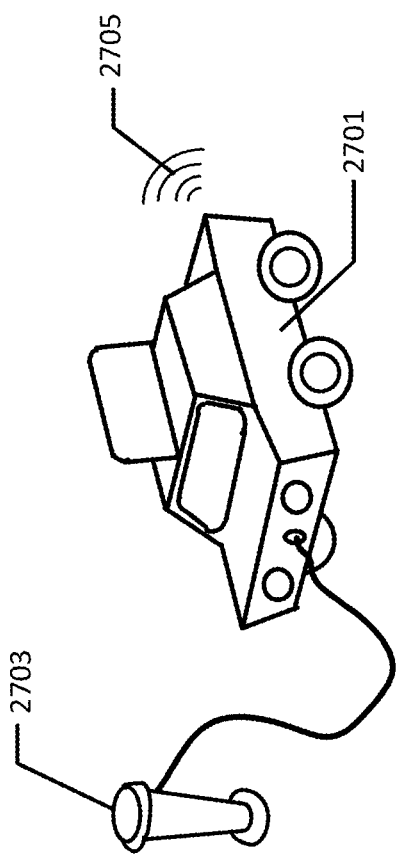
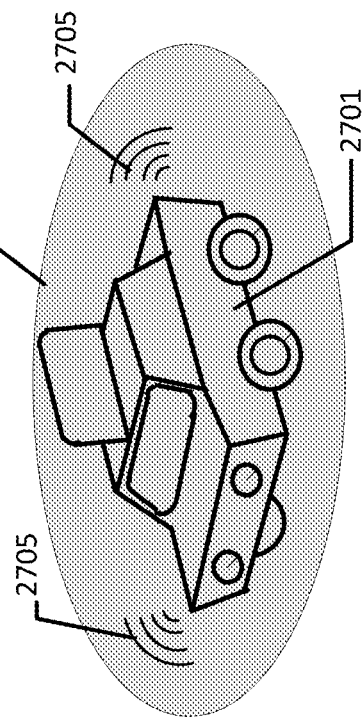
FIG. 27A
FIG. 27B

APPARATUS AND METHOD FOR USING CONNECTED VEHICLES AS AN ADVERTISEMENT PLATFORM

CROSS-REFERENCE TO RELATED APPLICATION(S)

The present application is a continuation-in-part of a U.S. patent application Ser. No. 16/248,991, filed Jan. 16, 2019, which claims the benefit of U.S. Provisional Patent Application No. 62/618,569, filed Jan. 17, 2018, titled "VEHICLE FOR PROVIDING ADVERTISEMENT AND METHOD OF DELIVERING ADVERTISEMENT USING THEREOF,"; a continuation-in-part of a U.S. patent application Ser. No. 16/288,062 filed Feb. 27, 2019, which is a continuation of U.S. patent application Ser. No. 16/286,336, filed Feb. 26, 2019, which claims the benefit of U.S. Provisional Patent Application No. 62/636,065, filed Feb. 27, 2018, titled "SYSTEM FOR PROVIDING VEHICLE ADVERTISMENT AND METHOD FOR CONTROLLING VEHICLE"; a continuation-in-part of a U.S. patent application Ser. No. 16/288,089 filed Feb. 27, 2019, which is a continuation of U.S. patent application Ser. No. 16/286,336, filed Feb. 26, 2019, which claims the benefit of U.S. Provisional Patent Application No. 62/636,065, filed Feb. 27, 2018, titled "SYSTEM FOR PROVIDING VEHICLE ADVERTISMENT AND METHOD FOR CONTROLLING VEHICLE"; and claims the benefits of Korean Patent Application Nos. KR10-2018-0052082, filed May 4, 2018, KR10-2018-0052083, filed May 4, 2018, KR10-2018-0052084, filed May 4, 2018, KR10-2018-0052085, May 4, 2018, KR10-2018-0052086, May 4, 2018, KR10-2018-0052775, filed May 8, 2018, KR10-2018-0052776, filed May 8, 2018, KR10-2018-0052777, filed May 8, 2018, KR10-2018-0052778, May 8, 2019, KR10-2018-0052779, May 8, 2018, KR10-2018-0052780, May 8, 2018, the entire contents of which are incorporated by reference herein in their entirety.

TECHNICAL FIELD

The present disclosure relates to a system and method for reproducing advertisements over a network, in particular, reproducing the advertisements on or in one or more connected vehicles over the network in a connected environment.

INCORPORATION BY REFERENCE

All publications, patents, and patent applications mentioned in this specification are herein incorporate by reference to the same extent as if each individual publication, patent or patent application was specifically and individually indicated to be incorporated by reference, including U.S. patent application Ser. No. 16/248,991, filed Jan. 16, 2019, Ser. No. 16/288,089 filed Feb. 27, 2019, Ser. No. 16/248,991, filed Jan. 16, 2019, Ser. No. 16/288,062, filed Feb. 27, 2019, Ser. No. 16/286,336, filed Feb. 26, 2019, 62/636,065, filed Feb. 27, 2018, 62/618,569 filed Jan. 17, 2018, Korean Patent Application Nos. KR10-2018-0052082, filed May 4, 2018, KR10-2018-0052083, filed May 4, 2018, KR10-2018-0052084, filed May 4, 2018, KR10-2018-0052085, May 4, 2018, KR10-2018-0052086, May 4, 2018, KR10-2018-0052775, filed May 8, 2018, KR10-2018-0052776, filed May 8, 2018, KR10-2018-0052777, filed May 8, 2018, KR10-2018-0052778, May 8, 2019, KR10-2018-0052779, May 8, 2018, KR10-2018-0052780, May 8, 2018, the entire contents of which are incorporated by reference herein in their entirety.

BACKGROUND

As modern technology advances, internet connected devices are gaining more popularity and are becoming more common place in people's everyday lives. Further, commercial advertisements are taking various delivery technology channels such as internet, webpages, you-tubes, mobile phones, smart TVs, etc. substantially away from traditional channels such as newspapers, magazines, TVs, and billboards. The advertisement channels are becoming more digital and mobile.

In an internet of things (IoT) environment, nowadays vehicles or transportation means are becoming more connected than ever. Also, transportation vehicles such as taxis or buses are displaying more advertisements for profit, in the form of stickers or special paints, on the sides of the vehicles so that passers-by or pedestrians can view them. However, these delivery platforms are static in nature and are very limited in nature such that the advertisements are attached to the vehicles for a contract duration that is agreed between vehicle owners and an advertiser. After the contract duration, the advertisements need to come off or repainted. Further, these advertisements are static in nature and are not location based. That is, the advertisements don't change during an entire vehicle route. Furthermore, the advertisements are not interesting to the people in general.

As such, there is still a need for new, improved, and innovative methods or techniques for reproducing digital advertisements using vehicles.

SUMMARY

With the advent of autonomous vehicles and/or electric vehicles, the vehicles are more connected to a network or Internet, via various communications technology. Further, there are more connected vehicles to the Internet, which are capable of communications with a device over a wireless network as well as with other connected vehicles. That is, vehicles are becoming not only a transportation means but also devices, e.g., clients (in a client-server context), which may communicate with one or more servers over a network for retrieving various information including current news, weather data, and advertisements from the one or more servers on the network.

The present technology described herein provides a system or a method for delivering one or more advertisement contents to connected vehicles in an Internet of Things (IoT) environment, in a more effective manner, thereby increasing the effect of advertisements delivered to people. That is, the present technology provides in an aspect a new, novel system or method for delivery of one or more advertisement contents for the highest possible effect to the viewers, using the connected vehicles as part of an advertisement platform.

In one embodiment of the present technology, a system for delivering advertisements include a plurality of connected vehicles participating in an advertisement event. Each of the plurality of connected vehicles is configured to receive an instruction from one of the connected vehicles over a first network or a server over a second network to cluster near or at a target area for delivering an advertisement as a cluster advertisement among a group of the connected vehicles.

In an aspect of the present disclosure, each of the connected vehicles of the system is configured to: receive input on a driving destination from a driver of the connected vehicle, send the received input to the server over the network, and in response, receive one or more quests from the server. The one or more quests may be determined based in part on one or more driving routes to the driving destination and available advertisement events in the one or more driving routes.

In another aspect of the present disclosure, in preparation for a carry-out of a parade or a mission, the plurality of connected vehicles of the system is instructed to gather together at a predetermined location. The predetermined location may be a parking lot or a road with the least amount of traffic.

In an aspect of the present disclosure, the advertisement event in the system is a parade or a mission event, and the plurality of the connected vehicles participating in the advertisement event is determined based in part on vehicle profiles or user preferences.

In an aspect of the present disclosure, the advertisement event in the system is the parade and movements of the plurality of connected vehicles participating in the parade are continuously monitored by the one of the connected vehicles over the first network or the server over the second network.

In another aspect of the present disclosure, during the parade, driving speeds and routes of the connected vehicles participating in the parade or the mission in the system are controlled by the server to maintain a predefined formation of procession in the parade or the mission. As such, when the cluster of the connected vehicles participating in the parade is broken into multiple sub-groups by a traffic light, the driving speeds and routes of the connected vehicles are controlled such that the multiple sub-groups may be clustered again into a single cluster for the parade after the traffic light.

In another aspect of the present disclosure, each of the plurality of connected vehicles of the system is configured to synchronize reproduction of one or more advertisements with other connected vehicles as the cluster advertisement, while participating in the advertisement event.

In an aspect of the present disclosure, each of the plurality of connected vehicles of the system participating in the parade is configured to display vehicle identification information of a preceding vehicle to follow in the parade on an internal display of the connected vehicle.

In an aspect of the present disclosure, each of the plurality of connected vehicles of the system participating in the parade is further configured to display an indication of whether the connected vehicle is at a right position in the parade.

In an aspect of the present disclosure, each of the plurality of connected vehicles of the system participating in the parade is further configured to display vehicle identification information of the connected vehicle on an external display of the preceding vehicle that the connected vehicle is following in the parade.

In an aspect of the present disclosure, each of the plurality of connected vehicles of the system participating in the parade is configured to output an indication from one of the connected vehicles over the first network or the server over the second network as to whether the connected vehicle is at a right position in the parade.

In an aspect of the present disclosure, the connected vehicles of the system participating in the parade are configured to drive a predetermined route near or around the target area with a predetermined number of turns around the predetermined route, while reproducing a same advertisement in a coordinated manner as the group of connected vehicles, thereby increasing an effect of the advertisement on people. Further, the predetermined number of turns around the predetermined route may be determined in advance by the server on the network, based in part on location of an advertiser, a density of traffic, or a density of people on the predetermined route.

In an aspect of the present disclosure, each of the plurality of connected vehicles of the system is configured to receive in advance, prior to arrival at or near the target area, real-time information on whether a minimum number of connected vehicles for a carry-out of the advertisement event have already arrived at or near the target area.

In an aspect of the present disclosure, when it is determined that the minimum number of connected vehicles that are needed for the carry-out of the advertisement event is not reached within a predetermined period of time, the plurality of connected vehicles is configured to receive a cancellation notice of the advertisement event from the server over the network.

In another embodiment of the present disclosure, when it is determined that the minimum number of connected vehicles that are needed for the carry-out of the advertisement event is reached within a predetermined period of time, drivers of the connected vehicles participating in the advertisement event receive a reward for participating in the advertisement event.

In an aspect of the present disclosure, a driver of a connected vehicle of the system receives a penalty when the connected vehicle is determined to deviate from the carry-out of the advertisement event in which the driver of the connected vehicle has selected to participate.

Further, in an aspect of the present disclosure, when a first connected vehicle of the system participating in the advertisement event is stopped at a traffic light, the first connected vehicle is configured to reproduce, via an external speaker of the first connected vehicle, an audio content of the advertisement.

In an aspect of the present disclosure, when a second connected vehicle of the system participating in the advertisement event is stopped at the traffic light, the second connected vehicle is configured to wait until an end of reproduction of the audio content of the advertisement via the external speaker of the first connected vehicle, and the first and second connected vehicles are configured to reproduce a same advertisement in a synchronized manner as a group of connected vehicles while the first and second connected vehicles are stopped at the traffic light.

In another aspect of the present disclosure, when the plurality of connected vehicles of the system participating in the advertisement event is configured to reproduce the advertisement as a stereo advertisement.

In an aspect of the present disclosure, when the connected vehicles of the system participating in the advertisement event are stopped at a traffic light or stopped at a certain location or moving with a speed lower than a predetermined speed, the connected vehicles are configured to reproduce the same advertisement via external displays and/or speakers of the connected vehicles in a coordinated manner as a cluster advertisement.

In as aspect of the present disclosure, when the coordinated manner comprises a simultaneous reproduction of the same advertisement or a sequential reproduction of the same advertisement as a round advertisement among the plurality of connected vehicles.

In another aspect of the present disclosure, when it is determined that the connected vehicles are coming to a stop, the reproduction of the same advertisement on external speakers of the connected vehicles is controlled so that an audio of the same advertisement is increased in accordance with decreasing speeds of the connected vehicles coming to the stop for a purpose of simultaneously reproducing the same advertisement on the connected vehicles.

In an aspect of the present disclosure, the system is configured to award a reward to a driver of a connected vehicle for safe driving, the reward including a discount in an auto insurance premium or other benefits.

In another aspect of the present technology, a system of connected vehicles is disclosed. When the connected vehicles are parked near each other in a parking lot, the connected vehicles are configured to reproduce one or more advertisements when one of the connected vehicles receives a signal from a remote controller associated with the one of the connected vehicles.

In an aspect of the present disclosure, the one or more advertisements of the system are selected for reproduction based at least in part on a profile of a user of the one of the connected vehicles, vehicle profile information, or location information of the connected vehicles.

In an aspect of the present disclosure, the connected vehicles of the system are configured to form a cluster and reproduce an advertisement via external displays and/or speakers of the connected vehicles in a synchronized manner as the cluster, when the one of the connected vehicles receives the signal from the remote controller associated with the one of the connected vehicles.

In an aspect of the present disclosure, the connected vehicles of the system are further configured to reproduce the one or more advertisements after the one of the connected vehicles outputs a sound and/or a flash in response to the signal received from the remote controller associated with the one of the connected vehicles.

In another aspect of the present technology, a connected vehicle including an autonomous driving unit and an advertisement identification unit coupled to the autonomous driving unit is disclosed. The autonomous driving unit is configured to self-drive the connected vehicle with little or no human input. The advertisement identification unit is configured to recognize and identify one or more visual contents of an advertisement reproduced on an external display of another vehicle or a billboard display nearby.

In an aspect of the present disclosure, the advertisement identification unit of the connected vehicle is further configured to recognize the one or more visual contents of the advertisement reproduced on the external display, based in part on a number of pixels in the external display. Further, the recognition of the one or more visual contents of the advertisement may be done based on a marker inserted in the one or more visual contents of the advertisement, to inform the advertisement identification unit that the one or more visual contents are designed for reproduction on the external display. The marker may include an image frame of advertisement, a quick response (QR) code, an identification symbol or number or the like.

In an aspect of the present technology, an autonomous vehicle including an autonomous driving unit, an advertisement system and an advertisement identification unit is disclosed. The autonomous driving unit is configured to self-drive the connected vehicle with little or no human input. The advertisement system may be coupled to the autonomous driving unit and configured to reproduce one or more advertisements on the autonomous vehicle. The advertisement identification unit may be coupled to the advertisement system and be configured to recognize and identify one or more visual contents of an advertisement reproduced on an external display of another vehicle or a billboard display nearby. Further, the recognition and identification of the one or more visual contents of an advertisement may be done based in part on a number of pixels in the external display or based in part on a marker inserted in the one or more visual contents of the advertisement to inform the advertisement identification unit that the one or more visual contents are designed for reproduction on the external display. The marker may include an image frame of advertisement, a quick response (QR) code, an identification symbol or number, or the like.

In an aspect of the present technology, a connected vehicle including an in-vehicle audio system and an advertisement system coupled to the in-vehicle audio system is also disclosed. The in-vehicle audio system of the connected vehicle is configured to stream music inside the connected vehicle for one or more occupants in the connected vehicle. The advertisement system of the connected vehicle is configured to detect the streaming of music and to reproduce, based on the music played, one or more advertisements for the one or more occupants inside the connected vehicle.

In an aspect of the present disclosure, the advertisement system of the connected vehicle is further configured to: create the one or more advertisements based in part on one or more segments of the music that is played inside the connected vehicle and reproduce the one or more advertisements at an end of the streaming of the music.

In another aspect of the present disclosure, the advertisement system may be further configured to create the one or more advertisements based in part on one or more segments of the music that is played inside the connected vehicle and reproduce the one or more advertisements at the end of the reproduction or playing of the music. Further, the one or more advertisements may be created based in part on a melody of the music and profile information of the one or more occupants in the connected vehicle. That is, the advertisement system may be further configured to detect a melody of the music that is being played and create the one or more advertisements based in part on the melody of the music and profile information (e.g., age, sex, preferences, moods, or the like) of the one or more occupants in the connected vehicle.

In an aspect of the present disclosure, the one or more advertisements are created based in part on the melody of the music based on a number of characters or words in a commercial music that is going to be created as part of the one or more advertisements.

In an aspect of the present disclosure, after the reproduction of the melody of the music, the one or more advertisements are reproduced within a predetermined period of time.

In an aspect of the present disclosure, the advertisement system of the connected vehicle is further configured to control the reproduction of the one or more advertisements based in part on whether the music is played via an in-vehicle radio or a mobile device via Bluetooth. When it is determined that the music is played from the in-vehicle radio, the advertisement system is configured to determine one or more intervals of time between reproductions of different music pieces or programs and reproduce the one or more advertisements that are created during the one or more intervals of time. Further, when it is determined that the music is played from the mobile device via Bluetooth, the advertisement system is configured to communicate with the in-vehicle audio system and control timings of streaming of the music such that the one or more advertisements that are created are reproduced between reproduction of different music pieces.

In another aspect of the present disclosure, the advertisement system is further configured to send to the server over the network information on the music that is being played, receive from the server the one or more advertisements that are created based in part on one or more segments of the music or a melody of the music, and reproduce the one or more advertisements at the end of the reproduction of the music inside the connected vehicle.

In another aspect of the present technology, a connected vehicle which is an electric vehicle including an advertisement system is also disclosed. The advertisement system is configured to detect presence of people near the connected vehicle via one or more proximity sensors and reproduce one or more audio advertisements via external displays and/or external speakers of the connected vehicle. Also, the one or more advertisements may be reproduced via the external speakers of the connected vehicle in such a way that the one or more audio advertisements reproduced provide to the people with an alert message of the presence of the connected vehicle, in place of imaginary engine sounds, for safety of people outside the connected vehicle.

In an aspect of the present disclosure, the connected vehicle is configured to reproduce a same advertisement substantially simultaneously with other connected vehicles disposed near the connected vehicle or to reproduce an advertisement in coordination with other connected vehicles.

In an aspect of the present disclosure, the electric vehicle is further configured to include an auxiliary battery for operation of the advertisement system and powering the external speakers, such that the one or more advertisements are reproduced by the advertisement system when the electric vehicle is off but the presence of people near the electric vehicle may be detected.

In an aspect of the present disclosure, the external speakers of the electric vehicle comprise one or more vibration speakers based in part on one or more vibration media.

In another aspect of the present technology, a connected vehicle including an advertisement system is disclosed. The advertisement system is configured to reproduce one or more advertisements on one or more external displays, and the one or more advertisements comprise non-commercial information.

In an aspect of the present disclosure, the advertisement system is further configured to reproduce the non-commercial information between reproductions of commercial advertisements on the one or more external displays, and the non-commercial information comprises news, weather, traffic or other public information or announcements. Further, the non-commercial information may include real-time scores for sports games.

In an aspect of the present disclosure, the non-commercial information includes location-based information relating to transportation schedules including bus or train arrival times, when the connected vehicle is disposed at or near a bus or train station. Further, in another aspect of the present disclosure, the non-commercial information may include flight schedule when the connected vehicle is disposed at or near an airport or an airport shuttle stop in a city.

In another aspect of the present technology, it is disclosed that an advertisement platform for reproducing one or more advertisement includes a plurality of connected vehicles forming a cluster of connected vehicles, and the plurality of connected vehicles is configured to reproduce the one or more advertisements as a cluster advertisement or an interactive advertisement.

In an aspect of the present disclosure, the reproduction of the cluster advertisement in the advertisement platform includes simultaneous reproduction of a same advertisement in synchronization with other connected vehicles of the cluster.

In an aspect of the present disclosure, the reproduction of the interactive advertisement in the advertisement platform includes reproduction of a same advertisement among the cluster, in which the connected vehicles are each assigned one or more different roles in the reproduction of the same advertisement.

In an aspect of the present disclosure, the reproduction of the cluster advertisement or the interactive advertisement in the advertisement platform is controlled either by a server over a network or by a master connected vehicle among the plurality of connected vehicles of the cluster.

In an aspect of the present disclosure, the reproduction of the interactive advertisement in the advertisement platform is configured to respond to input from a person who views the interactive advertisement.

In an aspect of the present disclosure, the one or more advertisements in the advertisement platform are provided by a server over a network, by one or more in-vehicle storage systems, or by one or more removable storage systems.

In another aspect of the present technology, the plurality of connected vehicles in the advertisement platform is configured to provide public guidance information via external displays of the connected vehicles or external speakers of the connected vehicles while driving on a road, when an emergency vehicle approaches the plurality of connected vehicles on the road.

In another aspect of the present technology, a method for controlling a plurality of advertisement vehicles is provided. The method includes various steps including: verifying information on a plurality of advertisement vehicles that are going to carry out a specific event; sending to the plurality of advertisement vehicles information on the specific event; collecting real-time traffic density information in an area in which the specific event is to be carried out; determining a starting location of the specific event, based on at least one of: the real-time traffic density information or real-time location information of the plurality of advertisement vehicles; sending driving route guidance to the plurality of advertisement vehicles such that the plurality of advertisement vehicles convenes at the starting location of the specific event.

In another aspect of the present technology, a method for carrying out an advertisement by an advertisement vehicle for a specific event is provided. The method includes various steps including: receiving information on the specific event that is to be carried out; in response to receiving the information on the specific event, sending a request to participate in the specific event; receiving driving route guidance to a starting location for the specific event; and receiving driving order of a plurality of advertisement vehicles that participate in a parade procession for the specific event.

As such, in various aspects of the present disclosure, one or more advertisements may be delivered and/or reproduced on a plurality of connected vehicles so that the effect of advertisement may be significantly increased. Also, using one or more connected vehicles as an advertisement platform, as well as by reproducing the one or more advertisements, based in part on location information, local time information, or attributes of people around the connected vehicles, the effect of advertisement may be significantly increased.

The following brief description of the drawings and the detailed description of the exemplary embodiments of the present technology are provided for better understanding of the present technology.

BRIEF DESCRIPTION OF THE DRAWINGS

A more detailed understanding may be obtained from the following description in conjunction with the following accompanying drawings.

FIGS. 12A and 12B conceptually illustrates an example embodiment of the present technology in accordance with an aspect of the present disclosure;

FIGS. 27A and 27B conceptually illustrates example embodiments of the present technology in accordance with an aspect of the present disclosure;

FIG. 32B provides an example embodiment for reproducing a public advertisement on at least one target vehicle for benefits of drivers, pedestrians, etc.;

DETAILED DESCRIPTION

Figure 1:
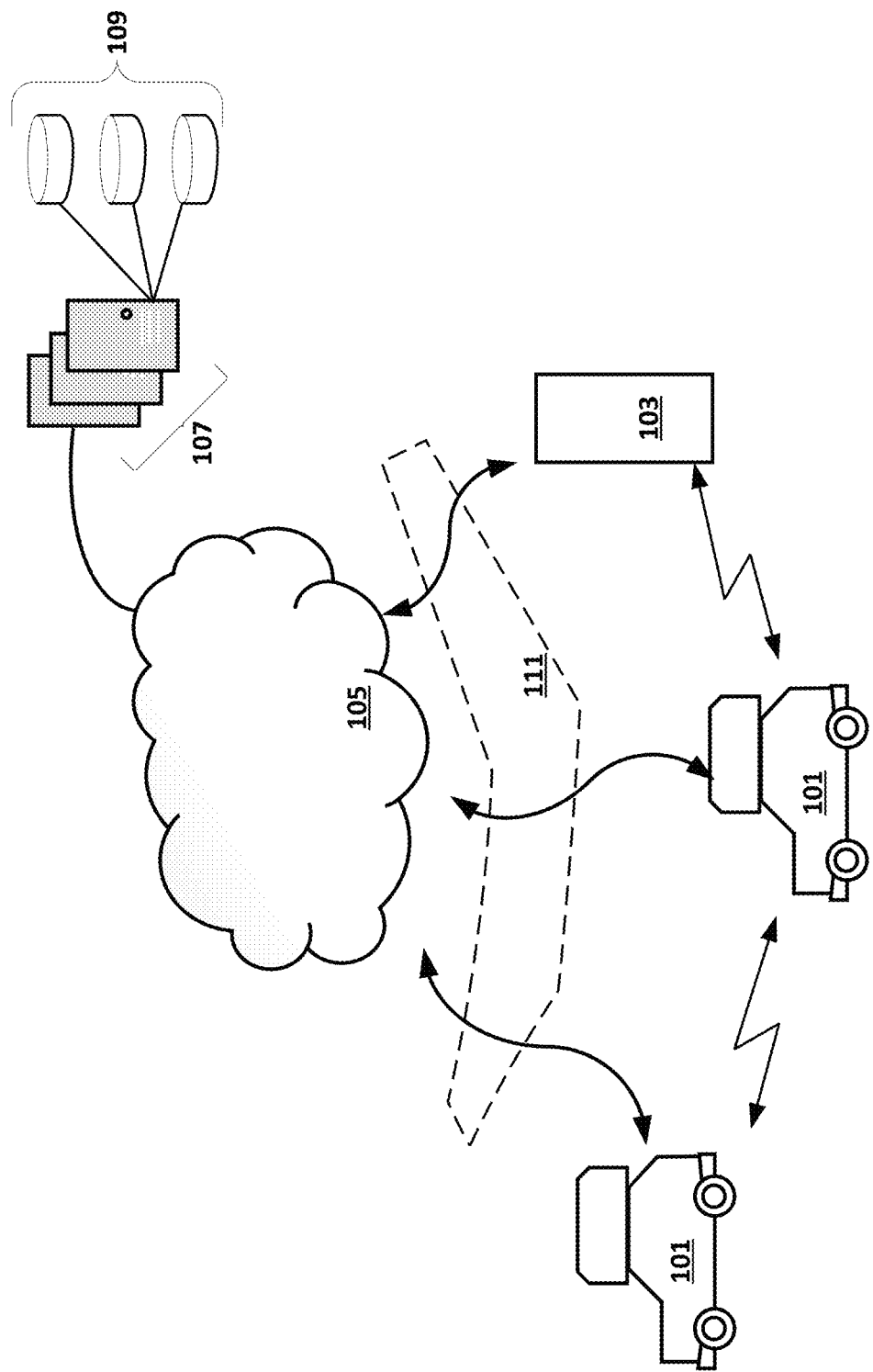
FIG. 1 is an overall network diagram conceptually illustrating an example embodiment of the present technology in accordance with an aspect of the present disclosure.

The detailed description of illustrative examples will now be set forth below in connection with the various drawings. The description below is intended to be exemplary and in no way limit the scope of the claimed invention. It also provides a detailed example of possible implementation(s) and is not intended to represent the only configuration(s) in which the concepts or present technology described herein may be practiced. Further, the detailed description includes specific details for providing a thorough understanding of various concepts, and it is noted that these concepts may be practiced without these specific details. In some instances, well known structures and components are shown in block diagram form to avoid obscuring such concepts or clarity of presentation. Also, it should be noted that like reference numerals are used in the drawings to denote like elements and features.

While the methodologies are described herein sometimes as a series of steps or acts, for simplicity, the claimed subject matter is to be understood to not be limited by the order of these steps or acts, as some steps or acts may occur in different orders and/or concurrently with other acts from that shown and described herein. Further, not all illustrated steps or acts may be required to implement various methodologies according to the present technology disclosed herein. Also, it should be appreciated that the apparatus and methods described herein may be utilized separately or in combination with other aspects of the present disclosure, or in combination with conventional technology, without departing from the teachings of the present disclosure or technology.

In the present disclosure disclosed herein, various terms or phrases as used herein are defined as follows. The term "advertisement platform" as used herein mean a system including one or more connected vehicles configured to reproduce one or more advertisements. The phrase "advertisement content(s)" or the term "advertisement" as used herein means any content, either audio advertisement or visual advertisement for a product, a service, including but not limited thereto, videos, audios, live TV broadcasts, news, weather, mission, surveys, votes, interactive games, sports updates, etc. that may be delivered via one or more audio, image, or video files in various formats. The advertisement may include an audio content and/or a visual content. The term "audio advertisement content," "audio advertisement," or "audio content" as used herein means an audio component of an advertisement. The term "visual advertisement content" or "visual content" as used herein means a visual or image component of an advertisement. The term "audio advertisement" as used herein may also mean an audio without image or visual content so that only audio systems such as speakers are used for reproducing the audio advertisement. Further, the term "visual advertisement" or "image advertisement" as used herein may mean a visual advertisement without audio content so that only displays are used for reproducing the visual advertisement.

The term "connected vehicle(s)" as used herein means one or more vehicles or transportation means including but not limited thereto electric vehicles, either stationary or moving, which are capable of being connected to a network, e.g., an Internet protocol (IP) network, and can communicate with one or more computing devices over the network. The connected vehicles may include conventional vehicles equipped with one or more advertisement systems in aspect of the present disclosure. The connected vehicles may be configured to include some interior spaces for one or more occupants, e.g., a driver or passengers for transportation purposes and may be configured to include autonomous vehicles as well as non-autonomous vehicles. An "autonomous vehicle" is also known as a self-driving vehicle that is capable of sensing its environment and moving with little or no human input and may be configured to include one or more autonomous driving units.

The term "coupled to" or its variations as used herein means being connected to or in communication with, e.g., a certain device over a network via various network protocols.

The term "a display means" or its variations are used herein to mean a display device including certain electronic display means, including but not limited to, a liquid crystal display (LCD) display, a light emitting diode (LED) display, an organic LED (OLED) display, or other types of display which is capable of outputting one or more visual advertisement contents. Further, the display means may include a flexible display which is flexible in nature, as opposed to more traditional flat screen displays used in most electronic devices. The flexible display may incorporate different types of electronic paper technology such as, but not limited thereto, electrophoretic or electrowetting technologies.

The term "audio means" as used herein means any type of audio means including, but not limited to, one or more speakers which are capable of outputting audio or sounds. The audio means may include traditional speakers and/or vibration speakers.

The term "location information" as used herein means certain information or data including, but not limited to, location data which are determined based on global positioning system (GPS), cellular signals, Wi-Fi signals, beacon signals, etc. The term "proximity information" is also used herein to mean certain position information of an object relative to another object, and may include distance information among two or more objects, based on technologies such as, including but not limited thereto, ultra-wideband (UWB), lidar, laser, camera, ultrasonic waves, etc.

The term "preceding" as used herein means being ahead of or in front of at a certain distance between two or more connected vehicles which may be moving in a direction or stationary. The term "following" as used herein means being disposed behind a connected vehicle while moving in a direction or stationary.

The term "billboard" as used herein means a general structure displaying one or more advertisements, such as, including but not limited thereto, a stationery structure, e.g., a conventional billboard, a wall of a building, etc., or a display disposed on a side of a vehicle, which may be stationary or moving. Also, the billboard may include one or more computing devices and/or communication devices.

The term "a discount rental fee" as used herein means a code or coupon for a discount in a rental fee of a connected vehicle. The term "a maximum reward route" as used herein means a route in which one can collect a maximum amount of rewards possible using or riding in a connected vehicle. The term "an expected advertisement effect" as used herein means an effect of advertisement including both quantifiable and non-quantifiable effects. An example of an expected advertisement effect may be a numerical value assigned to a number of viewers of an advertisement outside a connected vehicle.

Further, the terms "audio," "audio content" or "audio advertisement" may be used interchangeably; the terms "image," "image content" or "image advertisement" may be used interchangeably and the terms "video," "video content" or "video advertisement" may be used interchangeably to mean the same subject matter. In the present disclosure, each advertisement may include either an audio or an image advertisement content.

The term "mission advertisement" or "mission" as used herein means one or more advertisements that are carried out or reproduced by at least one vehicle, e.g., connected vehicle when a driver of the at least one vehicle accepts a mission or mission advertisement that is made available by a system or server over a network. A mission or mission advertisement may be determined based in part on factors including, but not limited thereto, certain location information, time, duration, etc. related to the one or more advertisements requested by an advertiser.

The term "cluster advertisement" as used herein means one or more advertisements reproduced simultaneously or in a coordinated manner by at least three vehicles as a cluster, e.g., group of connected vehicles. That is, a cluster advertisement may include a non-interactive advertisement or an interactive advertisement. The non-interactive advertisement includes a same advertisement simultaneously reproduced by a cluster of connected vehicles using external displays and/or external speakers, thereby amplifying and increasing the effect of an advertisement that is reproduced. On the other hand, the interactive advertisement may include a same advertisement reproduced by the cluster of connected vehicles in a coordinated manner, but each connected vehicle may take on a role different from others in the same advertisement. The interactive advertisement may include the same advertisement reproduced as a single body with different roles assigned to each connected vehicle in the cluster. The interactive advertisement may also include a stereo advertisement disclosed herein. Further, the interactive advertisement may interact with bystanders or pedestrians and receive input from them.

The term "individual advertisement" as used herein means one or more advertisements reproduced by a connected vehicle when not participating in either a mission advertisement or a cluster advertisement. In the individual advertisement, either an image or a video advertisement may be reproduced, based on a predetermined order, including but not limited thereto, advertisement priority, a reproduction counter for a currently running advertisement, arrival time to a specific location, specific time of the day, status on preceding and following vehicles, etc.

The term "parking advertisement" as used herein means one or more advertisements reproduced by at least one connected vehicle in a parking lot. In a parking lot, such as a department store parking lot or other public or private parking lot, a group of connected vehicles may be parked. In such a case, a cluster for advertisement may be formed and the parking advertisement may be reproduced right after when transmission of a wireless signal from a remote controller to a parked vehicle near the cluster is detected. The term "public goods advertisement" or "public goods announcement" as used herein means one or more public goods advertisements or announcements that are reproduced for non-commercial purposes by at least one connected vehicle. The public goods advertisement may include a video or an image displaying weather, dust, traffic, news, train or bus schedules, emergency announcements, etc. based on location of the connected vehicle.

The term "advertisement event" as used herein means an event designed for carry-out of one or more advertisements by one ore more connected vehicles for an advertiser at a particular purpose. The one or more advertisements may include a mission advertisement, a cluster advertisement, an individual advertisement, a parking advertisement, or a public goods advertisement. In the present disclosure, the advertisement event may also mean a mission advertisement, a cluster advertisement, an individual advertisement, a parking advertisement, or a public goods advertisement.

FIG. 1 is a diagram conceptually illustrating an example embodiment of the present technology in accordance with an aspect of the present disclosure. FIG. 1 illustrates a high-level system including various components such as one or more clients 101 or 103, a network 105, one or more servers 107, and one or more databases 109. The one or more clients 101 may include one or more connected vehicles 101 or advertisement structures 103, which are coupled to the network 105 via a first wireless network 111. The first wireless network 111 may be implemented using various telecommunications technologies, such as cellular technology and/or data communications technology, including but not limited thereto, the $3^{rd}$ Generation (3G), the $4^{th}$ Generation (4G), the $5^{th}$ Generation (5G), or any other advanced future generation telecommunications technologies, which are based on Internet Protocol (IP) or its variants. The network 105 may be composed of one or more public or private networks connecting the one or more clients 101 and 103 to one or more servers 107 over a network.

In an aspect of the present disclosure, the one or more servers 107 may include ADC servers which may be coupled to one or more databases 109. The one or more databases 109 may contain various types of data, including but not limited thereto, a database of advertisements (or advertisement contents), a database of user profiles, a database of advertiser profiles, a database of news and other information (e.g., news, videos, audios, broadcasts, weather news, missions, surveys or votes, interactive games, etc.) and a database of the clients 101 and 103. Further, the one or more servers 107 may be implemented to perform various functions, including but not limited thereto, management and control of advertisements. Also, the one or more servers 107 (e.g., ADC servers) may be configured to manage and control delivery of advertisements or advertisement contents to the one or more clients 101 or 103 over the first wireless network 111. Also, the one or more servers 107 may include account management functions for the advertisement contents, advertisers, advertisement events, and users. The account management functions may also include information on subscriptions, reward payments, etc. Further, in an aspect of the present disclosure, the one or more servers 107 may be implemented in a single computer or over multiple computers as a distributed system. The one or more servers 107 may also be implemented in cloud platforms.

Referring back to FIG. 1, in an aspect of the present disclosure, the one or more connected vehicles 101 may be configured to receive one or more advertisements or advertisement contents from the servers 107, based in part on location information of the one or more connected vehicles 101, via the network 105 and the wireless network 111, and output the one or more advertisements to occupants inside the one or more connected vehicles 101 or people outside the one or more connected vehicles 101. As such, as mentioned above, the one or more connected vehicles 101 may operate as clients and the servers 107 (e.g., ADC server(s)) as a server in a client-server environment. Also, in another aspect of the present disclosure, the one or more advertisements may be determined based in part on a local time and other factors such as attributes or characteristics of people (e.g., age, sex, preferences, etc.) around or outside the connected vehicles 101, in addition to the location information of the connected vehicles 101. That is, the connected vehicles 101 may be configured to collect, via cameras, information on the attributes or characteristics of people outside the connected vehicles 101 and sent the collected information to the servers 107 for further processing. The one or more servers 107 may be configured to process the collection information for extracting characteristics or traits of the people outside the connected vehicles 101. Many different image processing as well as data analytic tools may be applied to identify and/or determine the attributes or characteristics such as age, sex, preferences, moods, trends, etc. some of which may be used in determining one or more advertisements that is going to be delivered and reproduced on the one or more connected vehicles 101.

Further, the one or more connected vehicles 101 are each configured to send to the servers 107 certain identification information of the connected vehicles, such as vehicle identification number, user, driver or owner information. Further, the one or more connected vehicles 101 may be configured to collect and send real-time to the servers 107 location information of the connected vehicles, e.g., global positioning system (GPS), ultra-wideband (UWB) data, etc., as well as current vehicle operating status and diagnostic data such as speed, temperature, operating conditions, etc.

Furthermore, the one or more connected vehicles 101 are each configured to receive commands and/or data from the servers 107, such as, including but not limited thereto, advertisements or advertisement contents, news, or other types of data that are to be reproduced inside the connected vehicles 101 or outside the connected vehicles 101 (e.g., via external speakers and/or displays). Alternatively, the one or more connected vehicles 101 are each configured to independently take appropriate actions in response to certain commands from the servers 107 over the network 105.

Further, as mentioned above, the client 103 may include a building or structure, such as a billboard, equipped with displays and speakers for reproducing one or more advertisement contents. In another aspect of the present disclosure, the client 101 or 103 may be configured to send certain data to server(s) 107 over the network 105, such as current location information, identification information, environmental conditions including surrounding conditions, a micro dust amount in air, temperature, noise, etc. The client 101 or 103 is further configured to receive from the servers 107 certain commands and/or information, in response, and process the received commands and/or information for one or more actions, e.g., to display or reproduce information on the external displays of the clients 101 or 103. By way of example, the servers 107 may be configured to receive sensory data about the micro dust amount in air from the client 101 or 103 disposed at a certain location, and send certain commands and/or data in response, e.g., warning or alert messages, to the client 101 or 103 so that the warning or alert messages may be reproduced on the external displays and/or external speaker of the client 101 or 103 for the public or people nearby the client 101 or 103

Figure 2A:
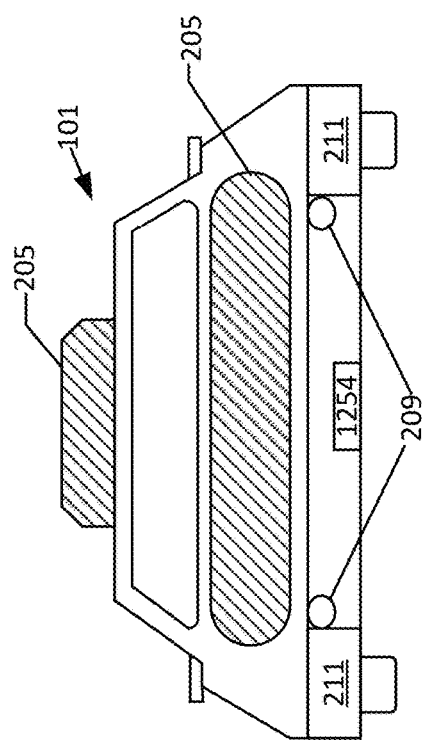
FIGS. 2A-2C are diagrams conceptually illustrating example embodiments of the present technology in accordance with an aspect of the present disclosure.
Figure 2B:
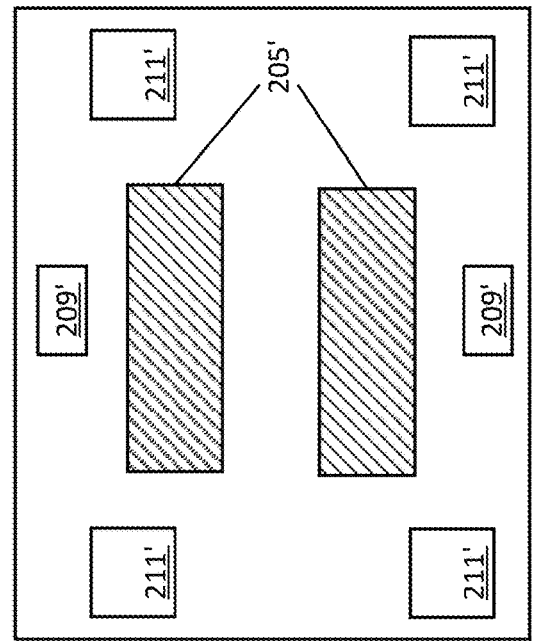
Figure 2C:
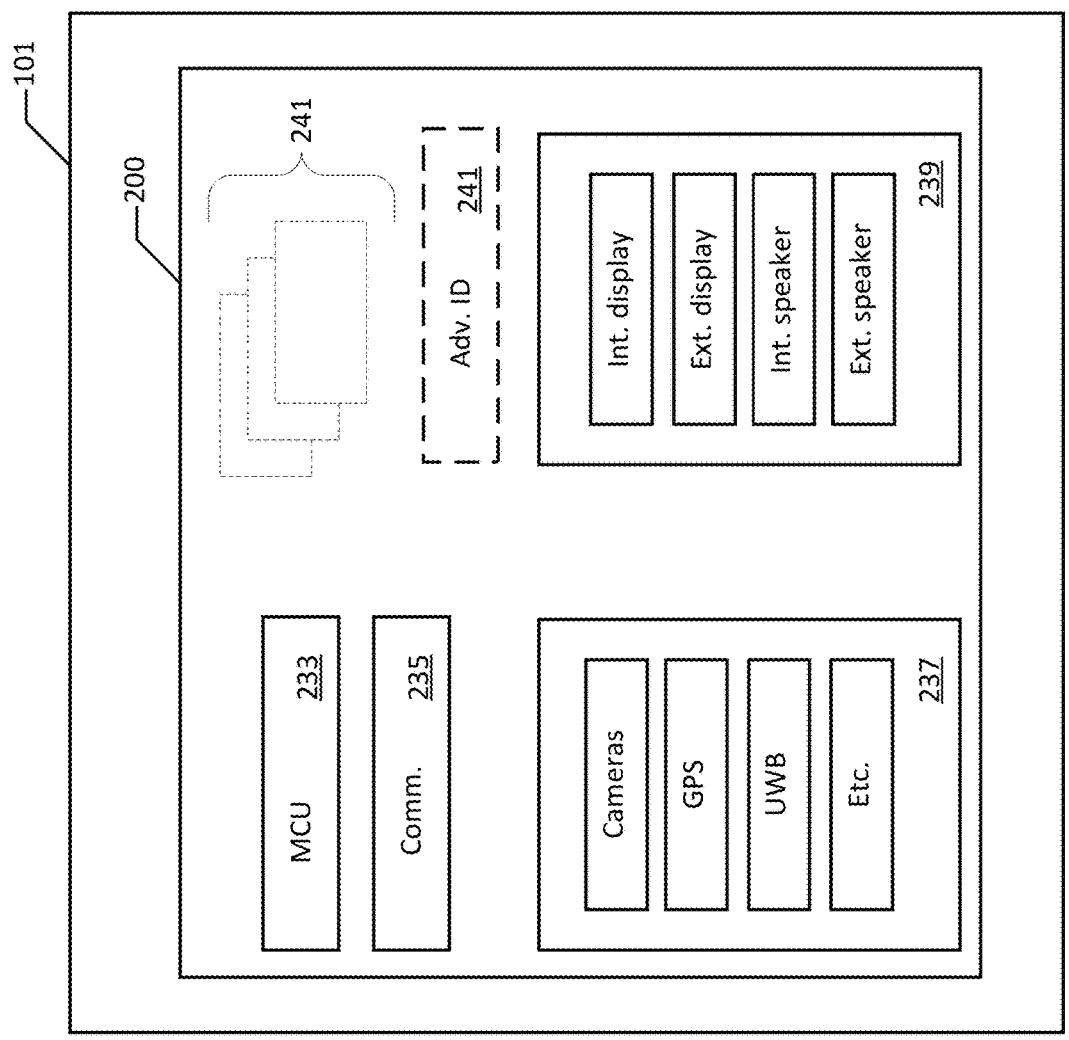

FIGS. 2A-2C illustrate example embodiments of the present technology in an aspect of the present disclosure. By way of example, as shown in FIGS. 2A and 2B, each connected vehicle 101 may be equipped with various devices inside and outside in accordance with aspects of the present technology. First, as shown in FIG. 2A, the connected vehicle 101 may be equipped with one or more external displays 205, one or more external speakers 211, and one or more external cameras 209, for reproducing one or more advertisements or advertisement contents for people outside the connected vehicle 101. Further, the connected vehicle 101 may include inside one or more internal displays 205', one or more internal speakers 211', and one or more internal cameras 209', for reproducing one or more advertisement contents for occupants including drivers and/or passengers in the connected vehicle 101. In an aspect of the present disclosure, the one or more external speakers 211 or the one or more internal speakers 211' may include one or more vibration speakers which are configured to turn vehicle surfaces into speakers.

FIG. 2C illustrate a block diagram conceptually illustrating components of a connected vehicle 101 which includes an advertisement system 200 in an aspect of the present disclosure. By way of example, the advertisement system 200 of FIG. 2C may be included in a vehicle, such as a connected vehicle as shown in FIGS. 1-28. The advertisement system 200 of FIG. 2C may include, but not limited thereto, various components such as a main control unit (MCU) 233, a communication unit 235, a sensor unit 237, an output unit 239, optionally an advertisement identification (ID) unit 241, and optionally one or more databases 241.

In an aspect of the present disclosure, the advertisement system 200 may also include or be coupled to an in-vehicle audio system and a separate advertisement management system. Further, in another aspect of the present disclosure, the advertisement system 200 may be configured to create advertisements based on a melody by words or a piece of music, as well as to select a music playlist based on profiles of vehicle occupants. The advertisement system 200 may be configured to couple to an advertisement management system. Further, in another aspect of the present disclosure, the advertisement system 200 may also be connected or coupled to external speakers or external displays. The advertisement system 200 may be further configured to reproduce one or more advertisements via internal or external speakers or displays.

In the example described herein, the main control unit 233 may be configured for management and control of devices or units of the advertisement system 200 for the reproduction of one or more advertisements via the connected vehicle to increase the effect of advertisement. The main control unit 233 may be coupled to the communication unit 235 which may be configured to communicate with the one or more servers 107 over the network 105 or with other connected vehicles 101 or structures 103, as shown in FIG. 1. Also, as for the communications with the one or more servers 107 over the network 105, various wireless telecommunications technologies such as the third generation (3G), the fourth generation (4G) or the fifth generation (5G) telecommunications technology may be used as the enabling technology for voice as well as high-speed data services with Internet connectivity. Further, in an aspect of the present disclosure, the communication unit 235 of the advertisement system 200 may be configured to include various transceivers that are needed for communicating with other connected vehicles 101 or structures 103. For example, the wireless technologies such as Wi-Fi or other vehicular communication technologies, e.g., vehicle to vehicle (V2V), vehicular ad hoc networks (VANETs), or the like may be used for communications between the connected vehicles 101 or between the connected vehicles 101 and the structures 103. In one implementation, V2V may be used between the connected vehicles 101, which is an automobile technology designed to allow automobiles to communicate with each other and is designed to use a region of 5.9 GHz band, and Wi-Fi may be used for communications between the connected vehicles 101 and the structures 103.

Furthermore, the sensor unit 237 of the advertisement system 200 may include a GPS, UWB transceivers, cameras, vehicular sensors, environmental sensors, etc. to collect various information and data relating to the connected vehicle 101 as well as the surrounding environments. By way of example, the GPS of the sensor unit 237 may be used to collect rough location information of the connected vehicle 101, e.g., GPS coordinates, and the UWB transceivers may be used to obtain relative location or more granular location information of the connected vehicle 101 with respect to other connected vehicles nearby. In another implementation, the sensor unit 237 may also include one or more location identification systems based on cellular signals, Wi-Fi signals, or beacons. Also, in another implementation, the sensor unit 237 of the advertisement system 200 may include other location identification systems based on lidar, laser, ultrasonic waves, or the like.

Further, the sensor unit 237 of the advertisement system 200 may include one or more cameras configured to capture images in real-time of inside as well as outside of the connected vehicle, the images of which will be further processed for various purposes including identification of one or more advertisements, identification of people, identification and extraction of characteristics or attributes of people (e.g., age, sex, preferences, trends, etc.), or determination of people density or vehicle density information, for example. Furthermore, the sensor unit 237 of the advertisement system 200 may include or coupled to one or more proximity sensors to detect presence of object(s) or people near the connected vehicle.

In an aspect of the present disclosure, in the example, one or more external cameras of the connected vehicle may be used to recognize or detect, in cooperation with other software and/or hardware components, one or more advertisement contents displayed on other connected vehicles or stationery or moving structures, such as billboards, trucks, buses, building walls, or etc. The one or more external cameras of the connected vehicle may be used to determine certain traits of people, such as age, sex, preferences, etc. by processing images of the people outside the connected vehicle, for reproducing one or more suitable advertisement contents on the external displays and/or speakers of the connected vehicle based on the determined trains of people. Further, in an aspect of the present disclosure, one or more internal cameras of the connected vehicle may be used to recognize or detect, in cooperation with other software and/or hardware components, certain data relating to one or more occupants in the connected vehicle, including a driver as well as passengers. Further, the one or more internal cameras of the connected vehicle may be used to determine certain traits of people, such as age, sex, preferences, etc. by processing images of the people inside the connected vehicle, for the purpose of reproducing one or more suitable advertisement contents on the internal displays and/or speakers of the connected vehicle based on the determined traits or characteristics of people.

Further, in another aspect of the present disclosure, the one or more external cameras of the connected vehicle may be configured to determine vehicle density information or people density information outside the connected vehicle, which may be used for selecting an appropriate advertisement for reproduction by the connected vehicle. The selected advertisement may be reproduced by the connected vehicle or may be sent by the connected vehicle to other devices including another connected vehicle or an outdoor display such as a kiosk or other structures, the like.

Further, the advertisement system 200 of the connected vehicle 101 may optionally include an advertisement identification unit 241 configured to recognize and identify one or more visual contents of an advertisement reproduced on external displays of other connected vehicles or billboard displays nearby.

Additionally, the advertisement system 200 of the connected vehicle 101 may optionally include one or more databases comprising a database of advertisement contents, a database of advertisers, and/or profiles of drivers, users, or owner of the connected vehicle 101, etc. In an aspect of the present disclosure, the one or more databases 241 of the advertisement system 200 may be used to reproduce advertisements or advertisement contents including visual advertisement contents and/or audio advertisement contents on the connected vehicle 101 or other connected vehicles 101, without retrieving the advertisements from the one or more servers 107 over the first wireless network 111 as shown in FIG. 1.

Further, the one or more databases 241 may include advertisement contents, news, weather, videos, audios, broadcasts, user profiles, driver profiles, vehicle owner profiles, vehicle status profiles, or many others. As noted above, the "advertisement" or "advertisement content" includes both audio and/or visual components. The user profiles may include various information on a user of the connected vehicle, including but not limited thereto, personal data including name, age, sex, shopping preferences, interests, past use history, preferred route information, etc. The driver profiles may include various information on a driver of the connected vehicle, including but not limited thereto, personal data including name, age, sex, shopping preferences, past use history, driving habits, etc. In one implementation, the user profile may be the same as the driver profile, but not necessarily so in other implementations. The vehicle owner profiles may include various information on a vehicle owner, including but not limited thereto, personal data including name, age, sex, shopping preferences, interests, driving habits, auto insurance, etc.

Further, in another aspect of the present disclosure, the one or more databases 241 of the advertisement system 200 disposed in the connected vehicle 101 may be automatically updated on a regular basis over the first wireless network 111 from the one or more servers 107 over the network 105. Further, the one or more databases 241 of the advertisement system 200 may automatically synchronize on a periodic basis in part or in whole with one or more network databases via the one or more servers 107 over the network.

Figure 3:
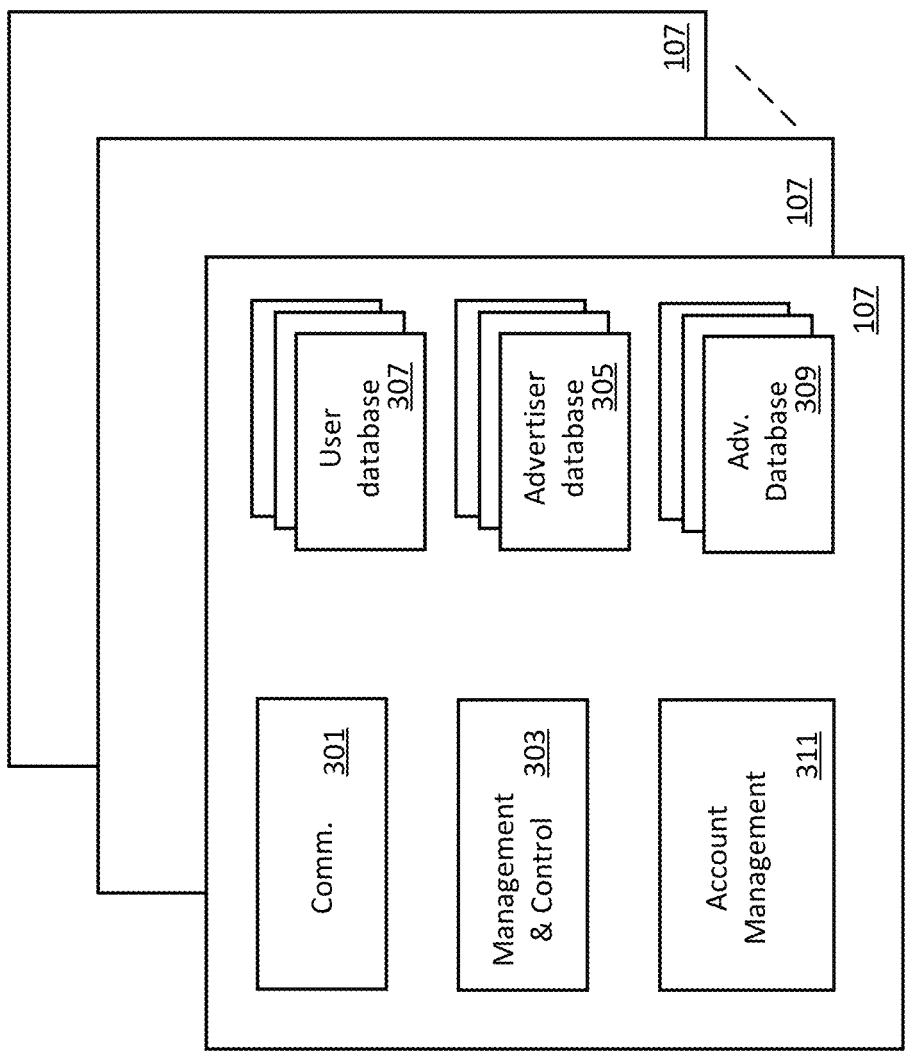
FIG. 3 is a diagram conceptually illustrating an example embodiment of the present technology in accordance with an aspect of the present disclosure.

FIG. 3 illustrates a diagram conceptually illustrating various components of one or more servers 107 over the network 105 for managing and delivering advertisement contents to connected clients 101 or 103. By way of example, in an aspect of the present disclosure, a server 107 (e.g., ADC server) may be configured to include a communications unit 301, a management and control 303, and an account management 311. The server 107 may further include, or alternatively coupled to, one or more databases, including but not limited thereto, a database of advertisement contents 305, a database of user profiles 307, a database of advertiser profiles 309. Further, in another aspect of the present disclosure, various other functionalities or databases may be implemented in multiple servers in a distributed manner.

In an aspect of the present disclosure, the communication unit 301 of the server 107 may be configured to include a receiving unit (not shown) configured to receive certain data (e.g., vehicle location information, vehicle status and diagnostic data, advertisement status, etc.) from one or more clients 101 or 103 and a transmitting unit (not shown) configured to send commands and/or data including advertisements to the clients 101 or 103.

Also, the management and control 33 of the server 107 may be configured to manage and control the connected vehicles 101 as well as delivery of the advertisements to the connected vehicles 101. In an aspect of the present disclosure, the management and control 33 of the server 107 may be configured to select an advertisement based on certain information including traffic density information or people density information which is collected from a plurality of connected vehicles in a target area. The certain information may also include profiles of drivers in the connected vehicles. Further, the advertisement may be selected based at least one of the vehicle related information (e.g., vehicle profiles, location information, driving status, driver's preferences, driver's habit information, feedback information, etc.). Furthermore, in another aspect of the present disclosure, the server 107 may be configured to collect certain information including traffic density (e.g., vehicle density and/or people density), vehicle profiles, and user profiles. The collected certain information may be used to select an appropriate advertisement for reproduction as well as to group two or more connected vehicles for a specific event. Further, in another aspect of the present disclosure, the certain information may include real-time information on drivers of the connected vehicles, e.g., driver driving habits or the like, which may be collected from vehicle OBD information or via internal cameras in the connected vehicles.

Further, the account management 311 of the server 107 may be configured to store and manage accounting data (e.g., subscription status, rewards status, payment status, etc.) relating to the users, drivers, vehicle owners, as well as advertisers. The account management 311 of the server 107 may be configured to administer payment of one or more rewards to the users, drivers, or vehicle owners when certain actions are taken, which the advertisers specify relating to the advertisements that are reproduced by the connected vehicles.

Furthermore, in an aspect of the present disclosure, the database of advertisement contents 305 may be configured to include one or more advertisements or advertisement contents that are to be delivered to the connected vehicles 101 over the network 105 and 111. As noted above, each advertisement may include audio and/or visual components, e.g., audio advertisement content and/or visual advertisement content. Also, the one or more advertisements may be selected and delivered to the connected vehicles over the network, based on certain information such as, including but not limited thereto, location information of the connected vehicles, local time information, advertisement event information, advertiser requests, or attributes of people (e.g., age, sex, preferences, etc.).

In another aspect of the present disclosure, the database of user profiles 307 may be configured to include one or more profiles of users (including drivers) of a connected vehicle, e.g., user information, including but not limited thereto, name, age, sex, personal preferences, interests, preferred routes, shopping habits, an amount of rewards, etc.

Further, in an aspect of the present disclosure, the database of advertisers 305 may be configured to include one or more profiles of advertisers, e.g., advertiser information, including but not limited thereto, advertiser name, location, type of business, advertisement contents, reward payment criteria, etc. The advertiser may include a corporate entity or an individual person who pays for an advertisement event.

Furthermore, the one or more servers 107 may include (or be coupled to) databases of other types of information such as current news, sports news, weather information, podcasts, live broadcasts, videos, audios, etc. that may be of interest to the public.

Having discussed some aspects of the systems of the present technology at a high level, more detailed aspects of the present technology are provided in the following using flowcharts and various embodiments.

Figure 4:
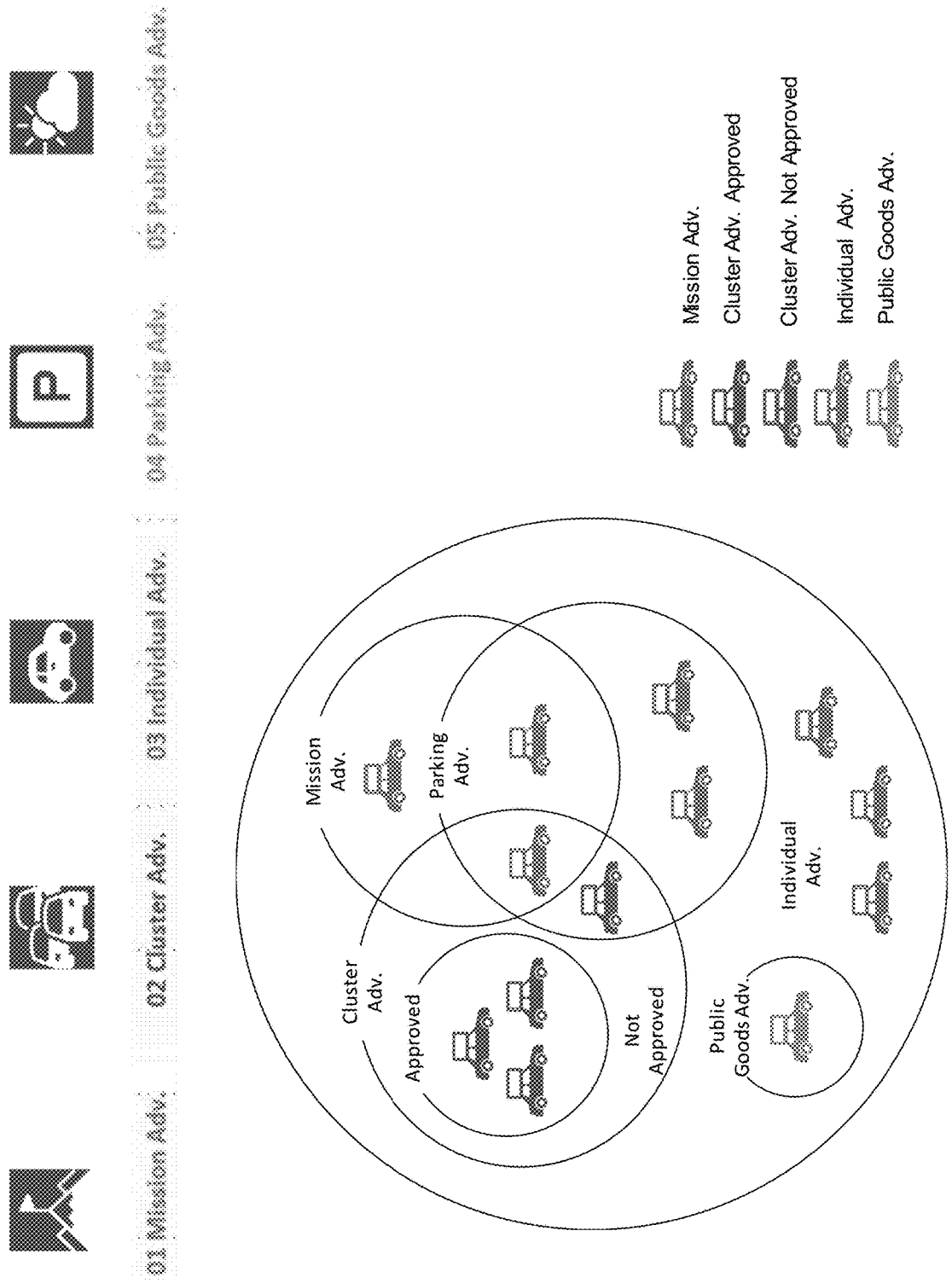
FIG. 4 conceptually illustrates an example embodiment of the present technology in accordance with an aspect of the present disclosure.

FIG. 4 illustrates different types of advertisement that may be reproduced on connected vehicles in accordance with an aspect of the present technology. By way of example, one or more advertisements disclosed herein may be classified into different types: mission advertisements, cluster advertisements, individual advertisements, parking advertisements, and public goods advertisements. One may include others. The connected vehicles such as 101 of FIG. 1 may be configured to reproduce one or more of different types of advertisements based in part on location information of the connected vehicles and/or instructions received from a server such as the server 107.

In the present disclosure, the mission or mission advertisement may include one or more advertisements that are carried out or reproduced by at least one vehicle, e.g., connected vehicle 101, when a driver of the at least one vehicle accepts a mission or mission advertisement that is made available by a system or server (e.g., the ADC server such as the server 107) over a network. The mission or mission advertisement may be determined based in part on factors, including but not limited thereto, certain location information, time, duration, etc. related to the one or more advertisements requested by an advertiser. Further, the mission advertisement may further include an advertisement service provided for a special event including but not limited thereto, a birthday, Christmas, New Year's Day, Thanksgiving Day, Veterans Day, etc.

As mentioned above, a cluster advertisement may include one or more advertisements reproduced simultaneously or in a coordinated manner by at least three vehicles as a cluster, e.g., a group of connected vehicles. Further, the cluster advertisement may include a non-interactive advertisement or an interactive advertisement. For the cluster advertisement, a cluster may be formed by the ADC server based on two sets of vehicle information that each connected vehicle collects and/or sends to the ADC server: a first set (e.g., GPS information) for rough location information and a second set (e.g., UWB data) for precise location and position information. Based on these two sets of data, the ADC server may determine the precise location and relative position information of the connected vehicle. As such, the cluster may be determined by the ADC server in consideration of: the vehicle location, status of an advertisement in reproduction in the vehicle, a vehicle profile, an advertiser profile, advertiser location, advertisement event details, or the like.

In an aspect of the present disclosure, the vehicle location includes current location information of a connected vehicle and/or destination location information. The advertiser location includes location information of one or more stores of an advertiser. The event location may include location information where an advertisement is to take place. The event location may include a spot near the one or more stores of the advertiser or a specific driving route of interest. The status of an advertisement in reproduction in the vehicle may include information on a type of advertisement, identification of the advertisement, and how much time is remaining for playing the advertisement, or the like. The vehicle profile may include information including vehicle type, model, make, color, size, etc. The advertiser profile may include information including advertiser preferences such as types of advertisements, durations, target audience, routes, rewards, or the like.

Further, in the example, based on the received information from the connected vehicle, the ADC server may be configured to determine whether the connected vehicle is to participate in a specific cluster advertisement. As such, after the determination, the ADC server may notify the connected vehicle of a status of the connected vehicle as to participation in a cluster advertisement, e.g., cluster advertisement approved (in) or cluster advertisement not approved (out). Further, the ADC server may be configured to determine whether the connected vehicle is to participate in an advertisement event based in part on user preferences. In the present disclosure, the term "user preference(s)" as used herein may mean one or more preference(s) indicated by a driver or user of a connected vehicle, as part of a profile stored in a database over a network. That is, a user of the connected vehicle may indicate his or her desire to participate in one or more advertisement events in the user's profile. As mentioned above, user profiles of registered users of connected vehicles may be stored in a database which is coupled to the ADC server, and the ADC server may access the database of the user profiles and consult the profile of the user (or driver) of the connected vehicle to determine whether the connected vehicle is to participate in the advertisement event.

Also, an individual advertisement may include one or more advertisements reproduced by a connected vehicle when not participating in either a mission advertisement or a cluster advertisement. In the individual advertisement, either an image or a video advertisement may be reproduced, based on a predetermined order, including but not limited thereto, advertisement priority, a reproduction counter for a currently running advertisement, arrival time to a specific location, specific time of the day, status on preceding and following vehicles, etc.

Further, a parking advertisement may include one or more advertisements reproduced by at least one connected vehicle in a parking lot. In a parking lot, such as a department store parking lot or other public or private parking lot, a group of connected vehicles may be parked. In such a case, a cluster for advertisement may be formed and the parking advertisement may be reproduced right after when transmission of a wireless signal from a remote controller to a parked vehicle near the cluster is detected. Furthermore, a public goods advertisement or public goods announcement includes one or more public goods advertisements or announcements that are reproduced for non-commercial purposes by at least one connected vehicle. The public goods advertisement may include a video or an image displaying weather, dust, traffic, news, train or bus schedules, emergency announcements, etc. based on location of the connected vehicle.

Figure 5A:
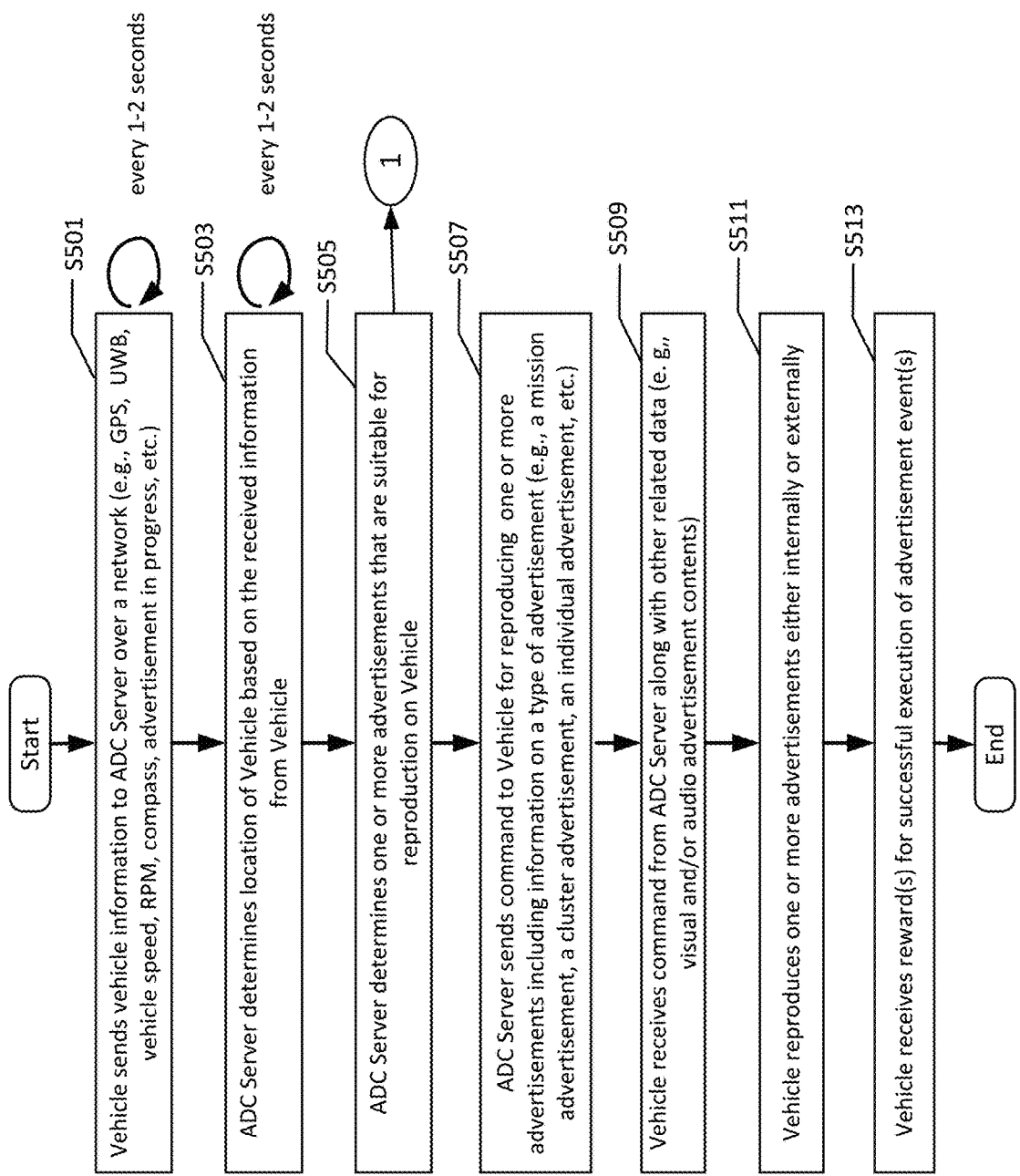
FIGS. 5A, 5B, and 5C conceptually illustrate example embodiments of the present technology in accordance with an aspect of the present disclosure.
Figure 5B:
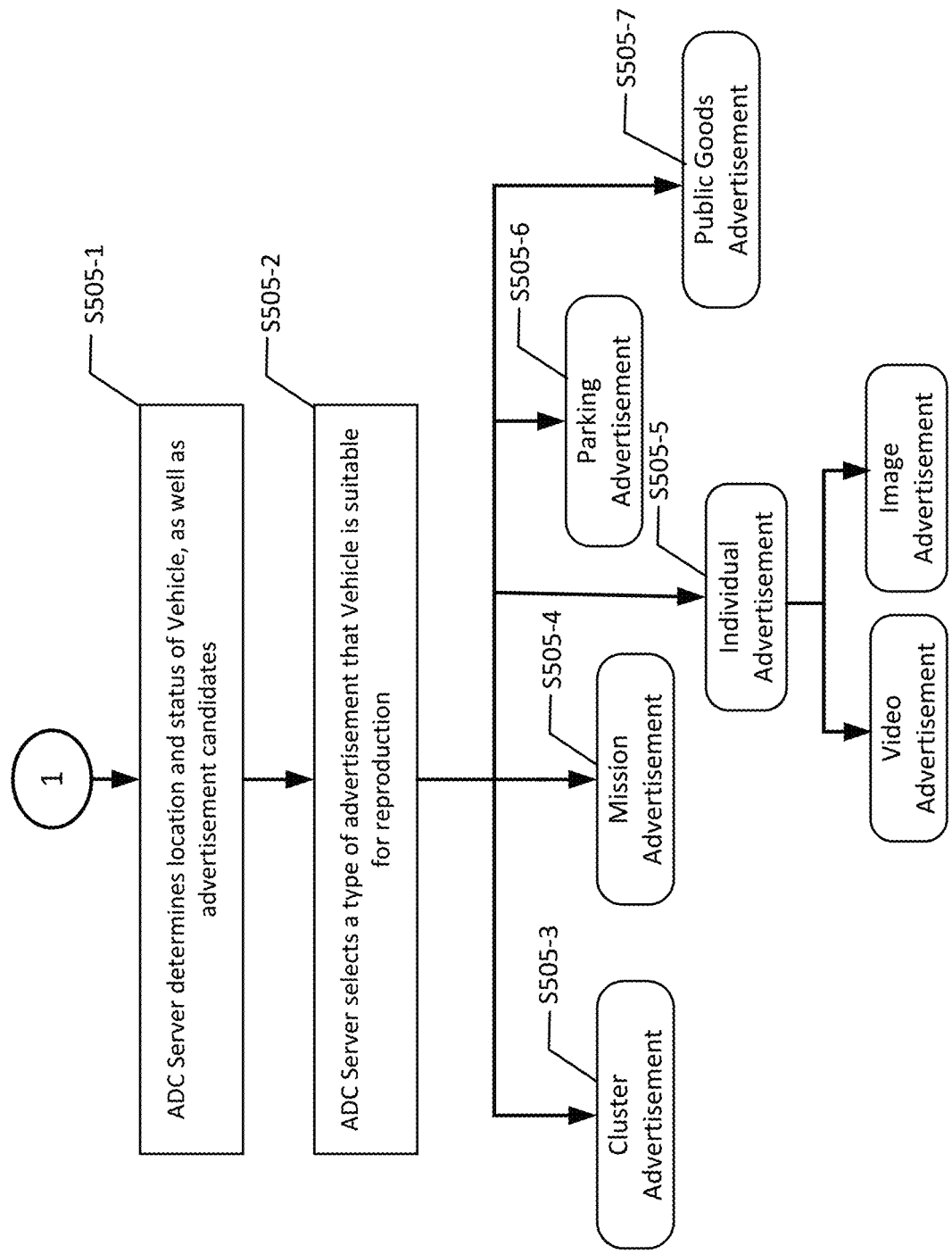
Figure 5C:
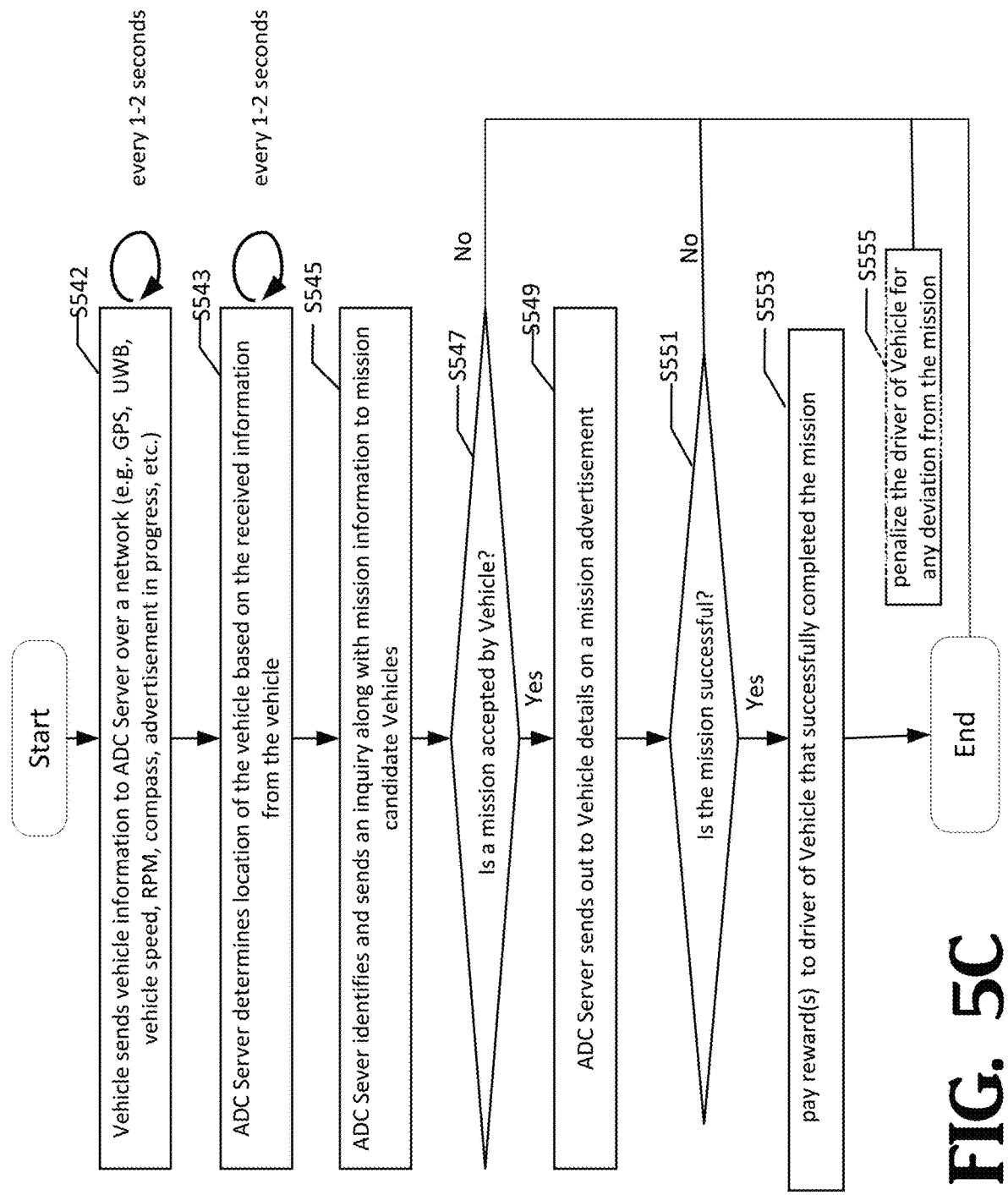
Figure 6:
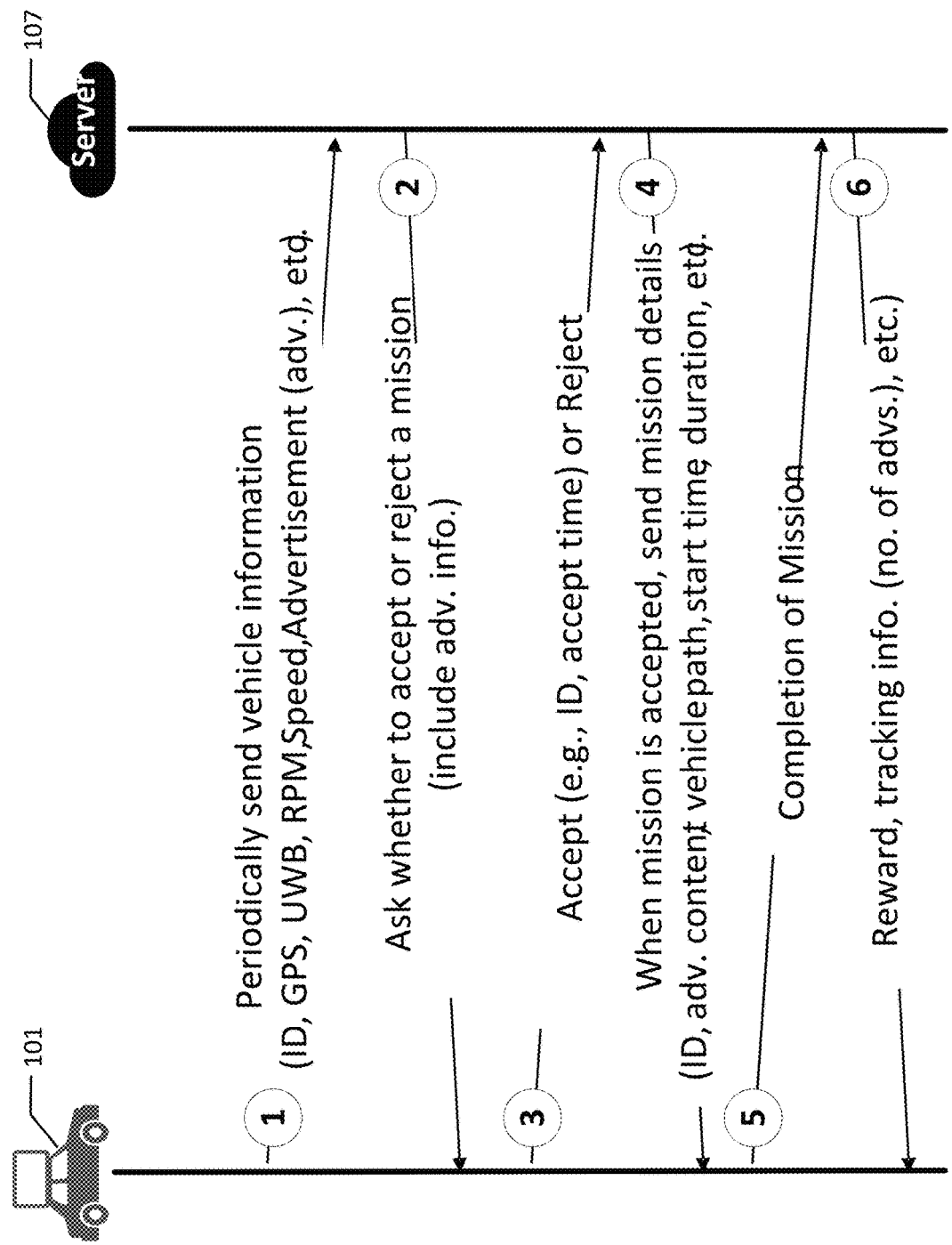
FIG. 6 conceptually illustrates an example embodiment of the present technology in accordance with an aspect of the present disclosure.
Figure 7:
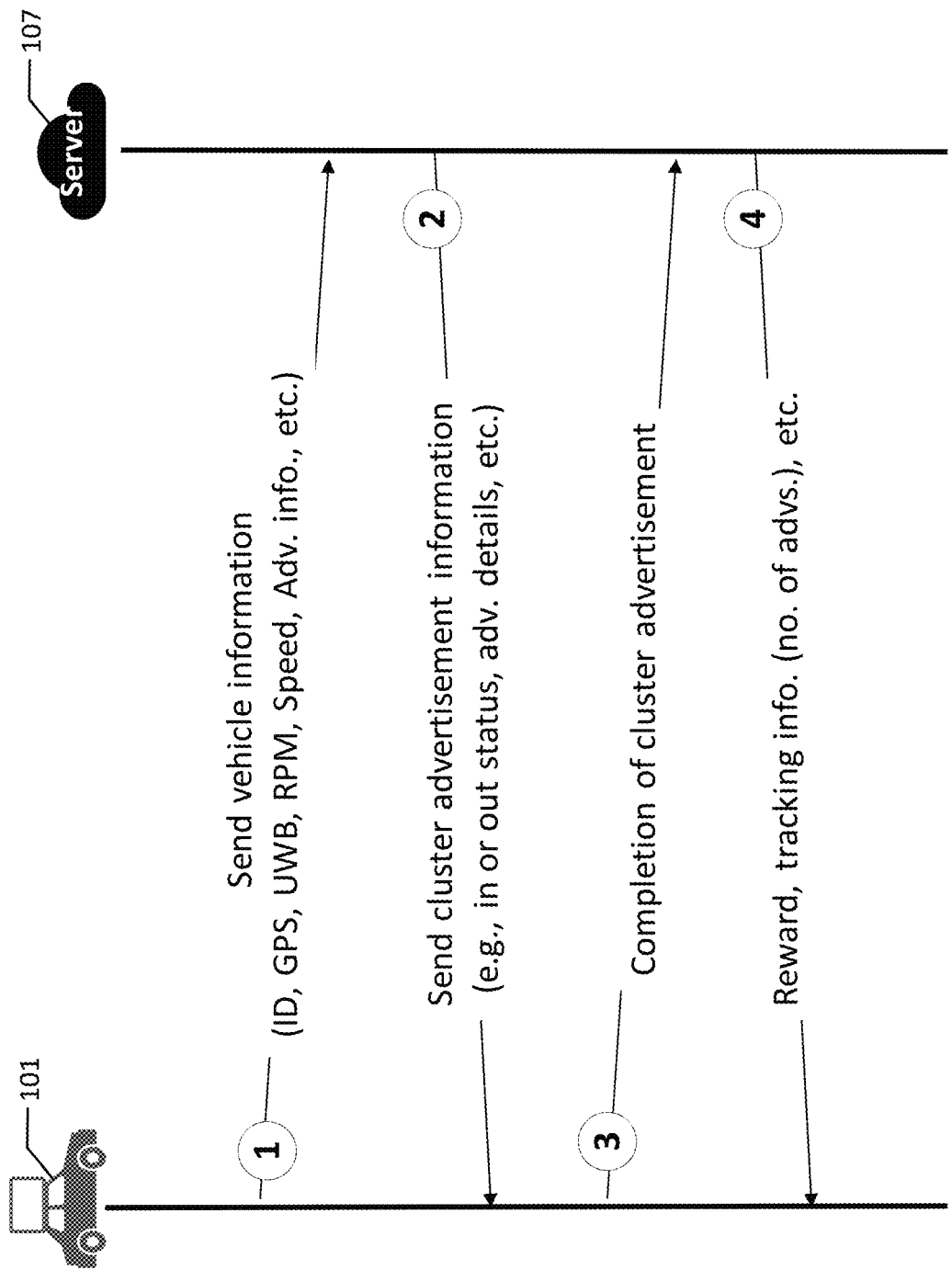
FIG. 7 conceptually illustrates an example embodiment of the present technology in accordance with an aspect of the present disclosure.
Figure 8:
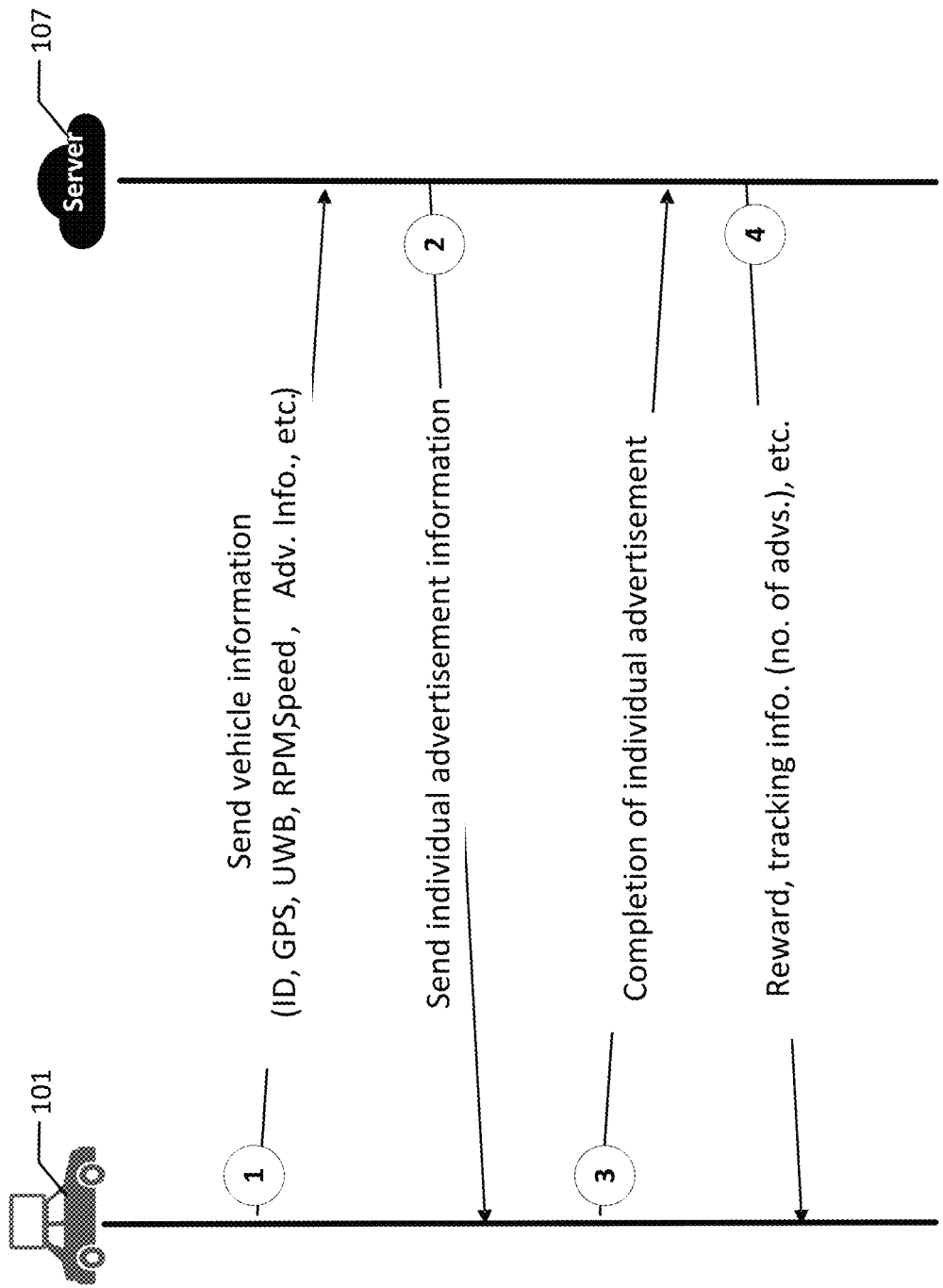
FIG. 8 conceptually illustrates an example embodiment of the present technology in accordance with an aspect of the present disclosure.

FIGS. 5-8 illustrates example process flows in accordance with aspects of the present disclosure. FIGS. 5A-5C are example flowcharts and FIGS. 6-8 are message diagrams conceptually illustrating communications between a connected vehicle and the server 107.

FIG. 5A is a diagram conceptually illustrating, at a high level, a process flow as to how a connected vehicle carries out an advertisement in accordance with an aspect of the present disclosure. By way of example, at S501, a connected vehicle sends periodically certain vehicle information to a server over a network, e.g., ADC server 107. The certain vehicle information may include real-time data on GPS location, UWB, vehicle speed, vehicle diagnostic information, compass information, advertisement in progress, etc.

At S503, the ADC server is configured to use the GPS location data to roughly determine the current location of the connected vehicle and UWB data to determine the more precise location of the connected vehicle along with relative positioning information among a plurality of connected vehicles. Also, the ADC server may use the compass data to aid in determining the orientation of the connected vehicle at the current location of the connected vehicle, relative to other connected vehicles in the area. Further, the ADC server may use the vehicle speed, vehicle diagnostic information, advertisement in progress, or the like to determine the current status of the connected vehicle as well as advertisement reproduction status on the connected vehicle.

At S505, the ADC server is further configured to determine one or more advertisements that are suitable for reproduction on the connected vehicle based in part on received information from the connected vehicle, in accordance with an example flowchart shown in FIG. 5B. Based on the received information from the connected vehicle, the ADC server is configured to determine location information of the connected vehicle, as well as advertisement candidates for reproduction, at S505-1. The advertisement candidates may be determined from a database of advertisements based on the determined location of the connected vehicle, vehicle profiles, as well as advertiser profiles.

At S505-2, the ADC server is further configured to select one or more advertisements that are to be reproduced by the connected vehicle, e.g., as a cluster advertisement (S505-3), a mission advertisement (S505-4), an individual advertisement (S505-5), a parking advertisement (S505-6), and a public goods advertisement (S505-7). The cluster advertisement is selected only when the connected vehicle is determined to be able to participate in a cluster advertisement, based on the location of the connected vehicle, a driver profile, an advertiser profile, vehicle information (e.g., model, make, color, etc. of the connected vehicle), or the like. The mission advertisement is selected when the connected vehicle is determined to be able to perform a mission advertisement event as requested by an advertiser. The individual advertisement is selected when the connected vehicle is determined to be able to perform an individual advertisement, not able to participate in the cluster advertisement, mission advertisement, parking advertisement, or public goods advertisement. Further, the individual advertisement may include a video advertisement or an image advertisement.

At S507, the ADC server is further configured to send commands to the connected vehicle for reproducing one or more advertisements including information on a type of advertisement such as, a mission advertisement, a cluster advertisement, an individual advertisement, a parking advertisement, or a public goods advertisement.

At S509, the connected vehicle is further configured to receive the command from the ADC server and other related data including visual and/or audio advertisement contents relating to the type of advertisement commanded for reproduction on the connected vehicle.

At S511, the connected vehicle is further configured to reproduce the one or more advertisements either internally via internal displays and/or speakers or externally via external displays and/or speakers. In the even that the connected vehicle detects the reproduction of an existing advertisement is in progress, the connected vehicle is further configured to wait until the reproduction of the existing advertisement is finished unless instructed otherwise from the ADC server.

At S513, after successful execution of one or more advertisement events, the connected vehicle (and/or the driver of the connected vehicle) receives a notification of award of reward(s) for participation in the advertisement event, e.g., reproducing the one or more advertisements requested by the ADC server.

Further, in particular, with respect to a mission advertisement, FIG. 5 illustrates an example flow for a mission advertisement in accordance with an aspect of the present disclosure.

At S542, the connected vehicle is configured to send vehicle information to the ADC server every 1 or 2 seconds, including various data such as GPS, UWB, vehicle speed, vehicle diagnostics, compass, advertisement reproduction status, etc.

At S543, the ADC server is configured to determine the location of the connected vehicle based in part on the received information from the connected vehicle. By way of example, the GPS location data is used to roughly determine the current location of the connected vehicle and additionally, the UWB data is used to determine a more precise location of the connected vehicle along with relative positioning information among a plurality of connected vehicles. In one implementation, for the location information, the GPS data may be used, and for granular location information, as needed for further applications, the UWB data may be used in addition to the GPS data. Further, the location of the connected vehicle may be determined based on GPS data, map, camera images, cellular signals, or any combination thereof.

Also, in an aspect of the present disclosure, the ADC server may be configured to use the compass data as well as the UWB data to assist in determining orientation information of the connected vehicle, relative to other connected vehicles nearby. Further, the ADC server may be configured to use a vehicle driving data such as the vehicle speed, vehicle diagnostic information, status on advertisements in reproduction, advertisement details (e.g., identification and duration of the advertisement, etc.) or the like to determine the current driving status of the connected vehicle as well as the advertisement reproduction status on the connected vehicle.

At S545, the ADC server is configured to send a mission inquiry along with mission information, based in part on the location of the connected vehicle, driver profile, advertiser profile, or the like. Some drivers may prefer to carry out mission advertisements than other types of advertisements. Some advertisers may also prefer to use certain types of connected vehicles (e.g., vehicle make, model, size, color, etc.) for their advertisements. Based on such profiles of the driver and advertisers, as well as the information of the connected vehicle, the ADC server may be configured to identify and classify the connected vehicle as a mission candidate vehicle for a carry-out of one or more mission advertisements.

At S547, the ADC server is further configured to determine whether an acceptance reply from the connected vehicle is received for the mission advertisement. At S549, if the acceptance reply from the connected vehicle is received from the connected vehicle, then the ADC server sends out details on the mission advertisement. If not accepted, then the process for the mission advertisement for the connected vehicle terminates.

At S551, the ADC server is further configured to monitor whether the mission advertisement is successfully carried out by the connected vehicle. If the mission advertisement is successfully carried out, then the ADC server is configured to pay rewards(s) to the driver of the connected vehicle that successfully completed the mission, at S553. If, during the mission advertisement, however, the connected vehicle failed to carry out the mission advertisement or deviated from the mission advertisement guidance, then a penalty is assessed and imposed on the driver of the connected vehicle at S555.

In the example, the mission advertisement may be a cluster advertisement or an individual advertisement along a specific route. That is, the mission advertisement may require the connected vehicle to show up a specific location at a certain designated time and carry out the cluster advertisement. Also, the mission advertisement may require the connected vehicle to show up at a specific location at a certain designated time to drive around a certain route while reproducing a specific advertisement on external displays and/or speakers of the connected vehicle. The mission advertisement may be designed based in part on one or more advertiser's specific needs.

FIGS. 6-8 are message diagrams conceptually illustrating communications between a connected vehicle 101 and a server 107 (e.g., ADC server) for example applications in accordance with aspects of the present disclosure.

For example, FIG. 6 shows messages exchanged between the connected vehicle 101 and the ADC server 107 for a mission advertisement. At the beginning of a process, the connected vehicle 101 periodically sends message(s) (e.g., Message Type 1) to the ADC server sends vehicle information including but not limited thereto, vehicle identification (ID), GPS information, UWB information, vehicle RPM information, vehicle speed information, advertisement status information, or the like. Based on the received information from the connected vehicle 101, the ADC server 107 sends to the connected vehicle 101 a message (e.g., Message Type 2) asking whether to participate in an upcoming mission. Then the connected vehicle 101 replies to the ADC server 107 in response to the inquiry message whether to accept the mission or reject the mission (e.g., Message Type 3). The message of Message Type 3 may include certain information such as vehicle ID, mission accept time, etc. Upon receiving the mission accept message, the ADC server 107 sends to the connected vehicle 101 details on the upcoming message (e.g., Message Type 4). The message may include certain information such as vehicle ID, advertisement content (video and/or audio advertisement content), vehicle path, start time, duration, or the like. After completing the mission based on information contained the message (e.g., Message Type 4), the connected vehicle 101 sends a report message informing the ADC server 107 (e.g., Message Type 5) that the mission has been successfully completed. Upon receiving the message of successfully completion of the mission from the connected vehicle 101, the ADC server 107 determines whether the mission was carried out in accordance with mission instructions or details, whether there was any deviation during the carry-out of the mission, or the like. After the successful completion of the mission by the connected vehicle 101 is confirmed, the ADC server 107 provides one or more rewards and send a message including a reward notification and number of advertisements carried out during the mission for accounting purposes.

FIG. 7 illustrates messages exchanged between the connected vehicle 101 and the ADC server 107 for a cluster advertisement. At the beginning of a process, the connected vehicle 101 periodically sends message(s) (e.g., Message Type 1) to the ADC server sends vehicle information including but not limited thereto, vehicle identification (ID), GPS information, UWB information, vehicle RPM information, vehicle speed information, advertisement status information, or the like. Based on the received information from the connected vehicle 101, the ADC server 107 determines whether the connected vehicle 101 is suitable for participation in a cluster advertisement. The ADC server 107 sends to the connected vehicle 101 a message (e.g., Message Type 2) including details on the cluster advertisement. For example, the connected vehicle may be informed whether the connected vehicle 101 is selected for a carry-out of the cluster advertisement, which in an aspect of the present disclosure is based in part on the location and profile information, through the "in" or "out" status information included in the message of Message Type 2. The connected vehicle 101 performs the cluster advertisement and after completing the cluster advertisement contained the message (e.g., Message Type 2), the connected vehicle 101 sends a report message informing the ADC server 107 (e.g., Message Type 3) that the cluster advertisement has been successfully completed. Upon receiving the message of successfully completion of the cluster advertisement from the connected vehicle 101, the ADC server 107 determines whether the cluster advertisement was carried out in accordance with the cluster advertisement instructions or details. After the confirmation of the successful completion of the cluster advertisement by the connected vehicle 101, the ADC server 107 provides one or more rewards and send a message including a reward notification and number of advertisements carried out during the mission for accounting purposes.

FIG. 8 illustrates messages exchanged between the connected vehicle 101 and the ADC server 107 for an individual advertisement. At the beginning of a process, the connected vehicle 101 periodically sends message(s) (e.g., Message Type 1) to the ADC server sends vehicle information including but not limited thereto, vehicle identification (ID), GPS information, UWB information, vehicle RPM information, vehicle speed information, advertisement status information, or the like. Based on the received information included in the message of Message Type 1 from the connected vehicle 101, the ADC server 107 determines whether the connected vehicle 101 is suitable for participation in an individual advertisement. The ADC server 107 sends to the connected vehicle 101 a message (e.g., Message Type 2) including details on the individual advertisement. The connected vehicle 101 performs the individual advertisement and after completing the individual advertisement contained the message (e.g., Message Type 2), the connected vehicle 101 sends a report message informing the ADC server 107 (e.g., Message Type 3) that the individual advertisement has been successfully completed. Upon receiving the message of successfully completion of the cluster advertisement from the connected vehicle 101, the ADC server 107 determines whether the individual advertisement was carried out in accordance with the individual advertisement instructions or details. After the confirmation of the successful completion of the individual advertisement by the connected vehicle 101, the ADC server 107 provides one or more rewards and send a message including a reward notification and number of advertisements carried out during the mission for accounting purposes. Further, in other implementations, one or more processes like the those shown in FIGS. 6-8 may be adopted for other types of advertisement such as parking advertisements as well as public goods advertisements.

Figure 9:
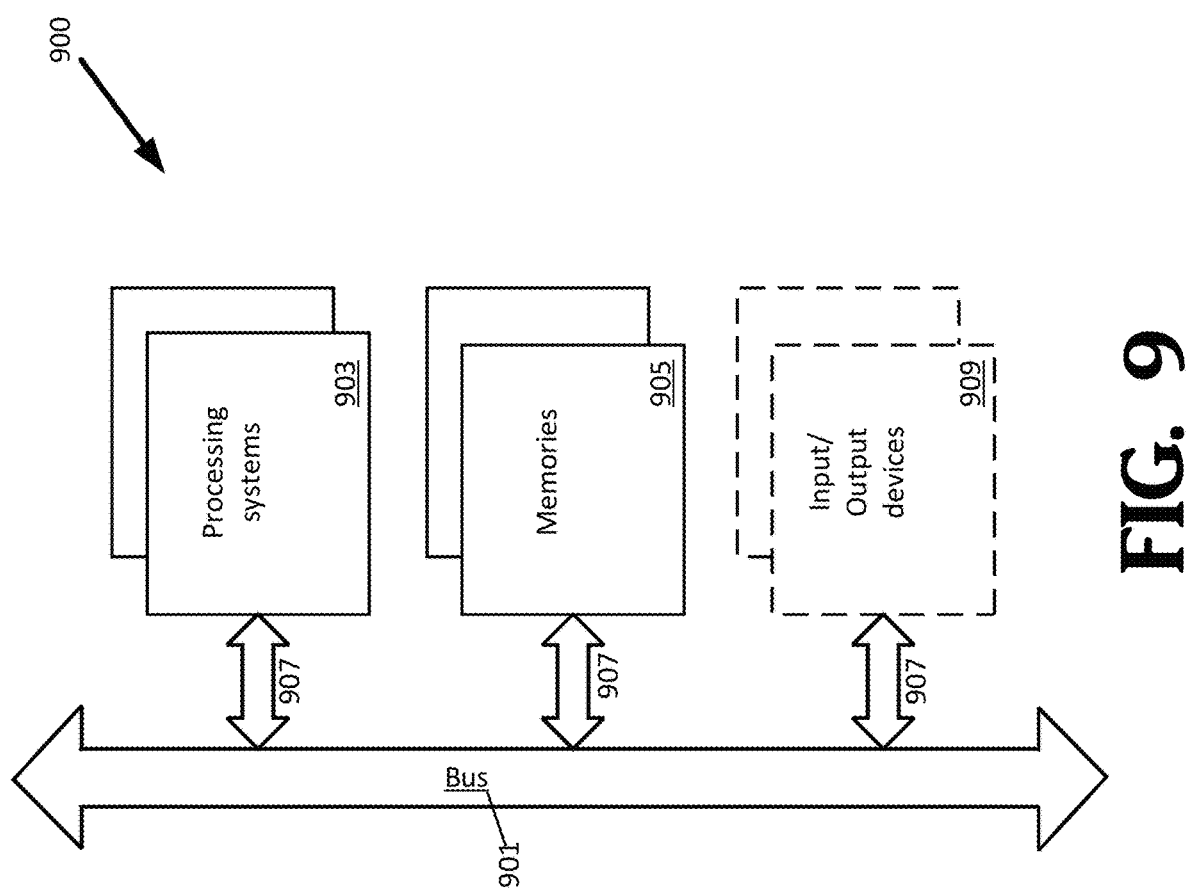
FIG. 9 is a block diagram conceptually illustrating an example of an embodiment in accordance with an aspect of the present disclosure.

FIG. 9 illustrates an example diagram conceptually illustrating an apparatus for implementing various functions, e.g., control and monitoring functions or units or circuitry, in connected vehicle (as shown in FIGS. 1-28), structures 103, and advertisement system 200 and/or the server 107. By way example, as shown in FIGS. 1-3, the advertisement system 200, various components of the advertisement system 200 (e.g., the main control unit 233, the communication unit 235, the sensor unit 237, the output unit 239, the advertisement identification unit 241, databases, or the like), the server 107, various components of the server 107 (e.g., the communication unit 301, the management and control unit 303, the account management unit 311, databases 305, 307, and 309), and other components may be implemented using in part an example apparatus 900 shown in FIG. 9.

As shown in FIG. 9, a bus 901 may link together various circuits, including one or more processing systems (or processors) 903, one or more memories (or storage units) 905, one or more communication interfaces 907, and/or optionally one or more input/output devices 909. The one or more processing systems 903 may be responsible for managing the bus and general processing, including the execution of software stored on a non-transitory computer-readable medium, relating to the one or more functions for present technology as disclosed herein.

Further, the one or more processing systems 903 may include one or more processors, such as microprocessors that interpret and execute instructions. In other implementations, the one or more processing systems 903 may be implemented as or include one or more application specific integrated circuits (ASICs), field programmable gate arrays (FPGAs), or the like. The software, when executed by the one or more processing systems 903, may cause the one or more processing systems 903 to perform the various functions or methodologies described herein for any apparatus. The non-transitory computer-readable medium may also be used for storing data that is manipulated by the one or more processing systems 903 when executing software.

Furthermore, the one or more memories 905 may include various types of memories, including a random-access memory and/or a read only memory, and/or other types of magnetic or optical recording medium and its corresponding device for storing information and/or instructions and/or retrieval thereof. Further, the one or more communication interfaces 907 may also include or coupled to any transceiver-like mechanism that enables communication with other devices and/or systems. The one or more input/output devices 909 may include devices that permit inputting information and/or outputting information to an operator.

FIGS. 10-28 illustrate various embodiments of the present technology in accordance with aspects of the present disclosure.

Figure 10:
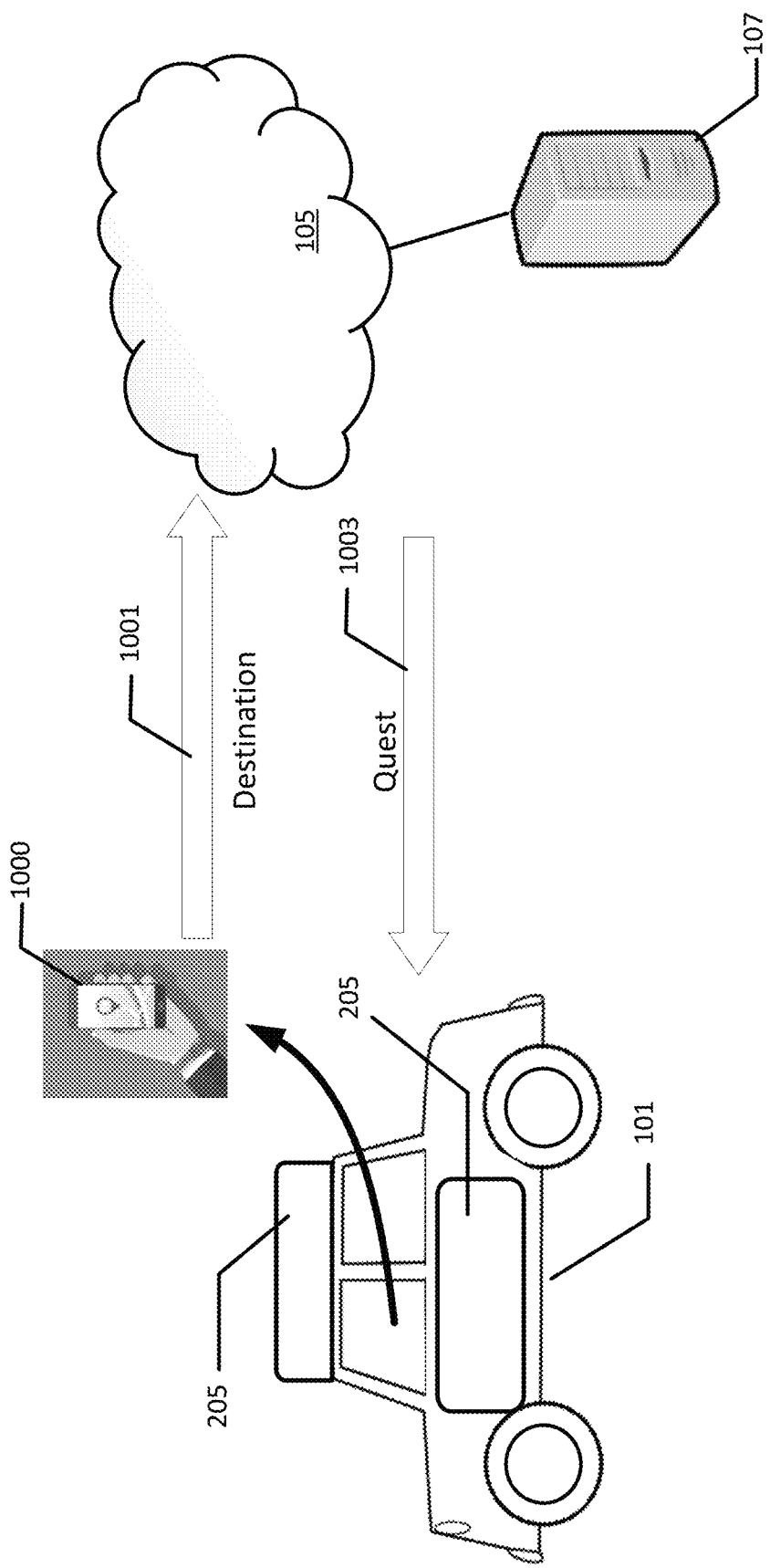
FIG. 10 conceptually illustrates an example embodiment of the present technology in accordance with an aspect of the present disclosure.

FIG. 10 illustrates an example embodiment in accordance with an aspect of the present technology. In an aspect of the present disclosure, a level of driver participation in an advertisement event may be increased by providing a quest (or recommendation) according to a driving route of the driver and available advertisement events. That is, in an aspect of the present disclosure, each of the plurality of connected vehicles may be configured to: receive input on a driving destination from a driver of the connected vehicle, send the received input to the server over the network, and in response, receive one more quests (or recommendations) from the server for a driving route. The one or more quests may be determined by the server, based in part on information on one or more driving routes to the driving destination of the driver, and available advertisement events in the one or more driving routes.

As shown in FIG. 10, by way of example, a driver of a connected vehicle 101 may enter a driving destination via an application on the driver's mobile device 1000 or an in-vehicle navigation device (not shown). The inputted destination information is transmitted to a server 107 over a network 105, via one or more messages 1001. The server 107 then is configured to receive the destination information and determine one or more advertisement campaign(s) or event(s) within the driver's driving path. The server 107 may be configured to prepare and send one or more quest(s) including information on the one or more advertisement campaign(s) or event(s), via one or more push notifications 1003 on the mobile application 1000 in the mobile device. Alternatively, the one or more quest(s) including information on the one or more advertisement campaign(s) or event(s) may be sent to the in-vehicle navigation device for presenting to the driver for selection. That is, it is possible to provide in real-time information about available advertisement events within the driver's expected driving route, e.g., a commute path, via push notifications on the driver's mobile device.

In an aspect of the present disclosure, alternatively, it may be also possible to receive input on a specific destination in advance from the driver, and to provide to the driver real-time information on an advertisement event within one hour from the estimated departure time through one or more push notifications of a mobile phone application.

Further, in another aspect of the present disclosure, the server 107 may be configured to include a function to prepare and recommend one or more quest(s) in consideration of a travelling route, time or the like, with respect to a connected vehicle suitable for the characteristics of the advertisement event among registered advertisement vehicles including connected vehicles such as 101, based on the location and time information of the advertisement event inputted by an advertiser. Further, the characteristics of the advertisement event may include target advertisement audience including audience's age, sex, preference, etc.

In an aspect of the present disclosure, the driver of the connected vehicle 101 may review the received quest(s) and accept the one or more quest(s) prior to departure to the specific destination. When the one or more quest(s) are accepted by the driver, a driving route according to the one or more quest(s) is set in an in-vehicle navigation system of the connected vehicle and driving instructions are provided to the driver of the connected vehicle. Alternatively, the driver of the connected vehicle 101 may request and receive a different request for change while driving to the specific destination.

As a result, the level of driver participation in advertisement event(s) may be greatly increased, by providing one or more quests based on a planned driving route of a driver of the connected vehicle 101.

Figure 11B:
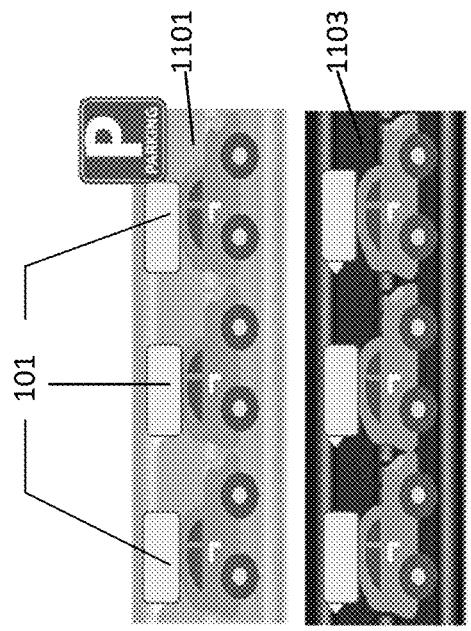
FIGS. 11A, 11B, and 11C conceptually illustrate an example embodiment of the present technology in accordance with an aspect of the present disclosure.
Figure 11A:
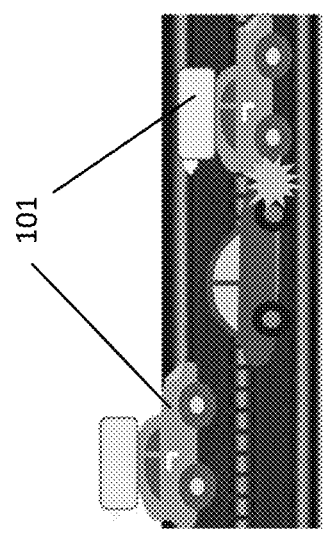
Figure 11C:
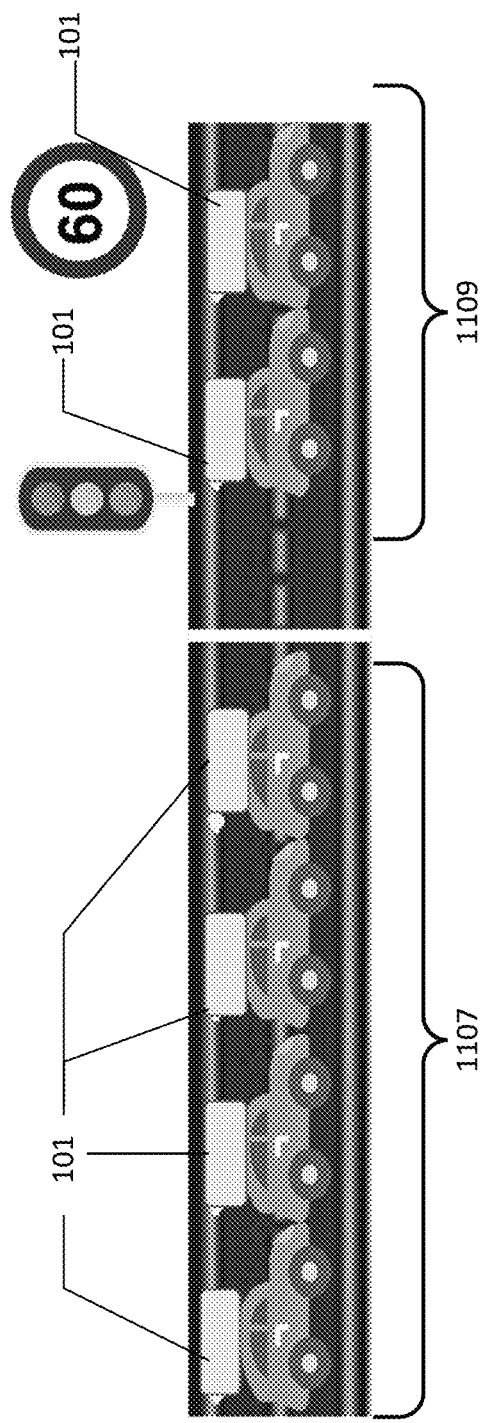

FIGS. 11A, 11B and 11C illustrate example embodiments in accordance with an aspect of the present technology. In preparation for performing a parade or a mission for an advertisement event using a plurality of connected vehicles 101, there may be a need for controlling the connected vehicles 101 to cluster at a predetermined area. By way of example, in preparation for performing the parade or the mission, the plurality of connected vehicles may be instructed to gather together at a predetermined location, e.g., a parking lot or a road with the least traffic.

As shown in FIG. 11A, in one implementation, if one or more connected vehicles 101 await other connected vehicles on a road, there may be a danger of causing an accident or interfering with other vehicles on the road while waiting for other connected vehicles to follow in the parade. Thus, as shown in FIG. 11B, in an aspect of the present disclosure, the connected vehicles 101 that are to participate in a parade for an advertisement event may be clustered either in a designated parking lot 1101 or on a road with the least amount of traffic on the road 1103.

In an aspect of the present disclosure, the server 107 may be configured to search for a parking lot nearby a target parade area and send commands or instructions to a plurality of connected vehicles 101 that are going to participate in the parade to drive and cluster in the parking lot in preparation for the parade. In another aspect of the present disclosure, when there is no such a parking lot for the plurality of connected vehicles that are going to participate in the parade to cluster for the parade, the server 107 may be further configured to search for a road nearby the target parade area with the least amount of traffic on the road, and send commands or instructions to the plurality of connected vehicles 101 to cluster on the road 1103 in preparation for the parade. In the example, the server 107 may collect and analyze data on traffic density or vehicle density information on the roads around the target parade area and select an appropriate cluster location based in part on distance to the target parade area and traffic or vehicle density information.

In another aspect of the present disclosure, during a parade, a traffic light may separate the cluster into two groups, a first group and a second group. In such a case, the first group and the second group need to be controlled so that the two groups can be re-clustered for the parade. That is, during the parade, when the cluster for the parade gets broken into multiple groups by a traffic light, then speeds as well as driving routes of the connected vehicles in multiple groups are controlled by the server 107 over the network such that the multiple groups cluster again into a single procession for the parade or the mission.

By way of example, as shown in FIG. 11C, a plurality of connected vehicles 101 participating in the parade (forming a cluster) are separated into the first group 1109 and the second group 1107 by a traffic light. For an effective management of the parade, the server 107 may be configured to detect that the cluster is separated into two groups by the traffic light. The server 107 may be configured to provide different driving instructions to the first group 1109 and the second group 1107 respectively. For example, the server 107 may provide directions to the first group to drive at a lower speed after the separation and provide instructions to the second group that follows the first group to drive at a higher speed so that the first and second groups can re-cluster at a point for carrying out of the parade. The server 107 may also verify minimum and/or maximum speed limits on the road and provide appropriate instructions to the first and the second groups for re-clustering for the parade.

In another aspect of the present disclosure, the server 107 may collect road information nearby for preparing instructions for the re-clustering for the parade. The server 107 may further provide a set of instructions to the first group to drive to a road with less traffic and wait there for re-clustering and provide another set of instructions to the second group to drive to the road on which the first group is waiting and re-cluster as a group for the parade.

FIGS. 12A and 12B illustrates an example embodiment in accordance with an aspect of the present technology. During a parade for an advertisement event, when driving routes for the parade are simply provided to a driver of a connected vehicle participating in the parade and asked to participated in the parade, there may be a confusion to the driver because the driver may not be able to identify or determine whether a preceding vehicle in front of his or her vehicle is another vehicle participating in the same parade. As such, in an aspect of the present disclosure, the vehicles participating in the same parade may be provided with vehicle information during the parade by the server 107.

In the example, as shown in FIG. 12A, the server 107 may provide vehicle identification information of a preceding vehicle to the connected vehicle 101 that is participating in the parade for internal display of the information to the driver of the connected vehicle. That is, the connected vehicle 101 receives the information and display on an internal display 205' of the connected vehicle 101 for participation in the parade. For example, the driver of the connected vehicle 101 only need to confirm that he or she is following the connected vehicle identified as "2.0.1.8". Further, the server 107 may additionally send identification information of the connected vehicle 101 to the preceding vehicle 101' participating in the parade such that the driver of the connected vehicle 101 may see the identification information of the connected vehicle 101 on the external displays of the connected vehicle 101'. As a result, the driver of the connected vehicle 101 may confirm that the connected vehicle 101 is following a correct vehicle for successful execution of the parade.

Alternatively, the plurality of connected vehicles participating in the parade may communicate with each other to manage and control the connected vehicles independent of the server 107 until the end of the successful execution of the parade. One of connected vehicles may be selected as a master vehicle which serves to manage the parade order and cluster management during the parade. For example, during the parade, a tethered communication link may be established and maintained among the plurality of connected vehicles participating in the parade for a smooth execution of the parade. When a connected vehicle is determined to be driving out of order in the parade, one or more alert messages are generated and displayed on internal displays of the connected vehicles that are driving out of order. Based on the one or more alert messages, the drivers of the connected vehicles may take corrective action to regroup and participate in the parade as the cluster. Alternatively, when the server detects out-of-order connected vehicles in the parade, the server may send driving instructions to the out-of-order connected vehicles to form the cluster as originally designed for the parade.

Figure 13:
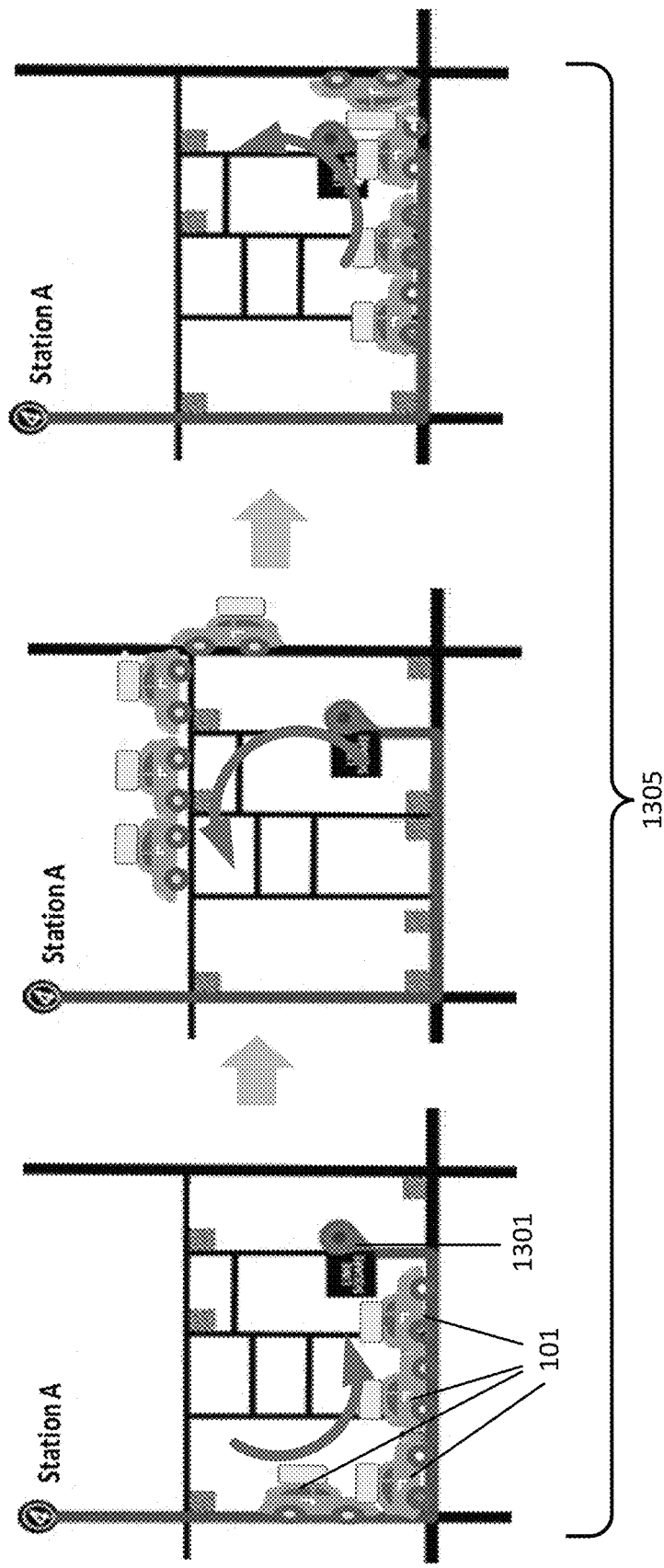
FIG. 13 conceptually illustrates an example embodiment of the present technology in accordance with an aspect of the present disclosure.
Figure 14A:
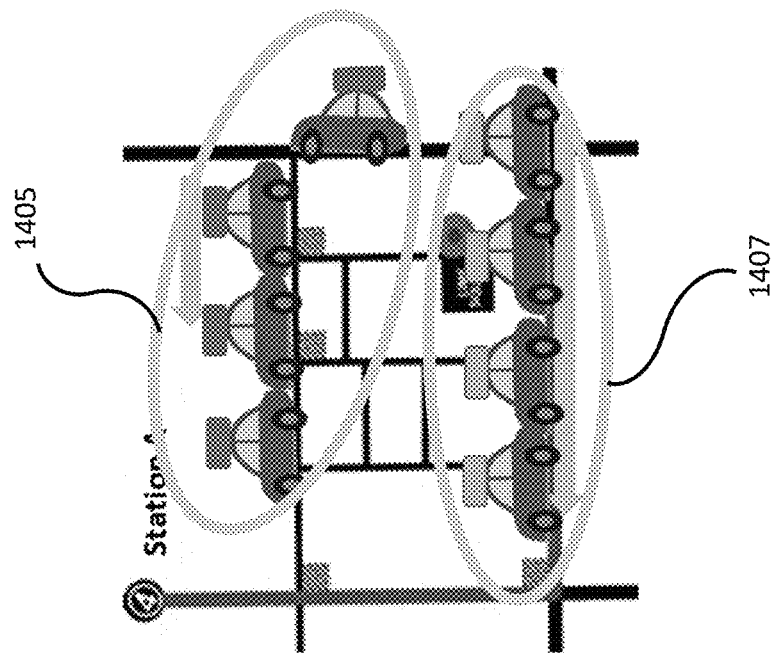
FIGS. 14A and 14B conceptually illustrate example embodiments of the present technology in accordance with an aspect of the present disclosure.
Figure 14B:
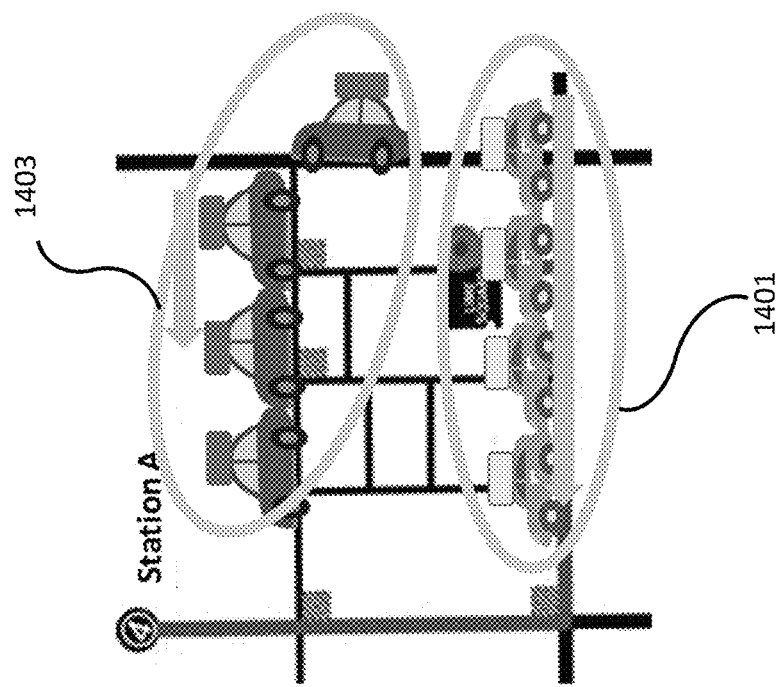

FIGS. 13, 14A and 14B illustrate example embodiments in accordance with an aspect of the present technology. In an aspect of the present disclosure, during a parade in which a plurality of connected vehicles drives together in a target parade area, reproducing the same advertisement, the effect of advertisement may be maximized by inducing repeat recognition.

By way of example, as shown in FIG. 13, for connected vehicle 101 form a cluster for the parade, in which the same advertisement is to be reproduced on the connected vehicles for the benefit of an advertiser's store 1301. For an effect of repeat recognition on people outside viewing the advertisement on the parade, the connected vehicles 101 may make 2-3 turns of the parade around the indicated route (e.g., a repeat recognition route indicated by arrows). FIG. 13 illustrates an example of a repeat recognition route showing a single turn 1305 of the repeat recognition route.

In an aspect of the present disclosure, the server 107 may be configured to identify a repeat recognition route for the parade based in part on factors including the location of the advertiser's store, traffic density on roads nearby the advertiser's store, and/or density information of people in the area. The number of turns around the repeat recognition route may also be determined based in part on the above factors.

Further, in another aspect of the present disclosure, as shown in FIG. 14A, the connected vehicles participating in the parade may be classified and sub-grouped for the parade based on vehicle information such as vehicle type, color, etc. As shown in FIG. 14A, by way of example, two different subgroups 1401 and 1403 may be formed near the target area, based on the vehicle information (e.g., vehicle type, model, make, color, size, or etc.) and drive along different parade routes. The two different sub-groups 1401 and 1403 are configured to reproduce the same or similar advertisement during the parade on the different parade routes, thereby increasing the effect of the advertisement during the parade.

Further, as shown in FIG. 14B, in another aspect of the present disclosure, two or more sub-groups, e.g., sub-groups 1405 and 1407, may be formed for the parade near the target area based in part on types of advertisements and/or advertisement contents or vehicle information. In the example, when the advertisement contents are selected for reproduction based on driver's preferences, etc., the connected vehicles that are to reproduce similar advertisements may be grouped into the different sub-groups 1405 and 1407 for the parade on the different parade routes.

In an aspect of the present disclosure, in one implementation, the server 107 may be configured to determine appropriate subgroups for the parade based in part on vehicle information and driver's preference of the connected vehicles participating in the parade. Further, such groupings (or clustering) for the parade may be done based in part on other factors, including but not limited thereto, a density of people on nearby roads, profile information of people on streets near the target area, types of advertisements to be reproduced by different subgroups, types of vehicles, make or model of vehicles, color of vehicles, etc. or any combination thereof. For some advertisements, factors having similar characteristic may be considered for the subgrouping of the connected vehicles participating in the parade. For other advertisements, factors having different characteristic may be considered for the subgrouping of the connected vehicles participating in the parade, to maximize the effect of the advertisement on people viewing the advertisements reproduced on the connected vehicles participating in the parade.

Figure 15:
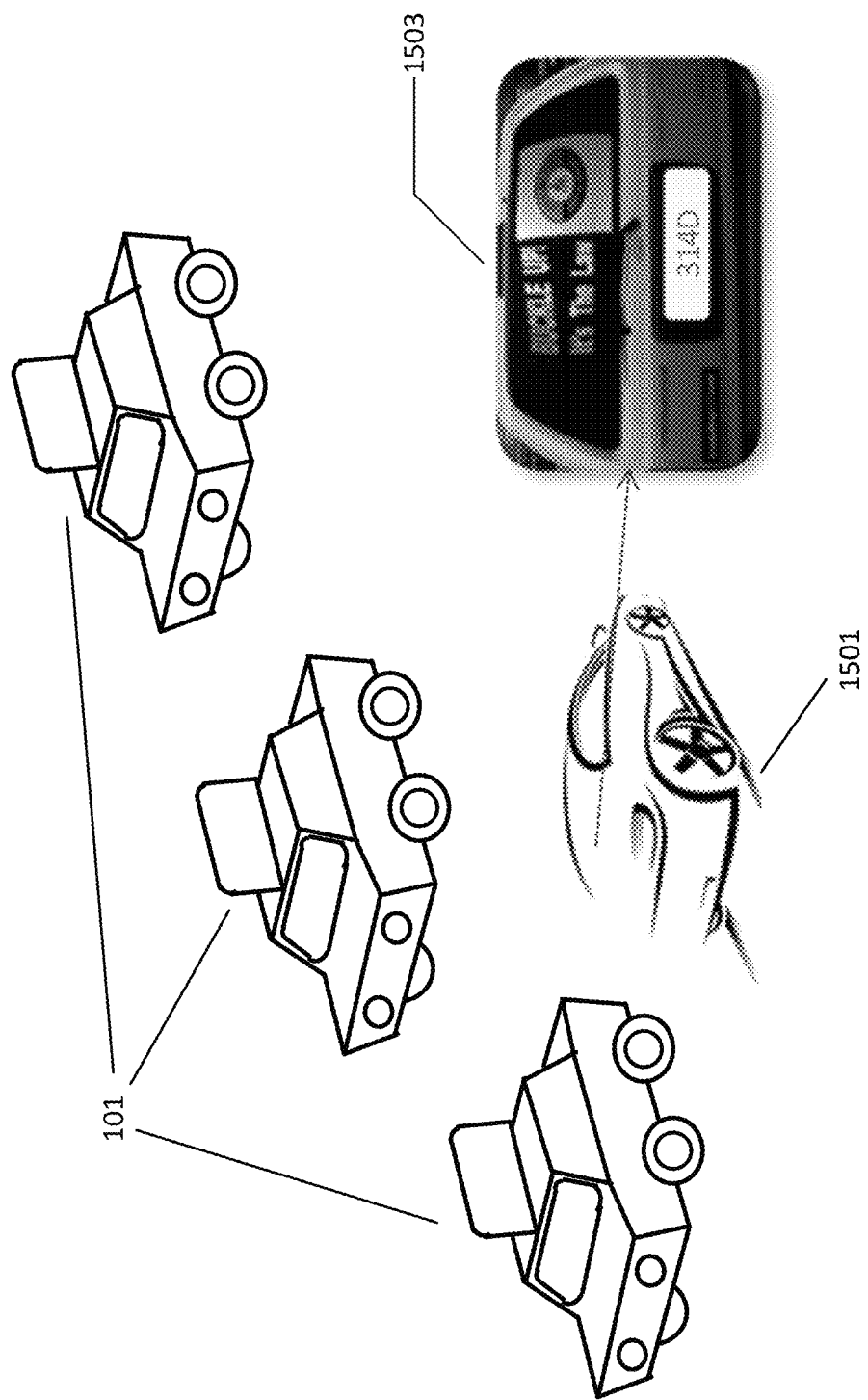
FIG. 15 conceptually illustrates an example embodiment of the present technology in accordance with an aspect of the present disclosure.

FIG. 15 illustrates an example embodiment in accordance with an aspect of the present technology. In an aspect of the present disclosure, during a parade of connected vehicles 101 for an advertisement event, some vehicles may desire to participate in the parade. In such a case, the server may be configured to allow a vehicle to participate in the parade, even though the vehicle has not registered for the advertisement event in advance of the parade. By way of example, as shown in FIG. 15, a vehicle 1501 may try to cut in the middle of the parade of connected vehicles 101. The sever 107 may be configured to detect such an attempt to cut in the parade by the vehicle 1501 and determine whether the vehicle 1501 can successfully participate in the parade. The server 107 may receive a request for registration for the advertisement event via a mobile application on the driver's mobile phone. Upon receipt of the request, the server 107 checks whether the vehicle 1501 is equipped to participate in the advertisement event. After the vehicle 1501 is determined to be able to participate in the parade for the advertisement event, the server 107 may send information on the advertisement for reproducing on the vehicle 1501.

By way of example, as shown in FIG. 15, the vehicle 1501 may be configured to project the advertisement using an in-vehicle projector or the like onto a rear or side window of the vehicle 1501, as shown in 1503, and participate in the parade procession, reproducing the same or similar advertisement through an in-vehicle projector or the like in the vehicle 1501. That is, the vehicle 1501 may be configured to project the same or similar advertisement on a rear window shield or a side window of the vehicle 1501, while participating in the procession of the parade. After the parade is finished, the server 107 may be configured to award a reward to the vehicle 1501 for participation in the parade. In the example, as noted above, although the vehicle 1501 may not be registered in advance prior to the participation in the parade, during the parade, the driver of the vehicle 1501 may register for the participation in the parade via the mobile application on the driver's mobile device.

Figure 16A:
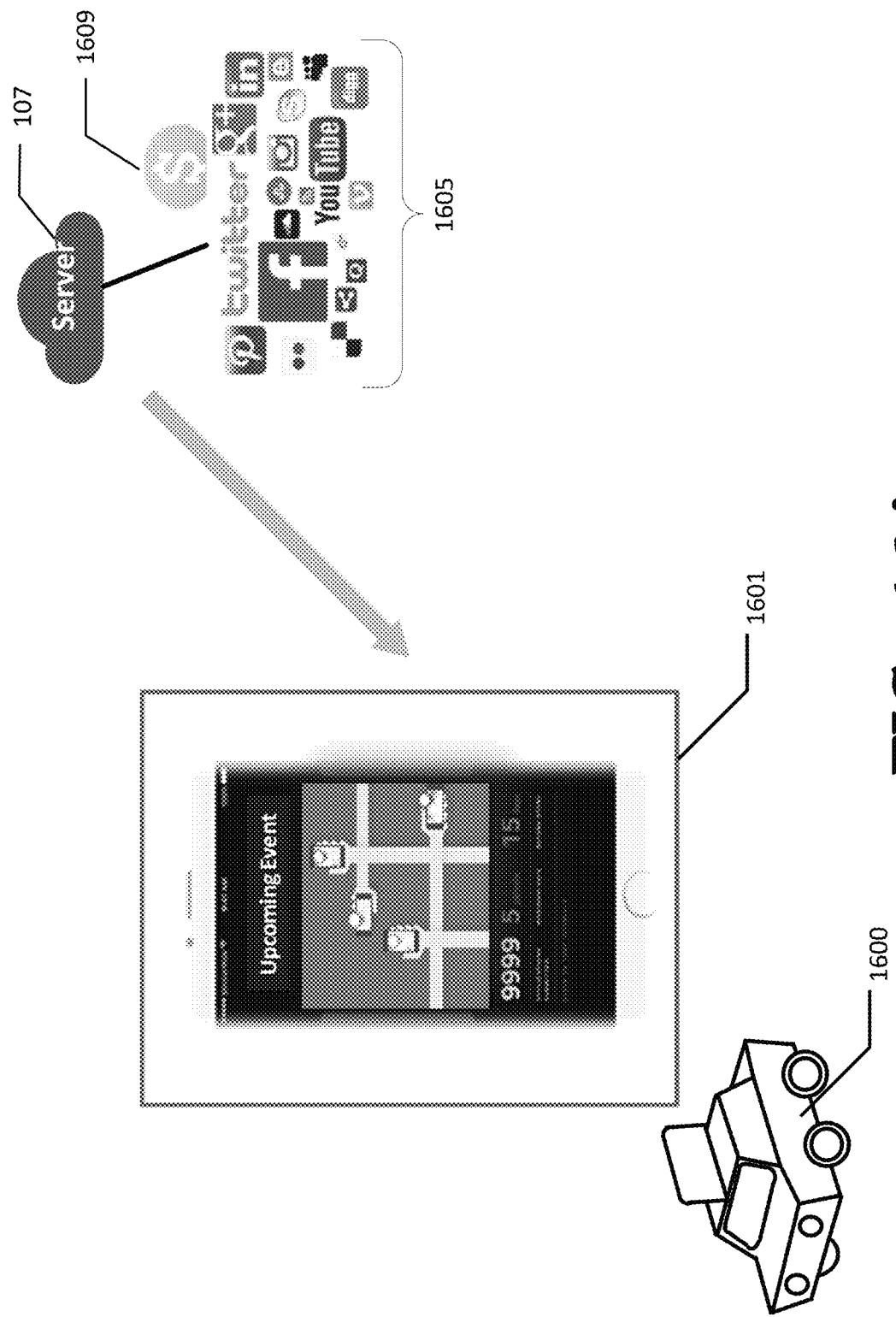
FIGS. 16A and 16B conceptually illustrate an example embodiment of the present technology in accordance with an aspect of the present disclosure.
Figure 16B:
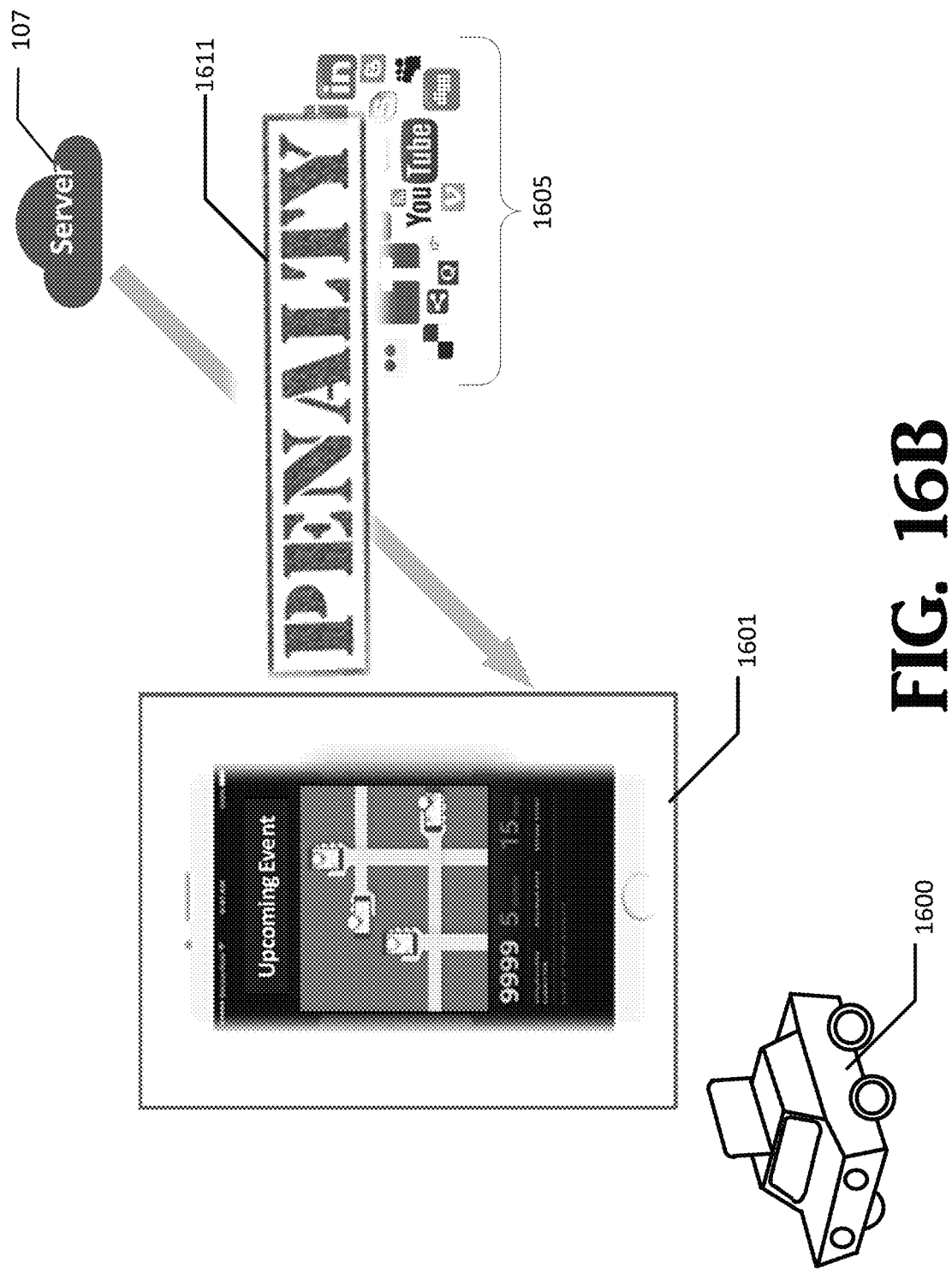

FIGS. 16A and 16B illustrate example embodiments in accordance with an aspect of the present technology. A planned advertisement event may be cancelled due to a shortage of target connected vehicles participating in the planned advertisement event. As shown in FIG. 16A, an application or in-vehicle display 1601 may be used to provide to a driver of the connected vehicle 1600 (having components like those of the connected vehicle 101) who signed up for participation in an upcoming advertisement event, real-time information about whether a predetermined target number of connected vehicles for carrying out the advertisement event has been reached or recruited.

In the example, the driver of the connected vehicle 1600 may find out various information about the upcoming advertisement event through an in-vehicle display 1601. In the example, the in-vehicle display 1601 may show that for the upcoming advertisement event, a predetermined target number of connected vehicles is set to 15 and so far, only 5 connected vehicles are recruited for the upcoming advertisement event, as well as locations of the connected vehicles. The predetermined target number of connected vehicles for the advertisement event may be set by the server 107 based on input from an advertiser 1605 that is sponsoring or paying for the advertisement event. When it is determined that for the upcoming advertisement event a minimum target number of connected vehicles has not been reached and it is less than a predetermined time duration (e.g., one hour) from the start of the planned advertisement event, the server 107 may send a notice of cancellation to the connected vehicle 1600 that is recruited for the advertisement event. The predetermined time duration may be provided by the sponsoring advertiser. Further, if the number of connected vehicles participating in the upcoming advertisement event is high, the server 107 may pay a high reward 1609 to participating connected vehicles (or drivers of the connected vehicles), thereby inducing or encouraging a high level of participation in the advertisement event.

In another aspect of the present disclosure, connected vehicles that are recruited for participation in the advertisement event are continuously monitored by the server 107. This is because some drivers of the connected vehicles who signed up for the upcoming advertisement event may not participate in the advertisement event, which is disadvantageous to the advertiser who invested in the upcoming advertisement event. As such, as shown in FIG. 16B, when the server 107 determines that the connected vehicle 1600 fails to participate in the advertisement event for which the connected vehicle 1600 was recruited, the server 107 is configured to impose a penalty to the connected vehicle 1600 (or the driver of the connected vehicle 1600). The penalty may be in the form of a deduction in points. Also, when the connected vehicle 1600 or the driver of the connected vehicle 1600 is determined to fail to participate in the advertisement events over than a certain number of times, e.g., 3 times, the server 107 may restrict the connected vehicle 1600 or the driver of the connected vehicle 1600 from participating in future advertisement events.

Thus, the effect of advertisement using the connected vehicles may be increased based on high rewards for participation in the advertisement events as well as penalties for failure to participate in signed-up advertisement events.

Figure 17:
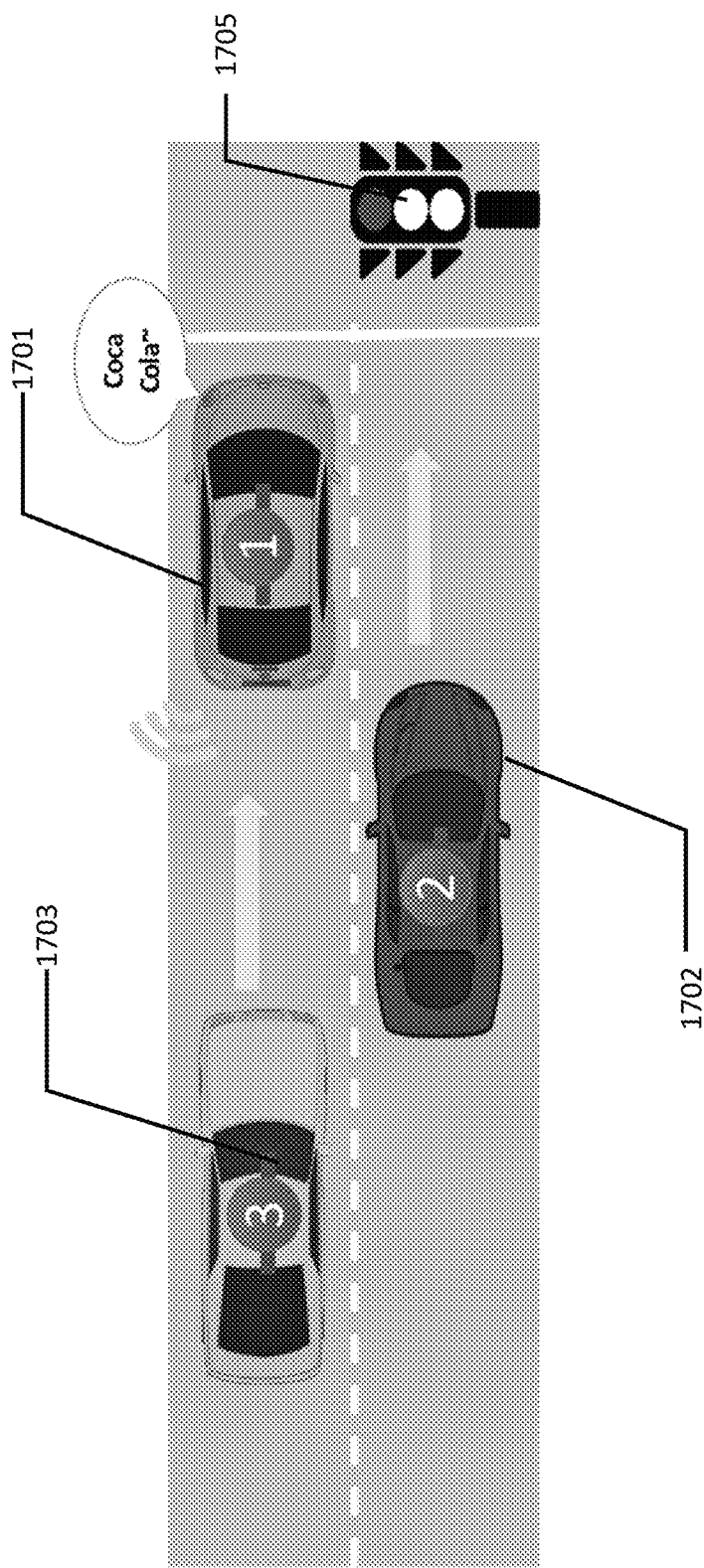
FIG. 17 conceptually illustrates an example embodiment of the present technology in accordance with an aspect of the present disclosure.
Figure 18:
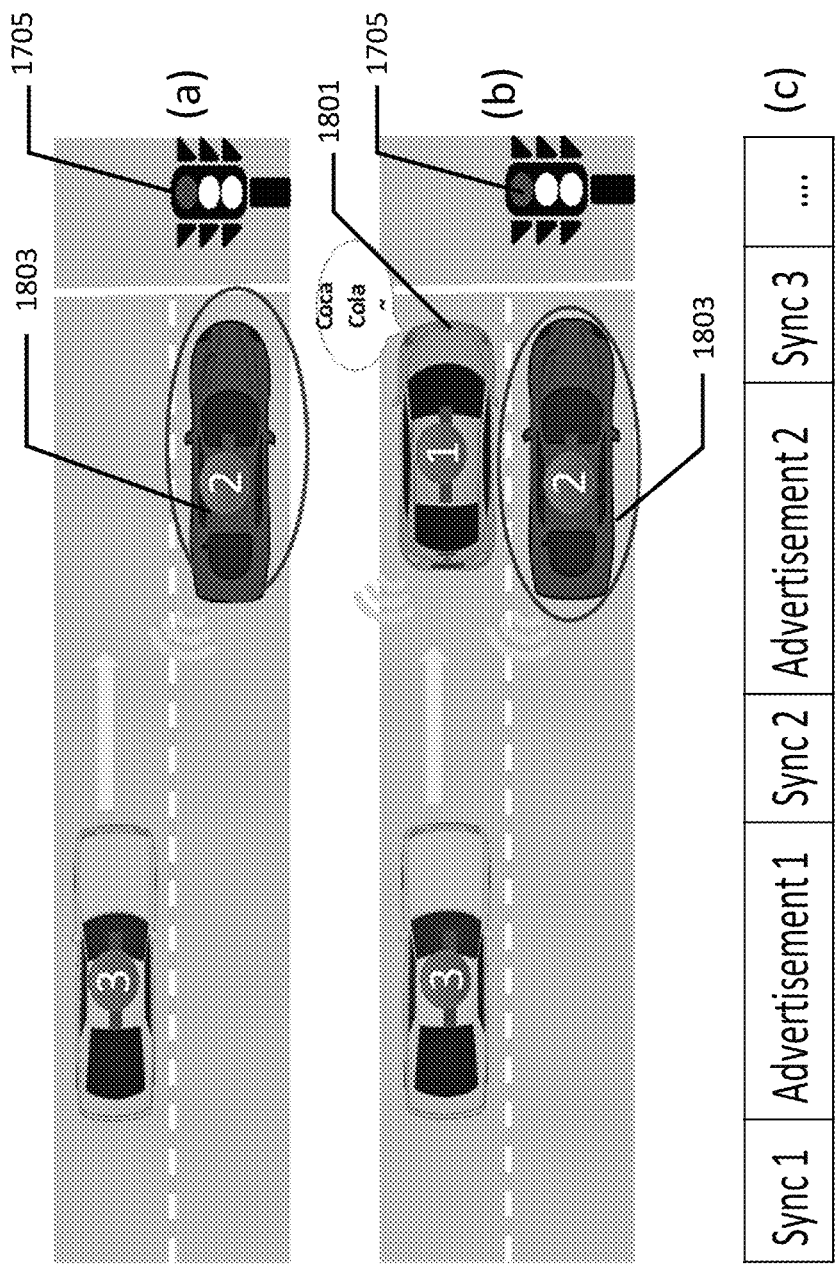
FIG. 18 conceptually illustrates an example embodiment of the present technology in accordance with an aspect of the present disclosure.

FIG. 17 and FIG. 18 ((a), (b), and (c)) illustrate an example embodiment in accordance with an aspect of the present technology. When a same advertisement (e.g., an audio advertisement) is reproduced at a stop signal of a traffic light, the reproduction of the same advertisement by connected vehicles may be viewed as noise to other vehicles or pedestrians when each connected vehicle is configured to reproduce the same advertisement at each stop of each connected vehicle 1701, 1702, or 1703 (having components similar to those of the connected vehicles 101) without coordination with each other, as shown in FIG. 17. In such a case, the effect of the audio advertisement may be greatly reduced. In an aspect of the present disclosure, a process for synchronizing the reproduction of the audio advertisement is disclosed herein to effectively reproduce the same advertisement simultaneously on the plurality of connected vehicles 1701, 1702, and 1703 entering the stop signal of the traffic light.

Referring to FIGS. 18 (a)-(c), in another aspect of the present disclosure, a connected vehicle 1803 approaches and comes to a stop signal of the traffic light 1705, shown in FIG. 18 (a). The connected vehicles 1801 and 1803 have components like those of the connected vehicles 101. First, it is determined whether there is another connected vehicle already stopped at the stop signal of the traffic light 1705. If there is no other connected vehicle already stopped at the stop signal of the traffic light 1705, then a first advertisement (including an audio and/or a video content) is immediately reproduced while the connected vehicle 1803 is stopped at the stop signal of the traffic light 1705. In the example, the connected vehicle 1803 may be configured to receive the first advertisement from the server 107 for reproduction or retrieve the first advertisement from one or more internal storages. Further, the first advertisement may be selected based in part on location information of the connected vehicle 1803.

On the other hand, as shown in FIG. 18 (*b*), when it is determined that there is another connected vehicle 1801 already stopped at the traffic light 1705 and the connected vehicle 1801 is reproducing a first advertisement (e.g., "Coca Cola"), the connected vehicle 1803 is configured to wait until the first advertisement is finished. When the reproduction of the first advertisement by the connected vehicle 1801 is finished, the connected vehicle 1803 is configured to synchronize with the connected vehicle 1801 for reproduction of a second advertisement as shown in FIG. 18 (*c*). That is, the timings of reproduction of the second advertisement by the first and second connected vehicles are controlled so that the first connected vehicle 1801 and the second connected vehicle 1803 are configured to simultaneously reproduce the second advertisement using external speakers and/or external displays while the first connected vehicle 1801 and the second connected vehicle 1803 are stopped at the stop signal of the traffic light 1705. Further, in an aspect of the present disclosure, the synchronization among the connected vehicles 1801 and 1803 may be obtained through the server 107 over the network. Alternatively, the synchronization among the connected vehicles 1801 and 1803 may be obtained through vehicle-to-vehicle communications between the connected vehicles 1801 and 1803.

Figure 19:
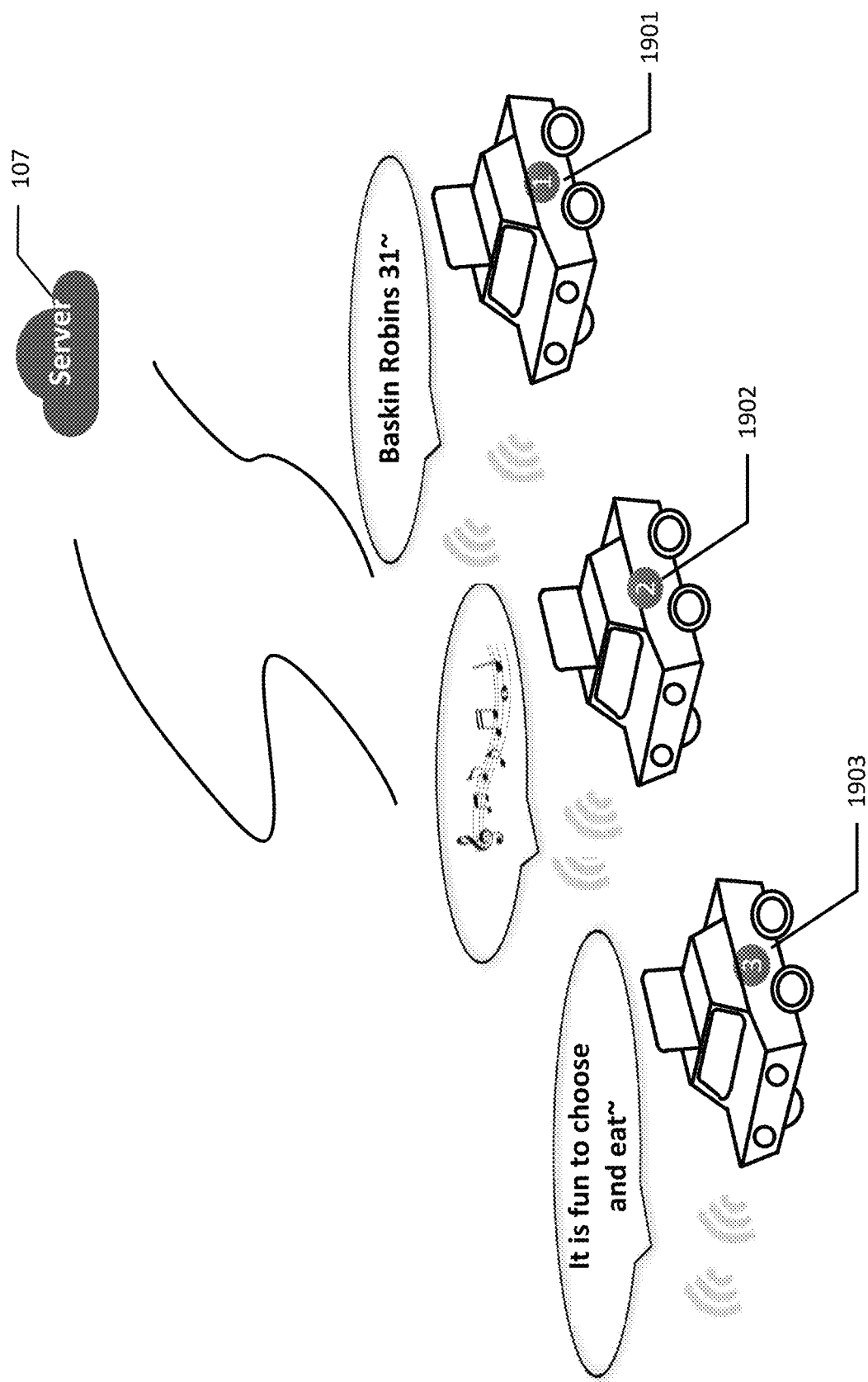
FIG. 19 conceptually illustrates an example embodiment of the present technology in accordance with an aspect of the present disclosure.

FIG. 19 illustrates an example embodiment in accordance with an aspect of the present technology. In an aspect of the present disclosure, while a plurality of connected vehicles (or advertisement vehicles) are clustered together, the same advertisement may be reproduced through external speakers of connected vehicles, having the external speakers form a stereo system, thereby an effect of delivery of the advertisement will likely be high on people outside the connected vehicles.

By way of example, in an aspect of the present disclosure, as shown in FIG. 19, when a plurality of connected vehicles 1901, 1902, and 1903 (having components similar to those of the connected vehicles 101) are stopped and commanded to form a cluster for the purpose of reproducing a same advertisement via the plurality of connected vehicles 1901, 1902, and 1903, via external speakers and/or external displays of the connected vehicles. In the example, each of the external speakers of the connected vehicle is configured to form a stereo system to increase the effect of the advertisement delivery.

Further, by way of example, the server 107 over a network may determine, based in part on location of the plurality of connected vehicles 1901, 1902, and 1903, profiles of people (e.g., traits or characteristics of people), or advertiser preferences that an ice cream advertisement be reproduced as a stereo advertisement by the cluster of connected vehicles 1901, 1902, and 1903 at a specific location. That is, the three connected vehicles are configured to reproduce the same advertisement as a stereo advertisement. For example, the connected vehicle 1902 may be configured to play a background music (BGM) for the ice cream advertisement via its external speakers, the connected vehicle 1903 may be configured to reproduce an audio content of the advertisement, e.g., "It is fun to choose and eat~" via its external speakers and the connected vehicle 1901 may be configured to reproduce another audio content of the advertisement, e.g., "Baskin Robins 31~" via its external speakers, thereby playing the advertisement as the stereo advertisement. In the example, there is no need to separately synchronize an audio advertisement, and thus the effect of an advertisement delivery power can be increased.

In an aspect of the present disclosure, the connected vehicle 1902 may become a master and the connected vehicles 1901 and 1903 may become slaves in a master-slave environment for reproducing the same advertisement. The master may assign different roles to slaves and may control timings of reproduction of the same advertisement on the plurality of connected vehicles as the cluster.

Further, in the example, the server 107 over the network is configured to send commands and control the plurality of connected vehicles 1901, 1902, and 1903 to reproduce the same ice cream advertisement as a stereo advertisement. However, in another aspect of the present disclosure, the group of connected vehicles 1901, 1902, and 1903 may form a cluster on an ad-hoc basis by communicating with each other. The master vehicle may be determined among the group of connected vehicles 1901, 1902, and 1903 to by the server 107.

Alternatively, the master vehicle may be determined via ad-hoc communications among the group of connected vehicles 1901, 1902, and 1903 to. Also, the server 107 may send the same advertisement to the plurality of connected vehicles in the cluster and assign different roles to the connected vehicles for reproducing the same advertisement as the stereo advertisement. In another implementation, the different roles may be determined based in part on profiles of the connected vehicles (e.g., types of vehicles, color, make, size, etc.). As such, by delivering an advertisement in a more interesting way, e.g., a stereo advertisement using a plurality of connected vehicles, the effect of delivery of the advertisement may be greatly increased on people who are exposed to the stereo advertisement.

In another aspect of the present disclosure, as shown in FIG. 19, the one or more advertisements may be reproduced as a cluster advertisement or an interactive advertisement, using the plurality of connected vehicles as an advertisement platform. In an aspect of the present disclosure, an advertisement platform for reproducing one or more advertisements may include a plurality of connected vehicles forming a cluster of connected vehicles. The cluster of connected vehicles is configured to reproduce the one or more advertisements as a cluster advertisement or an interactive advertisement. Further, in an aspect of the present disclosure, the reproduction of the cluster advertisement may include reproduction of the same advertisement in synchronization with other connected vehicles in the cluster. Also, in another aspect of the present disclosure, the reproduction of the interactive advertisement may include reproduction of the one or more advertisements among the cluster, in which the plurality of connected vehicles may be assigned different roles in the reproduction of the interactive advertisement. In another aspect of the present disclosure, the reproduction of the cluster advertisement or the interactive advertisement may be controlled either by a server over a network or by a master connected vehicle among the cluster. Further, in another aspect of the present disclosure, the reproduction of the interactive advertisement may be configured to respond to input from a person who views the interactive advertisement reproduced by the cluster. Furthermore, in an aspect of the present disclosure, in the example, the one or more advertisements are provided by a server over a network, by one or more in-vehicle storage systems, or by one or more removable storage systems.

Figure 20:
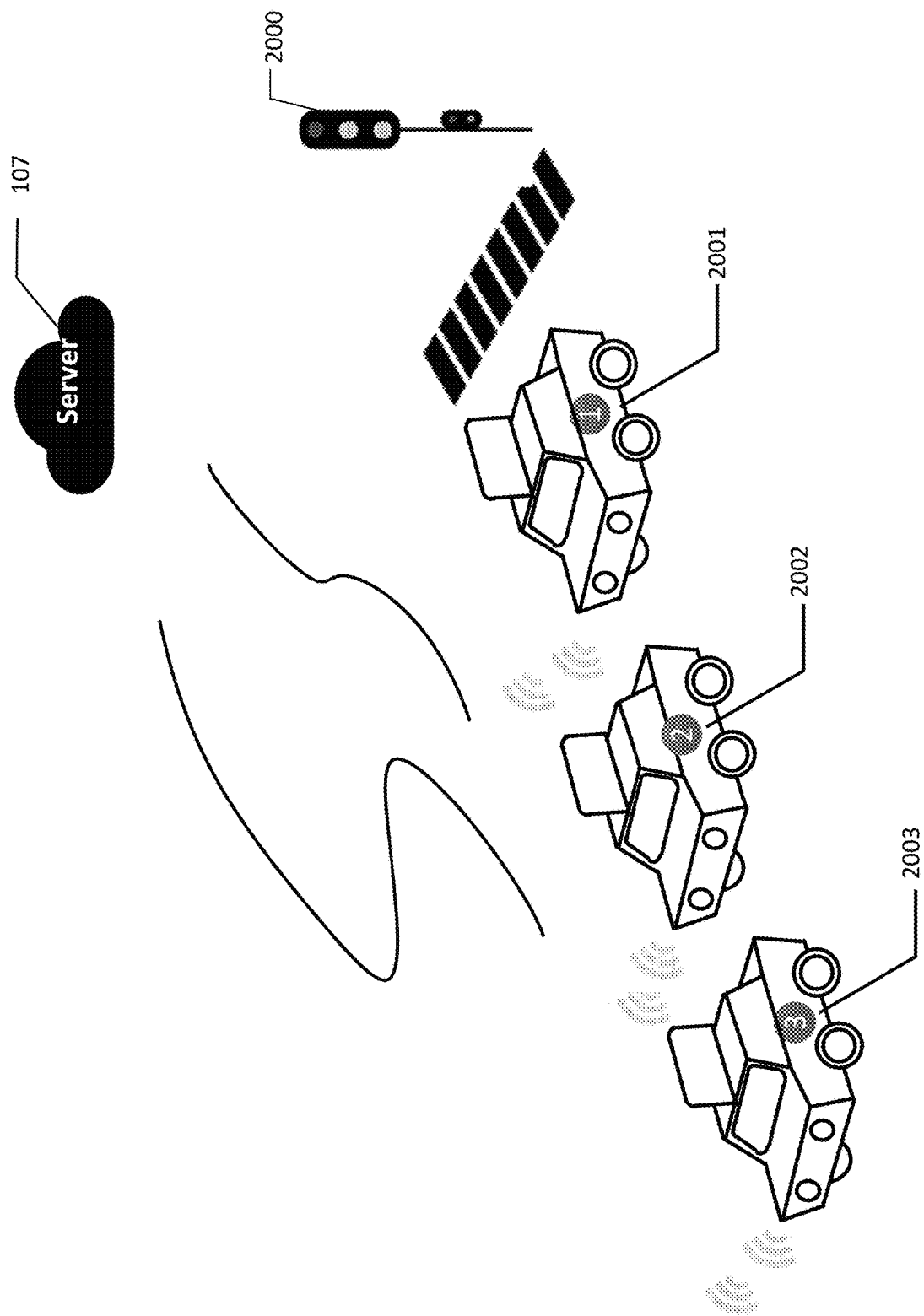
FIG. 20 conceptually illustrates an example embodiment of the present technology in accordance with an aspect of the present disclosure.

FIG. 20 illustrates an example embodiment in accordance with an aspect of the present technology. In an aspect of the present disclosure, a plurality of connected vehicles may be configured to reproduce or play one or more advertisements in various forms as a group, to increase an effect of the advertisement. During driving, it may be impossible to reproduce an advertisement through external speakers of the connected vehicles due to the Doppler effect. Thus, to increase the effect of the advertisement, when the connected vehicles are stopped or slowing down, a plurality of connected vehicles may be controlled to reproduce or play the same advertisement through external speakers of the connected vehicles participating in a parade.

By way of example, as shown in FIG. 20, a plurality of connected vehicles 2001, 2002, and 2003 (each having components like those of the connected vehicle 101) may come to a stop at a traffic stop 2000. The plurality of connected vehicles 2001, 2002, and 2003 may be controlled to reproduce the same advertisement at the same time. Alternatively, in another aspect of the present disclosure, the same advertisement may be played in a tune song form or a continuous manner, to increase the effect of the advertisement. In an aspect of the present disclosure, the playback or reproduction format of the same advertisement may be determined based in part on profiles of the connected vehicles or profiles of people in a surrounding area, advertiser preferences, or the like.

In another aspect of the present disclosure, the same advertisement may be reproduced when the connected vehicles are parked in a certain area or when the speed of the connected vehicles is below a certain level, e.g., 25 mph.

Further, in the example, the server 107 over the network is configured to control the plurality of connected vehicles 2001, 2002, and 2003 to reproduce the same advertisement as a group of connected vehicles (or as a cluster advertisement). However, in another aspect of the present disclosure, the group of connected vehicles 2001, 2002, and 2003 may form a cluster, and reproduce the same advertisement upon a command from a master vehicle. The master vehicle may be determined among the group of connected vehicles 2001, 2002, and 2003 by the server 107. Alternatively, the master vehicle may be determined via ad-hoc communications among the group of connected vehicles 2001, 2002, and 2003.

Furthermore, in another aspect of the present disclosure, as mentioned herein with reference to various embodiments including those of FIGS. 17-20, when a plurality of connected vehicles participating in an advertisement event are stopped at a traffic light or parked at a certain location or moving with a speed lower than a predetermined speed, the plurality of connected vehicles is configured to reproduce the same advertisement via external speakers of the connected vehicles in a coordinated manner. The coordinated manner may include a simultaneous reproduction of the same advertisement or a sequential reproduction of the same advertisement as a round advertisement among the plurality of connected vehicles.

In the present disclosure, the term "round advertisement" as used herein means an advertisement which can be reproduced by two or more connected vehicles. In a round advertisement, similar to a round song, one group of connected vehicles (or a first connected vehicle) starts off reproducing an advertisement and the next group of connected vehicles (or a second connected vehicle) starts to reproduce the same advertisement a bit later. When a group gets to the end of the advertisement, the group reproduces the same advertisement again, replaying the advertisement several times.

Further, in another aspect of the present disclosure, between reproductions of advertisements for products, one or more video reviews of the products by actual consumers may be reproduced, thereby increasing the effect of the advertisements. By way of example, when a plurality of vehicles is stopped at a stop signal of a traffic light, there may be an excellent opportunity to utilize one or more video advertisement because there is enough time for external viewers to be exposed to the advertisement reproduced on the connected vehicles. The connected vehicles are configured to receive from the server (e.g., ADC server) one or more review videos of products by real consumers and reproduce one or more review videos between the advertisements. In an aspect of the present disclosure, the one or more video reviews may be selected by an advertiser. The ADC server may provide an option to the advertiser such that the advertise can i) search for related user review videos using a video advertisement platform, including but not limited thereto, e.g., YouTube®, and ii) select review videos with high viewer counts among the searched review videos. As a result, by playing consumer produced review videos between advertisements on the connected vehicles, more consumers can be attracted and consumer loyalty to product brands may be greatly increased.

Figure 21:
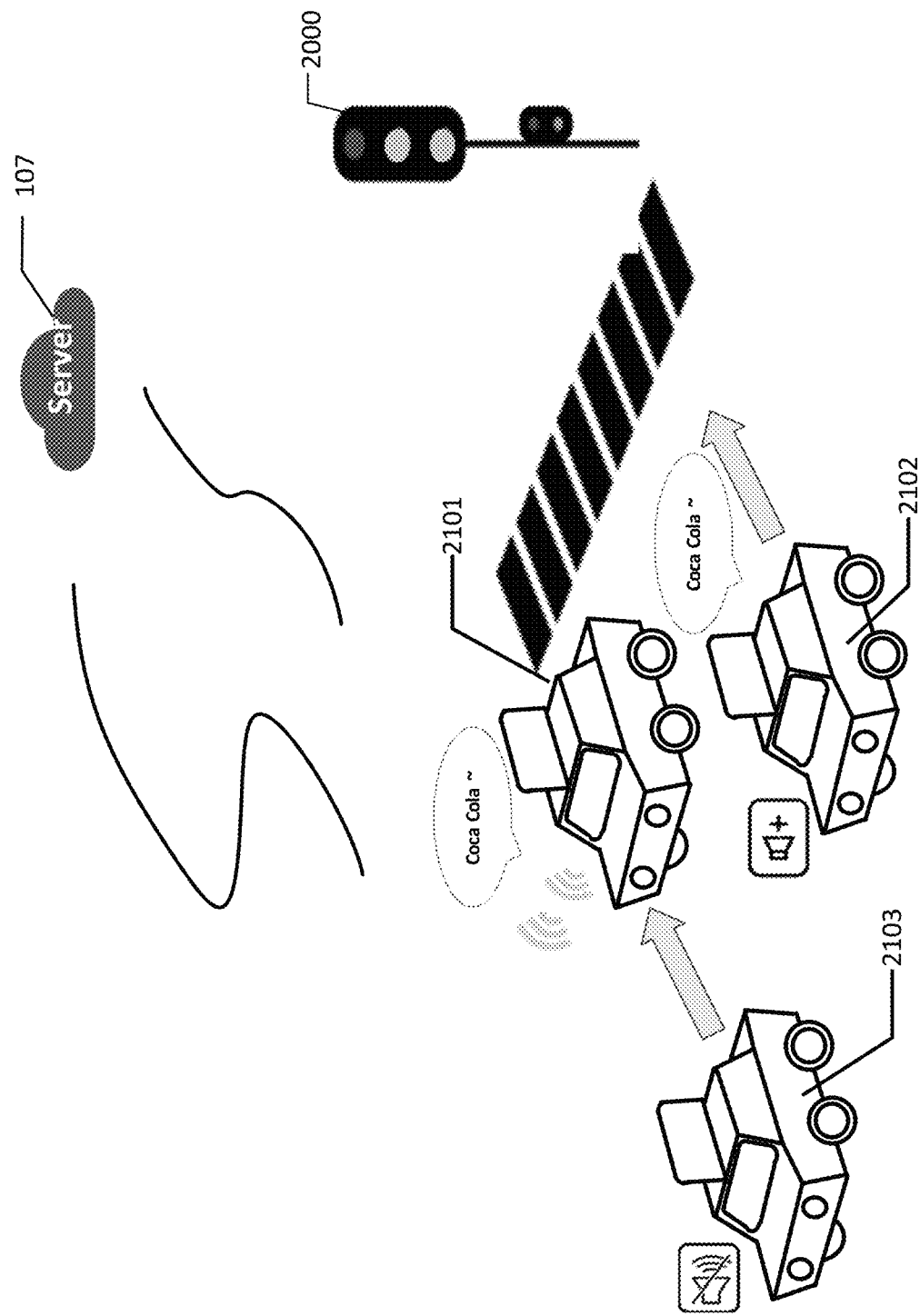
FIG. 21 conceptually illustrates an example embodiment of the present technology in accordance with an aspect of the present disclosure.

FIG. 21 illustrates an example embodiment in accordance with an aspect of the present technology. In another aspect of the present disclosure, and by way of example, as shown in FIG. 21, the server 107 may be configured to monitor and detect that a plurality of connected vehicles 2101, 2102, and 2103 (each having components like those of the connected vehicle 101) are entering a stop signal at a traffic light 2000. When it is determined that a same audio advertisement is to be played or reproduced through external speakers of the connected vehicles 2101, 2012, and 2013, the server 107 is configured to send control and command instructions to each of the connected vehicles 2101, 2102, and 2103, so that the reproduction of the audio advertisement is synchronized.

By way of example, in the example, the server 107 is configured to detect that the connected vehicle 2103 is about to enter a particular zone, based on location information received from the connected vehicle 2103. In the event that a particular audio advertisement is to be reproduced in the particular zone, the server 107 may be configured to send commands and control messages, along with an advertisement, to the connected vehicle 2103 which is approaching the traffic light 2000. It is noted that the connected vehicle 2103 may further be configured to reproduce the advertisement inside the connected vehicle 2103, while turning off the external speakers, before entering the stop signal. Upon entering the stop signal, however, the connected vehicle 2103 may turn on the external speakers for reproducing the audio advertisement via the external speakers. Further, the connected vehicle 2102 may be configured to gradually increase the volume of the external speaker(s) in accordance with the driving speed of the connected vehicle 2102.

Also, in an aspect of the present disclosure, in the example, all the connected vehicles 2101, 2102, and 2103 entering the stop signal may be controlled by the server 107 to reproduce the same audio advertisement via the external speakers at the same time in a most natural manner, to increase the effect of the advertisement.

Further, in the example, although the server 107 over the network is configured to control the plurality of connected vehicles 2101, 2102, and 2103 to reproduce the same advertisement in a coordinate manner. However, in another aspect of the present disclosure, the connected vehicles 2101, 2102, and 2103 may communicate with each other and reproduce the audio advertisement, upon entering the particular zone and the stop signal, independent of command and control by the server 107.

As such, the same audio advertisement may be effectively reproduced in a synchronized manner using external speakers of the connected vehicles entering a stop signal in a particular zone, thereby increasing the effect of the audio advertisement.

In an aspect of the present technology, a method or methodology for delivering advertisements using a plurality of connected vehicles is disclosed. The plurality of connected vehicles is configured to participate in an advertisement event and each connected vehicle is configured to receive one or more instructions from a server over a network to cluster near or at a target area for reproducing an advertisement in a coordinated manner as a group of the connected vehicles. Alternatively, each connected vehicle is configured to receive one or more instructions from one of the connected vehicles over another network. In another aspect, the advertisement event may be a parade or a mission, and the plurality of vehicles participating in the advertisement event may be determined based in part on vehicle profiles or user preferences.

Further, when the advertisement event is a parade, the method is further configured to include continuously monitoring movements of the plurality of connected vehicles participating in the parade by the server over the network, or alternatively by one of the connected vehicles over another network. In an aspect of the present disclosure, during the parade, the method further includes displaying vehicle identification information of a preceding vehicle to follow in the parade on an internal display of the connected vehicle. In another aspect of the present disclosure, the method further includes displaying vehicle identification information of the connected vehicle on an external display of the preceding vehicle that the connected vehicle is following in the parade. In another aspect of the present disclosure, the method is further configured to include displaying on an internal display an indication of whether the connected vehicle is at a right position in the parade.

In another aspect of the present disclosure, the method is further configured to include driving a predetermined route near or around the target are with a predetermined number of turns around the predetermined route, while reproducing the same advertisement in the coordinated manner as the group of connected vehicles, thereby increasing an effect of the advertisement on people outside the connected vehicles. The predetermined number of turns around the predetermined route may be determined in advance by the server over the network, based in part on location of an advertiser, a density of traffic, or a density of people on the predetermined route.

In another aspect of the present disclosure, the method is further configured to include receiving in advance, prior to arrival at or near the target area, real-time information on whether a minimum number of connected vehicles for a carry-out of the advertisement event has already arrived at or near the target area. Further, when it is determined that the minimum number of connected vehicles that are needed for the carry-out of the advertisement event has not reached within a predetermined period of time, the method is further configured to include receiving a cancellation notice of the advertisement event from the server over the network. Further, when it is determined that the minimum number of connected vehicles that are needed for the carry-out of the advertisement event has reached within a predetermined period of time, the method is further configured to include providing a reward to drivers of the connected vehicles participating in the advertisement event for participating in the advertisement event. In an aspect of the present disclosure, the method is further configured to include providing a penalty to a driver of a connected vehicle participating in the advertisement event when the connected vehicle is determined to deviate from the carry-out of the advertisement event in which the driver of the connected vehicle has previously indicated to participate.

In another aspect of the present disclosure, when a first connected vehicle of the plurality of connected vehicles participating in the advertisement event is stopped at a traffic light, the first connected vehicle is configured to reproduce via an external speaker of the first connected vehicle an audio content of the advertisement. When a second connected vehicle of the plurality of connected vehicles participating in the advertisement event is stopped at the traffic light, the second connected vehicle is configured to wait until the reproduction of the audio content of the advertisement by the first connected vehicle is finished, and the first and second connected vehicles are configured to reproduce the same advertisement in a synchronized manner as the group of connected vehicle while the first and second connected vehicles are stopped at the traffic light.

In another aspect of the present disclosure, the method is further configured to include, when the plurality of connected vehicles participating in the advertisement event is configured to reproduce the advertisement as a cluster advertisement, reproducing the cluster advertisement as a stereo advertisement among the plurality of connected vehicles.

In another aspect of the present disclosure, when the connected vehicles participating in the advertisement event are stopped at a traffic light or parked at a certain location or moving with a speed lower than a predetermined speed, the method is further configured to include reproducing the same advertisement via external speakers of the connected vehicles in the coordinated manner. The coordinated manner includes a simultaneous reproduction of the same advertisement or a sequential reproduction of the same advertisement as a round advertisement among the plurality of connected vehicles. In another aspect of the present disclosure, when it is determined that the connected vehicles are coming to a stop, the method is further configured to include controlling the reproduction of the same advertisement on external speakers of the connected vehicles so that an audio volume of the same advertisement is increased in accordance with lower speeds of the connected vehicles that are coming to the stop.

Figure 22:
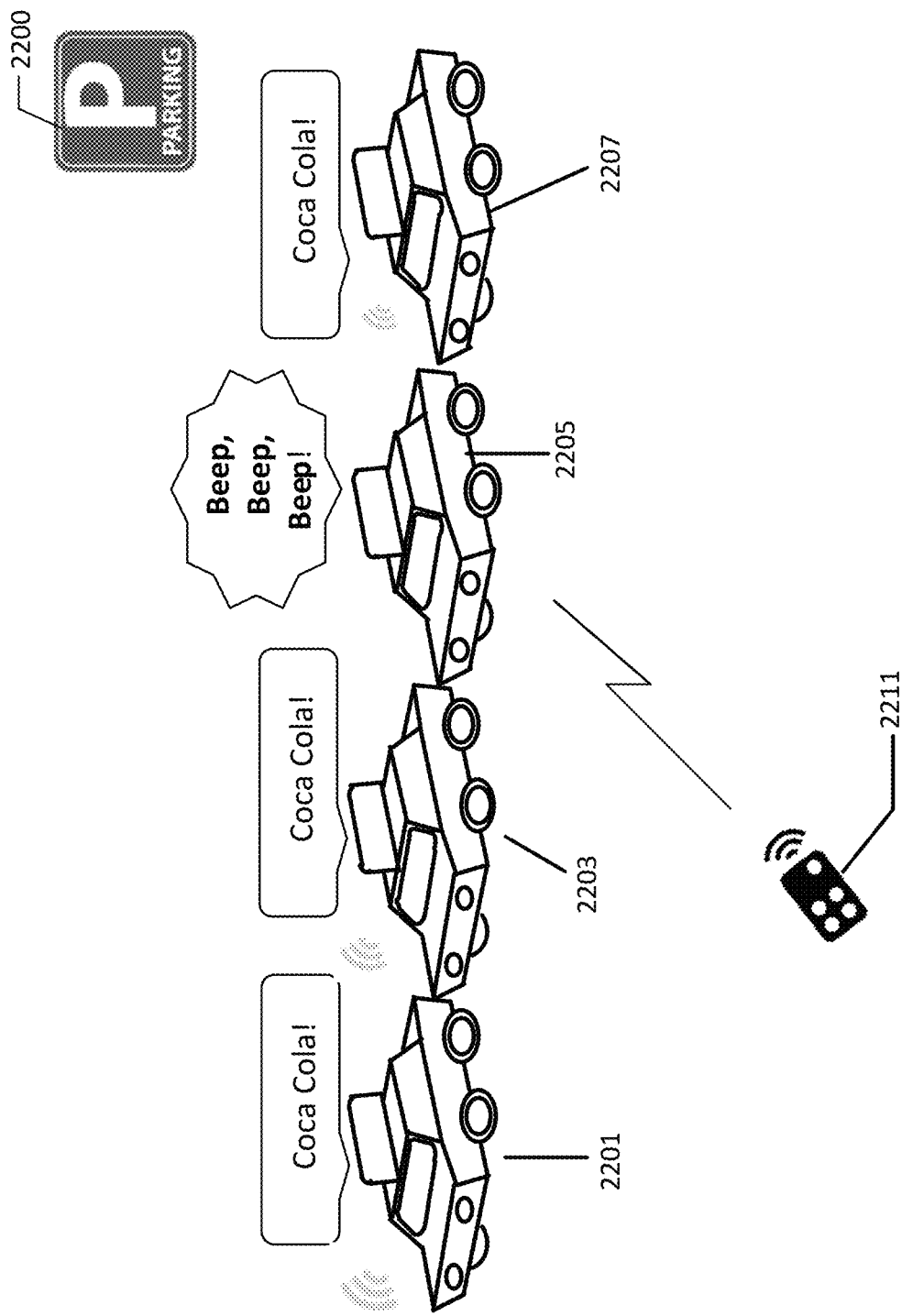
FIG. 22 conceptually illustrates an example embodiment of the present technology in accordance with an aspect of the present disclosure.

FIG. 22 illustrates an example embodiment in accordance with an aspect of the present technology. To maximize an effect of an advertisement, it is necessary to design various scenarios for when the advertisement needs to be output or reproduced. By way of example, in an aspect of the present disclosure, a same audio content of an advertisement (or the same audio advertisement) may be reproduced by a plurality of connected vehicles that are parked in a parking lot (e.g., a parking lot of a department store or the like) when a specific event occurs in the parking lot.

In an aspect of the present disclosure, in FIG. 22, a connected vehicle 2205 is parked among a plurality of other connected vehicles 2201, 2203, and 2207 in a parking lot 2200 of a department store. Each of the connected vehicles 2201, 2203, 2205, and 2207 have components like those of the connected vehicle 101. When a driver of the connected vehicle 2205 presses a button on a remote controller 2211 to lock or unlock the doors of the connected vehicle 2205, a wireless signal is generated from the remote controller 2211. The connected vehicle 2205 receives and determines that the wireless signal from the remote controller 2211 is for the connected vehicle 2205 and authenticates and respond to a command embedded in the wireless signal. When a lock command may be recognized, the connected vehicle 2205 produces a beeping sound to alert the user of the remote controller 2211 that the doors of the connected vehicle are locked. Alternatively, when an unlock command may be recognized, the connected vehicle 2205 produces a being sound to alert the user of the remote controller 2211 that the doors of the connected vehicle are unlocked.

In the example, when transmission of the wireless signal from the remote controller 2211 is detected, a plurality of connected vehicles 2201, 2203, and 2207 are configured to reproduce a same audio content of an advertisement (or an audio advertisement) at the same time, for example, "Coca Cola", relating to a specific event in the parking lot. In an aspect of the present disclosure, the audio advertisement may be received from a server like 107 over a network based in part on location information of the plurality of connected vehicles 2201, 2203, 2205, and 2207 as well as advertiser profiles. Further, the location information of the connected vehicles may be determined based on GPS data, map, camera images, cellular signals, or any combination thereof.

Further, in another aspect of the present disclosure, after the connected vehicle 2205 is parked in the parking lot, the connected vehicle 2205 may communicate with the server over the network to receive instructions and/or advertisement details for reproduction on either external displays or external speakers of the connected vehicle 2205 while the connected vehicle 2205 is parked in the parking lot.

Further, in another aspect of the present disclosure, when transmission of a signal from the remote controller 2211 to the connected vehicle 2205 is detected, the plurality of connected vehicles 2201, 2203 and 2207 may reproduce a parking advertisement (either an audio advertisement or a video advertisement) using external displays and/or external speakers.

Further, in another aspect of the present disclosure, when transmission of a signal from the remote controller 2211 to the connected vehicle 2205 is detected, the plurality of connected vehicles 2201, 2203 and 2207 may reproduce a cluster advertisement (either an audio advertisement or a video advertisement) using external displays and/or external speakers. The cluster advertisement may be a non-interactive group advertisement or an interactive group advertisement.

In an aspect of the present disclosure, a system of connected vehicles is disclosed for delivering one or more advertisements, where the connected vehicles are parked near each other in a parking lot and the connected vehicles are configured to reproduce one or more advertisements when one of the connected vehicles is determined to receive a signal from a remote controller associated with the one of the connected vehicles. Further, the one or more advertisements may be selected for reproduction based at least in part on a profile of a user of the one of the connected vehicles, vehicle profile information, or location information of the connected vehicles. Also, the connected vehicles are configured to form a cluster and reproduce an audio content of an advertisement via external speakers of the connected vehicles in a synchronized manner as a group of the connected vehicles, when the one of the connected vehicles is determined to receive the signal from the remote controller associated with the one of the connected vehicles. Further, the connected vehicles are configured to reproduce the audio content of the advertisement after the one of the connected vehicles outputs a sound and/or a flash in response to the signal from the remote controller associated with the one of the connected vehicles.

As such, by reproducing an advertisement using connected vehicles parked in a parking lot, an effect of advertisement relating to a specific event may be greatly increased.

Figure 23:
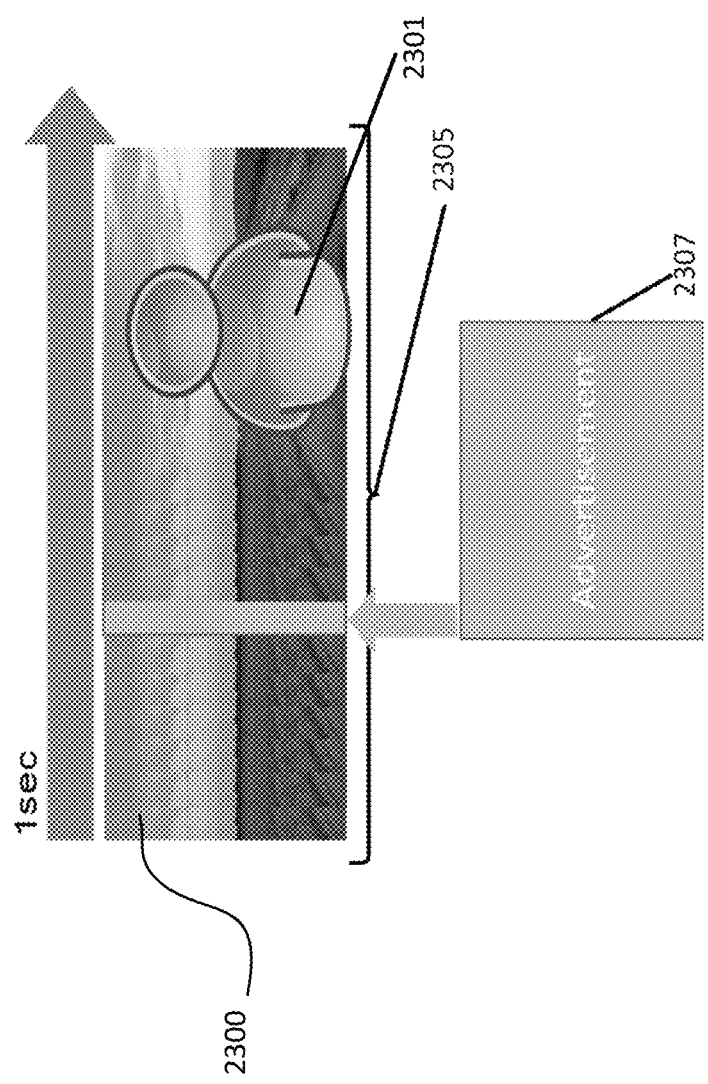
FIG. 23 conceptually illustrates an example embodiment of the present technology in accordance with an aspect of the present disclosure.

FIG. 23 illustrates an example embodiment in accordance with an aspect of the present technology. In an aspect of the present technology, the connected vehicle such as 101 may be an autonomous vehicle. When autonomous vehicles are in common use and fully commercialized, there may be a possibility that external displays of a vehicle may interfere with driving of an autonomous vehicle, e.g., the connected vehicle 101. In fact, there was an accident in which a TESLA model S vehicle in an autonomous mode collided with a large trailer, resulting in that an occupant of the vehicle was killed. The reason for the accident is known as a failure of an autopilot unit to detect and distinguish between a white trailer and a brightly lit sky. When autonomous vehicles are commercialized and in common use, a greater number of advertisements may be reproduced on external displays on vehicles. As such, there may be a greater chance of having such an accident. Thus, there is a need for an advanced technique for the connected vehicles (including autonomous vehicles) to detect and recognize an advertisement displayed on an external display as a series of image frames for the advertisement.

As noted above, an autonomous vehicle is also known as a self-driving vehicle that is capable of sensing its environment and moving with little or no human input. In an aspect of the present disclosure, a connected vehicle may include an autonomous driving unit, an advertisement system, and an advertisement identification unit. The autonomous driving unit may be configured to sense its driving environment and drive the connected vehicle without human input. The advertisement system is configured to reproduce one or more advertisements on the autonomous vehicle. The advertisement identification unit is configured to recognize and identify, through one or more digital signal processing functions, one or more visual contents of an advertisement reproduced on external displays of other connected vehicles or billboard displays nearby.

In an aspect of the present disclosure, the advertisement identification unit of the connected vehicle may be configured to recognize one or more visual contents of the advertisement reproduced on the external display, based in part on a number of pixels of the external display. That is, a minimum number of pixels in a display panel may be used by one or more sensors to recognize it as a display panel. That is, the number of pixels may be used as a marker for identifying the display panel, and on-board sensors along with image processing software in the connected vehicle may be configured to recognize an image reproduced for an advertisement purpose on the display panel as an "advertisement".

In another aspect of the present disclosure, the advertisement identification unit of the connected vehicle may be configured to recognize the one or more visual contents of the advertisement reproduced on the external display, based in part on one or more markers inserted (disposed) in the one or more visual contents of the advertisement, to inform the advertisement identification unit that the one or more visual contents are advertisements designed for reproduction on the external display. The marker may include, but not limited thereto, e.g., an image frame of advertisement, a quick response (QR) code, an identification symbol or number, or the like to indicate that the images are part of the advertisement.

Further, in another aspect of the present disclosure, as shown in FIG. 23, the advertisement identification unit of the connected vehicle may be configured to recognize the one or more visual contents of the advertisement reproduced on the external display, based in part on one or more image frames of advertisement inserted in the one or more visual contents of the advertisement.

In one implementation, as shown in FIG. 23, an advertisement frame 2307 may be inserted as a marker among the plurality of frames 230 in an advertisement 2300 during one second reproduction time such that an image of a person 2301 in the advertisement in 2300 is recognized as part of the advertisement, not an image of a real person. A driver may not recognize with naked eyes, but the advertisement identification unit or processing systems of the connected vehicle may recognize the presence of the marker embedded in the plurality of image frames of a video content of the advertisement such that the video content is recognized as an advertisement by the advertisement identification unit or the processing systems. Further, other image processing techniques may be employed to embed one or more markers in the images of an advertisement displayed on the external display. As such, using one or more aspects of the present technology disclosed herein, safety of autonomous connected vehicles may be greatly improved.

Figure 24:
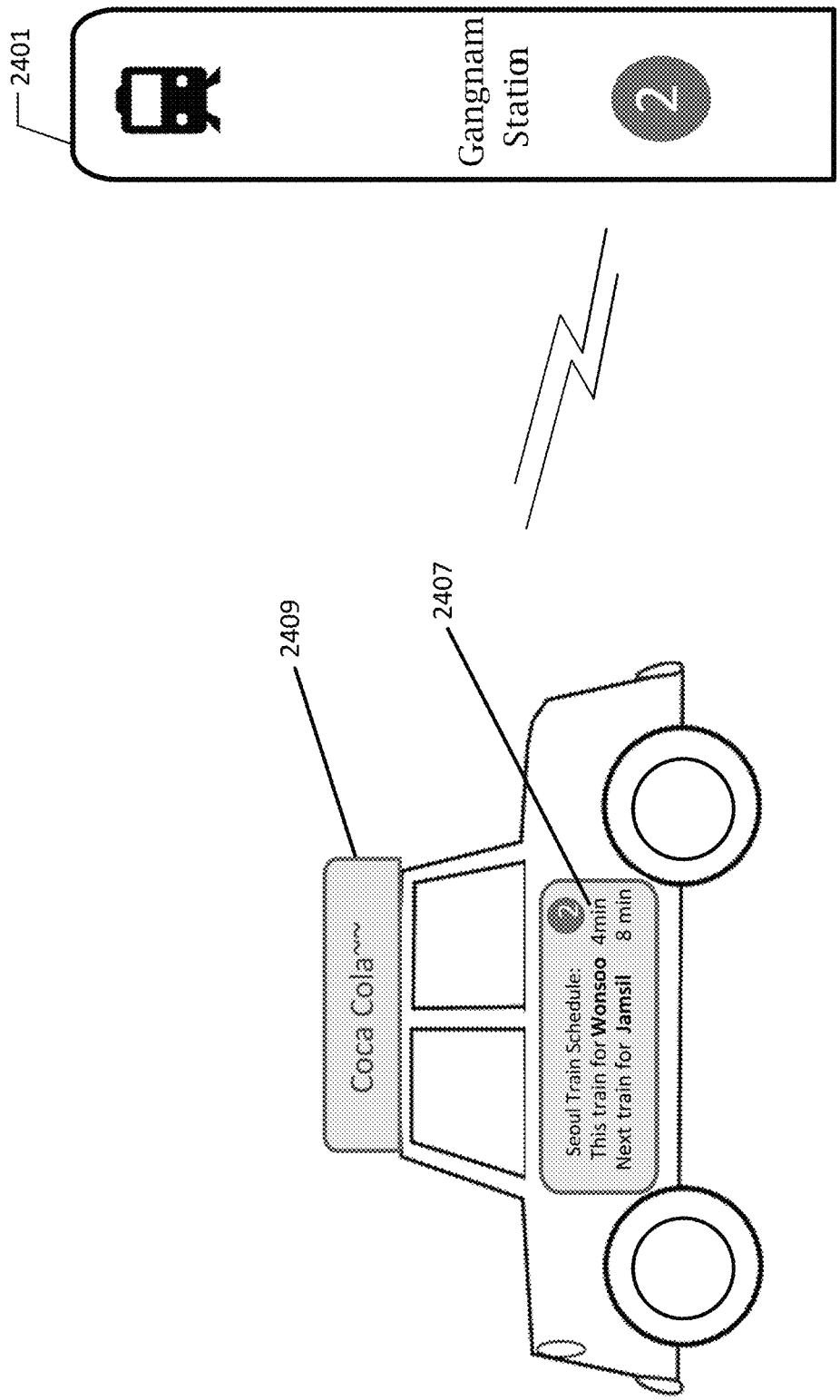
FIG. 24 conceptually illustrates an example embodiment of the present technology in accordance with an aspect of the present disclosure.

FIG. 24 illustrates an example embodiment in accordance with an aspect of the present technology. In the event of providing an advertisement on an external display of a connected vehicle, there may be an issue that the advertisement effect may be significantly reduced when the attention of the passers-by or pedestrians cannot be focused. If the attention of the passers-by or pedestrians is focused by using a beeping sound, it may be ignored when the beeping sound is continuously reproduced, or it may create a negative effect of the advertisement on people because passers-by or pedestrians may be annoyed or dislike hearing the beeping sound. As such, in an aspect of the present disclosure, the attention of passers-by or pedestrians is focused by allowing their gaze to stay on the external display of the connected vehicle at their own will through provisioning of necessary information to the passers-by or pedestrians outside a connected vehicle.

In an aspect of the present disclosure, a connected vehicle including am advertisement system configured to reproduce one or more advertisements on one or more externals displays of the connected vehicle is disclosed. The one or more advertisements include non-commercial information for the public interest. The advertisement system may be further configured to reproduce the non-commercial information between reproductions of commercial advertisements on the one or more external displays, and the commercial information may include news, weather, traffic, sports scores, or other public information or announcements.

Further, the non-commercial information may further include location-based information relating to transporting schedules, including but not limited thereto, bus schedules (e.g., bus arrival and/or departure times, etc.), train schedules (e.g., train arrival and/or departure times, etc.), flight schedules (e.g., flight arrival and/or departure times, etc.), etc. when the connected vehicle is disposed at or near a bus station, a train station, or an airport or an airport shuttle stop or the like.

By way of example, as shown in FIG. 24, a connected vehicle 2405 (having components like those of the connected vehicle 101) may be configured to provide certain useful information to passers-by or pedestrians to befriend and focus their attention on an advertisement reproduced on external displays and/or external speakers by the connected vehicle 2405. In particular, FIG. 24 illustrates an example embodiment that the connected vehicle 2405 situated near a subway station 2401 is configured to display useful information on an external display 2407, such as train schedules including expected arrival times of subways at the subway station 2401.

In other aspects of the present disclosure, the useful information may include weather, news, sports score, public announcements or the like. In an aspect of the present disclosure, while the useful information is being displayed on the external display 2407 of the connected vehicle 2405, an external display 2409 may be configured to reproduce one or more commercial (or paid) advertisements. In another aspect of the present disclosure, when the connected vehicle 2405 may be disposed near or at a bus stop, the connected vehicle 2405 may be configured to display useful information related to bus schedules including estimated arrival time of a bus, etc. Also, when the connected vehicle 2405 is disposed near or at an airport or an airport shuttle service stop, the connected vehicle 2405 may be configured to display useful information related to flight schedules.

Further, in the example shown in FIG. 24, the connected vehicle 2405 may be configured to receive, based on location information of the connected vehicle 2405, other relevant advertisements and/or useful information from a server over a network like the one 107, and reproduce the received advertisements and/or useful information on the external displays 2409 or 2407. Further, the location of the connected vehicle may be determined based on GPS data, map, camera images, cellular signals, or any combination thereof.

Furthermore, in a case of providing an advertisement on a rear external display of the connected vehicle 2405 while driving on a highway or the like, useful information such as a road congestion situation, accident occurrence information or the like may be received from the server over the network and reproduced on the rear external display of the connected vehicle 2405 for the benefit of drivers of following the connected vehicle 2405. Further, in this example, the useful information may be reproduced between reproductions of commercial advertisements on the rear external display of the connected vehicle 2405.

Additionally, in another aspect of the present disclosure, the connected vehicle 2405 may be configured to communicate with a subway station 2401 or a bus stop or any other public facility to receive other useful information for reproduction on the external display 2409 or 2405. The communications may be done using one-way broadcast or two-way communications technologies including WiFi, near field wireless, short range wireless, or any other wireless technologies.

As such, using various methodologies disclosed herein, various useful information (e.g., news, weather, train or bus schedules, traffic conditions, accident information, etc.) may be provided to people nearby the connected vehicle 2405 to focus the attention of the people (e.g., passers-by, pedestrians or drivers in vehicles) outside the connected vehicle 2405 and befriend them, thereby increasing the effect of an advertisement reproduced on one or more external displays of the connected vehicle 2405.

Figures 25A, 25B:
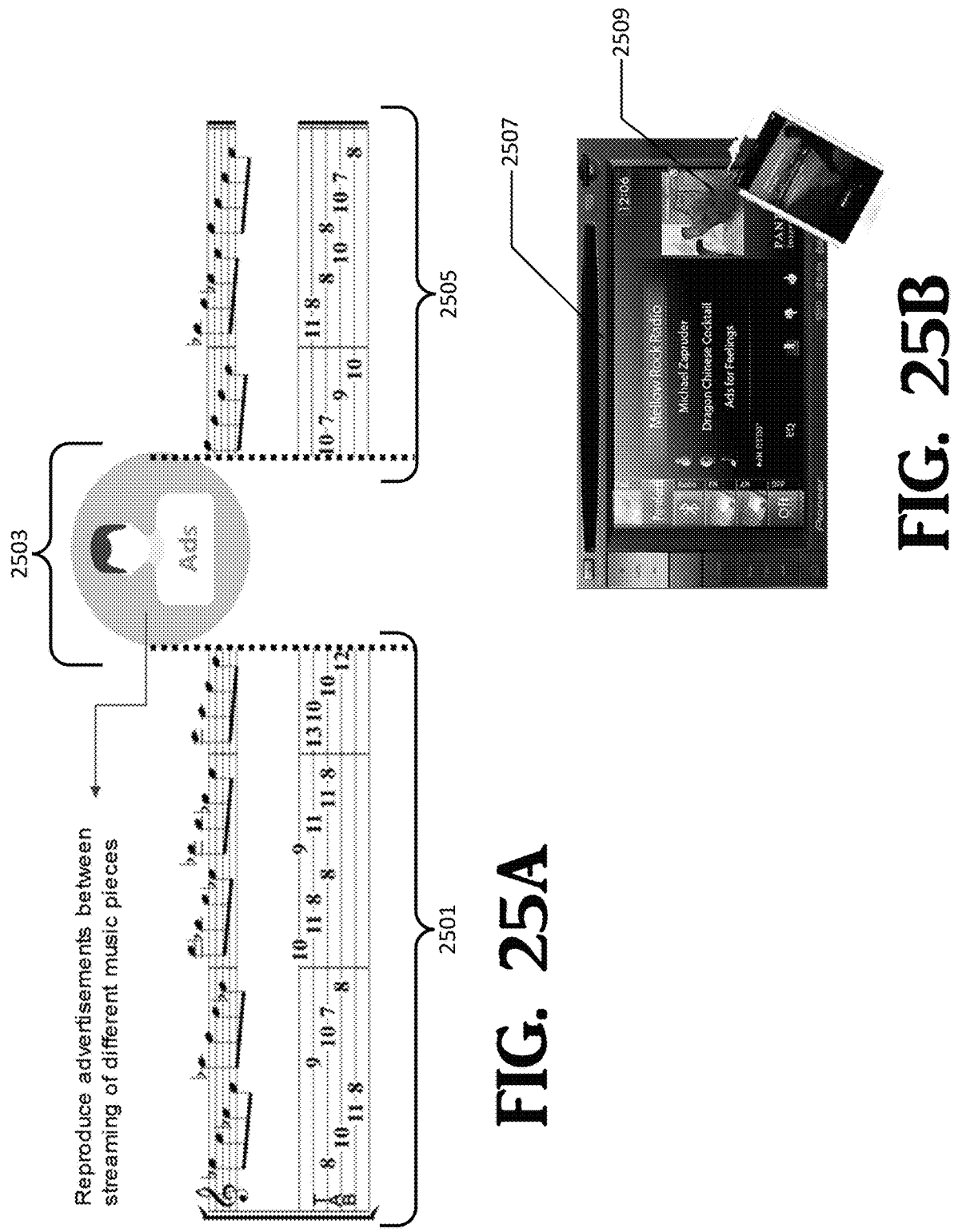
FIGS. 25A and 25B conceptually illustrates example embodiments of the present technology in accordance with an aspect of the present disclosure.
Figure 26:
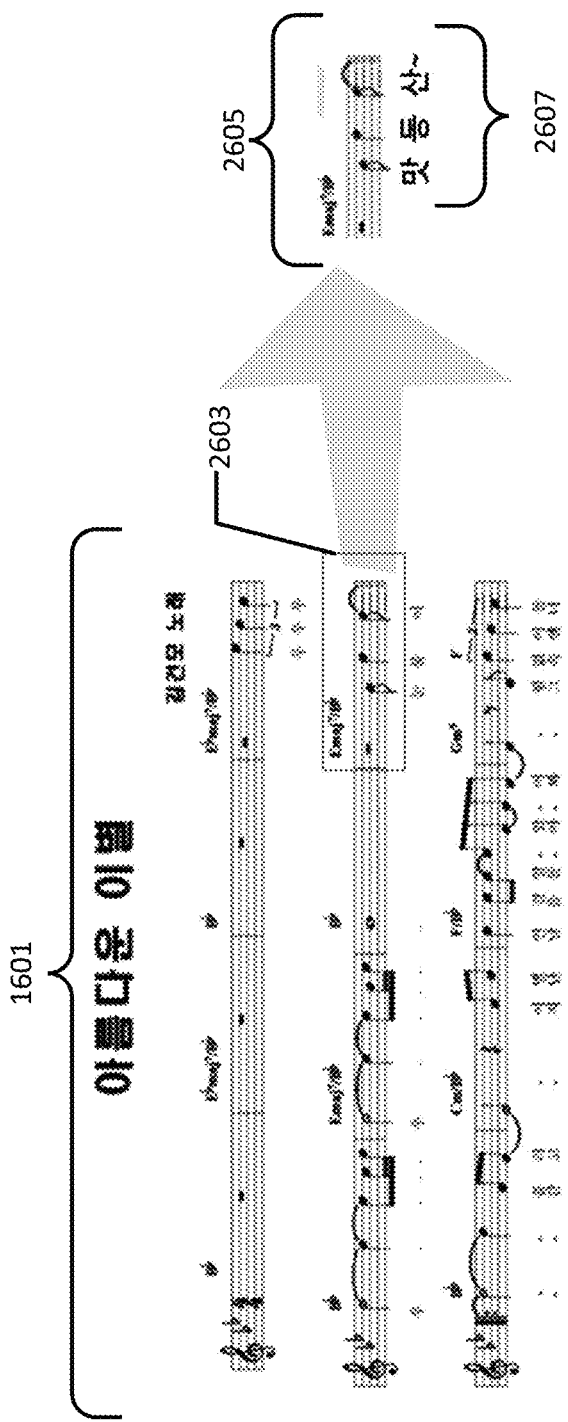
FIG. 26 conceptually illustrates an example embodiment of the present technology in accordance with an aspect of the present disclosure.

To further increase an effect of an advertisement on drivers or passengers in connected vehicles, FIGS. 25 and 26 provide example embodiments of the present technology in aspects of the present disclosure.

FIGS. 25A and 25B illustrate an example embodiment in accordance with an aspect of the present technology. Often, there is a need for reproducing an advertisement, not interfering with user's needs (or drivers' needs) or desires to listen to music while driving a vehicle. In an aspect of the present disclosure, to meet such a need of the user of a connected vehicle like 101, a reproduction of an advertisement via in-vehicle audio and/or internal displays inside the connected vehicle 101 may be controlled in such a way that the reproduction of the advertisement is placed between reproductions of different music pieces. In the present disclosure, the term "in-vehicle audio" or "in-vehicle audio system" as used herein means equipment including one or more internal speakers or audio system(s) installed in a vehicle to provide in-car entertainment and information for the vehicle occupants.

In an aspect of the present disclosure, a connected vehicle including an in-vehicle audio system and an advertisement system is disclosed. The in-vehicle audio system is configured to stream (or play or reproduce) music inside the connected vehicle, and the advertisement system is coupled to the in-vehicle audio system and configured to detect the streaming of music and to reproduce one or more advertisements for occupants inside the connected vehicle. The occupants may include a driver and/or passenger(s) in the connected vehicle. Further, the advertisement system is further configured to reproduce the one or more advertisements between streaming of different music pieces.

By way of example, as shown in FIG. 25A, in an aspect, after the end of streaming of the music 2501 that a driver of a connected vehicle 101 is listening to, an advertisement 2503 may be reproduced via an in-vehicle audio systems (e.g., speakers) and/or internal displays in the connected vehicle 101 and the streaming of a subsequent music piece 2505 may be delayed until the end of the reproduction of the advertisement 2503. That is, timings of streaming music may be controlled so that the advertisement 2503 can be inserted between two different music pieces 2501 and 2505.

Further, in another aspect of the present disclosure, as shown in FIG. 25B, using an application in an in-vehicle navigation system 2507 in the connected vehicle 101, the streaming of music and reproduction of the advertisement 2509 (or 2503) may also be simultaneously provided (or presented) to the driver or occupant(s) in the connected vehicle 101 in a non-interfering manner. That is, in cooperation with the in-vehicle navigation system 2507, the advertisement(s) 2503 or 2509 may be reproduced in such a manner that the reproduction of the advertisement(s) 2509 or 2509 does not interfere with audio guidance of the in-vehicle navigation system 2507 as shown in FIG. 25B. Further, in an aspect of the present disclosure, the advertisement 2503 or 2509 may be provided by the server 107 over a wireless network or retrieved from one or more storage devices of the connected vehicle 101. In addition, the advertisement 2503 or 2509 may include an advertisement that is created based in part on the music 2501 or 2505 in accordance with an aspect of an example embodiment as shown in FIG. 26.

FIG. 26 illustrates an example embodiment in accordance with an aspect of the present technology. Most drivers listen to music while driving, and the driver's perception of music and their concentration is very high. To effectively provide an advertisement based on such driver's concentration, a musical tone (or musical tone rate) or the like of the music to which the driver is listening in a connected vehicle may be analyzed and an advertisement corresponding to a specific musical tone may be created and reproduced by an advertisement system of the connected vehicle.

By way of example, and in an aspect of the present disclosure, as shown in FIG. 26, it is possible to recognize a specific segment or portion (e.g., a melody) of the music that the user is listening to, read a musical tone (or musical tone rate) of the specific segment or the melody of the music and create (or generate) an advertisement that corresponds to the musical tone or musical tone rate of the specific segment or the melody of the music that is being reproduced in the connected vehicle.

That is, in an aspect of the present disclosure, the advertisement system of the connected vehicle may be configured to: detect a piece of music that is being played in the connected vehicle (e.g., either by streaming of music from an in-vehicle radio or a mobile device via Bluetooth), analyze the detected piece of music, create one or more advertisements based in part on one or more segments of the detected piece of music, and reproduce the one or more advertisements at an end of the streaming of the music in the connected vehicle. In the example, the one or more advertisements may be created based in part on a melody of the music and/or profile information (e.g., age, sex, preferences, favorite tunes, personality, moods, or the like) of the one or more occupants (including the driver) in the connected vehicle. In an aspect, a melody of the music that is favored by the occupants may be selected and an audio advertisement corresponding to the favorite melody of the music may be created in consideration of certain information (e.g., age, sex, preferences, favorite tunes, personality, moods, or the like) of the one or more occupants in the connected vehicle.

Further, in an aspect of the present disclosure, when creating an advertisement based on the detected music, the detected music may be analyzed in terms of certain characteristics including but not limited thereto, a musical tone, a musical tone rate, pitch, notes, words, characters, or the like. Based on such analysis of the music that is detected, one or more segments of the music may be selected for creating an advertisement that corresponds to the selected one or more segments. In one implementation, in addition to the melody of the music, a number of characters or words in a commercial music or advertisement for one or more products of an advertiser may be considered. That is, the advertisement may be created by combining a musical tone of a selected segment of the music and one or more advertisement words or characters (e.g., "Coca Cola").

In another aspect of the present disclosure, although the above description is presented herein with respect to the advertisement system, rather than the advertisement system, the server 107 may receive from the advertisement system certain information on music (e.g., artist, a title, genre, a total duration, a current reproduction counter, a remaining time counter, etc.) that is being played in the connected vehicle and create one or more appropriate advertisements. The server may then send the created advertisement to the connected vehicle for reproduction for the occupants in the connected vehicle.

Further, as for the reproduction of the created advertisement, the advertisement may be reproduced within a predetermined period after the reproduction of a favored melody of the music is finished. Also, the created advertisement may be reproduced between different music pieces.

In another aspect of the present disclosure, the reproduction of the advertisement may be controlled based in part on whether the music is played via a radio or a mobile device via Bluetooth.

In the example, when it is determined that the music is played from the radio (e.g., an in-vehicle radio or a satellite radio system), the advertisement system may be configured to detect and determine an interval of time (e.g., an interval of silence or no reproduction of sound) between different music pieces or programs, and reproduce the one or more advertisements (e.g., audio advertisements) during the determined internal of time by controlling timings of reproduction of the one or more advertisements as well as the different music pieces. In another aspect of the present disclosure, when it is determined that the music is played via the Bluetooth, the music may be streamed from the mobile device (e.g., a smart phone, a MP3 player, or the like) to internal speakers via an in-vehicle audio system in the connected vehicle. In such a case, the advertisement system may be configured to communicate with the in-vehicle audio system and control timings of streaming of the music such that the one or more advertisements that are created based on the melody of the music are reproduced or played between playing of different music pieces. Alternatively, in another aspect of the present disclosure, the advertisement system may be considered to send to the server 107 certain information on the music (e.g., artist, a title, genre, a total duration, a current reproduction counter, a remaining time counter, etc.) that is being played, receive from the server 107 the one or more advertisements that are created based in part on one or more segments of the music, and reproduce the one or more advertisements at an end of the reproduction of music or between different pieces of music.

By way of example, as noted above, and as shown in FIG. 26, in one implementation, a specific segment or melody 2603 of the music 1601 may be selected by either the advertisement system of the connected vehicle or the server 107 over the network and, and then based on the selected specific segment or melody 2603 of the music 1601, a corresponding advertisement 2605 (e.g., an audio content) that is appropriate for the reproduction may be created or generated. In the example, the corresponding advertisement 2605 may include a musical tone and advertisement characters or words 2607. That is, the advertisement 2605 may be created by combining the musical tone of the segment 2603 and the advertisement characters or words 2607 (e.g., "맛동산"). In selecting the segment of music, various factors may be considered including but not limited thereto, a number of characters or words to be used in the advertisement 2605, a mood, or favorite lyrics, etc.

Furthermore, the advertisement system of the connected vehicle may be further configured to control in such a way that the created advertisement 2605 is provided after the song 1601 ends or immediately after a specific segment or melody 2603 is reproduced. Alternatively, as noted above, the server over the network may be configured to create one or more advertisement 2605 and control the reproduction of the created advertisement 2605. Further, as noted above, the sever over the network may be configured to use different control methods depending on whether the music is played through a radio station or via Bluetooth.

As such, in the present disclosure, a method and system for reproducing one or more advertisements while reproducing music inside a connected vehicle is disclosed. In the method, playing (or streaming) of music is detected in the connected vehicle, an advertisement is created based on the detected music, and the created advertisement is reproduced via one or more internal speakers of the connected vehicle. Further, in creating the advertisement based on the detected music, a musical tone of the music may be analyzed segment by segment, and one segment that is appropriate for creating the advertisement may be selected. The advertisement may be created by combining the musical tone of the selected segment of the music and one or more advertisement words for an advertiser. Further, when detecting the playing of music inside the connected vehicle may include determining whether the music is reproduced via streaming from an in-vehicle radio or a mobile device via Bluetooth. When it is determined that the music is reproduced via streaming from the in-vehicle radio, one or more intervals of time (e.g., an interval of silence or no reproduction of sound) between different music pieces or programs are determined for the reproduction of the advertisement. Also, when it is determined that music is reproduced via streaming from the mobile device, communications with the in-vehicle audio system are made and timing of streaming of the music is controlled such that the advertisement is reproduced after the end of reproduction of the music or between the reproductions of different music pieces. Further, when it is determined that the music is reproduced via streaming from the mobile device, a buffering process may start by the in-vehicle audio system such that timings of streaming of different music pieces may be controlled so as to reproduce the advertisement.

As a result, by dynamically reproducing an advertisement based on detection of streaming of music inside a connected vehicle, the effect of an advertisement on the driver (or the occupant) in the connected vehicle may be dramatically increased.

FIGS. 27A and 27B illustrate example embodiments in accordance with aspects of the present technology. In another aspect of the present technology, an advertisement system may be used for a virtual engine sound system in a connected vehicle. At present with electric vehicles, there may be a problem that the safety of pedestrians near the electric vehicles may be threatened because the electric vehicles do not produce engine noise while the electric vehicles are in operation. To solve this problem, in many different countries it has become mandatory for a manufacturer to install a virtual engine sound system in an electric vehicle. The virtual engine sound system is a system for producing a warning noise, providing synthetic audio feedback mimicking the sound of an idling internal combustion engine. The virtual engine sound system is designed to alert pedestrians to the presence of electric vehicles travelling at low speeds or when stopped at a location.

In an aspect of the present disclosure, an advertisement reproduction system (e.g., the advertisement system 200 or part thereof, as shown in FIG. 2C) may be used to replace a virtual engine sound system in an electric vehicle.

By way of example, a connected vehicle comprising an electric vehicle including an advertisement system is disclosed. The advertisement system is configured to reproduce one or more audio advertisements in a continuous manner via external speakers of the connected vehicle in place of imaginary engine sounds, for safety of people outside the connected vehicle. In an aspect of the present disclosure, the advertisement system may be further configured to detect presence of people near the connected vehicle via one or more sensors. Further, the connected vehicle may be configured to reproduce a same advertisement substantially simultaneously with other connected vehicles disposed near the connected vehicle or to reproduce an advertisement in coordination with other connected vehicles.

Further, the connected vehicle may be further configured to include an auxiliary batter for external speakers, and the connected vehicle is further configured to reproduce one or more advertisements when the presence of people near the connected vehicle is detected via one or more proximity sensors of the connected vehicle. In the example, the one or more proximity sensors may be part of a sensor unit of the advertisement system in the connected vehicle. Furthermore, the external speakers of the connected vehicle may include one or more vibration speakers. As noted above, a vibration speaker is a speaker configured to turn a solid surface into a speaker.

In the present disclosure, the term "proximity sensors" as used herein mean one or more electric sensors able to detect the presence of nearby objects without any physical contact, by emitting an electromagnetic field or a beam of electromagnetic radiation, e.g., infrared or the like. The proximity sensors may include inductor sensors, capacitive sensors, photoelectric sensors, magnetic sensors, or the like.

In one implementation, as shown in FIG. 27A, when the connected vehicle 2701 (including components like those of the connected vehicle 101) is stopped and/or charging from a charging station 2703, the connected vehicle 2701 (e.g., an electric vehicle) may be configured to continuously output or reproduce one or more advertisements 2705 via external speakers outside the connected vehicle 2701. In an aspect of the present disclosure, the connected vehicle 2705 may be further configured to continuously reproduce brand names, commercial music (CM) songs, slogans or the like, to alert pedestrians near the connected vehicle 2701. Further, as shown FIG. 27B, the connected vehicle 2701 may be configured to check whether there is a pedestrian or a moving object in a nearby area (e.g., a proximity area 2707) of the connected vehicle 2701 and reproduce one or more advertisements 2701 while moving a slow speed or parked in a space. That is, using its external sensors (e.g., proximity sensors or the like) outside the connected vehicle 2701, the connected vehicles 2701 may be configured to detect presence of a pedestrian or any moving object, and reproduce the one or more advertisements 2705 accordingly.

In another aspect of the present disclosure, when a plurality of connected vehicles is clustered together and configured to output different advertisements, there may be a problem that the advertisements may be unclear to the pedestrian due to inferences of the multiple advertisements. In such a case, the plurality of connected vehicles may be configured to communicate with each other and control a reproduction order of the multiple advertisements among the plurality of connected vehicles. Alternatively, the plurality of connected vehicles may further be configured to reproduce the same advertisement at the same time in a synchronized manner such that the pedestrian may recognize and understand an amplified or enhanced version of the advertisement that is being reproduced by the connected vehicles.

As such, by using an advertisement reproduction system of the connected vehicle 2701 a virtual engine sound system may be replaced in the connected vehicle 2701, and the safety of the pedestrian may be provided in a cost-effective way.

Further, in another aspect of the present disclosure, the connected vehicle 2701 may be configured to include one or more vibrations speakers (or vibration transducers) as part of an advertisement system (e.g., the advertisement system 200 of the connected vehicle 101). The vibration speakers turn surfaces into speakers. The one or more vibrations speakers may be mounted on a front, a left side, a right side, or under a hood of the connected vehicle 2701 and use one or more surfaces of a body of the connected vehicle 2701 to produce a rich and full sound. As such, in an aspect of the present disclosure, the connected vehicle 2701 may include one or more vibration speakers as part of an advertisement reproduction system (or the advertisement system) of the connected vehicle 2701 to reproduce one or more audio advertisements outside the connected vehicle 2701. Further, in another aspect of the present disclosure, external speakers in the form of vibration speakers (e.g., Feonic surface speakers or transducers or the like) may be used as the main sound source, and furthermore, the vibration speakers may be positioned at various positions including on the front, rear, or sides of the connected vehicle, in accordance with the disclosure in KR10-2013-002881, the contents of which is incorporated herein in its entirety.

Figure 28:
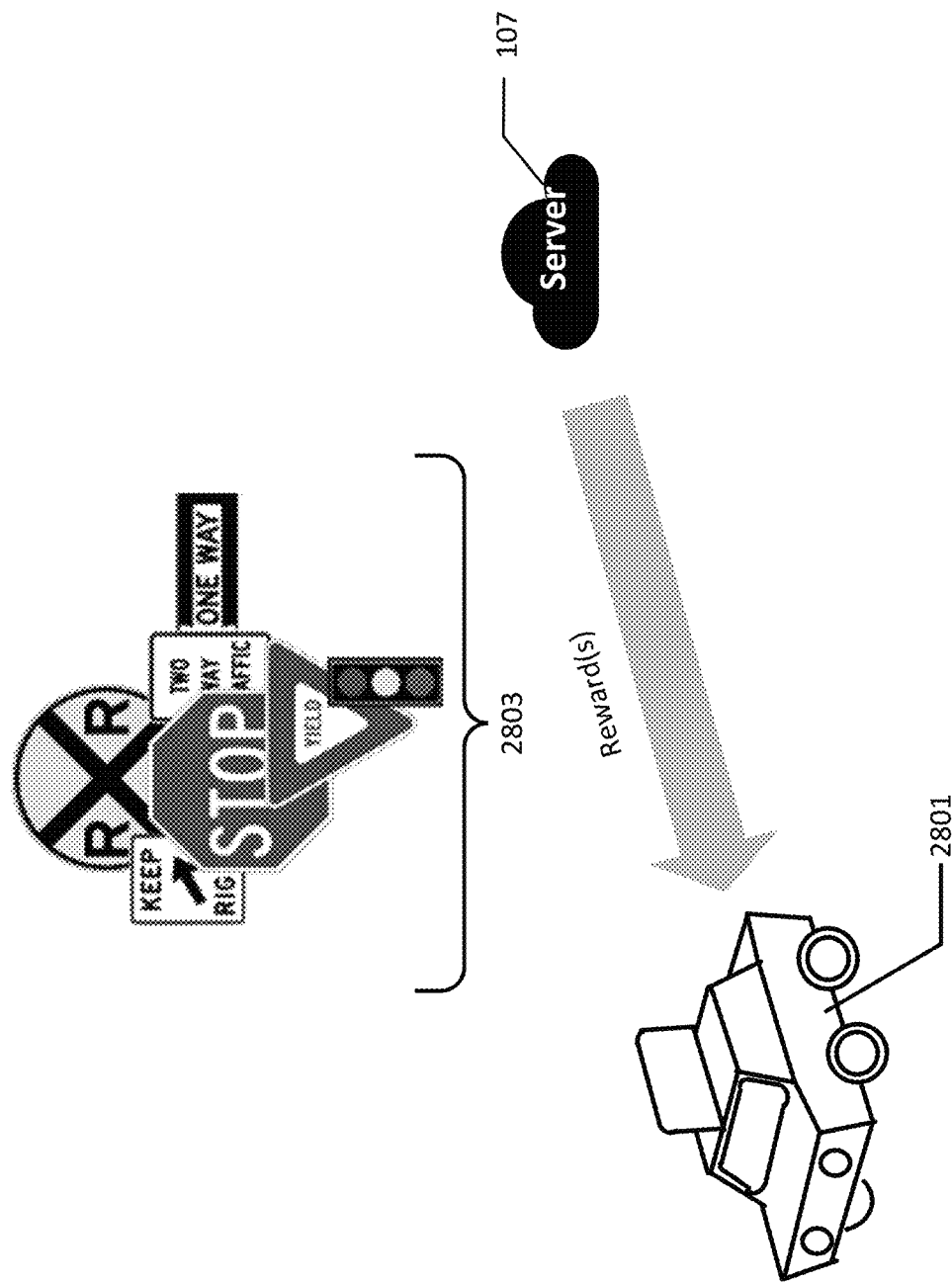
FIG. 28 conceptually illustrates an example embodiment of the present technology in accordance with an aspect of the present disclosure.

FIG. 28 illustrates an example embodiment in accordance with an aspect of the present technology. In an aspect of the present disclosure, to enhance public goods and interests as well as ensuring safe driving of a connected vehicle, one or more rewards may be paid to a driver of the connected vehicle (e.g., a driver of a rental vehicle) for safe driving and observing traffic laws and regulations. Alternatively, for observing traffic laws and/or regulations 2803 on the road, other benefits including a discount in auto insurance premium may be paid to an owner of the connected vehicle 2801 (having components like those of the connected vehicle 101). By way of example, the server 107 is configured to continuously monitor driving conditions of the connected vehicle 2801 by a driver. When it is determined that the connected vehicle 2801 (or the driver of the connected vehicle 2801) observed all traffic laws and/or regulations for safe driving on the road, the server 107 is configured to pay or give one or more rewards to the connected vehicle 2801 and/or the driver of the connected vehicle 2801.

Further, the server 107 is configured to monitor each connected vehicle such as 2801 and determine whether the driver of the connected vehicle 2801 has observed traffic laws and/or regulations on the road. Also, logs for the connected vehicle including a number of observances of traffic laws and regulations including speed limits, traffic signs, etc. may be created and kept. When the number of observances is determined to be greater than a predetermined value, then the server 107 may be configured to pay out one or more rewards to the driver of the connected vehicle 2801 or the owner of the connected vehicle 2801 in various forms, including but not limited to, a discount in insurance premium, a credit for future use, etc.

Further, in another aspect of the present disclosure, the server 107 may be configured to provide hints or guidance as to traffic enforcement or provide alert messages to the driver of the connected vehicle 2801 when the connected vehicle 107 is about to drive through one or more traffic enforcement areas. In another aspect of the present disclosure, when the connected vehicle 2801 is a rental vehicle, the reward may be provided to the driver of the connected vehicle 2801 in the form of an additional use time, a discount in rental fee, a future credit for use, a coupon for other services, or the like such that the safe driving of the connected vehicle may be encouraged.

Furthermore, in another aspect of the present disclosure, the plurality of connected vehicles may be configured to provide guidance information via external displays and/or external speakers of the connected vehicles while driving on the road, when an emergency vehicle approaches the plurality of connected vehicles on the road. For example, in one implementation, the server 107 may control driving paths of the connected vehicles on the road when an emergency vehicle coming towards the plurality of connected vehicles on the road. The server 107 may also be configured to detect the presence of the emergency vehicle on the road in a vicinity of the connected vehicles and control the driving routes of the connected vehicles on the road such that one of a plurality of lanes may be open and emptied for a quick pass through of the emergency vehicle.

In the example, the server 107 may be further configured to predict entry of the emergency vehicle into the driving route of the connected vehicles. Also, through the reproduction of route guidance via external displays and/or speakers of the connected vehicles, it will be possible to allow other vehicles to yield the right of way for the emergency vehicles. In an aspect of the present disclosure, the server 107 may further be configured to provide a deduction in penalties, taxes, etc. for the connected vehicles that operated in accordance with the driving route guidance provided by the server. Alternatively, fines may be imposed on the connected vehicles that fail to operate in accordance with the driving route guidance when the emergency vehicles are on the road. As such, by encouraging the yield of the right of way to the emergency vehicles and/or other vehicles, it will be possible to contribute to the public goods and interest. Further, in another aspect of the present disclosure, when there is a need for putting out a public notice, such as an emergency warning or alert, e.g., an earthquake warning, a war warning, a traffic warning, a disaster warning, or other emergency warnings or the like, the server 107 may be configured to receive such emergency warning or information from a public or government server, and send the information to the plurality of connected vehicles such that the information may be reproduced on the external displays and/or speakers of the connected vehicles, thereby contributing to the public goods and interest.

As such, by using connected vehicles as a platform, public goods and interests may be advanced and safe driving of the connected vehicles may also be encouraged through various forms of incentives including one or more rewards for compliance with traffic laws and regulations or the like.

FIGS. 29-39 illustrate various embodiments of the present disclosure using example flowcharts for better understanding of the present technology. In the description below, it is noted that the term "advertisement vehicle" or "target vehicle" or "vehicle" may include one or more connected vehicles. Further, the terms "driving route guidance" or "driving direction guidance" may be interchangeably used herein. Further, the embodiments disclosed or described in reference to FIGS. 29-39 are example embodiments, many of which may be implemented on a server side on a network. However, it is also contemplated that other embodiments or variants similar to those shown in FIGS. 29-39 may be implemented on a client side, for example, on one or more of advertisement vehicles (or connected vehicles) which may also act as a server or a master. When one of the advertisement vehicles acts as a master of a group of advertisement vehicles, various communication technologies including vehicle-to-vehicle communications, wifi communications, or the like may be used to communicate with each other.

In the present disclosure, the term "verify" as used herein includes meanings of "verify" or "confirm" depending on the context. Further, the term "collect" as used herein includes meanings of "collect," "obtain," or "determine" depending on the context. Further, the term "driving route guidance" as used herein means any driving guidance provided based on a navigation device. Detailed turn by turn instructions may be provided to the advertisement vehicles. Also, the term "real-time traffic density information" as used herein mean traffic density information provided in real-time, including vehicle density or people density in a certain area. As such, the real-time traffic density information includes either the real-time vehicle density information or the real-time people density information. Further, the term "vehicle density" as used herein means a density of vehicles in a certain area and the term "people density" as used herein means a density of people in a certain area. Either term represents a measure of how many vehicles or people are present in the certain area. Either the vehicle density information or the people density information may be obtained from other advertisement vehicles or devices present in the certain area as well as from one or more public or private traffic data sources. In case of when the vehicle density information or the people density information is obtained from other advertisement vehicles or devices, such needed information may be captured via external cameras of the other advertisement vehicles and sent to a server on a network for statistical analysis and calculation of either vehicle density or people density information. Alternatively, the vehicle density information or the people density information may be obtained from the one or more public or private traffic data sources, which collect and monitor vehicle density and/or people density information through numerous cameras deployed throughout the certain area. Further, the term "a lowest real-time traffic density" or "a lowest real-time people density" as used herein mean a lowest traffic or people density measured or determined at a certain location. Also, the term "driving order" as used herein means an order for a plurality of vehicles participating in a parade or parade procession for the specific event.

FIGS. 29 (29A, 29B, 29C, 29D and 29E) illustrate various embodiments of the present technology in accordance with aspects of the present disclosure. In an aspect of the present disclosure, an example method for controlling advertisement vehicles is provided. FIGS. 29A and 29B illustrate an example method for handling a request to participate in a specific event during the execution of the specific event, and FIG. 29C illustrates an example method of handling a break-away indication from one of the participating vehicles in the specific event. By way of example, in FIG. 29A, a request to participate in a specific event (e.g., a specific advertisement event or the like) is received from a first vehicle, while the specific event is in progress, at S2901. In the example, the specific event may be one of multiple advertisement events that are to be carried out in a destination route of the first vehicle.

At S2903, it is determined whether it is possible for the first vehicle to participate in the specific event, based on at least one of: specific event information or location of the first vehicle. The specific event information may include event duration, event location, event condition, etc. The event condition may include at least one of: a vehicle type, a vehicle color, age of a driver, sex of the driver, a maximum number of vehicles for the specific event. Further, in another aspect of the present disclosure, it may be determined whether it is possible for the first vehicle to participate in the specific event in consideration of a distance from the location of the first vehicle to the target area for the specific event or a time it may take for the first vehicle to arrive at the target area. Further, the location of the first vehicle may be determined based on GPS data, map, camera images, cellular signals, or any combination thereof.

At S2905, when it is determined that the first vehicle is not suitable for participating in the specific event, a rejection message is sent in reply to the request to participate in the specific event from the first vehicle. Alternatively, at S2907, when it is determined that the first vehicle can participate in the specific event but it is expected that the first vehicle is not able to arrive at the target area for the specific event within a predetermined time prior to an expected termination of the specific event, a rejection message is sent in reply to the request to participate in the specific event.

Alternatively, when it is determined that the first vehicle can participate in the specific event, driving direction guidance is provided to the first vehicle and a plurality of vehicles that are participating in the specific event, at S2911. Further, in an aspect of the present disclosure, when it is determined that the first vehicle can participate in the specific event and the first vehicle can arrive at its destination within a desired time, the driving direction guidance including a most optimal route for earning a maximum amount of reward is suggested.

Figure 29A:
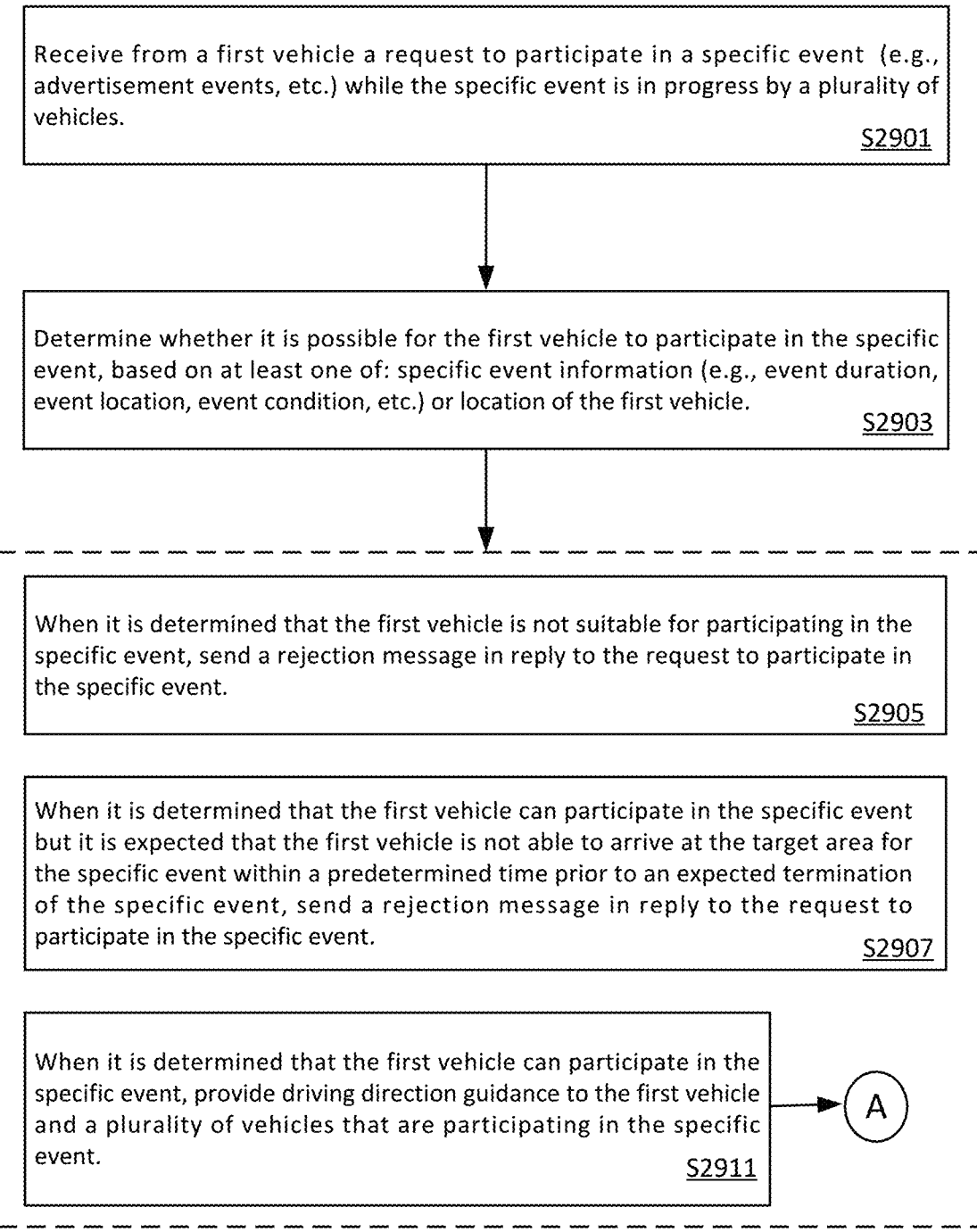
FIGS. 29 (29A, 29B, 29C, 29D and 29E) are example flowcharts conceptually illustrating various embodiments of the present technology in accordance with various aspects of the present disclosure.
Figure 29B:
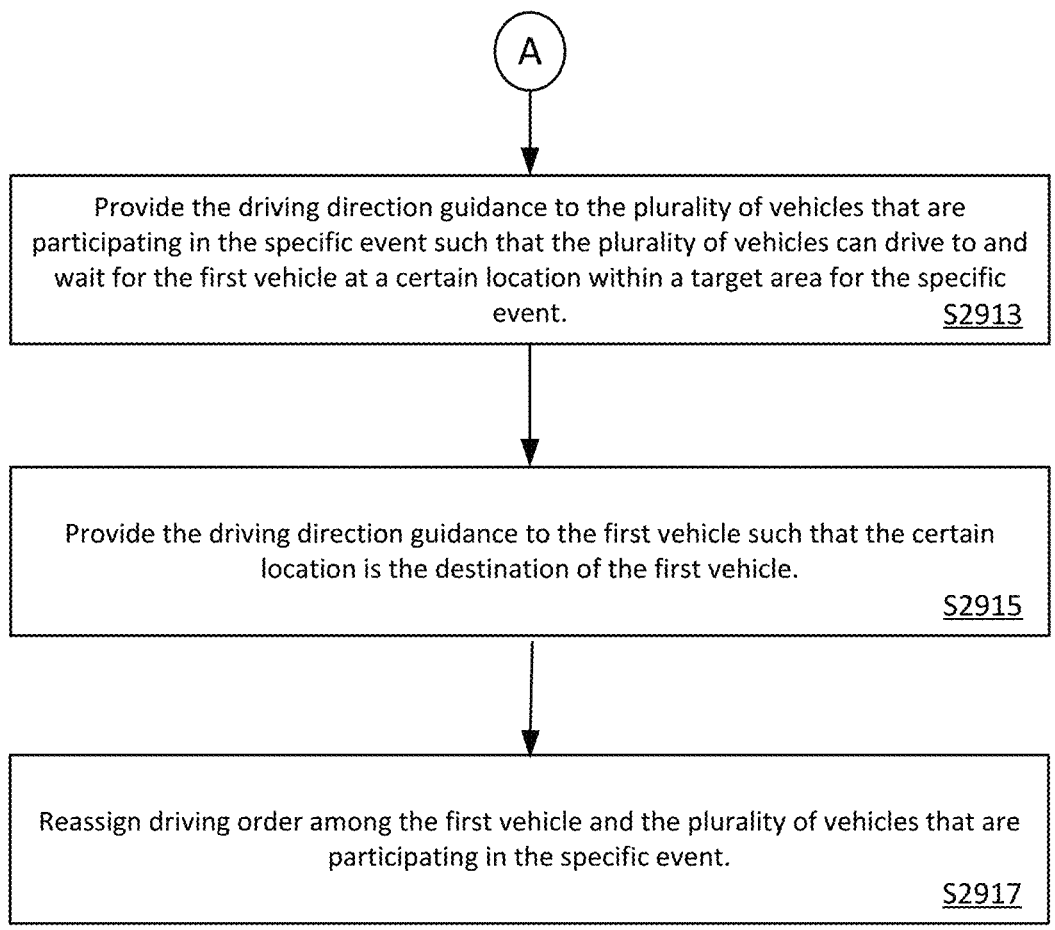

Also, as shown in FIG. 29B, at S2913, the driving direction guidance is provided to the plurality of vehicles that are participating in the specific event such that the plurality of vehicles can drive to and wait for the first vehicle at a certain location within a target area for the specific event. That is, the driving direction guidance may include instructions to the plurality of vehicles that are participating in the specific event such that the plurality of vehicles wait for the first vehicle at a certain location within the target area for the specific event. Further, the driving direction guidance may be provided to the first vehicle such that the certain location is the destination of the first vehicle, at S2915.

In another aspect of the present disclosure, the driving direction guidance may include instructions to the first vehicle in consideration of real-time vehicle information of the first vehicle and the plurality of vehicles that are participating in the specific event. The driving direction guidance may further include instructions to the first vehicle to increase a driving speed of the first vehicle. In another aspect of the present disclosure, when it is determined that the first vehicle can participate in the specific event, an initial location for participation by the first vehicle may be determined in consideration of real-time vehicle information of the first vehicle and the plurality of vehicles that are participating in the specific event. The real-time vehicle information may include at least one of: real-time location, speed, or traffic information. Further, the initial location for participation by the first vehicle may be determined based on a distance between the first vehicle and a vehicle of the plurality of vehicles that are a shortest distance from the first vehicle. Furthermore, a driving route and a duration for the specific event may be determined based on traffic density and people density at a specific time of a day in a target area for the greatest effect of the advertisement.

At S2917, driving order may also be reassigned among the first vehicle and the plurality of vehicles that are participating in the specific event.

Figure 29C:
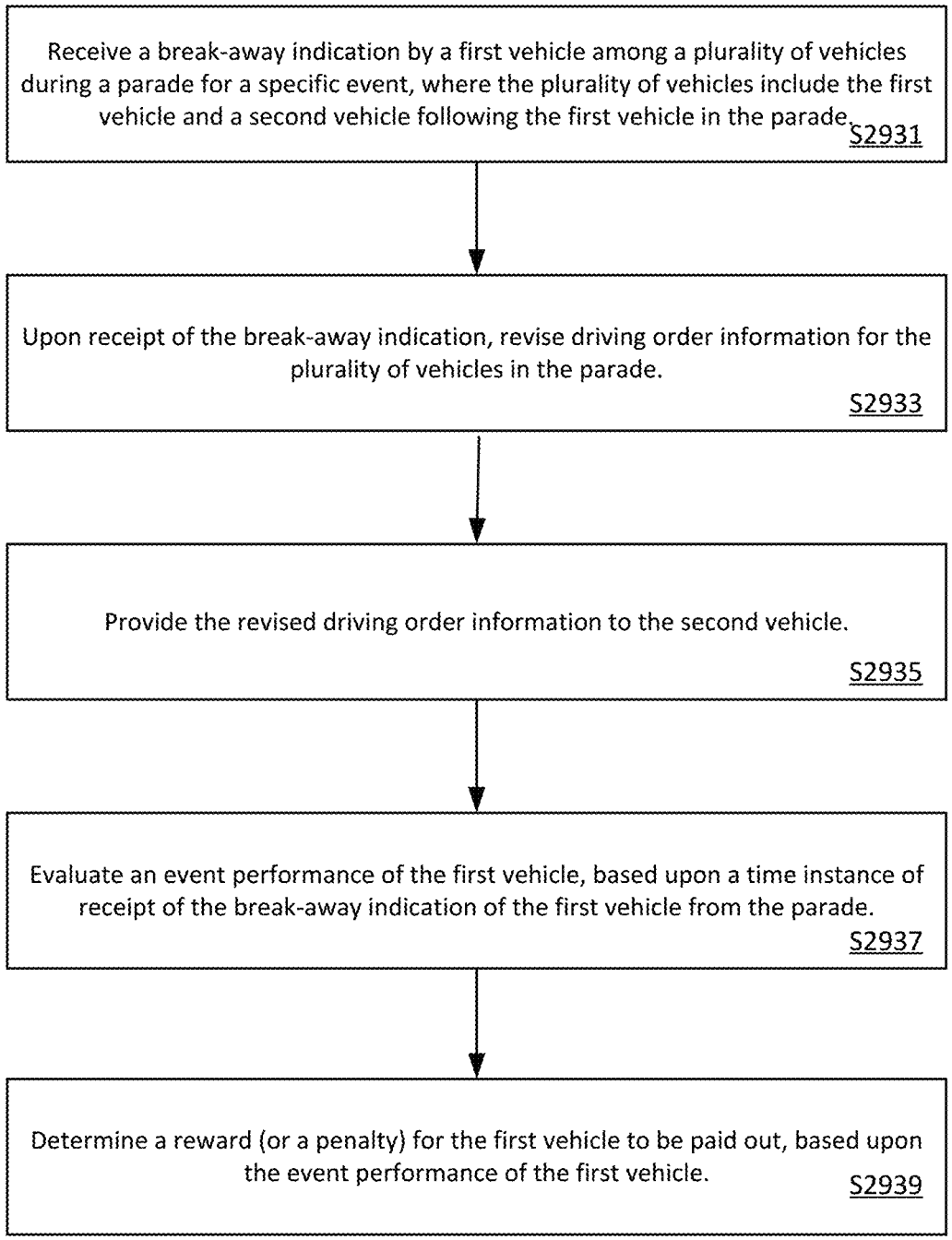

In an aspect of the present disclosure, one of the participating advertisement vehicles may decide to break-away and depart from the specific advertisement event. FIG. 29C illustrates an example method for handing such a break-way advertisement vehicle. At S2931, a break-away indication may be received from a first vehicle among a plurality of vehicles participating in a parade for a specific event (e.g., a specific advertisement event). The plurality of vehicles includes the first vehicle and a second vehicle following the first vehicle in the parade. Upon receipt of the break-away indication, driving order information may be revised for the plurality of vehicles participating in the parade for the specific event, at S2933. The revised driving order information may be provided to the second vehicle, at S1935. In an aspect of the present disclosure, when the first vehicle has been a lead vehicle in the parade, a message may be provided that the second vehicle has become the lead vehicle for the parade.

Based on a time instance of receipt of the break-away indication of the first vehicle from the parade, at S2937, an event performance of the first vehicle may be evaluated. At S2939, based on the event performance of the first vehicle, a reward may be paid out to the first vehicle or a penalty may be imposed on the first vehicle. In an aspect of the present disclosure, the reward may be determined based on at least one of: a time duration for participation by the first vehicle in the parade or a driving distance for the parade.

Figure 29D:
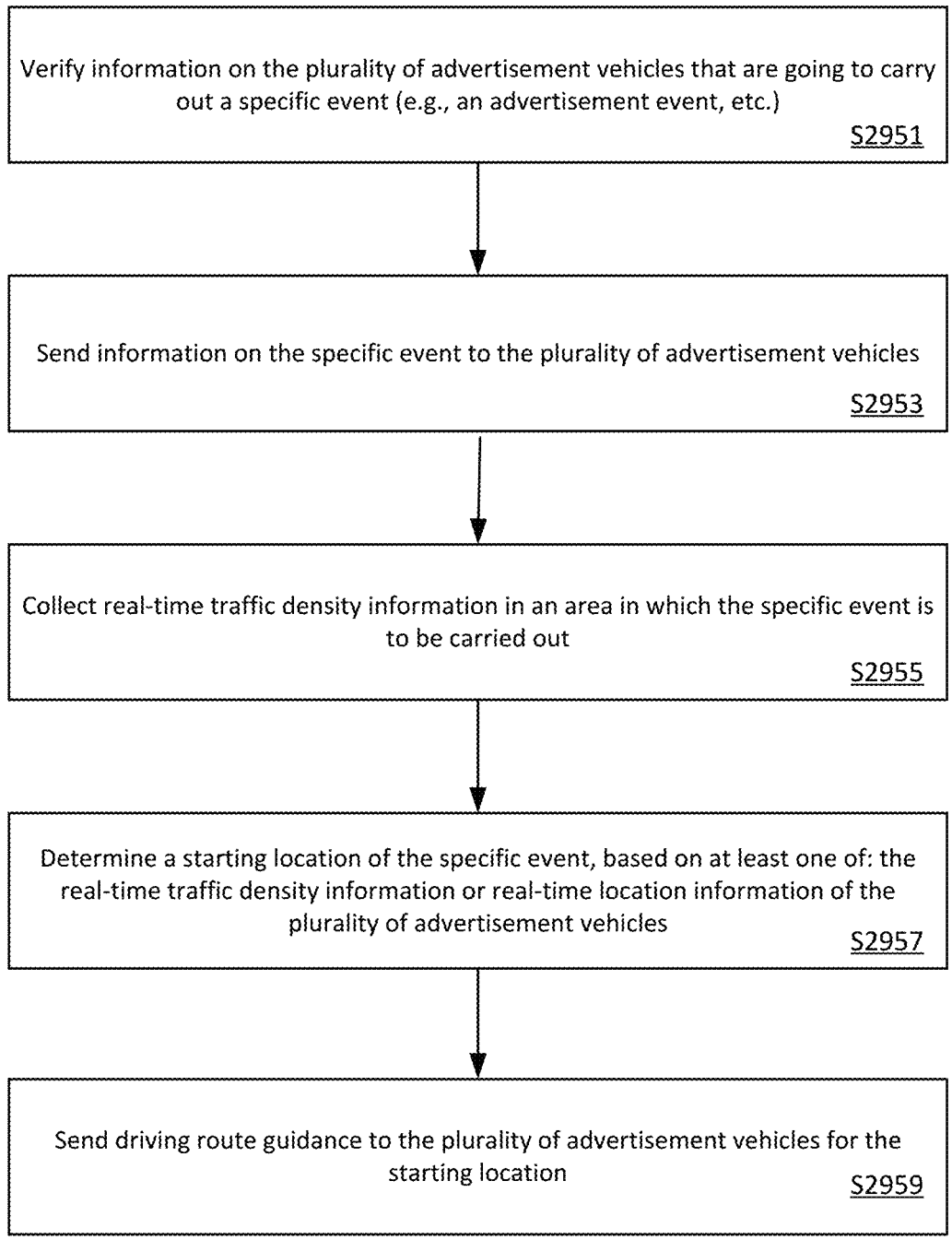

FIG. 29D illustrates an example embodiment in accordance with an aspect of the present disclosure.

In an aspect of the present disclosure, driving route guidance to the plurality of advertisement vehicles may be provided based on various factors such as traffic density and/or people density. By way of example, at S2951, information on the plurality of advertisement vehicles that are going to carry out a specific event, e.g., a specific advertisement event, etc. may be verified. At S2953, information on the specific event may be sent to the plurality of advertisement vehicles. In another aspect of the present disclosure, when the information on the specific event is sent to the plurality of advertisement vehicles, the driving route guidance with an initial destination which is set to a predetermined location within an area for the specific event may be sent as well.

At S2955, real-time traffic density information may be collected in an area in which the specific event is to be carried out. In an aspect of the present disclosure, the real-time traffic density information may include at least one of: real-time vehicle density information in the area or real-time people density information in the area.

At S2957, a starting location of the specific event may be determined, based on at least one of: the real-time traffic density information or real-time location information of the plurality of advertisement vehicles. In an aspect of the present disclosure, the starting location of the specific event may also include or selected as a location with a lowest real-time traffic density among multiple locations, e.g., a first location, a second location, and a third location within the area in which the specific event is to be carried out. In another aspect of the present disclosure, the starting location of the specific event may also include or selected as a location with a lowest real-time people density among multiple locations, e.g., a first location, a second location, and a third location within the area in which the specific event is to be carried out. As such, the location with the lowest vehicle or people density may be selected as the starting location so that the plurality of vehicles may easily convene together in preparation for a parade for the specific event. Further, alternatively, the location with the highest people density may be selected as the starting location for the specific event.

In another aspect of the present disclosure, the starting location of the specific event may be determined in consideration of present location information of the plurality of advertisement vehicles. In one implementation, when the people density is determined to be higher than a predetermined density, a shortest distance location from the present location information of the plurality of advertisement vehicles may be the starting location for the specific event.

At S2959, driving route guidance may be provided to the plurality of advertisement vehicles for the starting location of the specific event. In an aspect of the present disclosure, the driving route guidance may be provided in real-time to the plurality of advertisement vehicles from the starting location in order to carry-out the specific event. In another aspect of the present disclosure, the driving route guidance may include at least one of: driving speed information (e.g., traffic speed, speed limit, etc.), lane information (e.g., a single lane, 2-lanes, etc.), and driving route information. In another aspect of the present disclosure, the driving route guidance may also be provided in consideration of at least one of: a predetermined route or real-time traffic or people density information in the area in which the specific event is to be carried out.

Further, in another aspect of the present disclosure, driving order information among the plurality of advertisement vehicles may be provided to the plurality of advertisement vehicles for a parade procession. Also, the driving order information among the plurality of advertisement vehicles may be determined according to expected arrival order of the advertisement vehicles at the starting location based on the real-time location information of the plurality of advertisement vehicles. In the example, based on the location information of the plurality of advertisement vehicles and traffic density information (including vehicle density and/or people density), an expected shortest time or an expected longest time for each advertisement vehicle to arrive at the starting location may be calculated or determined and as result it may be determined whether each advertisement vehicle may be able to participate in the specific event. The traffic density information may include real-time traffic density and/or past traffic density. As such, based on the expected arrive times of the advertisement vehicles, a group of advertisement vehicles that can participate in the specific event may be selected and an inquiry as to whether the selected advertisement vehicles desire to participate in the specific event may be sent out to the selected advertisement vehicles. Also, one or more advertisements may be sent to the selected advertisement vehicles for reproduction of the one or more advertisement for the specific event. Further, in another aspect of the present disclosure, each of the selected advertisement vehicles may be provided with information on whether the advertisement vehicle may arrive at the destination of vehicle occupant(s) within a desired time even after participating in the specific event. This may be determined based on expected arrival times that are calculated based on the real-time traffic information and/or past traffic information.

In another aspect of the present disclosure, the driving order information among the plurality of advertisement vehicles may also be determined according to waiting order of the advertisement vehicles at the starting location based on the real-time location information of the plurality of advertisement vehicles. Further, in another aspect of the present disclosure, the driving order information among the plurality of advertisement vehicles may be provided or determined according to exchanges of messages among drivers of the plurality of advertisement vehicles participating in the specific event. Further, in another aspect of the present disclosure, the driving order information among the plurality of advertisement vehicles may be provided or reproduced via at least one of; an external display or an external speaker of each advertisement vehicle. Further-more, in another aspect of the present disclosure, the driving order information among the plurality of advertisement vehicles may include information on at least one of: a vehicle type, a vehicle color, identification of a preceding advertisement vehicle. As such, the driving order information may help to form and maintain a parade or a parade procession for the specific event.

Figure 29E:
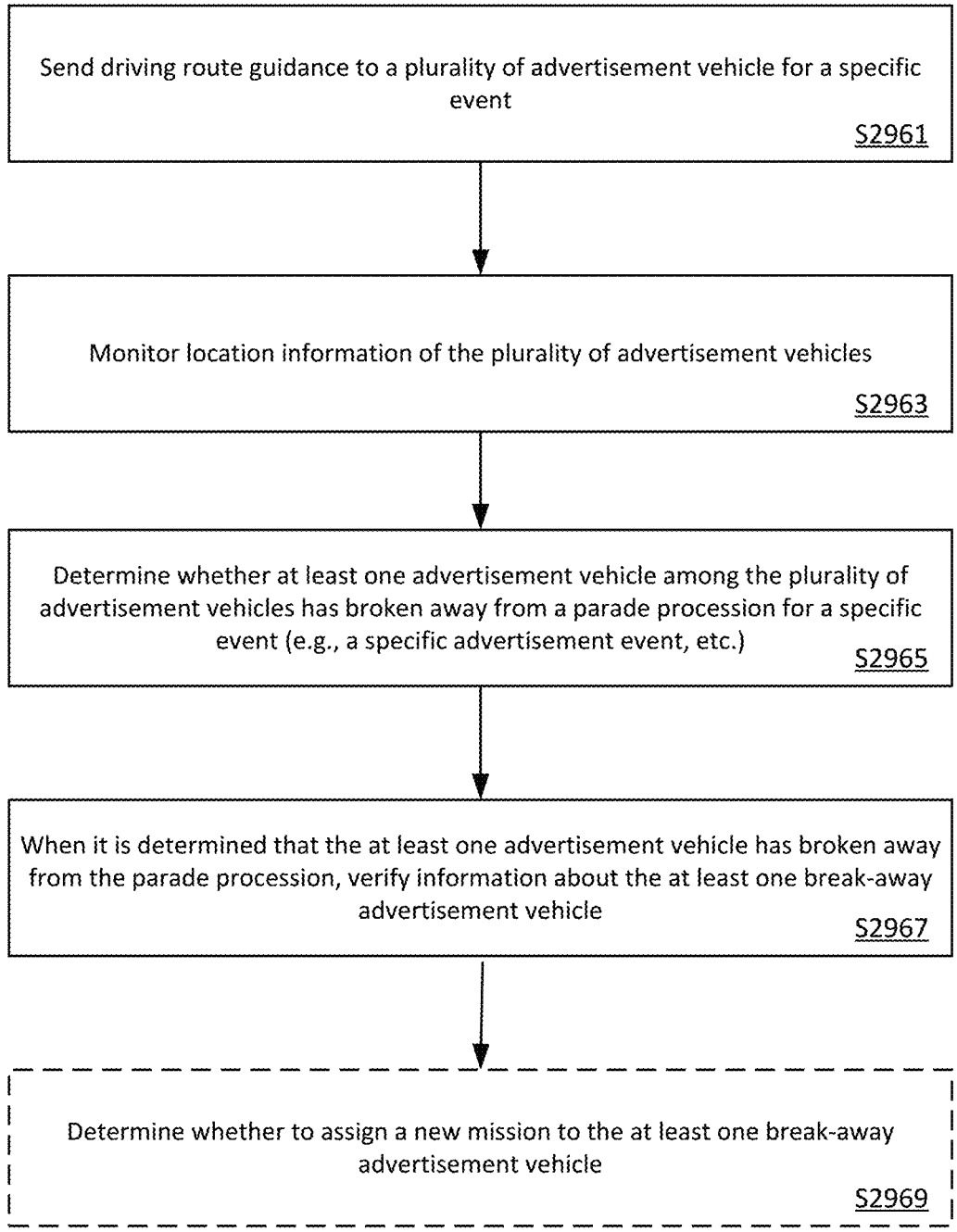

FIG. 29E illustrates another embodiment of the present technology in accordance with an aspect of the present disclosure. In an aspect of the present disclosure, an example method of dealing with a break-away vehicle from a specific event is provided. By way of example, at S2961, initially, driving route guidance may be sent to a plurality of advertisement vehicles for participating in the specific event. As mentioned above, the specific event may be an advertisement event or any other event including a parade. At S2963, location information of the plurality of advertisement vehicles is monitored. That is, the location information such as global positioning system (GPS) data of each advertisement vehicle participating in the specific event or the parade is continuously collected and monitored.

At S2965, it is determined whether at least one advertisement vehicle among the plurality of advertisement vehicles has broken away from a parade procession for the specific event, e.g., a specific advertisement event, etc. In an aspect of the present disclosure, determining whether the at least one advertisement vehicle among the plurality of advertisement vehicles has broken away from the parade procession may be based on a determination of whether the at least one advertisement vehicle may have deviated from the driving route for the parade or parade procession for the specific event, based on real-time location information of the at least one advertisement vehicle.

At S2967, when it is determined that the at least one advertisement vehicle has broken away from the parade procession in the middle of carrying out the specific event, certain information about the at least one break-away advertisement vehicle (e.g., vehicle profile information or the like) may be verified.

At S2969, it may optionally be determine whether to assign a new mission to the at least one break-away advertisement vehicle in the middle of carrying out the specific event, for example, doing a parade procession. In an aspect of the present disclosure, when determining whether to assign the new mission to the at least one break-away advertisement vehicle, the assignment of the new mission may be determined based on at least one of: a number of break-away advertisement vehicles from the parade procession or a distance of the at least one break-away advertisement vehicle from the parade procession. Further, in another aspect of the present disclosure, when the number of the break-away advertisement vehicles is determined to be greater than a predetermined number, the new mission may be assigned to the at least one break-away advertisement vehicle. Otherwise, when the number of the break-away advertisement vehicles is determined to be less than the predetermined number, driving route guidance may be provided to the at least one break-away advertisement vehicle such that the at least one break-away advertisement vehicle may join the parade procession later.

The following and other embodiments throughout the present disclosure recite permutation of combinations of features disclosed herein. In some cases, permutations of combinations of features disclosed herein are non-limiting. Other permutations of combination of features are also contemplated. In particular, each of these numbered embodiments is contemplated as depending from or relating to every previous or subsequent numbered embodiment, independent of their order as listed. Some methods enumerated herein include up to and all of the following elements a, b, and c. The methods may further include additional elements. 29A-1. A method for controlling advertisement vehicles, the method comprising: receiving from a first vehicle a request to participate in a specific event while the specific advertisement event is in progress; determining whether it is possible for the first vehicle to participate in the specific event, based on at least one of: the specific event information or location of the first vehicle; and when it is determined that the first vehicle can participate in the specific event, providing driving direction guidance to the first vehicle and a plurality of vehicles that are participating in the specific event. 29A-2. The method of embodiment 29A-1, wherein the specific event comprises one of multiple advertisement events that are to be carried out in a destination route of the first vehicle. 29A-3. The method of embodiment 29A-1, wherein the specific event information comprises at least one of: an event duration, an event location, and an event carryout condition. 29A-4. The method of embodiment 3, further comprising: when the first vehicle is determined to be not suitable for participating in the specific event, sending a rejection message in response to the request to participate in the specific event. 29A-5. The method of embodiment 29A-4, wherein the event carryout condition comprises at least one of: a vehicle type, a vehicle color, age of a driver, sex of the driver, a maximum number of vehicles for the specific event. 29A-6. The method of embodiment 29A-1, wherein determining whether it is possible for the first vehicle to participate in the specific event comprises is made in consideration of a distance from the location of the first vehicle to a target area for the specific event or a time it takes for the first vehicle to arrive at the target area. 29A-7. The method of embodiment 29A-6, further comprising: when it is expected that the first vehicle is not able to arrive at the target area for the specific event within a predetermined time prior to an expected termination of the specific event, sending a rejection message in response to the request to participate in the specific advertisement event. 29A-8. The method of embodiment 29A-1, further comprising when it is determined that the first vehicle can participate in the specific advertisement event, providing the driving direction guidance to the plurality of vehicles that are participating in the specific event such that the plurality of vehicles wait for the first vehicle at a certain location within the target area for the specific event. 29A-9. The method of embodiment 29A-8, further comprising: providing the driving direction guidance to the first vehicle such that the destination of the first vehicle is the certain location. 29A-10. The method of embodiment 29A-1, further comprising: when it is determined that the first vehicle can participate in the specific event, providing the driving direction guidance to the first vehicle in consideration of real-time vehicle information of the first vehicle and the plurality of vehicles that are participating in the specific event. 29A-11. The method of embodiment 29A-10, further comprising providing the driving direction guidance to the first vehicle so as to increase a driving speed of the first vehicle. 29A-12. The method of embodiment 29A-1, further comprising: when it is determined that the first vehicle can participate in the specific advertisement event, determining an initial location for participation by the first vehicle in consideration of real-time vehicle information of the first vehicle and the plurality of vehicles that are participating in the specific advertisement event. 29A-13. The method of embodiment 29A-10 or 29A-12, wherein the real-time vehicle information comprises at least one of: real-time location, speed, or traffic information. 29A-14. The method of embodiment 29A-12, wherein the initial location for participation by the first vehicle is determined based on a distance between the first vehicle and a vehicle of the plurality of vehicles that has a shorted distance from the first vehicle. 29A-15. The method of embodiment 29A-1, further comprising: when the first vehicle participates in the specific event while the specific event is in progress, reassigning driving order among the first vehicle and the plurality of vehicles that are participating in the specific event. 29C-16. A method for controlling advertisement vehicles, the method comprising: receiving a break-away indication of a first vehicle among a plurality of vehicles during a parade for a specific event, the plurality of vehicles including the first vehicle and a second vehicle following the first vehicle; revising driving order information for the plurality of vehicles in the parade; roviding the revised driving order information to the second vehicle; and evaluating a parade event performance of the first vehicle, based upon a time instance of receipt of the break-away indication of the first vehicle from the parade. 29C-17. The method of embodiment 29C-16, further comprising: when the first vehicle has been a lead vehicle in the parade, providing a message that the second vehicle has become the lead vehicle for the parade. 29C-18. The method of embodiment 29C-16, wherein evaluating the parade event performance of the first vehicle comprises determining a reward for the first vehicle to be paid out. 29C-19. The method of embodiment 29C-18, wherein the reward is determined based on at least one of: a time duration for participation by the first vehicle in the parade or a driving distance for the parade. 29D-1. A method for controlling a plurality of advertisement vehicles, the method comprising: verifying information on the plurality of advertisement vehicles that are going to carry out a specific event; sending information on the specific event to the plurality of advertisement vehicles; collecting real-time traffic density information in an area in which the specific event is to be carried out; determining a starting location of the specific event, based on at least one of: the real-time traffic density information or real-time location information of the plurality of advertisement vehicles; sending driving route guidance to the plurality of advertisement vehicles such that the plurality of advertisement vehicles convenes at the starting location for the specific event. 29D-2. The method of embodiment 29D-1, further comprising providing the driving route guidance in real-time to the plurality of advertisement vehicles from the starting location for the carry out of the specific event. 29D-3. The method of embodiment 29D-1, further comprising sending one or more advertisements to the plurality of advertisement vehicles for reproduction of the one or more advertisements during the specific event. 29D-4. The method of embodiment 29D-1, wherein the real-time traffic density information includes at least one of: real-time vehicle density information or real-time people density information in the area in which the specific event is to be carried out. 29D-5. The method of embodiment 29D-4, wherein the starting location of the specific event comprises a location with a lowest real-time traffic density among a first location, a second location, and a third location within the area in which the specific advertisement event is to be carried out. 29D-6. The method of embodiment 29D-4, wherein the starting location of the specific event comprises a location with a lowest real-time people density among a first location, a second location, and a third location within the area in which the specific advertisement event is to be carried out. 29D-7. The method of embodiment 29D-1, wherein the starting location of the specific event is determined in consideration of present location information of the plurality of advertisement vehicles. 29D-8. The method of embodiment 29D-3, wherein the driving route guidance includes at least one of: driving speed information, lane information, and driving route information. 29D-9. The method of embodiment 29D-8, wherein the driving route guidance is provided in consideration of at least one of: a predetermined route or real-time traffic or people density information in the area in which the specific event is to be carried out. 29D-10. The method of embodiment 29D-2, further comprising providing driving order of the plurality of advertisement vehicles. 29D-11. The method of embodiment 29D-10, wherein the driving order of the plurality of advertisement vehicles is determined according to expected arrival order at the starting location based on the real-time location information of the plurality of advertisement vehicles. 29D-12. The method of embodiment 29D-10, wherein the driving order of the plurality of advertisement vehicles is determined according to waiting order at the starting location based on the real-time location information of the plurality of advertisement vehicles. 29D-13. The method of embodiment 29D-10, wherein the driving order of the plurality of advertisement vehicles is determined according to exchanges of messages among drivers of the plurality of advertisement vehicles. 29D-14. The method of embodiment 29D-10, wherein the driving order of the plurality of advertisement vehicles is provided via at least one of: an external display or an external speaker of each advertisement vehicle. 29D-15. The method of embodiment 29D-10, wherein the driving order information among the plurality of advertisement vehicles includes information on at least one of: a vehicle type, a vehicle color, identification of a preceding advertisement vehicle. 29D-16. The method of embodiment 29D-1, wherein the specific event comprises an advertisement event. 29E-1. A method for controlling a plurality of advertisement vehicles, the method comprising: sending driving route guidance to the plurality of advertisement vehicles for a specific event; monitoring location information of the plurality of advertisement vehicles; determining whether at least one advertisement vehicle among the plurality of advertisement vehicles has broken away from a parade procession for the specific event; when it is determined that the at least one advertisement vehicle has broken away from the parade procession, verifying information about the at least one break-away advertisement vehicle; determining whether to assign a new mission to the at least one break-away advertisement vehicle. 29E-2. The method of embodiment 29E-1, wherein determining whether at least one advertisement vehicle among the plurality of advertisement vehicles has broken away from the parade procession comprises determining whether the at least one advertisement vehicle has deviated from the driving route, based on real-time location information of the at least one advertisement vehicle. 29E-3. The method of embodiment 29E-1, wherein determining whether to assign a new mission to the at least one break-away advertisement vehicle is based on at least one of: a number of break-away advertisement vehicles from the parade procession or a distance of the at least one break-away advertisement vehicle from the parade procession. 29E-4. The method of embodiment 29E-3, wherein when the number of the break-away advertisement vehicles is greater than a predetermined number, the new mission is assigned to the at least one break-away advertisement vehicle. 29E-5. The method of embodiment 29E-4, wherein when the number of the break-away advertisement vehicles is less than a predetermined number, driving route guidance is provided to the at least one break-away advertisement vehicle such that the at least one break-away advertisement vehicle can join the parade procession later.

Further, example embodiments may also include the following embodiment. 29-1. A method for carrying out an advertisement by an advertisement vehicle for a specific event, the method comprising: receiving information on the specific event that is to be carried out; in response to receiving the information on the specific event, sending a request to participate in the specific event; receiving driving route guidance to a starting location for the specific event; and receiving driving order of a plurality of advertisement vehicles that participate in a parade procession for the specific event. 29-2. The method of embodiment 29-1, wherein the specific event comprises an advertisement event. 29-3. The method of embodiment 29-1, further comprising: receiving one or more advertisements for reproduction; and reproducing the one or more advertisements via external displays and/or speakers of the advertisement vehicle. 29-4. The method of 29-1, wherein the driving route guidance includes real-time traffic density information in an area in which the specific event is to be carried out. 29-5. The method of 29-4, wherein the real-time traffic density information includes real-time vehicle density information or real-time people density information. 29-6. The method of 29-1, wherein the starting location for the specific event comprises a location with a lowest real-time traffic or people density in the area in which the specific event is to be carried out.

As such, by implementing the example embodiment or its variants, it may be possible to carry out a very efficient, targeted advertisement activity using a plurality of advertisement vehicles.

Figure 30:
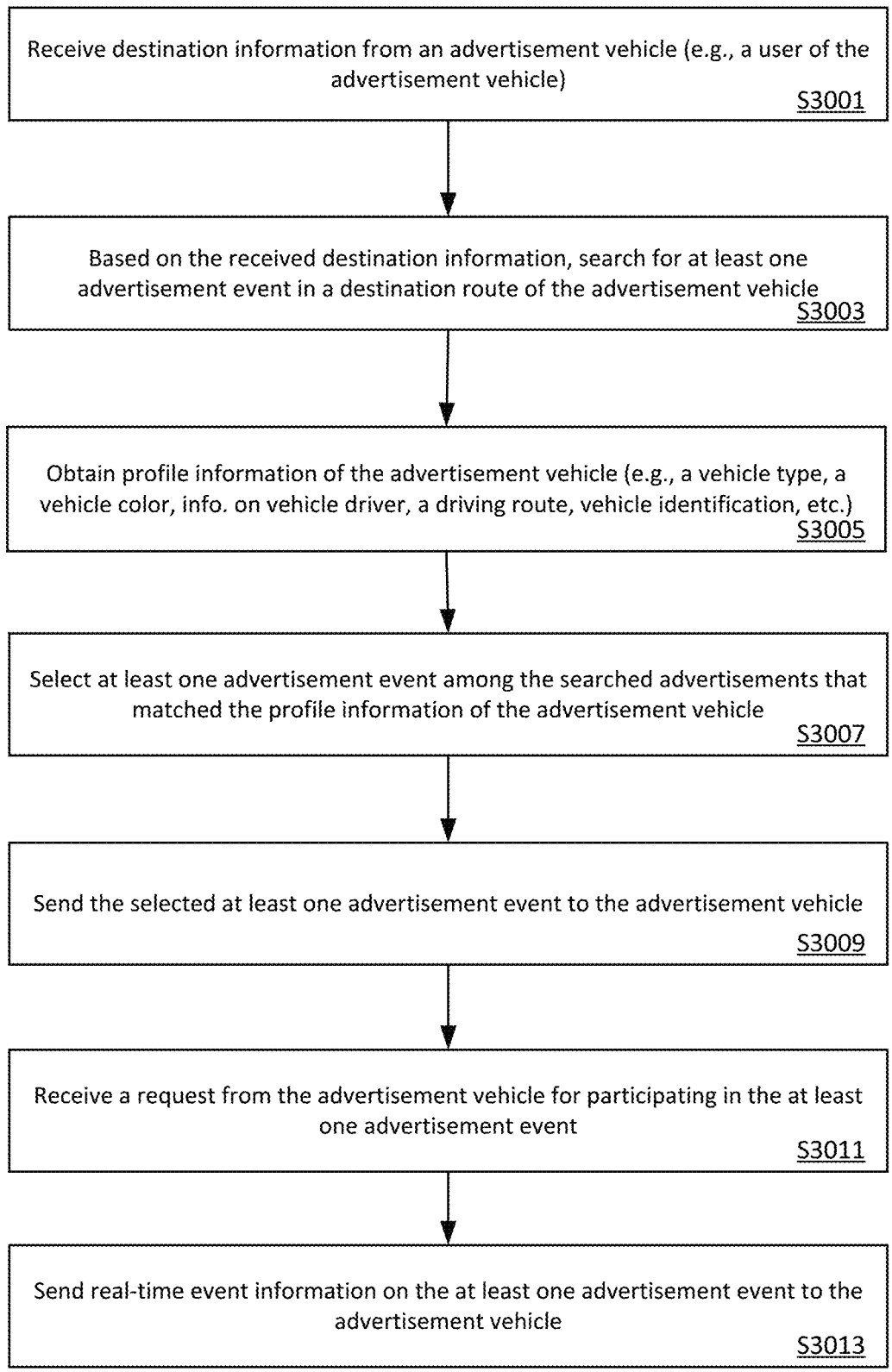
FIG. 30 is an example flowchart conceptually illustrating another embodiment of the present technology in accordance with an aspect of the present disclosure. The example flowchart illustrates an example method for providing information to advertisement vehicles.

FIG. 30 illustrates another embodiment of the present technology in accordance with an aspect of the present disclosure. In an aspect of the present disclosure, an example method for providing information to advertisement vehicles is provided. As shown in FIG. 30, at S3001, destination information is received from an advertisement vehicle. Based on the received destination information, at least one advertisement event is searched for, which are available in a destination route of the advertisement vehicle. The destination route may include at least one of: a shorted distance, a shortest time, a toll-free road, a highway, and a maximum reward route. Further, the at least one advertisement event may be searched in a database of advertisements or advertisement contents which may be stored in a server on a network. In another aspect, alternatively, the database may be a database installed in the advertisement vehicle or another advertisement vehicle acting as a server or a master.

At S3005, profile information on the advertisement vehicle may be obtained. The profile information may include, for example, a vehicle type, a vehicle color, information on vehicle driver, a driving route, vehicle identification (e.g., license plate number or the like), etc. At S3007, the at least one advertisement event may be selected among the searched advertisements that match the profile information of the advertisement vehicle. For example, a particular advertisement event may be selected among various advertisement events, based on the vehicle driver's preferences such as like brands or the like. At S3009, the selected at least one advertisement event may be sent to the advertisement vehicle for inquiry as to participation of the advertisement vehicle. At S3011, a request may be received from the advertisement vehicle (e.g., a user of the advertisement vehicle) for participating in the at least one advertisement event.

At S3013, in response to the request, real-time event information on the at least one advertisement event may be sent to the advertisement vehicle. In the example, the real-time event information may include information on the at least one advertisement event that matches the profile information of the advertisement vehicle among the advertisement events that were searched. In an aspect of the present disclosure, real-time alert information may be sent based on information about the specific advertisement event. The real-time alert information may include alert messages regarding the real-time status of the at least one advertisement event (or the selected advertisement event). In an aspect of the present disclosure, the alert message may include information on whether the at least one advertisement event is on track or cancelled. Further, the real-time event information may include at least one of: a target number of vehicles needed for the at least one advertisement event, a current number of vehicles registered for the at least one advertisement event, and information on an expected maximum reward amount for participating in the at least one advertisement event. Furthermore, it may be determined whether a number of registered vehicles for the at least one advertisement event is less than a predetermined number within a predetermined time duration prior to commencement of the at least one advertisement event. When the number of registered vehicles for the at least one advertisement event is determined to be less than the predetermined number within the predetermined time duration prior to the commencement of the at least one advertisement event, a message cancelling the at least one advertisement event may be sent to the advertisement vehicle.

The following embodiments recite permutation of combinations of features disclosed herein in reference to the example embodiment shown in FIG. 30. In some cases, permutations of combinations of features disclosed herein are non-limiting. Other permutations of combination of features are also contemplated. 30-1. A method for providing information to advertisement vehicles, the method comprising: receiving destination information from an advertisement vehicle; based on the destination information, searching for at least one advertisement event available in a destination route of the advertisement vehicle; obtaining profile information of the advertisement vehicle; selecting at least one advertisement event (or a specific advertisement event) that matches the profile information of the advertisement vehicle; and sending the selected at least one advertisement event to the advertisement vehicle. 30-2. The method of embodiment 30-1, wherein the destination route comprises at least one of: a shortest distance, a shortest time, a toll-free road, a highway, and a maximum reward route. 30-3. The method of embodiment 30-1, wherein the profile information of the advertisement vehicle comprises at least one of: a vehicle type, a vehicle color, information relating to a vehicle driver, a driving route, and vehicle identification. 30-4. The method of embodiment 30-1, further comprising: receiving a request from a user for participating in the specific advertisement event. 30-5. The method of embodiment 30-4, further comprising: sending real-time alert information based on information about the specific advertisement event. 30-6. The method of embodiment 30-3, further comprising: providing real-time event information on the specific advertisement event that matches the profile information of the advertisement vehicle among the advertisement events that were searched. 30-7. The method of embodiment 30-6, wherein the real-time event information comprises at least one of: a target number of vehicles needed for the specific advertisement event, a current number of vehicles registered for the specific advertisement event, and information on an expected maximum reward amount. 30-8. The method of embodiment 30-7, further comprising: when number of registered vehicles for the specific advertisement event is determined to be less than a predetermined number within a predetermined time duration prior to a commencement of the specific advertisement event, sending a message cancelling the specific advertisement event. As such, by implementing the example embodiment or its variants, it may be possible to carry out a very efficient, targeted advertisement activity using a plurality of advertisement vehicles in cooperation.

Figure 31:
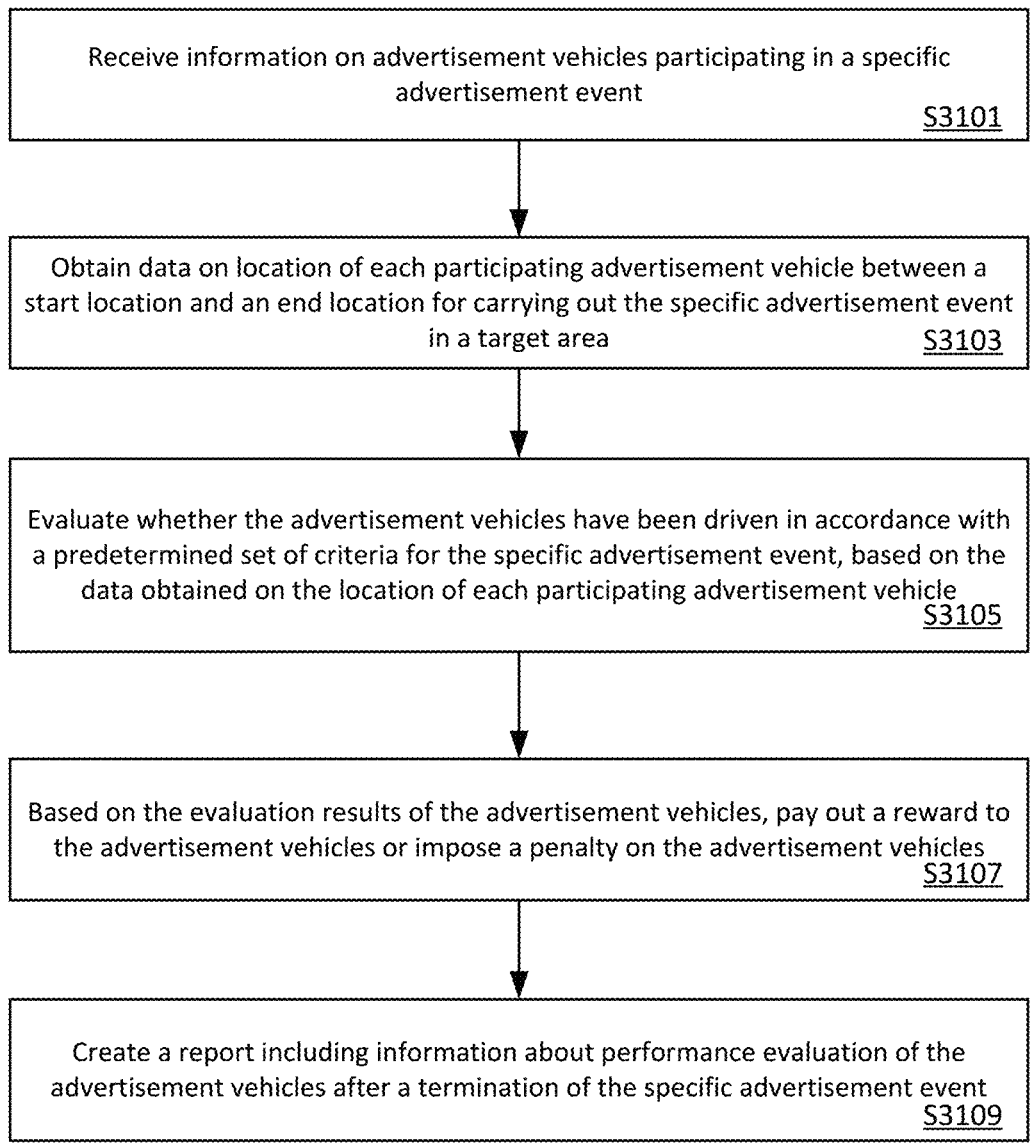
FIG. 31 is an example flowchart conceptually illustrating another embodiment of the present technology in accordance with an aspect of the present disclosure. The example flowchart illustrates an example method for evaluating performance of an advertisement vehicle for a specific advertisement event.

FIG. 31 illustrates another embodiment of the present technology in accordance with an aspect of the present disclosure. In an aspect of the present disclosure, an example method is provided for evaluating performance of an advertisement vehicle for a specific advertisement event.

As shown, at S3101, in the example, information on advertisement vehicles participating in a specific advertisement event is received. Further, at S3103, data on location of each participating advertisement vehicle is obtained between a start location and an end location for carrying out the specific advertisement event in a target area. In the example, GPS data of the participating advertisement vehicles may be collected and monitored during the specific advertisement event in the target area.

At S3105, based at least in part on the data obtained on the location of each participating advertisement vehicle, each advertisement vehicle may be evaluated whether the vehicle has driven in accordance with a predetermined set of criteria for the specific advertisement event. In the example, the predetermined set of criteria may include at least one of: an event duration, an event location, and event content. Further, when evaluating whether the advertisement vehicle has been driven in accordance with the predetermined set of criteria for the specific advertisement event, it may be determined whether the advertisement vehicle has carried out the specific advertisement event for a predetermined event duration or a predetermined event distance within the target area for the specific advertisement event.

At S3107, based on the evaluation result of the advertisement vehicle for the specific advertisement event, a reward may be paid to the advertisement vehicle or a penalty may be imposed on the advertisement vehicle for any deviation. In an aspect of the present disclosure, when it is determined that the advertisement vehicle has not carried out the specific advertisement event for the predetermined event duration or has not driven the predetermined event distance within the target area for the specific advertisement event, a penalty may be imposed on the advertisement vehicle.

Further, when it is determined that the advertisement vehicle has driven in an area other than the target area for the specific advertisement event, it may also be determined whether the advertisement vehicle has failed to participate in the specific advertisement event. When it is determined that the advertisement vehicle has failed to participate in more than a predetermined number of advertisement events, participation of the advertisement vehicle in future advertisement event(s) may be restricted.

On the other hand, as mentioned above, when it is determined that the advertisement vehicle has successfully carried out the specific advertisement event for the predetermined event duration or has driven the predetermined event distance with the target area for the specific advertisement event, a reward may be determined to be paid out to the advertisement vehicle. In such a case, the reward for the advertisement vehicle may be calculated in accordance with the predetermined event duration or the predetermined event distance within the target area for the specific advertisement event. Alternatively, the reward may be calculated based on other factors such as user preferences, user profiles, customer preferences and profiles, etc.

At S3109, after a termination of the specific advertisement event, for each advertisement vehicle, a report may be created within a predetermined time period, the report including information on the performance of the advertisement vehicle. The report may also include information about the evaluation of the advertisement vehicle and may be automatically created or manually created by a user or an operator.

The following embodiments recite permutation of combinations of features disclosed herein in reference to the example embodiment shown in FIG. 31. In some cases, permutations of combinations of features disclosed herein are non-limiting. Other permutations of combination of features are also contemplated. 31-1. A method for evaluating performance of an advertisement vehicle, the method comprising: receiving information on advertisement vehicles participating in a specific advertisement event, obtaining data on location of each participating advertisement vehicle between a start location and an end location for carrying out the specific advertisement event in a target area; evaluating whether the advertisement vehicles have been driven in accordance with a predetermined set of criteria for the specific advertisement event, based on the data obtained on the location of each advertisement vehicle; and determining whether to pay out a reward to the advertisement vehicles, based on the evaluation result of the advertisement vehicles. 31-2. The method of embodiment 31-1, wherein the predetermined set of criteria comprises at least one of: a predetermined event duration, a predetermined event location, and event content. 31-3. The method of embodiment 31-2, wherein evaluating whether the advertisement vehicles have been driven in accordance with a predetermined set of criteria for the specific advertisement event comprises determining whether an advertisement vehicle has carried out the specific advertisement event for the predetermined event duration or a predetermined event distance within the target area for the specific advertisement event. 31-4. The method of embodiment 31-3, further comprising: when it is determined that the advertisement vehicle has not carried out the specific advertisement event for the predetermined event duration or the predetermined event distance within the target area for the specific advertisement event, determining to impose a penalty on the advertisement vehicle. 31-5. The method of embodiment 31-4, further comprising: when it is determined that the advertisement vehicle has driven in an area other than the target area for the specific advertisement event, determining whether the advertisement vehicle has failed to participate in the specific advertisement event. 31-6. The method of embodiment 31-5, further comprising: when it is determined that the advertisement vehicle has failed to participate in more than a predetermined number of advertisement events, restricting participation of the advertisement vehicle in future advertisement events. 31-7. The method of embodiment 31-3, further comprising: when it is determined that an advertisement vehicle has carried out the specific advertisement event for the predetermined event duration or the predetermined event distance within the target area for the specific advertisement event, determining to pay a reward on the advertisement vehicle. 31-8. The method of embodiment 31-7, further comprising: calculating the reward for the advertisement vehicle in accordance with the predetermined event duration or the predetermined event distance within the target area for the specific advertisement event. 31-9. The method of embodiment 28, further comprising: providing a report including information about a performance evaluation of the advertisement vehicle. 31-10. The method of embodiment 31-9, wherein the report is automatically created within a preset time duration after a termination of the specific advertisement event.

As such, by using the example embodiment disclosed herein or its variants, it may be possible to carry out and manage targeted advertisement activities using a plurality of advertisement vehicles in a more efficient manner.

Figure 32A:
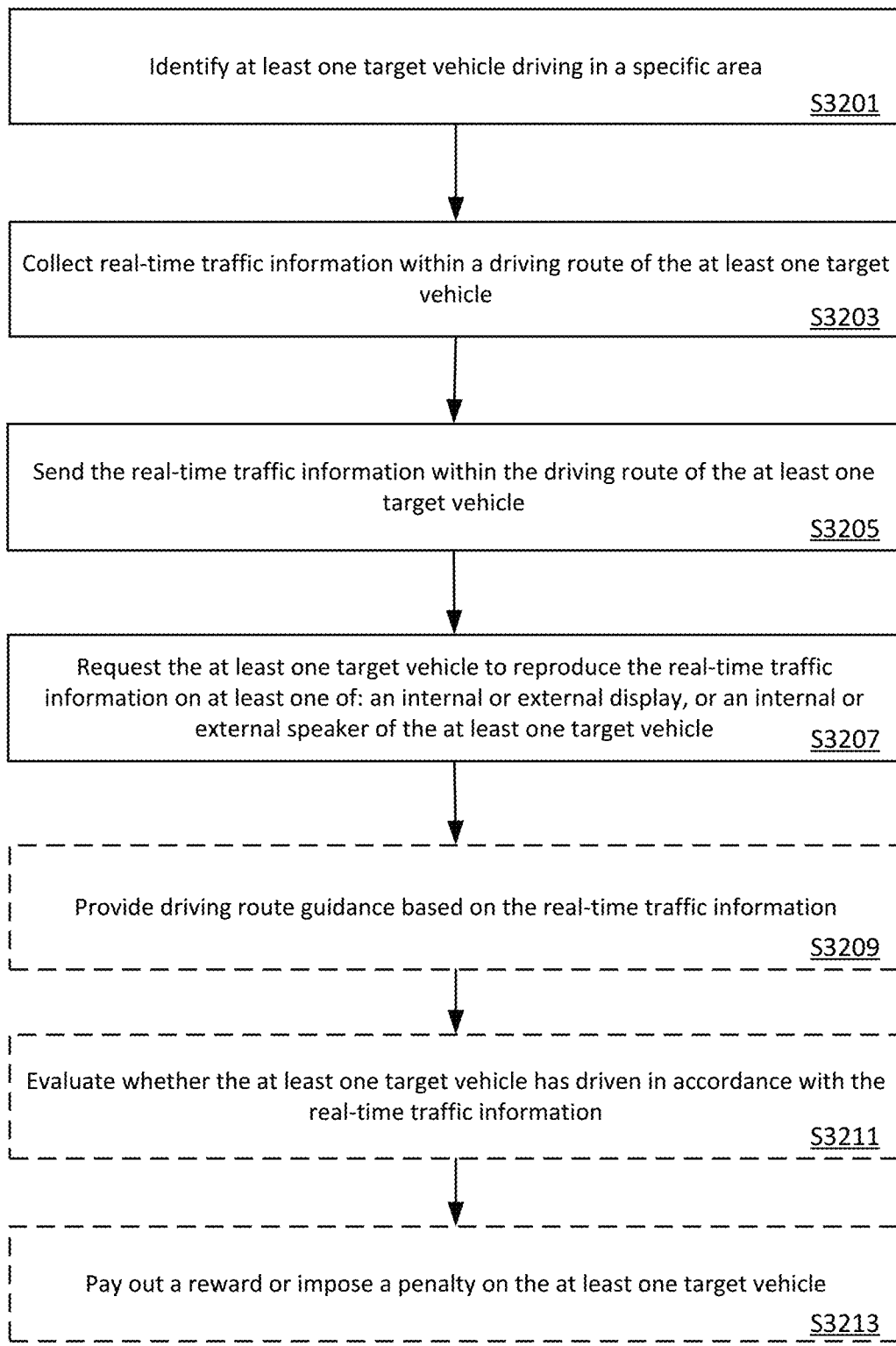
FIGS. 32A and 32B are example flowcharts conceptually illustrating various embodiments of the present technology in aspects of the present disclosure. By way of example, FIG. 32A provides an example embodiment for reproducing real-time traffic information on at least one target vehicle for benefits of drivers, pedestrians, etc.

FIG. 32A is an example flowchart conceptually illustrating an embodiment of the present technology in an aspect of the present disclosure. By way of example, FIG. 32A provides an example embodiment for reproducing real-time traffic information on at least one target vehicle for benefits of drivers, pedestrians, etc.

In the example, at S3201, at least one target vehicle driving in a specific area is identified. At S3203, real-time traffic information is collected within a driving route of the at least one target vehicle. The real-time traffic information may include at least one of: traffic information, safe driving information relating to traffic conditions or laws in a certain area, traffic accident information, disaster information, etc. The traffic information may include traffic density information. At S3205, the real-time traffic information within the driving route of the at least one target vehicle is sent to the at least one target vehicle.

At S3207, a request is sent to the at least one target vehicle to reproduce the real-time traffic information on at least one of: an internal or external display, or an internal or external speaker of the at least one target vehicle. Alternatively, in an aspect of the present disclosure, an inquiry may be sent to a driver of the target vehicle for reproducing the real-time traffic information. In another aspect of the present disclosure, the driver of the target vehicle may set in advance as to whether to receive and reproduce the real-time traffic information on at least one of: an internal or external display or an internal or external speaker of the target vehicle.

In the example, depending on the nature of the real-time traffic information, it may be reproduced using both internal and external displays as well as internal or external speakers of the at least one target vehicle. In one implementation, when the real-time traffic information includes urgent messages for both vehicle occupants and people outside, the internal and external displays and/or speakers may be used for reproduction of the real-time traffic information. In another aspect of the present disclosure, when there is a need for reproducing the real-time traffic information for benefits of people outside the at least one target vehicle, the real-time traffic information may be reproduced simultaneously via at least one of: the external display or the external speaker of the at least one target vehicle. In another aspect of the present disclosure, when the real-time traffic information is sent to the at least one target vehicle, along with a reproduction command, the real-time traffic information may be sent for immediate reproduction of the real-time traffic information. Further, in another aspect of the present disclosure, the reproduction command may include a temporary stop request for streaming music or reproduction of an advertisement that is in progress in the at least one target vehicle. Furthermore, in another aspect of the present disclosure, the reproduction command may include a resume reproduction request for the streaming of the music or the reproduction of the advertisement at an end of reproducing the real-time traffic information.

At S3209, based on the real-time traffic information, driving route (or direction) guidance may be optionally provided to the at least one target vehicle. Also, at S3211, it may be optionally evaluated whether the at least one target vehicle has driven in accordance with the real-time traffic information. At S3213, it may be also determined whether to pay out a reward or impose a penalty on the at least one target vehicle. That is, when the at least one target vehicle has been determined to have driven in accordance with the real-time traffic information, the reward may be paid out which is predetermined for the at least one target vehicle. Further, when the at least one target vehicle has been determined to not have driven in accordance with the real-time traffic information, the penalty that is predetermined for the at least one target vehicle may be imposed.

The following embodiments recite permutation of combinations of features disclosed herein in reference to the example embodiment shown in FIG. 32A. In some cases, permutations of combinations of features disclosed herein are non-limiting. Other permutations of combination of features are also contemplated. 32A-1. A method for controlling a plurality of advertisement vehicles, the method comprising: identifying at least one target vehicle driving in a specific area; collecting real-time traffic information within a driving route of the at least one target vehicle; sending the real-time traffic information to the at least one target vehicle; and requesting the at least one target vehicle to reproduce the real-time traffic information on at least one of: an internal or external display, or an internal or external speaker of the at least one target vehicle. 32A-2. The method of embodiment 32A-1, further comprising: providing driving route guidance based on the real-time traffic information. 32A-3. The method of embodiment 32A-2, wherein the real-time traffic information is reproduced simultaneously on the at least one of: the external display and speaker of the at least one target vehicle. 32A-4. The method of embodiment 32A-1, wherein the real-time traffic information includes at least one of: safe driving information relating to traffic laws in a certain area, traffic information, accident information, or disaster information. 32A-5. The method of embodiment 32A-1, wherein sending the real-time traffic information to the at least one target vehicle comprises sending a reproduction command along with the real-time traffic information to immediately reproduce the real-time traffic information. 32A-6. The method of embodiment 32A-5, wherein the reproduction command includes a temporary stop request for streaming of music or reproduction of an advertisement that is in progress in the at least one target vehicle. 32A-7. The method of embodiment 32A-5, wherein the reproduction command further includes a resume reproduction request for streaming of the music or reproduction of the advertisement at an end of reproduction of the real-time traffic information. 32A-8. The method of embodiment 32A-1, further comprising: evaluating whether the at least one target vehicle has driven in accordance with the real-time traffic information. 32A-9. The method of embodiment 32A-8, further comprising: when it is determined that the at least one target vehicle has driven in accordance with the real-time traffic information, paying out a reward that is predetermined for the at least one target vehicle. 32A-10. The method of embodiment 32A-8, further comprising: when it is determined that the at least one target vehicle has not driven in accordance with the real-time traffic information, paying out a penalty that is predetermined for the at least one target vehicle.

As such, by using the example embodiment disclosed herein or its variants, it may be possible to reproduce the real-time traffic information via one or more target vehicles, thereby increasing safety and contributing to the benefits of the public near the one or more target vehicles.

Figure 32B:
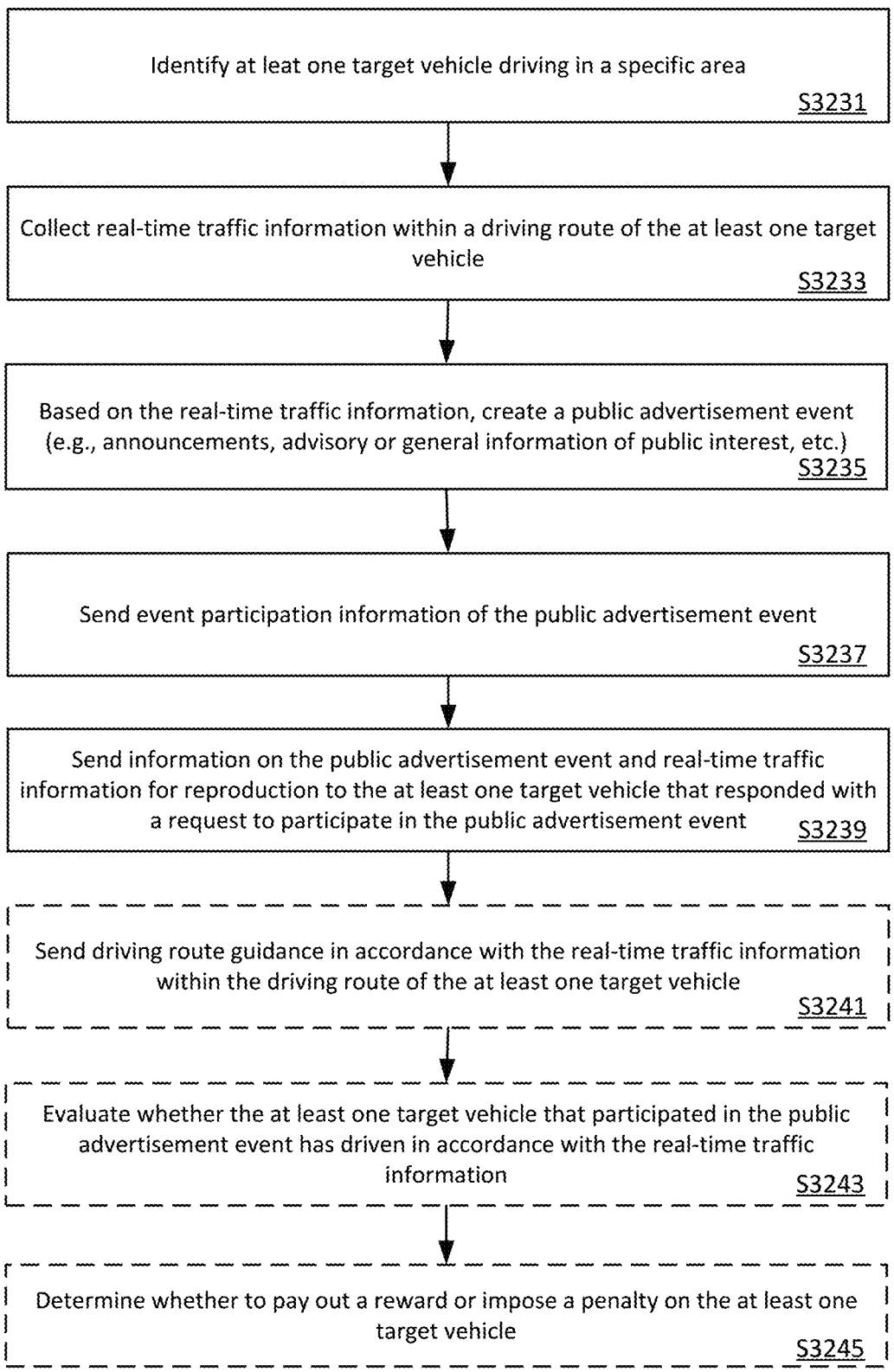

FIG. 32B is an example flowchart conceptually illustrating an embodiment of the present technology in an aspect of the present disclosure. By way of example, FIG. 32B provides an example embodiment for reproducing a public advertisement event on at least one target vehicle for benefits of drivers, pedestrians, etc.

In the example, at S3231, at least one target vehicle driving in a specific area is identified. At S3233, real-time traffic information is collected within a driving route of the at least one target vehicle. At S3235, based on the real-time traffic information, a public advertisement event is created, for example, public announcement, advisory, or general information of public interest, etc. At S3237, an inquiry including event participation information of the public advertisement event is sent to the at least one target vehicle. That is, an inquiry of whether the at least one target vehicle desires to participate in the public advertisement event may be sent along with the event participation information. Further, the event participation information for the public advertisement event may also include at least one of: event content or a reward for the event participation.

At S3239, to the at least one target vehicle that responded with a request to participate in the public advertisement event, information on the public advertisement event and real-time traffic information are sent for reproduction. In the example, sending of the public advertisement event may include steps of: sending an inquiry as to whether the at least one target vehicle desire to participate in the public advertisement event, receiving a request to participate in the public advertisement event, and in response to the request, sending a reproduction command with the real-time traffic information for immediate reproduction of the public advertisement event. In an aspect of the present disclosure, the content of the public advertisement event and/or the real-time traffic information may be reproduced via at least one of: an external display or an external speaker of the at least one target vehicle.

Optionally, at S3241, driving route guidance in accordance with the real-time traffic information may also be provided within the driving route of the at least one target vehicle. Further, at S3243, it may be optionally evaluated whether the at least one target vehicle that participated in the public advertisement event has driven in accordance with the real-time traffic information. At S3245, it may be optionally determined whether to pay out a reward or impose a penalty on the at least one target vehicle. That is, when it is determined that at least one target vehicle has driven in accordance with the real-traffic information, the reward may be paid out which is predetermined for the at least one target vehicle. Further, when it is determined that the at least one target vehicle has not driven in accordance with the real-time traffic information, the penalty that is predetermined for the at least one target vehicle may be imposed on the at least one target vehicle.

The following embodiments recite permutation of combinations of features disclosed herein in reference to the example embodiment shown in FIG. 32B. In some cases, permutations of combinations of features disclosed herein are non-limiting. Other permutations of combination of features are also contemplated. 32B-1. A method for controlling a plurality of advertisement vehicles, the method comprising: identifying at least one target vehicle driving in a specific area; collecting real-time traffic information within a driving route of the at least one target vehicle; based on the real-time traffic information, creating a public advertisement event; sending event participation information of the public advertisement event; and sending the real-time traffic information to the at least one target vehicle that responded with a request to participate in the public advertisement event. 32B-2. The method of embodiment 48, further comprising sending driving route guidance accordance with the real-time traffic information. 32B-3. The method of embodiment 32B-1, wherein the event participation information for the public advertisement event includes at least one of: event content or a reward for event participation. 32B-4. The method of embodiment 32B-1, wherein sending the real-time traffic information comprises: sending an inquiry whether the at least one target vehicle desire to participate in the public advertisement event; receiving a request to participate in the public advertisement event; and in response to the request, sending a reproduction command with the real-time traffic information for immediate reproduction of the public advertisement event. 32B-5. The method of embodiment 32B-1, further comprising: evaluating whether the at least one target vehicle that participated in the public advertisement event has driven in accordance with the real-time traffic information. 32B-6. The method of embodiment 32B-5, further comprising: when it is determined that the at least one target vehicle has driven in accordance with the real-time traffic information, paying out a reward that is predetermined for the at least one target vehicle. 32B-7. The method of embodiment 32B-5, further comprising: when it is determined that the at least one target vehicle has not driven in accordance with the real-time traffic information, imposing a penalty that is predetermined for the at least one target vehicle. 32B-8. The method of embodiment 32B-1, wherein the real-time traffic information is reproduced on at least one of: an external display or an external speaker.

Further, example embodiments may also include the following embodiment. 32-1. A method for reproducing a public advertisement at an advertisement vehicle, the method comprising: receiving an inquiry for participating in a public advertisement event; in response to the inquiry, sending a request to participate in the public advertisement event; receiving content of the public advertisement event; and reproducing the public advertisement content via an external display or speaker or an internal display or speaker of the advertisement vehicle. 32-2. The method of embodiment 32-1, further comprising receiving driving route guidance for the public advertisement event. 32-3. The method of embodiment 32-1, further comprising: receiving real-time traffic information; and reproducing the real-time traffic information via the external display or speaker or the internal display or speaker of the advertisement vehicle.

As such, by implementing the example embodiment disclosed herein or its variants, it may be possible to reproduce one or more public advertisement events via one or more target vehicles, thereby contributing to the benefits of the public near the one or more target vehicles.

Figure 33A:
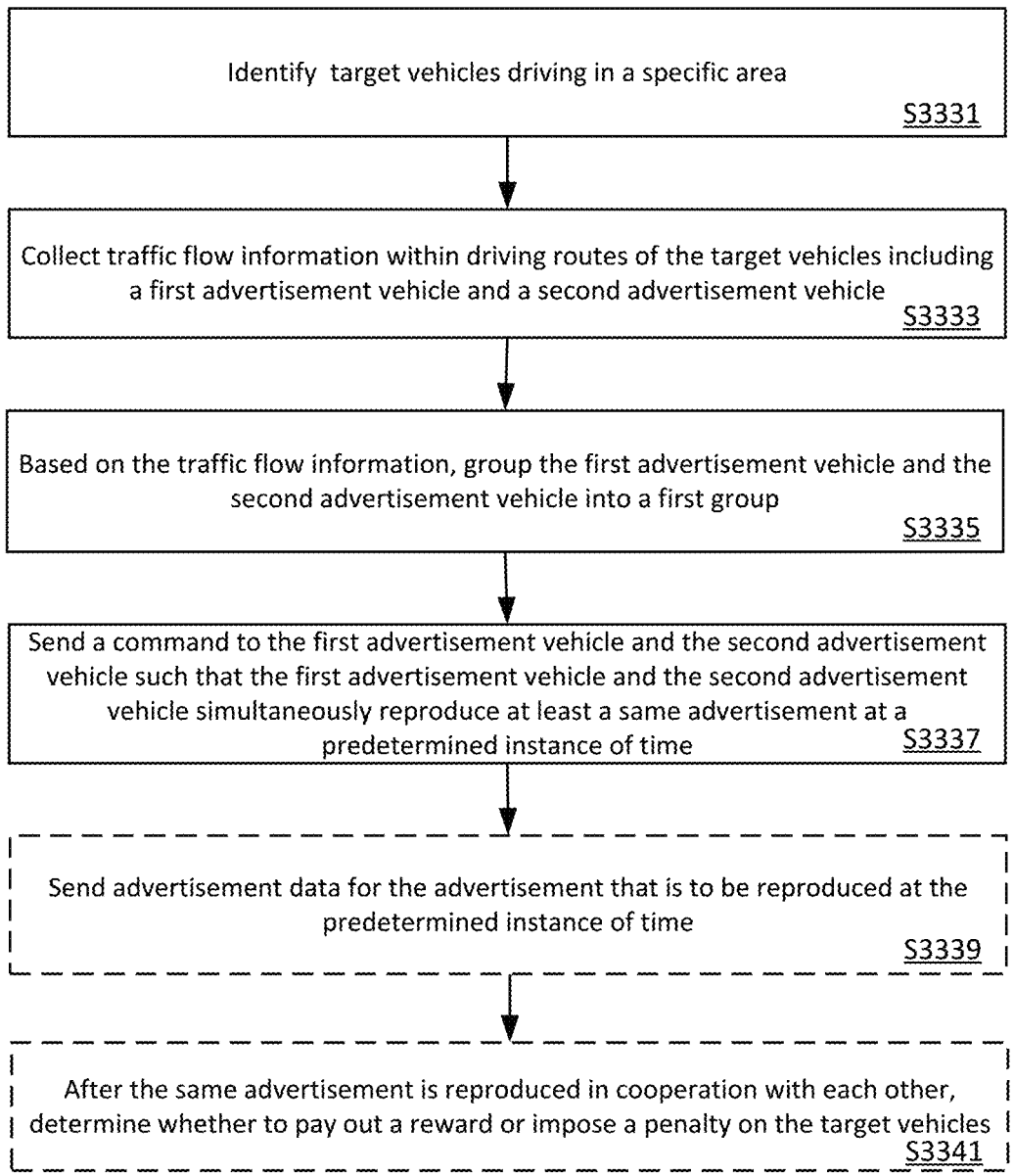
FIGS. 33A, 33B, and 33C are example flowcharts conceptually illustrating various embodiments of the present technology in various aspects of the present disclosure. By way of example, FIG. 33A provides an example embodiment for cooperatively reproducing a same advertisement among two or more target vehicles, and FIG. 33B provides an example embodiment for cooperatively reproducing the same advertisement when advertisement vehicles are at a certain location. By way of example, FIG. 33C provides an example embodiment for reproducing an advertisement when a target advertisement vehicle approaches a certain location.

FIG. 33A is an example flowchart conceptually illustrating an embodiment of the present technology in an aspect of the present disclosure. By way of example, FIG. 33A provides an example embodiment for cooperatively reproducing a same advertisement via a group of two or more target vehicles. At S3331, target vehicles driving in a specific route are identified. At S3333, traffic flow information within driving routes of the target vehicles is collected. The target vehicles may include a first advertisement vehicle and a second advertisement vehicle. The traffic flow information may include vehicle density or vehicle flow information on roads. At S3335, based on the traffic flow information, the first advertisement vehicle and the second advertisement vehicle are grouped into a first group.

At S3337, a command is sent to the first advertisement vehicle and the second advertisement vehicle such that the first advertisement vehicle and the second advertisement vehicle simultaneously reproduce at least the same advertisement at a predetermined instance of time. The predetermined instance of time may include an instance of time when speeds of the first advertisement vehicle and the second advertisement vehicle are reduced to a speed below a predetermined speed. Alternatively, the predetermined instance of time may include an instance of time when the first advertisement vehicle and the second advertisement vehicle are slowing down at a stop signal.

Further, at S3339, optionally, advertisement data for the advertisement that is to be reproduced simultaneously at the predetermined instance of time may be sent to the first advertisement vehicle and/or the second advertisement vehicle. Alternatively, for the reproduction of the same advertisement, the first advertisement vehicle and the second advertisement vehicle may communicate with each other to share the advertisement data that is going to be reproduced in a cooperative manner. Further, at S3341, after the same advertisement is reproduced in cooperation with each other, it may be optionally determined whether to pay out a reward or impose a penalty on the target vehicles.

The following embodiments recite permutation of combinations of features disclosed herein in reference to the example embodiment shown in FIG. 33A. In some cases, permutations of combinations of features disclosed herein are non-limiting. Other permutations of combination of features are also contemplated. 33A-1. A method for controlling a plurality of advertisement vehicles, the method comprising: identifying target vehicles driving in a specific area; collecting traffic flow information in driving routes of the target vehicles including a first advertisement vehicle and a second advertisement vehicle; grouping the first advertisement vehicle and the second advertisement vehicle into a first group, based on the traffic flow information; and sending a command to the first advertisement vehicle and the second advertisement vehicle such that the first advertisement vehicle and the second advertisement vehicle simultaneously reproduce at least a same advertisement at a predetermined instance of time. 33A-2. The method of embodiment 33A-1, wherein the predetermined instance of time comprises an instance of time when speeds of the first advertisement vehicle and the second advertisement vehicle are reduced to a speed below a preset speed. 33A-3. The method of embodiment 33A-1, wherein the predetermined instance of time comprises an instance of time when the first advertisement vehicle and the second advertisement vehicle are slowing down at a stop signal. 33A-4. The method of embodiment 33A-1, wherein sending the command to the first advertisement vehicle and the second advertisement vehicle comprises sending advertisement data for the advertisement that is to be reproduced at the predetermined instance of time. 33A-5. The method of embodiment 33A-1, further comprising: after the same advertisement is reproduced in cooperation with each other, paying out a reward based at least on one criterion for the reproduction of the same advertisement.

As such, by implementing the example embodiment disclosed herein or its variants, it may be possible to reproduce one or more advertisements via one or more target vehicles in a cooperative manner, thereby increasing the effect of the advertisements by multiple advertisement vehicles.

Figure 33B:
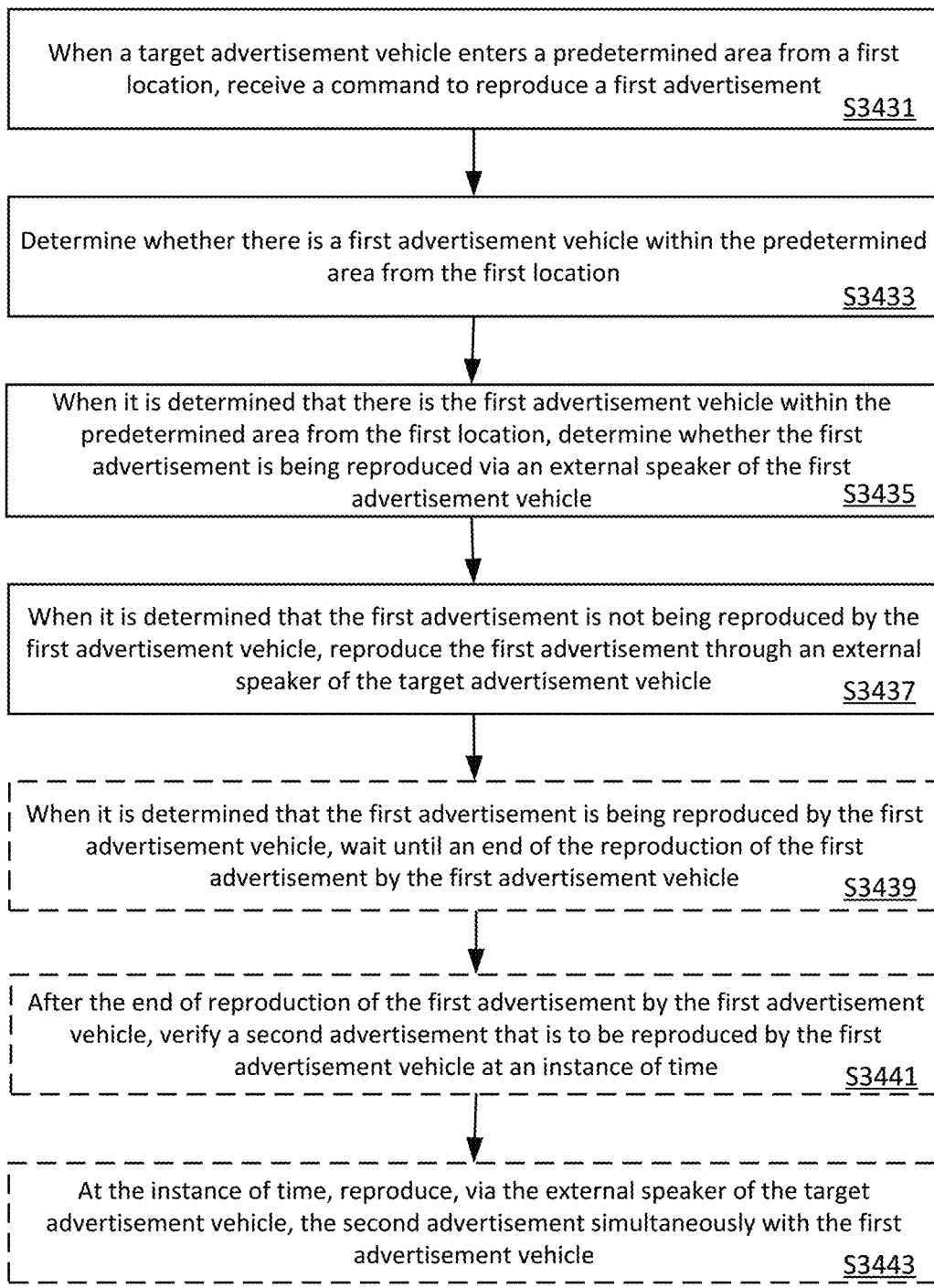

FIG. 33B is an example flowchart conceptually illustrating an embodiment of the present technology in an aspect of the present disclosure. By way of example, FIG. 33B provides an example embodiment for cooperatively reproducing the same advertisement when advertisement vehicles are at a certain location.

As shown in FIG. 33B, at S3431, when a target advertisement vehicle enters a predetermined area from a first location (e.g., a certain distance away from a traffic stop, or the like), the target advertisement vehicle may receive a command to reproduce a first advertisement. The received command may be in a form of a reply to a request to participate in a real-time event. Further, the real-time event may include an advertisement activity to reproduce the same advertisement simultaneously via the external speakers or external displays of the target advertisement vehicle and the first advertisement vehicle.

At S3433, it may be determined whether there is a first advertisement vehicle within the predetermined area from the first location. At S3435, when it is determined that there is the first advertisement vehicle within the predetermined area from the first location, the target advertisement vehicle may determine whether the first advertisement is being reproduced via an external speaker or external display of the first advertisement vehicle. At S3437, alternatively, when it is determined that the first advertisement is not be reproduced by the first advertisement vehicle, the target advertisement vehicle may reproduce the first advertisement through an external speaker or external display of the target advertisement vehicle.

Further, alternatively and/or optionally, at S3439, when it is determined that the first advertisement is being reproduced by the first advertisement vehicle, the target advertisement may wait until an end of the reproduction of the first advertisement by the first advertisement vehicle. Optionally, at S3441, after the end of reproduction of the first advertisement by the first advertisement vehicle, the target advertisement vehicle may verify a second advertisement that is to be reproduced by the first advertisement vehicle at an instance of time. In an aspect of the present disclosure, the verification may be done through communications with a server over a network or communications between the target advertisement vehicle and the first advertisement vehicle. At S3443, after the verification, the second advertisement may be optionally reproduced at the instance of time, via the external speakers or external displays of the target advertisement vehicle, simultaneously with the first advertisement vehicle, thereby increasing the effect of the second advertisement.

Further, in an aspect of the present disclosure, it may be determined whether to pay out a reward to the target advertisement vehicle, based on at least one of: a number of reproductions of advertisements or a reproduction time.

The following embodiments recite permutation of combinations of features disclosed herein in reference to the example embodiment shown in FIG. 33B. In some cases, permutations of combinations of features disclosed herein are non-limiting. Other permutations of combination of features are also contemplated. 33B-1. A method for reproducing an advertisement via an external speaker of a target advertisement vehicle, the method comprising: when the target advertisement vehicle enters a predetermined area from a first location, receiving a command to reproduce a first advertisement; determining whether there is a first advertisement vehicle within the predetermined area from the first location; when it is determined that there is a first advertisement vehicle within the predetermined area from the first location, determining whether the first advertisement is being reproduced via an external speaker of the first advertisement vehicle; and when it is determined that the first advertisement is not being reproduced by the first advertisement vehicle, reproducing the first advertisement through an external speaker of the target advertisement vehicle. 33B-2. The method of claim 33B-1, further comprising: when it is determined that the first advertisement is being reproduced by the first advertisement vehicle, waiting until an end of the reproduction of the first advertisement by the first advertisement vehicle. 33B-3. The method of claim 33B-2, further comprising: after the end of reproduction of the first advertisement at the first advertisement vehicle, verifying a second advertisement that is to be reproduced by the first advertisement vehicle at a first instance of time. 33B-4. The method of claim 33B-2, further comprising: at the first instance of time, reproducing via the external speaker of the target advertisement vehicle the second advertisement data simultaneously with the first advertisement vehicle. 33B-5. The method of claim 33B-1, wherein the received command is in a form of a reply to a request to participate in a real-time event. 33B-6. The method of claim 33B-5, wherein the real-time event includes an advertisement activity to reproduce the same advertisement simultaneously via the external speakers of the target advertisement vehicle and the first advertisement vehicle. 33B-7. The method of claim 33B-6, further comprising: paying out a reward based on at least one of: a number of reproductions of advertisements in accordance with real-time events or a reproduction time.

As such, by implementing the example embodiment disclosed herein or its variants, it may be possible to reproduce one or more advertisements via one or more target vehicles in a cooperative manner, thereby increasing the effect of the advertisements by multiple advertisement vehicles.

Figure 33C:
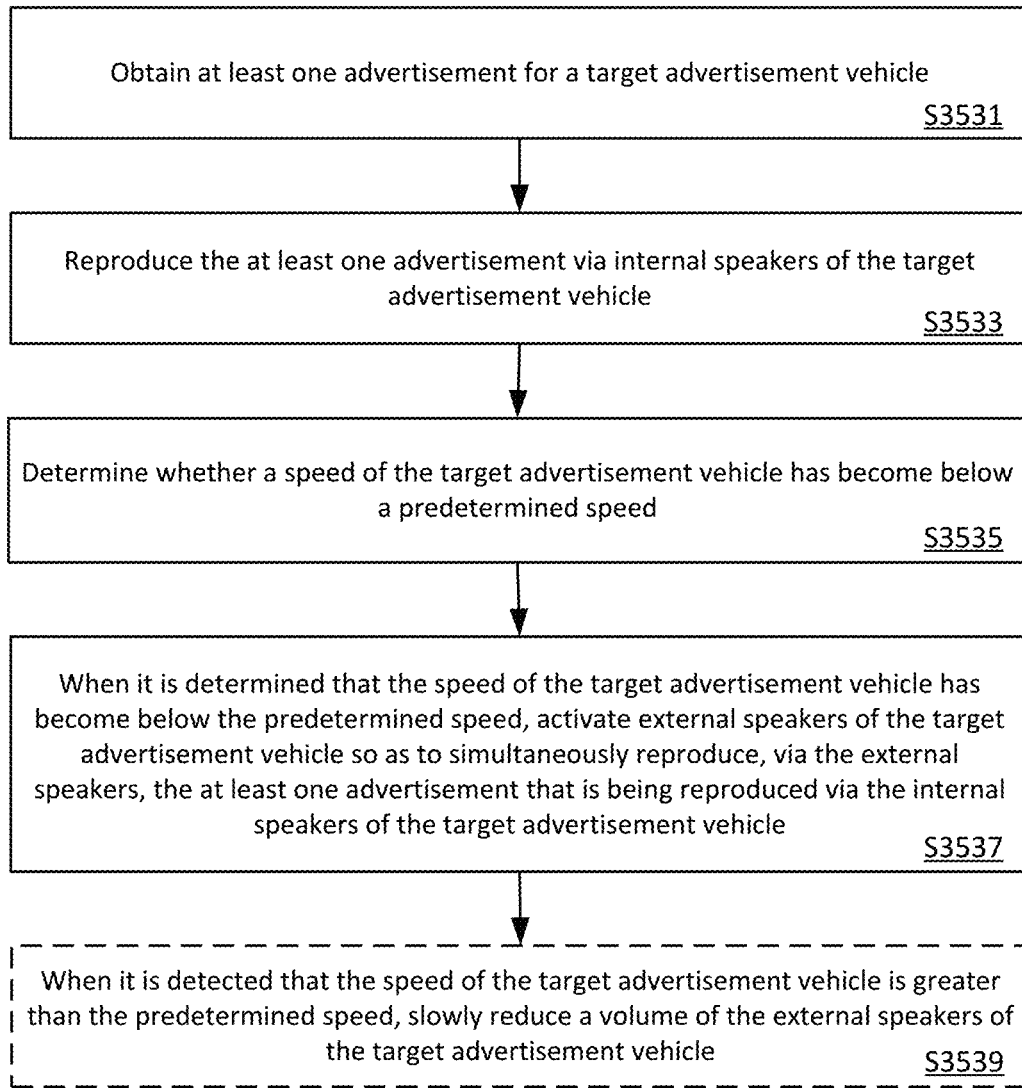

FIG. 33C is an example flowchart conceptually illustrating an embodiment of the present technology in an aspect of the present disclosure. By way of example, FIG. 33C provides an example embodiment for reproducing an advertisement when a target advertisement vehicle approaches a certain location.

In the example, at S3531, at least one advertisement is obtained for reproduction by a target advertisement vehicle.

At S3533, the at least one advertisement is reproduced via internal speakers of the target advertisement vehicle. The at least one advertisement may be obtained based on location information of the target advertisement vehicle. For example, a specific advertisement may be selected because the target advertisement vehicle is near a retail store that sponsors the specific advertisement. Further, a server may send to the target advertisement vehicle the at least one advertisement. Also, the at least one advertisement may be shared through communications between the target advertisement vehicle and other surrounding vehicles. The communications may include vehicle-to-vehicle based communications, wifi based communications, wireless communications, or the like.

At S3535, it is determined whether a speed of the target advertisement vehicle has become below a predetermined speed. At S3537, when the speed of the target advertisement vehicle has been determined to become below the predetermined speed, external speakers of the target advertisement vehicle are activated so as to simultaneously reproduce, via the external speakers, the at least one advertisement that is being reproduced via the internal speakers of the target advertisement vehicle. Further, in an aspect of the present disclosure, as the speed of the target advertisement vehicle is reduced, a volume of the external speakers of the target advertisement vehicle may be slowly increased. Also, alternatively and/or optionally, at S3539, when it is detected that the speed of the target advertisement vehicle is greater than the predetermined speed, a volume of the external speakers of the targeted advertisement vehicle may be slowly reduced. Further, when it is detected that the speed of the target advertisement vehicle is greater than the predetermined speed, the external speakers of the target advertisement vehicle may be de-activated.

The following embodiments recite permutation of combinations of features disclosed herein in reference to the example embodiment shown in FIG. 33B. In some cases, permutations of combinations of features disclosed herein are non-limiting. Other permutations of combination of features are also contemplated. 33B-1. A method for reproducing an advertisement via a target advertisement vehicle, the method comprising: obtaining at least one advertisement; reproducing the at least one advertisement via internal speakers of the target advertisement vehicle; determining whether a speed of the target advertisement vehicle has become below a predetermined speed; and when it is determined that the speed of the target advertisement vehicle has become below the predetermined speed, activating external speakers of the target advertisement vehicle so as to simultaneously reproduce, via the external speakers, the at least one advertisement that is being reproduced via the internal speakers of the target advertisement vehicle. 33B-2. The method of embodiment 33B-1, further comprising: slowly increasing a volume of the external speakers of the target advertisement vehicle as the speed of the target advertisement vehicle is reduced. 33B-3. The method of embodiment 33B-1, further comprising: when it is detected that the speed of the target advertisement vehicle is greater than the predetermined speed, slowly reducing the volume of the external speakers of the target advertisement vehicle. 33B-4. The method of embodiment 33B-3, further comprising: when it is detected that the speed of the target advertisement vehicle is greater than the predetermined speed, deactivating the external speakers of the target advertisement vehicle. 33B-5. The method of embodiment 33B-1, wherein the at least one advertisement is obtained based on location information of the target advertisement vehicle. 33B-6. The method of embodiment 33B-1, wherein the at least one advertisement is shared through communications between the target advertisement vehicle and other surrounding vehicles.

Further, example embodiments include the following embodiment. 33-1. A method for reproducing an advertisement by a first advertisement vehicle in cooperation with a second advertisement vehicle, the method comprising: receiving an advertisement; receiving a command to reproduce the advertisement at an instance of time; and reproducing the advertisement in a cooperative manner with the second advertisement vehicle. 33-2. The method of embodiment 33-1, wherein reproducing the advertisement in the cooperative manner with the second advertisement vehicle includes reproducing the advertisement simultaneously at the instance of time with the second advertisement vehicle. 33-3. The method of embodiment 33-1, wherein reproducing the advertisement in the cooperative manner with the second advertisement vehicle includes reproducing the advertisement as a stereo advertisement with the second advertisement vehicle. 33-4. The method of embodiment 33-3, wherein the stereo advertisement is formed by reproducing a first sound by the first advertisement vehicle and a second sound by the second advertisement vehicle, respectively. 33-5. The method of embodiment 33-1, wherein reproducing the advertisement in the cooperative manner with the second advertisement vehicle includes reproducing the advertisement after an end of reproduction of a first advertisement by the second advertisement vehicle. 33-6. The method of embodiment 33-1, further comprising communicating with the second advertisement vehicle to coordinate the reproduction of the advertisement. 33-7. The method of embodiment 33-1, wherein the advertisement is reproduced via external displays or speakers of the first advertisement vehicle. 33-8. The method of embodiment 33-1, further comprising adaptively controlling a volume of the external speaker of the first advertisement vehicle while reproducing the advertisement in accordance with a speed of the first advertisement vehicle.

As such, by implementing the example embodiment disclosed herein or its variants, it may be possible to adaptively reproduce one or more advertisements via one or more target vehicles in accordance with speeds of the vehicles, thereby increasing the effect of the advertisements.

Figure 34:
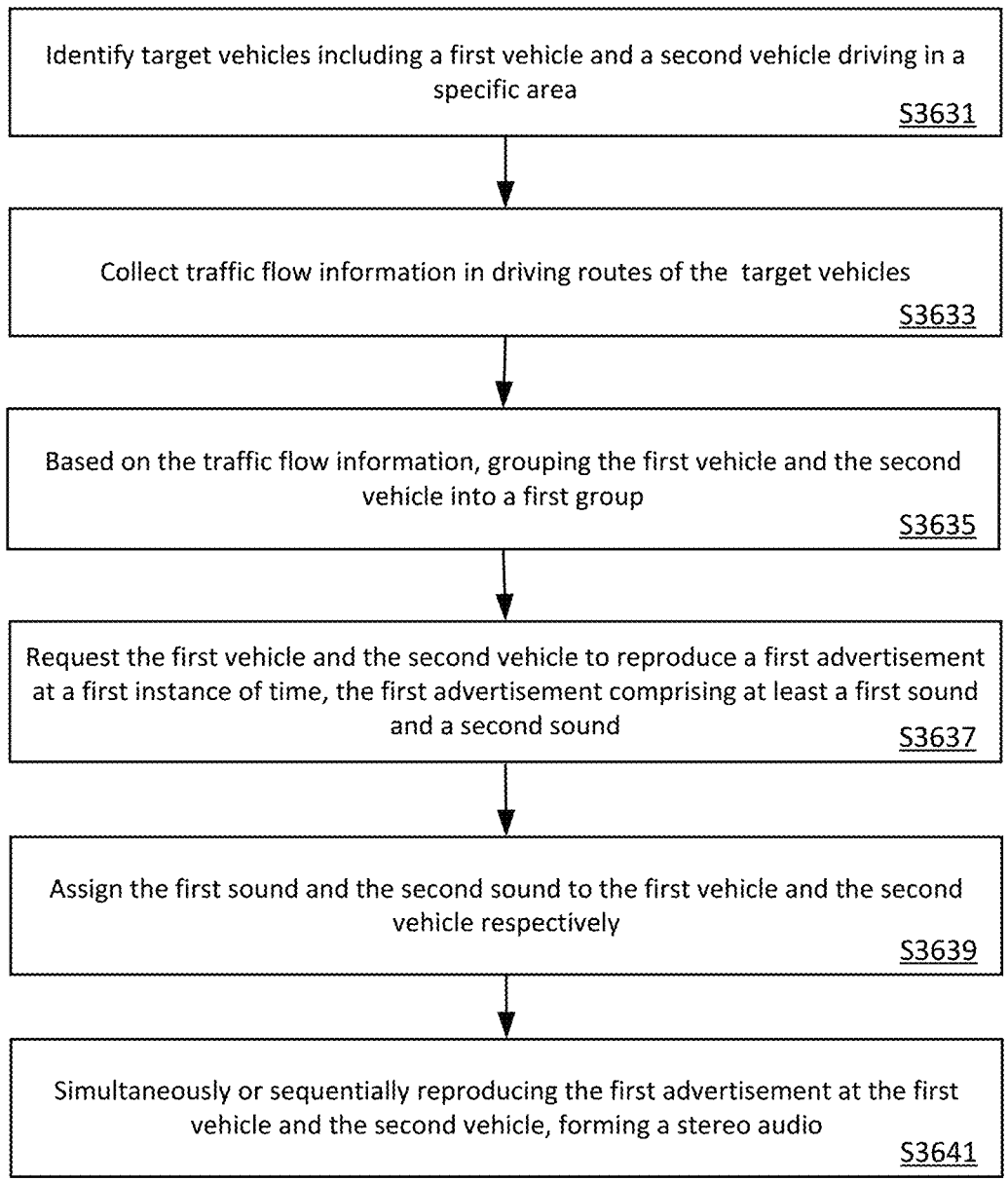
FIG. 34 is an example flowchart conceptually illustrating an embodiment of the present technology in an aspect of the present disclosure. By way of example, FIG. 34 provides an example embodiment for reproducing an advertisement by multiple target vehicles in cooperation with each other.

FIG. 34 is an example flowchart conceptually illustrating an embodiment of the present technology in an aspect of the present disclosure. By way of example, FIG. 34 provides an example embodiment for reproducing an advertisement by multiple target vehicles in cooperation with each other. In the example, at S3631, target vehicles including a first vehicle and a second vehicle driving in a specific area are identified. At S3633, traffic flow information in driving routes of the target vehicles is collected. At S3635, based on the traffic flow information, the first vehicle and the second vehicle are grouped into a first group. At S3637, the first vehicle and the second vehicle are requested to reproduce a first advertisement at a first instance of time, and the first advertisement includes at least a first sound and a second sound. At S3639, the first sound and the second sound are assigned to the first vehicle and the second vehicle, respectively. Further, in an aspect of the present disclosure, in assigning the first sound and the second sound, the first sound and the second sound may be assigned to the first vehicle and the second vehicle based on location information of the first vehicle and the second vehicle. Furthermore, in another aspect of the present disclosure, the assignment of the first sound and the second sound may be determined through communications between the first vehicle and the second vehicle.

At S3641, the first advertisement is simultaneously or sequentially reproduced at the first vehicle and the second vehicle, forming a stereo audio. Further, in an aspect of the present disclosure, the first advertisement may be simultaneously or sequentially reproduced when the first vehicle and the second vehicle enter a predetermined area.

Further, in another aspect of the present disclosure, after the first vehicle and the second vehicle reproduce at least the same advertisement in cooperation with each other, a reward may be computed and paid out to the first vehicle and the second vehicle, based on at least one of: a reproduction frequency of the advertisement or a reproduction time.

The following embodiments recite permutation of combinations of features disclosed herein in reference to the example embodiment shown in FIG. 34. In some cases, permutations of combinations of features disclosed herein are non-limiting. Other permutations of combination of features are also contemplated. 34-1. A method for controlling a plurality of advertisement vehicles, the method comprising: identifying target vehicles driving in a specific area; collecting traffic flow information in a driving route of the target vehicles including a first vehicle and a second vehicle; based on the traffic flow information, grouping the first vehicle and the second vehicle into a first group; requesting the first vehicle and the second vehicle to reproduce a first advertisement at a first instance of time, the first advertisement comprising at least a first sound and a second sound; and assigning the first sound and the second sound to the first vehicle and the second vehicle respectively. 34-2. The method of embodiment 34-1, further comprising: simultaneously or sequentially reproducing the first advertisement at the first vehicle and the second vehicle, forming a stereo audio. 34-3. The method of embodiment 34-1, wherein assigning the first sound and the second sound comprises assigning the first sound and the second sound to the first vehicle and the second vehicle in consideration of location information of the first vehicle and the second vehicle. 34-4. The method of embodiment 34-1, wherein assigning the first sound and the second sound is determined through communications between the first vehicle and the second vehicle. 34-5. The method of embodiment 34-1, further comprising: simultaneously or sequentially reproducing the first advertisement when the first vehicle and the second vehicle enter a predetermined area. 34-6. The method of embodiment 34-1, further comprising: after the first vehicle and the second vehicle reproduce at least a same advertisement in cooperation with each other, paying out a reward based on at least one of: a reproduction frequency of the advertisement or a reproduction time.

As such, by implementing the example embodiment disclosed herein or its variants, it may be possible to reproduce one or more advertisements via one or more advertisement vehicles in a cooperative manner, thereby increasing the effect of the advertisements by multiple advertisement vehicles.

Figure 35:
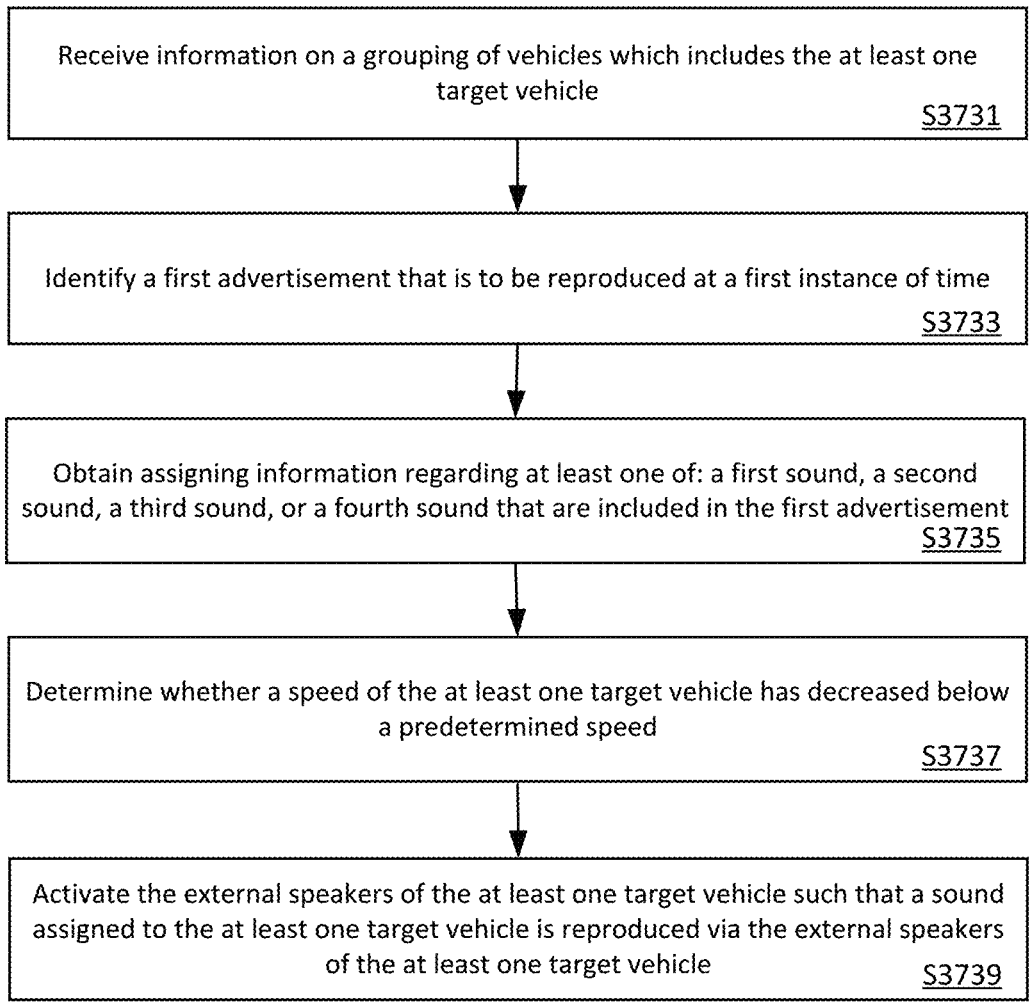
FIG. 35 is an example flowchart conceptually illustrating an embodiment of the present technology in an aspect of the present disclosure. By way of example, FIG. 35 provides an example embodiment for reproducing an advertisement by multiple target vehicles in cooperation with each other.

FIG. 35 is an example flowchart conceptually illustrating an embodiment of the present technology in an aspect of the present disclosure. By way of example, FIG. 35 provides an example embodiment for reproducing an advertisement by multiple target vehicles in cooperation with each other. At S3731, information on a grouping of vehicles which includes at least one target vehicle. The information on the grouping of vehicles may include at least a first target vehicle, a second target vehicle, a third target vehicle, and a fourth target vehicle. At SS3733, a first advertisement that is to be reproduced at a first instance of time is identified. Further, at S3735, assigning information regarding at least one of: a first sound, a second sound, a third sound, or a fourth sound that are included in the first advertisement is obtained. In another aspect of the present disclosure, the first sound, the second sound, the third sound, and the fourth sound may be assigned to the first vehicle, the second vehicle, the third vehicle, and the fourth vehicle, respectively. At S3737, it is determined whether a speed of the at least one target vehicle has decreased below a predetermined speed. At S3739, the external speakers of the at least one target vehicle may be activated such that a sound assigned to the at least one target vehicle is reproduced via the external speakers of the at least one target vehicle.

In another aspect of the present disclosure, the first target vehicle, the second target vehicle, the third target vehicle, and the fourth target vehicle are configured to form a surround audio and reproduce the first advertisement simultaneously. In another aspect of the present disclosure, the first sound, the second sound, the third sound, and the fourth sound may be assigned based on location information of the first target vehicle, the second target vehicle, the third target vehicle, and the fourth target vehicle.

In another aspect of the present disclosure, the assignment of the first sound, the second sound, the third sound, the fourth sound may be determined through communications among the first target vehicle, the second target vehicle, the third target vehicle, and the fourth target vehicle.

In another aspect of the present disclosure, when it is detected that the speed of the at least one target vehicle is less than a predetermined speed, it may be controlled to slowly increase a volume of the external speakers of the at least one target vehicle. In another aspect of the present disclosure, when it is detected that the speed of the at least one target vehicle is greater than a predetermined speed, it may be controlled to slowly decrease the volume of external speakers of the at least one target vehicle. In another aspect of the present disclosure, when it is detected that the speed of the at least one target vehicle is greater than the predetermined speed, the external speakers of the at least one target vehicle may be deactivated.

In another aspect of the present disclosure, the first advertisement may be obtained in real-time based on location information of the at least one target vehicle. In another aspect of the present disclosure, the first advertisement may be shared through communications among the first target vehicle, the second target vehicle, the third target vehicle, and the fourth target vehicle. In another aspect of the present disclosure, when the first target vehicle, the second target vehicle, the third target vehicle, and the fourth target vehicle are configured to reproduce, in cooperation with each other, the first advertisement, a reward may be paid out based on at least one of: a reproduction frequency of the first advertisement and a reproduction time.

The following embodiments recite permutation of combinations of features disclosed herein in reference to the example embodiment shown in FIG. 35. In some cases, permutations of combinations of features disclosed herein are non-limiting. Other permutations of combination of features are also contemplated. 35-1. A method for reproducing an advertisement via external speakers of at least one target vehicle, the method comprising: receiving information on a grouping of vehicles which includes the at least one target vehicle; identifying a first advertisement that is to be reproduced at a first instance of time; obtaining assigning information regarding at least one of: a first sound, a second sound, a third sound, or a fourth sound that are included in the first advertisement; determining whether a speed of the at least one target vehicle has decreased below a predetermined speed; and activating the external speakers of the at least one target vehicle such that a sound assigned to the at least one target vehicle is reproduced via the external speakers of the at least one target vehicle. 35-2. The method of embodiment 35-1, wherein the information on the grouping of vehicles comprises at least a first target vehicle, a second target vehicle, a third target vehicle, and a fourth target vehicle; and wherein the first sound, the second sound, the third sound, and the fourth sound are assigned to the first target vehicle, the second target vehicle, the third target vehicle, and the fourth target vehicle, respectively. 35-3. The method of embodiment 35-2, wherein the first target vehicle, the second target vehicle, the third target vehicle, and the fourth target vehicle are configured to form a surround audio and reproduce the first advertisement simultaneously or sequentially. 35-4. The method of embodiment 35-2, wherein the first sound, the second sound, the third sound, and the fourth sound are assigned based on location information of the first target vehicle, the second target vehicle, the third target vehicle, and the fourth target vehicle. 35-5. The method of embodiment 35-2, wherein the assignment of the first sound, the second sound, the third sound, and the fourth sound are determined through communications among the first target vehicle, the second target vehicle, the third target vehicle, and the fourth target vehicle. 35-5. The method of embodiment 35-2, further comprising: when it is detected that the speed of the at least one target vehicle is less than a predetermined speed, controlling to slowly increase a volume of the external speakers of the at least one target vehicle. 35-6. The method of embodiment 35-2, further comprising: when it is detected that the speed of the at least one target vehicle is greater than a predetermined speed, controlling to slowly decrease the volume of external speakers of the at least one target vehicle. 35-7. The method of embodiment 35-6, further comprising: when it is detected that the speed of the at least one target vehicle is greater than the predetermined speed, deactivating the external speakers of the at least one target vehicle. 35-8. The method of embodiment 35-1, wherein the first advertisement is obtained in real-time based on location information of the at least one target vehicle. 35-9. The method of embodiment 35-2, wherein the first advertisement is shared through communications among the first target vehicle, the second target vehicle, the third target vehicle, and the fourth target vehicle. 35-10. The method of embodiment 35-3, further comprising: when the first target vehicle, the second target vehicle, the third target vehicle, and the fourth target vehicle are configured to reproduce, in cooperation with each other, the first advertisement, paying out a reward based on at least one of: a reproduction frequency of the first advertisement and a reproduction time.

As such, by implementing the example embodiment disclosed herein or its variants, it may be possible to reproduce one or more advertisements via one or more advertisement vehicles in a cooperative manner, thereby increasing the effect of the advertisements by multiple advertisement vehicles.

Figure 36A:
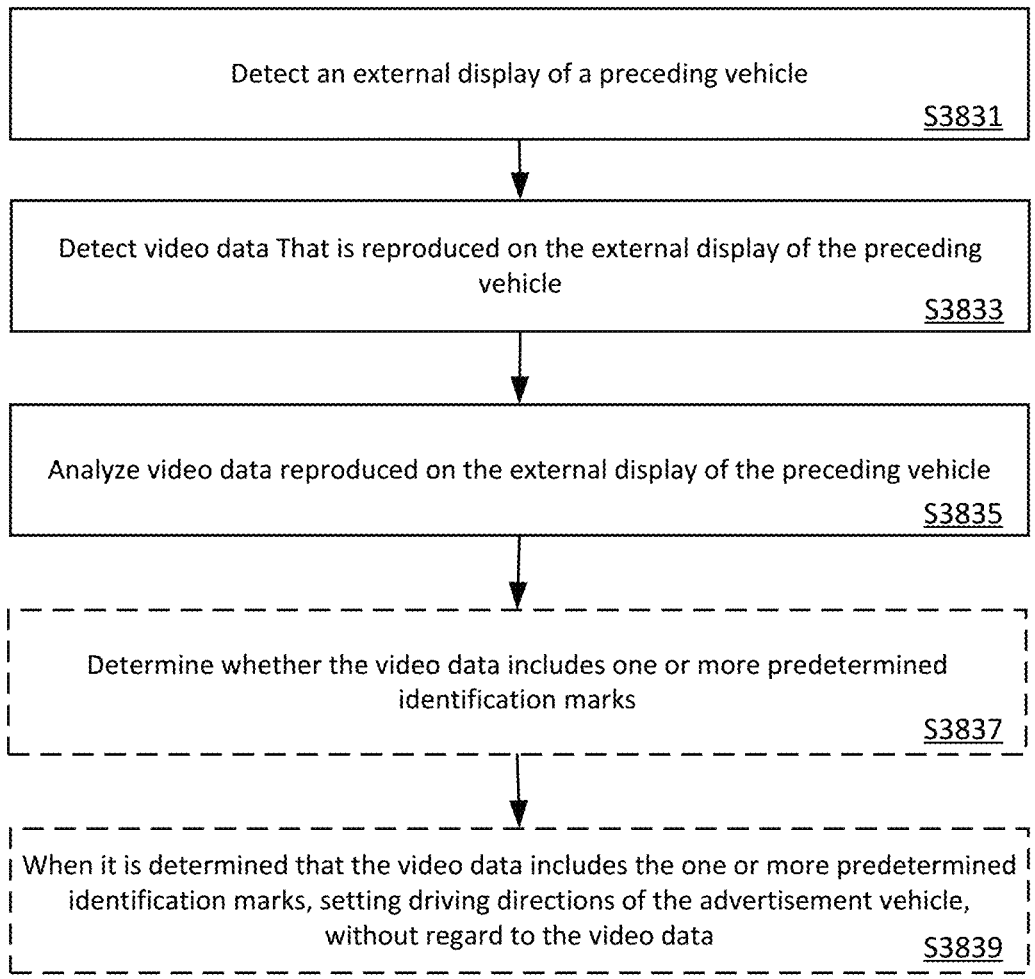
FIGS. 36A and 36B are example flowcharts conceptually illustrating various embodiments of the present technology in various aspects of the present disclosure. By way of example, FIG. 36A provides an example embodiment for controlling an advertisement vehicle capable of autonomous driving and FIG. 36B provides an example embodiment for controlling an advertisement vehicle capable of autonomous driving.

FIG. 36A is an example flowchart conceptually illustrating an embodiment of the present technology in an aspect of the present disclosure. By way of example, FIG. 36A provides an example embodiment for controlling an advertisement vehicle capable of autonomous driving. In the example, at S3831, an external display of a preceding vehicle is detected. Here, the advertisement vehicle with autonomous driving capability detects the preceding vehicle with the external display. At S3833, the video data that is reproduced on the external display of the preceding vehicle is detected. In the example, the advertisement vehicle further detects or receives the video data through cameras of the advertisement vehicle.

At S3835, the video data reproduced on the external display of the preceding vehicle are analyzed.

In an aspect of the present disclosure, the video data may include at least one of: driving related information or advertisement content. The driving related information may include at least one of: real-time traffic information, accident occurrence information, disaster occurrence information or driving route guidance messages. In an aspect of the present disclosure, when it is determined that the video data includes driving related information, the driving directions of the advertisement vehicle that follows the preceding vehicle may be set in consideration of the driving related information. Further, when it is determined that the video data include the advertisement content, the driving directions of the advertisement vehicle may be set without regard to the video data.

At S3837, optionally it may be determined whether the video data include one or more predetermined identification marks. In an aspect of the present disclosure, the one or more predetermined identification marks may be included or used in the video data as part of the video data to represent the video data as the advertisement content. Further, in another aspect of the present disclosure, the one or more predetermined identification marks may be included as at least one of a plurality of frames of the video data. Further, in an aspect of the present disclosure, the one or more predetermined identification marks may comprise another image data and/or text data to represent the video data as the advertisement content.

At S3839, optionally when it is determined that the video data include the one or more predetermined identification marks, the driving directions of the advertisement vehicle may be set without regard to the video data reproduced on the external display of the preceding vehicle.

The following embodiments recite permutation of combinations of features disclosed herein in reference to the example embodiment shown in FIG. 36A. In some cases, permutations of combinations of features disclosed herein are non-limiting. Other permutations of combination of features are also contemplated. 36A-1. A method for controlling an advertisement vehicle capable of autonomous driving, the method comprising: detecting an external display of a preceding vehicle; detecting video data reproduced on the external display of the preceding vehicle; analyzing the video data reproduced on the external display of the preceding vehicle. Optionally, the method of embodiment 36A-1 further includes: determining whether the video data includes one or more predetermined identification marks; and when it is determined that the video data includes the one or more predetermined identification marks, setting driving directions of the advertisement vehicle, without regard to the video data. 36A-2. The method of embodiment 36A-1, wherein the video data includes at least one of: driving related information or advertisement content. 36A-3. The method of embodiment 36A-2, wherein when the video data include the driving related information, the driving directions of the advertisement vehicle are set in consideration of the driving related information. 36A-4. The method of embodiment 36A-3, wherein the driving related information includes at least one of: real-time traffic information, accident occurrence information, disaster occurrence information, or driving route guidance messages. 36A-5. The method of embodiment 36A-2, wherein when the video data includes the advertisement content, the driving directions of the advertisement vehicle are set without regard to the video data. 36A-6. The method of embodiment 36A-1, wherein the one or more predetermined identification marks are included in the video data as part of the video data to represent the video data as the advertisement content. 36A-7. The method of embodiment 36A-6, wherein the one or more predetermined identification marks are included as at least one of a plurality of frames of the video data. 36A-8. The method of embodiment 36A-7, wherein the one or more predetermined identification marks comprise image data to represent the video data as the advertisement content. 36A-9. The method of embodiment 36A-7, wherein the one or more predetermined identification marks comprise text data to represent the video data as the advertisement content.

As such, by implementing the example embodiment disclosed herein or its variants, the driving directions of an advertisement vehicle may be efficiently and adaptively set based on video data reproduced on an external display of a preceding vehicle, thereby increasing the efficiency of driving of the advertisement vehicle.

Figure 36B:
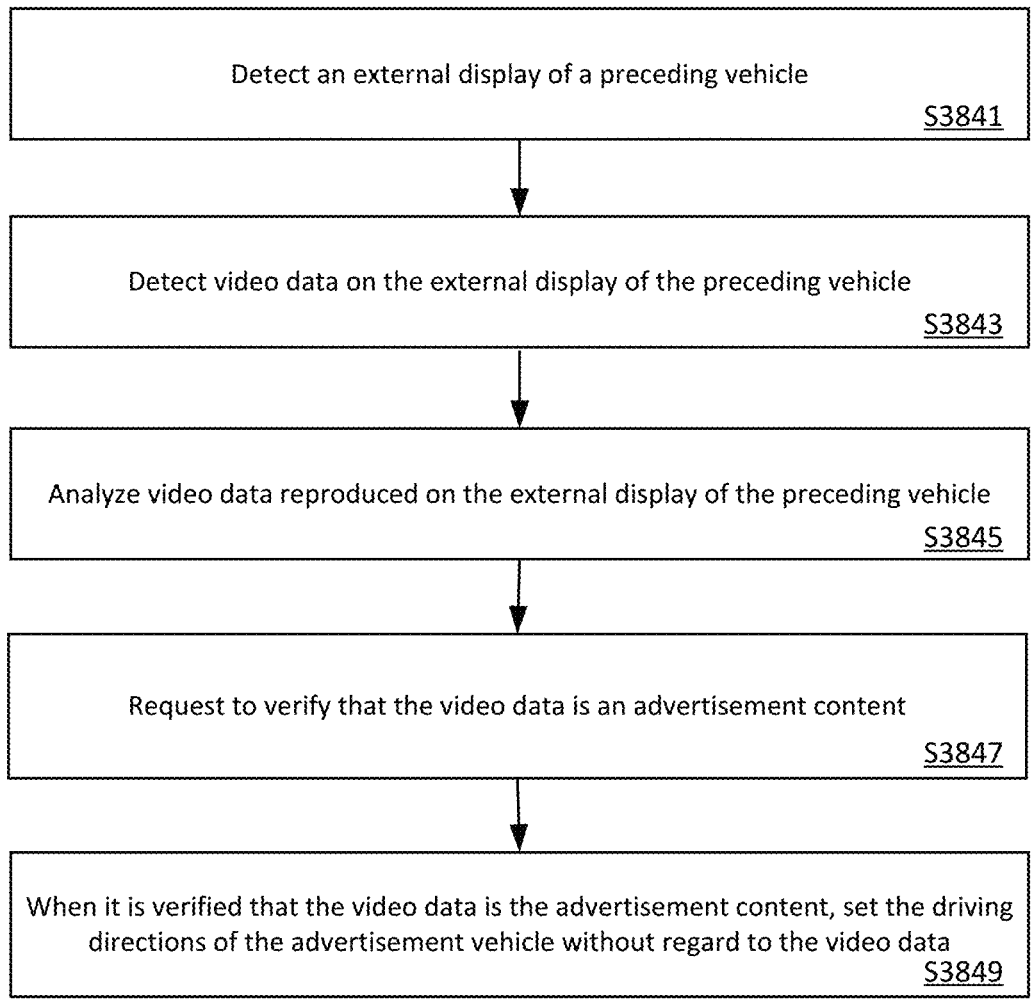

FIG. 36B is an example flowchart conceptually illustrating an embodiment of the present technology in an aspect of the present disclosure. By way of example, FIG. 36B provides an example embodiment for controlling an advertisement vehicle capable of autonomous driving. In the example, at S3841, an external display of a preceding vehicle may be detected. At S3843, video data that is reproduced on the external display of the preceding vehicle may be detected. At S3845, the video data reproduced on the external display of the preceding vehicle may be analyzed. The video data may include at least one of: driving related information or advertisement content. The driving related information may include at least one of: real-time traffic information, accident occurrence information, disaster occurrence information or driving route guidance messages. At S3847, it may be requested to verify that the video data is an advertisement content. That is, in the example, the advertisement vehicle may send a request to the preceding vehicle to verify that the video data is an advertisement content. In response, the preceding vehicle may reply back with a confirmation message to the advertisement vehicle. At S3849, when it is verified that the video data is the advertisement content, the driving directions of the advertisement vehicle may be set without regard to the video data that is reproduced on the external display of the preceding vehicle. On the other hand, in an aspect of the present disclosure, when it is verified that the video data include the driving related information, the driving directions of the advertisement vehicle may be set based on the driving related information.

The following embodiments recite permutation of combinations of features disclosed herein in reference to the example embodiment shown in FIG. 36B. In some cases, permutations of combinations of features disclosed herein are non-limiting. Other permutations of combination of features are also contemplated. 36B-1. A method for controlling an advertisement vehicle capable of autonomous driving, the method comprising: detecting an external display of a preceding vehicle; detecting video data reproduced on the external display of the preceding vehicle; analyzing the video data reproduced on the external display of the preceding vehicle; requesting to verify that the video data is an advertisement content; and when it is verified that the video data is the advertisement content, setting the driving directions of the advertisement vehicle without regard to the video data. 36B-2. The method of embodiment 36B-1, wherein the video data includes at least one of: driving related information or advertisement content. 36B-3. The method of embodiment 36B-2, wherein when it is verified that the video data include the driving related information, the driving directions of the advertisement vehicle is set based on the driving related information.

As such, by implementing the example embodiment disclosed herein or its variants, the driving directions of an advertisement vehicle may be efficiently and adaptively set based on video data reproduced on an external display of a preceding vehicle, thereby increasing the efficiency of driving of the advertisement vehicle.

Figure 37A:
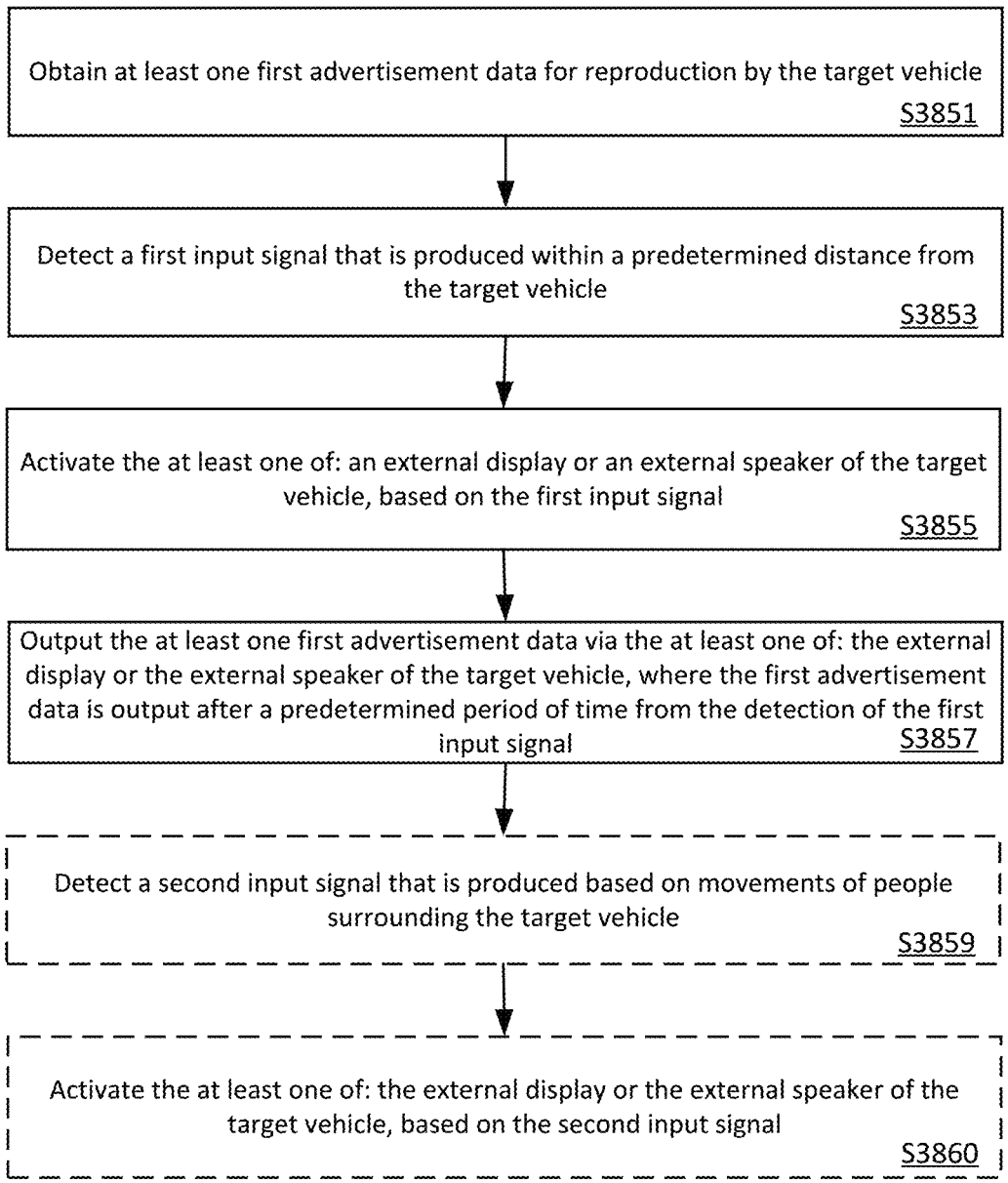
FIGS. 37A and 37B are example flowcharts conceptually illustrating embodiments of the present technology in aspects of the present disclosure. By way of example, FIGS. 37A and 37B provide example embodiments for reproducing an advertisement via a target vehicle with at least one of an external display or an external speaker.

FIG. 37A is an example flowchart conceptually illustrating an embodiment of the present technology in an aspect of the present disclosure. By way of example, FIG. 37A provides an example embodiment for reproducing an advertisement via a target vehicle with at least one of an external display or an external speaker. In the example, at S3851, a first advertisement data is obtained for reproduction by the target vehicle. In an aspect of the present disclosure, the first advertisement data may be selected based on at least one of: day information or time of a day information. By way of example, for at night or evening times, certain advertisements such as night life related advertisements including bars or certain alcoholic beverages may be selected for reproduction.

At S3853, a first input signal that may be produced within a predetermined distance from the target vehicle is detected. In an aspect of the present disclosure, the first input signal may include a radio frequency signal for locking of a vehicle, unlocking of the vehicle, or location determination of the vehicle.

At S3855, based on the first input signal, at least one of: the external display or the external speaker of the target vehicle is activated. In another aspect of the present disclosure, the activation of at least one of the external display or the external speaker of the target vehicle based on the first input signal may be determined based on nature of the first input signal. Further, in another aspect of the present disclosure, the activation of at least one of the external display or the external speaker of the target vehicle based on the first input signal may be determined based on a state of a battery of the target vehicle. In one example, if the battery of the target vehicle is below a certain level, the external display or the external speaker of the target vehicle may not be activated.

At S3857, the first advertisement data is output via at least one of: the external display or the external speaker of the target vehicle, and the first advertisement data is output after a predetermined period of time from the detection of the first input signal. In an aspect of the present disclosure, the first advertisement data may include data selected based on location of the target vehicle. In another aspect of the present disclosure, the first advertisement data may comprise an advertisement for goods or services relating to a specific area in which the target vehicle is parked. Furthermore, in another aspect of the present disclosure, the first advertisement data may be selected based on information relating to at least one vehicle that visited the specific area in which the target vehicle is parked. Also, in another aspect of the present disclosure, the information relating to at least one vehicle may include at least one of: vehicle profile information or driver preference information. The vehicle profile information may include at least one of: vehicle information (e.g., type, color, make, size, etc.), vehicle driver information (e.g., sex, age, preferences, shopping habits, etc.), or vehicle passenger information (e.g., sex, age, preferences, shopping habits, etc.). Further, in another aspect of the present disclosure, the vehicle passenger information or vehicle driver information may also include at least purchase of goods or services history information including certain purchase history that may match the surrounding area in which the target vehicle is parked.

Further, at S3859, optionally, a second input signal may be detected, which is produced based on movements of people surrounding the target vehicle. That is, the second signal may be produced by means of one or more proximity sensors installed onboard the target vehicle. At S3860, at least one of: the external display or the external speaker of the target vehicle may be activated based on the second input signal. Thus, in an aspect of the present disclosure, the external speaker may be activated in accordance with the first input signal and the external display may be activated in accordance with the second input signal. Also, the external speaker may be activated in accordance with the second input signal and the external display may be activated in accordance with the first input signal.

The following embodiments recite permutation of combinations of features disclosed herein in reference to the example embodiment shown in FIG. 37A. In some cases, permutations of combinations of features disclosed herein are non-limiting. Other permutations of combination of features are also contemplated. 37A-1. A method for reproducing an advertisement via a target vehicle with at least one of an external display or an external speaker, the method comprising: obtaining a first advertisement data for reproduction by the target vehicle; detecting a first input signal that is produced within a distance from the target vehicle; activating at least one of: the external display or the external speaker of the target vehicle, based on the first input signal; and outputting the first advertisement data via at least one of: the external display or the external speaker of the target vehicle, wherein the first advertisement data is output after a predetermined period of time from the detection of the first input signal. 37A-2. The method of embodiment 37A-1, wherein the first input signal is produced within a predetermined distance from the target vehicle. 37A-3. The method of embodiment 103, wherein the first input signal comprises a radio frequency signal for locking of a vehicle, unlocking of the vehicle, or location determination of the vehicle. 37A-4. The method of embodiment 37A-1, wherein the activation of at least one of the external display or the external speaker of the target vehicle based the first input signal is determined based on nature of the first input signal. 37A-5. The method of embodiment 37A-1, wherein the activation of at least one of the external display or the external speaker of the target vehicle based on the first input signal is determined based on a state of a battery of the target vehicle. 37A-6. The method of embodiment 37A-1, further comprising detecting a second input signal. 37A-7. The method of embodiment 37A-6, wherein the second input signal comprises a signal that is produced based on movements of people surrounding the target vehicle. 37A-8. The method of embodiment 37A-6, wherein the external speaker is activated in accordance with the first input signal, and wherein the external display is activated in accordance with the second input signal. 37A-9. The method of embodiment 37A-1, wherein the first advertisement data comprise data selected based on location of the target vehicle. 37A-10. The method of embodiment 37A-1, wherein the first advertisement data comprise an advertisement for goods or services relating to a specific area in which the target vehicle is parked. 37A-11. The method of embodiment 37A-10, wherein the first advertisement data are selected based on information relating to at least one vehicle that visited the specific area in which the target vehicle is parked. 37A-12. The method of embodiment 37A-11, wherein the information relating to at least one vehicle includes at least one of: vehicle profile information or driver preference information. 37A-13. The method of embodiment 37A-12, wherein the vehicle profile information includes at least one of: vehicle information, vehicle driver information, or vehicle passenger information. 37A-14. The method of embodiment 37A-12, wherein the driver preference information includes at least purchase history information that matches the target vehicle. 37A-15. The method of embodiment 37A-9, wherein the first advertisement data are selected based on at least one of: day information or time of a day information.

As such, by implementing the example embodiment disclosed herein or its variants, an advertisement may be efficiently reproduced by a target vehicle, based on an input signal, thereby increasing the effect of the advertisement by the target vehicle.

Figure 37B:
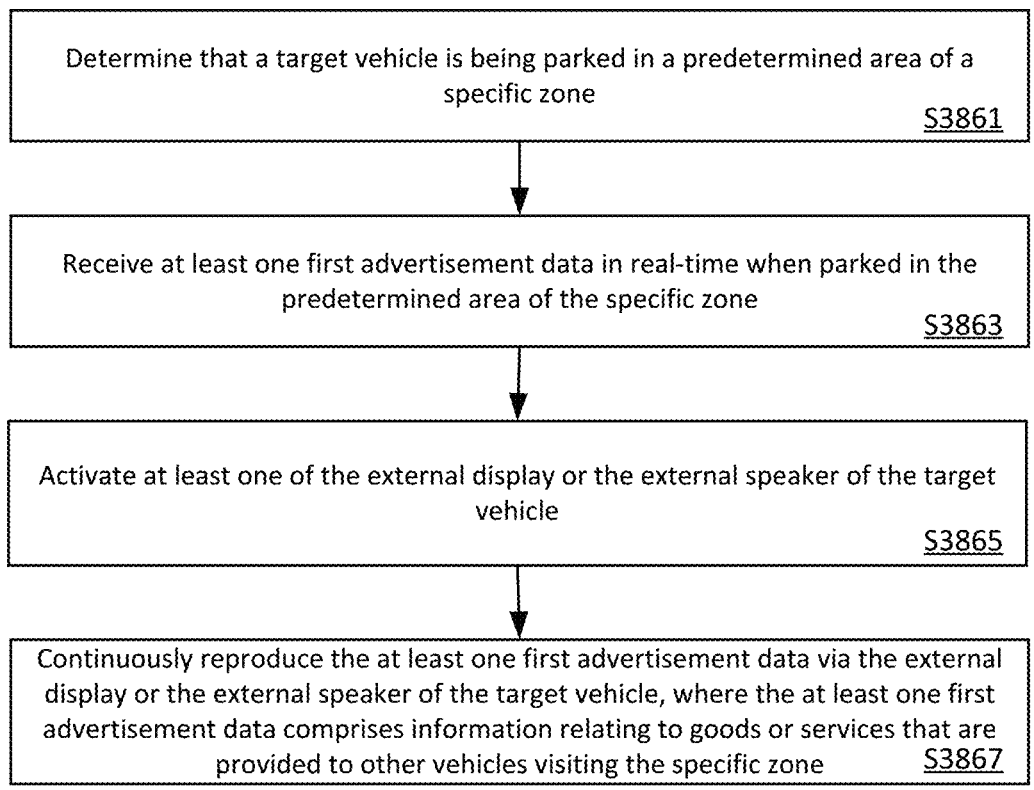

FIG. 37B is an example flowchart conceptually illustrating an embodiment of the present technology in an aspect of the present disclosure. By way of example, FIG. 37B provides an example embodiment for reproducing an advertisement via a target vehicle with at least one of an external display or an external speaker. At S3861, it is determined that the target vehicle is being parked in a predetermined area of a specific zone, e.g., a parking lot of a mall or a department store, or a retail store, or the like. At S3863, at least one first advertisement data is received at the target vehicle in real-time when parked in the predetermined area of the specific zone. At S3865, at least one of the external display or the external speaker of the target vehicle is activated. At S3867, using the external display or the external speaker of the target vehicle, the at least one first advertisement data is continuously reproduced. The at least one first advertisement data include information relating to goods or services that are provided to other vehicles vising the specific zone. In another aspect of the present disclosure, a reward may be paid out to the target vehicle based on at least one of: a frequency of reproduction of the first advertisement data or a time duration of reproduction of the first advertisement data.

The following embodiments recite permutation of combinations of features disclosed herein in reference to the example embodiment shown in FIG. 37B. In some cases, permutations of combinations of features disclosed herein are non-limiting. Other permutations of combination of features are also contemplated. 37B-1. A method for reproducing an advertisement via a target vehicle with at least one of an external display or an external speaker, the method comprising: determining that the target vehicle being parked in a predetermined area of a specific zone; receiving at least one first advertisement data in real-time when parked in the predetermined area of the specific zone; activating at least one of the external display or the external speaker; and continuously reproducing the at least one first advertisement data via the external display or the external speaker of the target vehicle, wherein the at least one first advertisement data comprise information relating to goods or services that are provided to other vehicles visiting the specific zone. 37B-2. The method of embodiment 37B-1 or 37A-1, wherein a reward is paid out to the target vehicle based on at least one of: a frequency of reproduction of the first advertisement data or a time duration of reproduction of the first advertisement data.

As such, by implementing the example embodiment disclosed herein or its variants, an advertisement may be efficiently reproduced by a target vehicle parked in a predetermined area of a specific zone, thereby increasing the effect of the advertisement by the target vehicle.

Figure 38A:
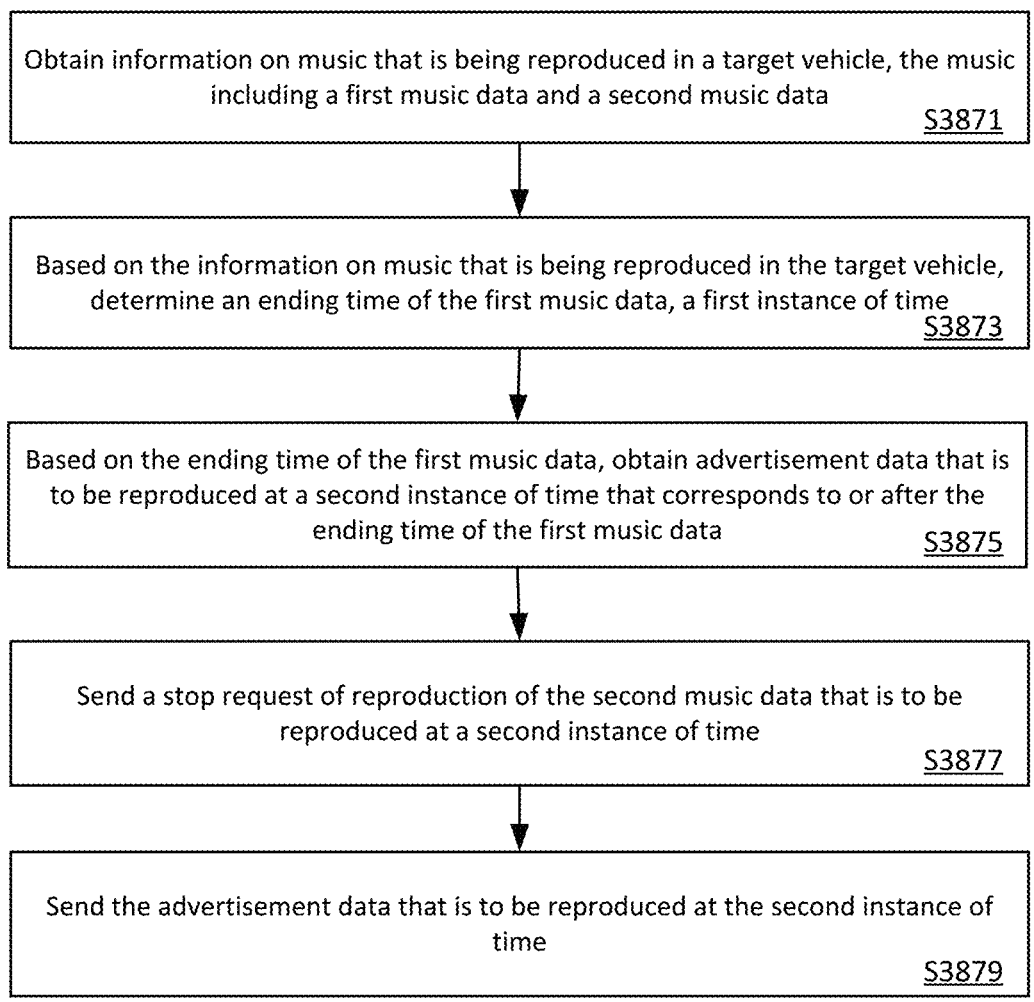
FIGS. 38A and 38B are example flowcharts conceptually illustrating embodiments of the present technology in aspects of the present disclosure. By way of example, FIGS. 38A and 38B provide example embodiments for reproducing an advertisement in a target vehicle.

FIG. 38A is an example flowchart conceptually illustrating an embodiment of the present technology in an aspect of the present disclosure. By way of example, FIG. 38A provides an example embodiment for reproducing an advertisement in a target vehicle between music provided from an external server.

In the example, at S3871, first information on music that is being reproduced in the target vehicle is obtained. The music may include a first music data (e.g., a first music piece or song) and a second music data (e.g., a second music piece or song). Further, in an aspect of the present disclosure, the first information on the music that is being reproduced in the target vehicle may include at least one of: a music playlist, music playback order information, attribute information of music data of each music in the music playlist, or user preference information.

At S3873, based on the first information on music that is being reproduced in the target vehicle, at a first instance of time, an ending time of the first music data is determined. That is, in the example, the first music data is scheduled to end at the first instance of time.

At S3875, based on the ending time of the first music data, advertisement data (e.g., an advertisement or an advertisement content or the like) is obtained, which is to be reproduced at a second instance of time which corresponds to or after the ending time of the first music data.

In an aspect of the present disclosure, when the reproduction of the first music data is expected to end within a certain time interval of the first instance of time, a time for reproduction of the second music data is confirmed. In another aspect of the present disclosure, obtaining of the advertisement data that is to be reproduced at the second instance of time may include selecting of the advertisement data that is to be reproduced at the second instance of time, based on predetermined criteria. In another aspect of the present disclosure, the predetermined criteria may include at least one of: location information of the target vehicle, user preference information, user feedback information, traffic information or weather information. In another aspect of the present disclosure, user priority may be assigned to at least one of the predetermined criteria (e.g., location information of the target vehicle, user preference information, user feedback information, traffic information or weather information, etc.).

At S3877, a stop request of reproduction of the second music data that is to be reproduced at the second instance of time is sent to the target vehicle. At S3879, the advertisement data that is to be reproduced at the second instance of time is sent to the target vehicle. In another aspect of the present disclosure, the advertisement data that is to be produced at the second instance of time may be selected based on the information on the music that is being reproduced in the target vehicle. In another aspect of the present disclosure, the advertisement data may be inserted at a predetermined interval in the music playlist for reproduction of the advertisement data. Further, in an aspect of the present disclosure, a request may be sent for continuous reproduction of the second music data at a third instance of time at which the reproduction of the advertisement data ends.

The following embodiments recite permutation of combinations of features disclosed herein in reference to the example embodiment shown in FIG. 38A. In some cases, permutations of combinations of features disclosed herein are non-limiting. Other permutations of combination of features are also contemplated. 38A-1. A method for reproducing an advertisement between music provided from an external server, the method comprising: obtaining information on the music that is being reproduced in a target vehicle, the music including a first music data and a second music data thereafter; based on the information on the music that is being reproduced in the target vehicle, determining an ending time of the first music data, a first instance of time; based on the ending time of the first music data, obtaining advertisement data that is to be reproduced at a second instance of time that corresponds to or after the ending time of the first music data; sending a stop request of reproduction of the second music data that is to be reproduced at the second instance of time; and sending the advertisement data that is to be reproduced at the second instance of time. 38A-2. The method of embodiment 38A-1, wherein the information on the music that is being reproduced in the target vehicle comprises at least one of: a music playlist, music playback order information, attribute information of music data of each music in the music playlist, or user preference information. 38A-3. The method of embodiment 38A-1, wherein when the reproduction of the first music data is expected end within a certain time interval of the first instance of time, a time of reproduction of the second music data after the first music data is confirmed. 38A-4. The method of embodiment 38A-1, wherein obtaining the advertisement data that is to be reproduced at the second instance of time includes selecting advertisement data that is to be reproduced at the second instance of time, based on predetermined criteria. 38A-5. The method of embodiment 38A-4, wherein the predetermined criteria include at least one of: location information of the target vehicle, user preference information, user feedback information, traffic information, or weather information. 38A-6. The method of embodiment 38A-4, wherein user priority is assigned to at least one of the predetermined criteria. 38A-7. The method of embodiment 38A-2, wherein based on the information on the music that is being reproduced in the target vehicle, advertisement data that is to be reproduced at the second instance of time is selected. 38A-8. The method of embodiment 38A-1, wherein the advertisement data is inserted at a predetermined interval in the music playlist for reproduction of the advertisement data. 38A-9. The method of embodiment 38A-1, further comprising sending a request for continuous reproduction of the second music data at a third instance of time at which the reproduction of the advertisement data ends.

As such, by implementing the example embodiment disclosed herein or its variants, an advertisement may be efficiently reproduced in a target vehicle without interrupting user's listening to music in the target vehicle, thereby increasing the effect of the advertisement in the target vehicle.

Figure 38B:
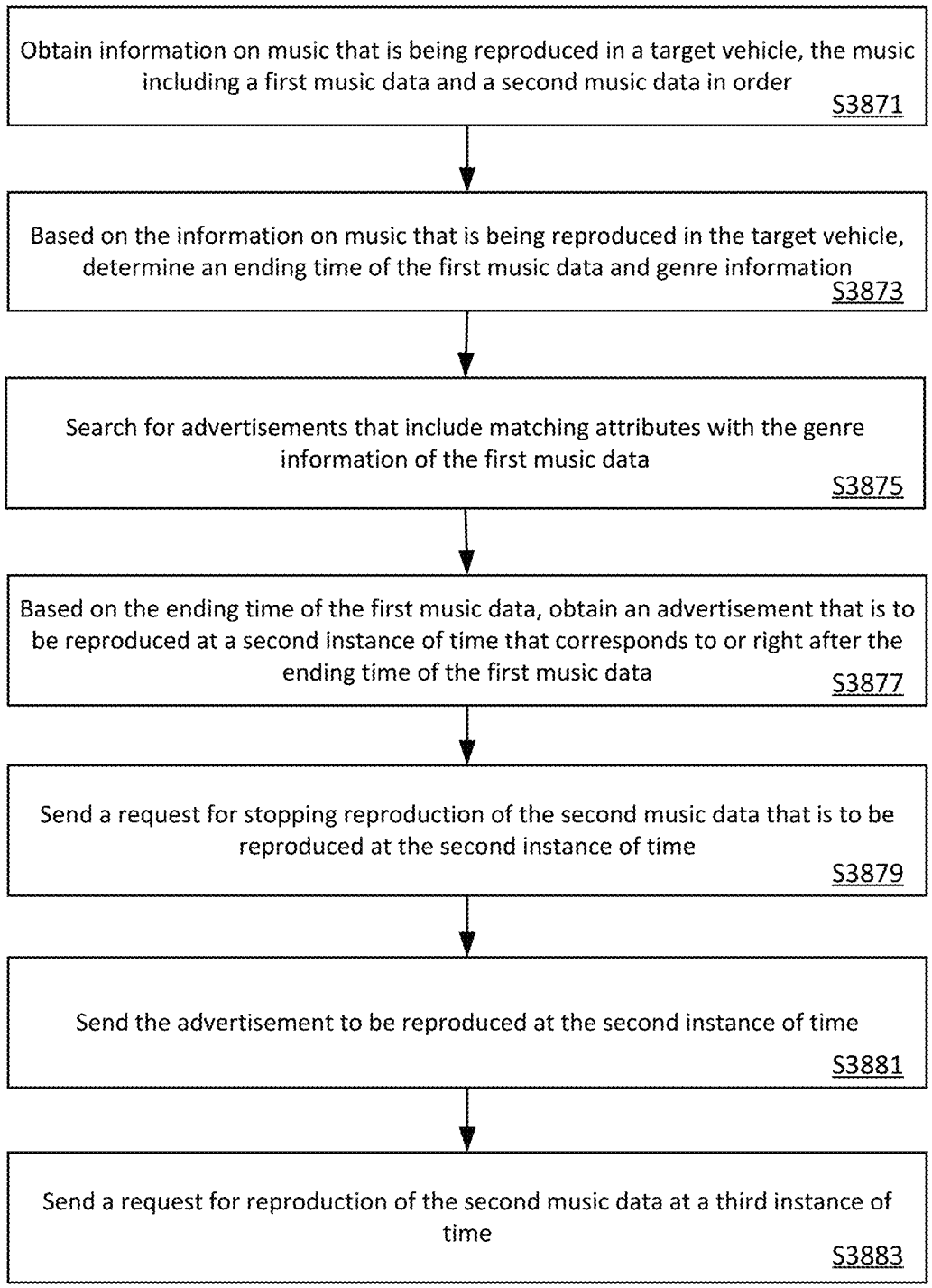

FIG. 38B is an example flowchart conceptually illustrating an embodiment of the present technology in an aspect of the present disclosure. By way of example, FIG. 38B provides an example embodiment for reproducing an advertisement in a target vehicle between music provided from an external server.

In the example, at S3871, information on music that is being reproduced in a target vehicle is obtained. The information on much that is being reproduced in the target vehicle may include at least one of: a music playlist, music playback order information, attribute information of music data of each music in the music playlist or user preference information. Also, the music may include a first music data and a second music data in order.

At S3873, based on the information on the music that is being reproduced in the target vehicle, an ending time of the first music data and genre information of the first music data are determined. At S3875, advertisement data that have attributes matching with the genre information of the first music data is searched. Further, in an aspect of the present disclosure, based on the attribute information of music data of each music in the music playlist, when a genre of the first music data is determined to belong to a first genre, the advertisement data having attributes corresponding to the first genre may be selected among multiple advertisements, and when the genre of the first music data is determined to belong to a second genre, the advertisement data having attributes corresponding to the second genre may be selected among the multiple advertisements. In another aspect of the present disclosure, when there are multiple advertisements having attributes corresponding to the first genre or the second genre, an advertisement (or advertisement data) may be selected based on predetermined criteria. In another aspect of the present disclosure, the predetermined criteria may include at least one of: location information of the target vehicle, user preference information, user feedback information, traffic information or weather information. In another aspect of the present disclosure, user priority may be assigned according to at least one predetermined criterion.

At S3877, based on the ending time of the first music data, the advertisement that is to be reproduced at a second instance of time that corresponds to or right after the ending time of the first music data is obtained.

At S3879, a request is sent for stopping reproduction of the second music data that is to be reproduced at the second instance of time. At S3881, the advertisement is sent to be reproduced at the second instance of time. At S3883, at a third instance of time at which the reproduction of the advertisement ends, a request is sent for reproduction of the second music data. That is, after the end of the reproduction of the advertisement, the second music data is reproduced right after at the third instance of time such that the advertisement is reproduced between the first music data and the second music data.

Further, in another aspect of the present disclosure, a reward may be paid out to the target vehicle based on at least one of: a frequency of advertisement reproduction or a reproduction time for the advertisement. In another aspect of the present disclosure, when the advertisement may be received from another advertisement vehicle, the reward may be paid out to both the target vehicle and another advertisement vehicle.

The following embodiments recite permutation of combinations of features disclosed herein in reference to the example embodiment shown in FIG. 38B. In some cases, permutations of combinations of features disclosed herein are non-limiting. Other permutations of combination of features are also contemplated. 38B-1. A method for reproducing an advertisement between music provided by an external server, the method comprising: obtaining information on the music that is being reproduced in a target vehicle, the music including a first music data and a second music data in order; based on the information on the music that is being reproduced in the target vehicle, determining an ending time of the first music data and genre information; searching for advertisement data that includes matching attributes with the genre information of the first music data; based on the ending time of the first music data, obtaining the advertisement data that is to be reproduced at a second instance of time that corresponds to the ending time of the first music data; sending a stop request of reproduction of the second music data that is to be reproduced at the second instance of time; and sending the advertisement data to be reproduced at the second instance of time. 38B-2. The method of embodiment 38B-1, wherein the information on the music that is being reproduced in the target vehicle includes at least one of: a music playlist, music playback order information, attribute information of music data of each music in the music playlist or user preference information. 38B-3. The method of embodiment 38B-2, wherein based on the attribute information of music data of each music in the music playlist, when genre of the first music data is determined to belong to a first genre, an advertisement having certain attributes corresponding to the first genre is selected, and when the genre of the first music data is determined to belong to a second genre, the advertisement having certain attributes corresponding to the second genre is selected. 38B-4. The method of embodiment 38B-3, wherein when there are multiple advertisements having attributes corresponding to the first genre or the second genre, an advertisement is selected based on predetermined criteria. 38B-5. The method of embodiment 38B-4, wherein the predetermined criteria include at least one of: location information of the target vehicle, user preference information, user feedback information, traffic information, or weather information. 38B-6. The method of embodiment 38B-5, wherein user priority is assigned according to at least one predetermined criterion. 38B-7. The method of embodiment 38B-3, wherein the advertisement includes the attributes corresponding to the first genre or the second genre. 38B-8. The method of embodiment 38B-1, further comprising sending, at a third instance of time at which the reproduction of the advertisement ends, a request for reproduction of the second music data. 38B-9. The method of embodiment 38B-2 or 38B-1, wherein a reward is paid out to the target vehicle based on at least one of: a frequency of advertisement reproduction or an advertisement reproduction time. 38B-10. The method of embodiment 38B-9, wherein when the advertisement is received from another advertisement vehicle, the reward is paid out to both the target vehicle and another advertisement vehicle.

As such, by implementing the example embodiment disclosed herein or its variants, an advertisement may be efficiently reproduced in a target vehicle, by reproducing the advertisement between music being reproduced in the target vehicle, thereby greatly increasing the effect of the advertisement in the target vehicle.

Figure 39A:
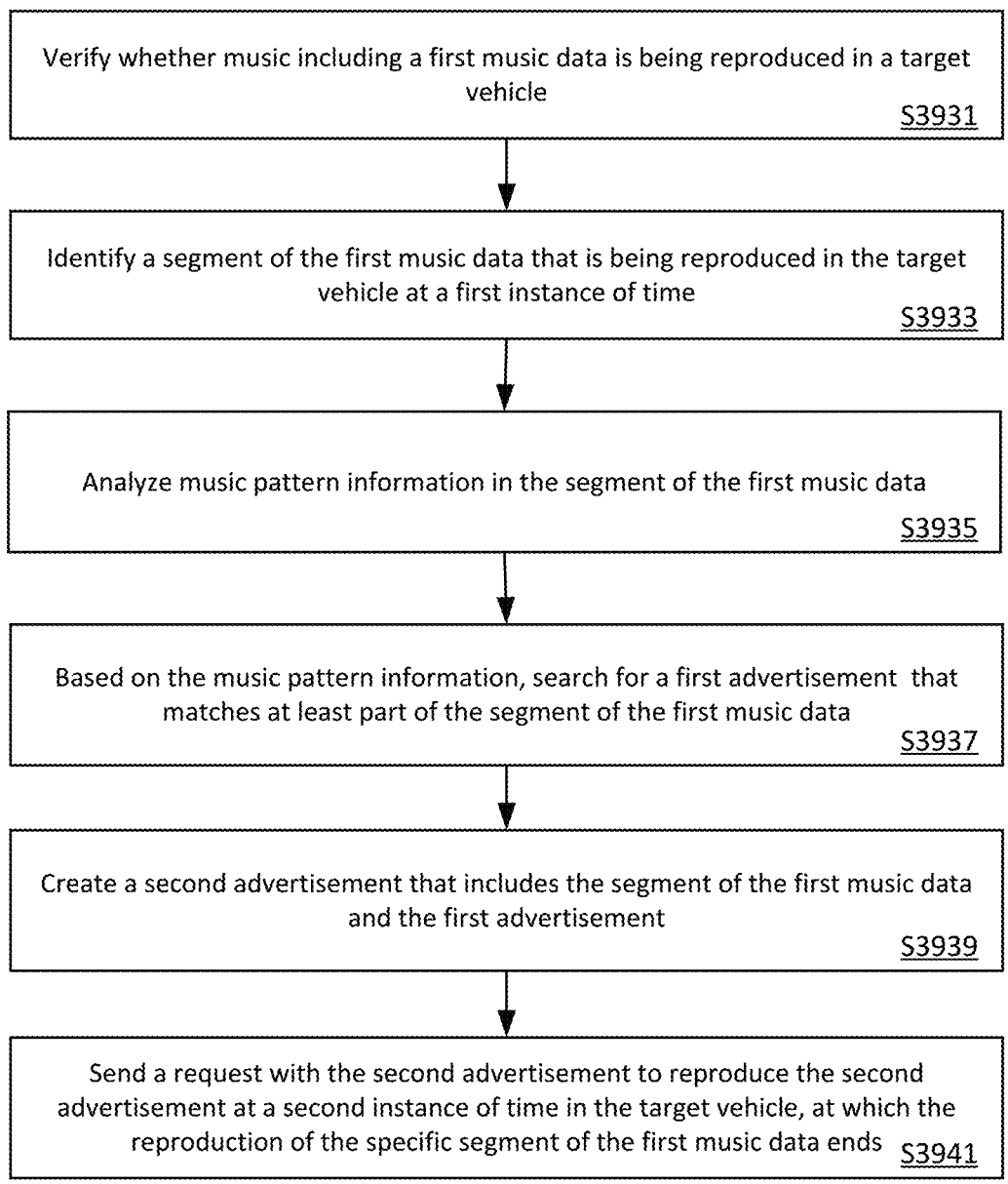
FIGS. 39A and 39B are example flowcharts conceptually illustrating embodiments of the present technology in aspects of the present disclosure. By way of example, FIGS. 39A and 39B provide example embodiments for reproducing an advertisement in a target vehicle.

FIG. 39A is an example flowchart conceptually illustrating an embodiment of the present technology in an aspect of the present disclosure. By way of example, FIG. 39A provides an example embodiment for reproducing an advertisement in a target vehicle.

In the example, at S3931, it is verified whether music including a first music data (e.g., a music piece, song or etc.) is being reproduced in a target vehicle. At S3933, it is identified that a segment of the first music data that is being reproduced in the target vehicle at a first instance of time. At S3935, music pattern information in the segment of the first music data is analysed. In an aspect of the present disclosure, when the music pattern information in the segment of the first music data is analyzed, the segment of the first music data may be analyzed in at least one of: temper, melody, tone, note, pitch, or rhythm.

At S3937, based on the music pattern information, a first advertisement that matches at least part of the segment of the first music data is searched for. In an aspect of the present disclosure, searching for the first advertisement that matches at least part of the segment of the first music data may include considering information relating to the first advertisement, which may be done optionally or additionally. Further, in an aspect of the present disclosure, the first advertisement may include at least a number of syllables of a phrase that is included in the first advertisement.

At S3939, a second advertisement that includes the segment of the first music data and the first advertisement is created. That is, in one implementation, the second advertisement may include a melody of the segment of the first music data and words of the first advertisement.

At S3941, a request to reproduce the second advertisement at a second instance of time is sent. The second instance of time corresponds to a time at which the reproduction of the specific segment of the first music data ends. In another aspect of the present disclosure, a request to stop the reproduction of the first music data or the second music data that is to be reproduced at the second instance of time may be sent before the request to reproduce the second advertisement is sent. In another aspect of the present disclosure, a request to resume the reproduction of the first music data or the second music data in a continuous manner may also be sent at a third instance of time at which the reproduction of the second advertisement data ends.

The following embodiments recite permutation of combinations of features disclosed herein in reference to the example embodiment shown in FIG. 39A. In some cases, permutations of combinations of features disclosed herein are non-limiting. Other permutations of combination of features are also contemplated. 39A-1. A method for reproducing an advertisement between music provided by an external server, the method comprising: verifying whether the music including a first music data is being reproduced in a target vehicle; identifying a segment of the first music data that is being reproduced at a first instance of time; analyzing music pattern information in the segment of the first music; based on the music pattern information, searching for a first advertisement that matches at least part of the segment of the first music data; creating a second advertisement that includes the segment of the first music data and the first advertisement; and sending a request with the second advertisement to reproduce the second advertisement at a second instance of time in the target vehicle, at which the reproduction of the specific segment of the first music data ends. 39A-2. The method of embodiment 39A-1, wherein analyzing music patter information in the segment of the first music includes analyzing the segment of the first music data in at least one of: temper, melody, tone, note, pitch, or rhythm. 39A-3. The method of embodiment 39A-1, wherein searching for the first advertisement that matches at least part of the segment of the first music data includes additionally considering information relating to the first advertisement. 39A-4. The method of embodiment 39A-3, wherein the first advertisement includes at least a number of syllables of a phrase included in the first advertisement. 39A-5. The method of embodiment 39A-1, further comprising sending a request to reproduce the second advertisement at a second instance of time at which the reproduction of the specific segment of the first music data ends. 39A-6. The method of embodiment 39A-5, further comprising sending a request to stop the reproduction of the first music data or the second music data that is to be reproduced at the second instance of time. 39A-7. The method of embodiment 39A-6, further comprising sending, at a third instance of time at which the reproduction of the second advertisement ends, a request to resume the reproduction of the first music data or the second music data in a continuous manner.

As such, by implementing the example embodiment disclosed herein or its variants, an advertisement may be efficiently reproduced in a target vehicle, by reproducing the advertisement tailored to part of music being reproduced in the target vehicle, thereby greatly increasing the effect of the advertisement in the target vehicle.

Figure 39B:
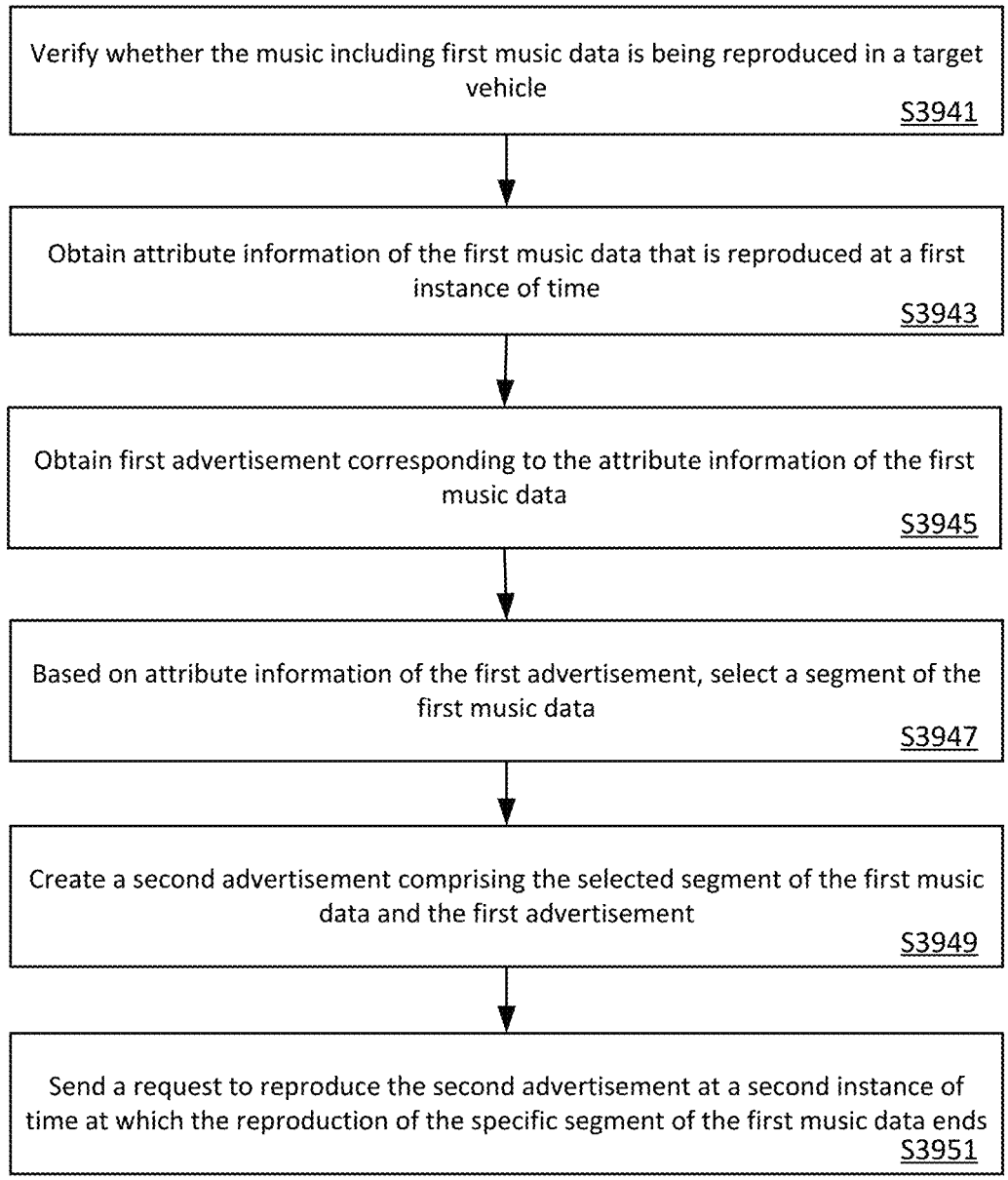

FIG. 39B is an example flowchart conceptually illustrating an embodiment of the present technology in an aspect of the present disclosure. By way of example, FIG. 39B provides an example embodiment for reproducing an advertisement in a target vehicle. In the example, at S3941, it is verified whether the music including first music data is being reproduced in a target vehicle. At S3943, attribute information of the first music data is obtained, which is reproduced at a first instance of time. In an aspect of the present disclosure, the attribute information of the first music data may include at least one of: artist, title, genre, or reproduction time information.

At S3945, first advertisement corresponding to the attribute information of the first music data are obtained. In an aspect of the present disclosure, attribute information of the first advertisement may include at least one of: a number of syllables of a phrase included in the first advertisement or the attribute information of the first advertisement.

At S3947, based on the attribute information of the first advertisement, a segment of the first music data is selected. In an aspect of the present disclosure, when the segment of the first music data is selected, music pattern information of the first music data may be additionally analyzed in real-time, which may also be done optionally. Further, in an aspect of the present disclosure, the music pattern information may include at least one of: temper, melody, tone, note, pitch, or rhythm. Furthermore, in another aspect of the present disclosure, the analysis of the music pattern information of the first music data in real-time may include analysis of an entire piece of the first music data section by section. The entire piece of the first music data may include multiple sections. Further, in still another aspect of the present disclosure, the analysis of the entire piece of the first music data may be performed section by section until a specific segment that matches the number of syllables of the first advertisement data is identified.

At S3949, a second advertisement comprising the selected segment of the first music data and the first advertisement are created. At S3951, a request is sent to reproduce the second advertisement at a second instance of time at which the reproduction of the specific segment of the first music data ends.

Further, in another aspect of the present disclosure, a request may be sent to stop the reproduction of the first music data or the second music data that is to be reproduced at the second instance of time. In an aspect of the present disclosure, optionally, at a third instance of time at which the reproduction of the second advertisement ends, a request may be sent to stop the reproduction of the first music data or the second music data in a continuous manner. In an aspect of the present disclosure, a reward may be paid out to the target vehicle based on at least one of: a frequency of advertisement reproduction or an advertisement reproduction time. It is noted that throughout the present disclosure, the frequency of advertisement reproduction may include a total number of reproduction of a specific advertisement (or advertisement data), and the advertisement reproduction time may include a total amount of time for reproducing the specific advertisement (or advertisement data). Further, as mentioned above, in another aspect of the present disclosure, when the advertisement data is received from another advertisement vehicle, the reward may be paid to both the target vehicle and another advertisement vehicle.

As such, using the example embodiment in accordance with the present technology, it may be possible to provide one or more advertisement to listeners in a vehicle while not interrupting their listening to music by naturally inserting the one or more advertisement between entries of a music playlist of the listeners. In addition, it is also possible to improve or increase a level of absorption or attention by the listeners in the vehicle on the advertisement by inserting the advertisements in a natural manner between the reproductions of different songs in the music playlist of the listeners while they are actively listening in the vehicle.

The following embodiments recite permutation of combinations of features disclosed herein in reference to the example embodiment shown in FIG. 39B. In some cases, permutations of combinations of features disclosed herein are non-limiting. Other permutations of combination of features are also contemplated. 39B-1. A method for reproducing an advertisement between music provided by an external server, the method comprising: verifying whether music including first music data is being reproduced in a target vehicle; obtaining attribute information of the first music data that is reproduced at a first instance of time; obtaining first advertisement data corresponding to the attribute information of the first music data; based on attribute information of the first advertisement data, selecting a segment of the first music data; and creating a second advertisement data comprising the selected segment of the first music data and the first advertisement data. 39B-2. The method of embodiment 39B-1, wherein the attribute information of the first music data includes at least one of: title information, genre information, or reproduction time information. 39B-3. The method of embodiment 39B-2, wherein the attribute information of the first advertisement data includes at least one of: a number of syllables of a phrase included in the first advertisement data or the attribute information of the first advertisement data. 39B-4. The method of embodiment 39B-1, wherein selecting the segment of the first music data includes additionally analyzing music pattern information of the first music data in real-time. 39B-5. The method of embodiment 39B-4, wherein the music pattern information includes at least one of: temper, melody, tone, note, pitch, or rhythm. 39B-6. The method of embodiment 39B-4, wherein analyzing the music pattern information of the first music data in real-time includes analyzing an entire piece of the first music data section by section. 39B-7. The method of embodiment 39B-6, wherein analyzing the entire piece of the first music data section by section is performed until a specific segment that matches the number of syllables of the first advertisement data is identified. 39B-8. The method of embodiment 39B-1, further comprising sending a request to reproduce the second advertisement data at the second instance of time at which the reproduction of the specific segment of the first music data ends. 39B-9. The method of embodiment 39B-8, further comprising additionally sending a request to stop the reproduction of the first music data or the second music data that is to be reproduced at the second instance of time. 39B-10. The method of embodiment 39B-9, wherein at a third instance of time at which the reproduction of the second advertisement data ends, a request is sent to stop the reproduction of the first music data or the second music data in a continuous manner. 39B-11. The method of embodiment 38A-1 or 39B-1, wherein a reward is paid out to the target vehicle based on at least one of: a frequency of advertisement reproduction or an advertisement reproduction time. 39B-12. The method of embodiment 39B-11, wherein when the advertisement data is received from another advertisement vehicle, the reward is paid to the target vehicle and another advertisement vehicle.

As such, by implementing the example embodiment disclosed herein or its variants, an advertisement may be efficiently reproduced in a target vehicle, by reproducing the advertisement tailored to part of music being reproduced in the target vehicle, thereby greatly increasing the effect of the advertisement in the target vehicle.

Even though particular combinations of features are disclosed in the specification and/or recited in the claims, these combinations are not intended to limit the disclosure of the present technology. Further, the methods or methodologies for the present technology disclosed herein, including one or more systems, apparatuses, and flowcharts, in accordance with various aspects of the present disclosure, may be implemented in software, hardware, any combinations of software and hardware, a computer program or firmware incorporated in a computer readable medium for execution by a controller, a processor, a computer, or a processing system that includes one or more processors. Examples of processors include microcontrollers, microprocessors, digital signal processors (DSPs), discrete hardware circuits, gated logic, state machines, programmable logic devices (PLDs), FPGAs, and other suitable hardware configured to perform various functions described herein.

While, for simplicity, the methodologies are described herein as a series of steps or acts, it is to be understood that the claimed subject matter is not limited by the order of steps or acts, as some steps or acts may occur in different orders and/or concurrently with other acts from that shown and described herein. Further, not all illustrated steps or acts, e.g., various flowcharts, may be required to implement various methodologies according to the present technology disclosed herein. Furthermore, the methodologies disclosed herein and throughout this specification are capable of being stored on an article of manufacture to facilitate transporting and transferring such methodologies to one or more processing systems.

The term "software" as used herein is to be construed broadly to mean any instructions, instruction sets, programs, subprograms, code, program code, software modules, applications, software packages, routines, objects, executables, threads of execution, procedures, functions, etc. including firmware, microcode, middleware, software, hardware description language, or the like. The software may also refer to general software, firmware, middleware, microcode, hardware description language, or etc. As noted above, the software may be stored on a computer-readable medium.

Examples of a computer-readable medium may include a non-transitory computer-readable medium, such as, by way of example, an optical disk, a magnetic storage device, a digital versatile disk, a flash memory, random access memory (RAM), read only memory (ROM), a register, programmable ROM (PROM), erasable PROM (EPROM), electrically erasable PROM (EEPROM), a removable disk, a flash memory device, and any other suitable medium for storing software that may be accessed and read by a processor or a processing system. It is also appreciated that one skilled in the art will recognize how best to implement the described functionality relating to adding new system functionalities to an existing network element, depending upon a application within design constraints.

The term "unit" or "component" as used herein means software, hardware, or any combinations thereof. A unit may be implemented as a software component, a hardware component, or any combinations thereof, including a processor, a central processing unit (CPU), a FPGA, logic, logic arrays, ASIC, DSP, microcontroller, microprocessor, etc. or any combinations thereof. The unit thus may include software components, task components, processes, procedures, functions, program code, firmware, micro-codes, circuits, data structures, tables, arrays, and variables.

The term "article of manufacture" is intended to encompass a computer program accessible from any computer-readable device, carrier, or medium. A singular form may include a plural form if there is no clearly opposite meaning in the context. Also, as used herein, the article "a" is intended to include one or more items. Further, no element, act, step, or instruction used in the present disclosure should be construed as critical or essential to the present disclosure unless explicitly described as such in the present disclosure.

As used herein, except explicitly noted otherwise, the term "comprise" and variations of the term, such as "comprising," "comprises," and "comprised" are not intended to exclude other additives, components, integers or steps. The terms "first," "second," and so forth used herein may be used to describe various components, but the components are not limited by the above terms. The above terms are used only to discriminate one component from other components, without departing from the scope of the present disclosure.

Also, the term "and/or" as used herein includes a combination of a plurality of associated items or any item of the plurality of associated items. Further, it is noted that when it is described that an element is "coupled" or "connected" to another element, the element may be directly coupled or directly connected to the other element, or the element may be coupled or connected to the other element through a third element. Also, the term "in" may include "in" and "on".

Further, the term "include" or "have" as used herein indicates that a feature, an operation, a component, a step, a number, a part or any combination thereof described herein is present. Further, the term "include" or "have" does not exclude a possibility of presence or addition of one or more other features, operations, components, steps, numbers, parts or combinations.

Although the present technology has been illustrated with specific examples described herein for purposes of describing example embodiments, it is appreciated by one skilled in the relevant art that a wide variety of alternate and/or equivalent implementations may be substituted for the specific examples shown and described without departing from the scope of the present disclosure. As such, the present disclosure is intended to cover any adaptations or variations of the examples and/or embodiments shown and described herein, without departing from the spirit and the technical scope of the present disclosure.

What is claimed is:

1. A method to be implemented at a server over a network for controlling a plurality of advertisement vehicles over the network, the method comprising:
    receiving over the network, at the server, information on an advertisement event in an area which requires participation in collaboration of two or more advertisement vehicles;
    identifying, at the server, at least two or more advertisement vehicles that are candidates for carrying out the specific event, based on global positioning system (GPS) data of the at least two or more advertisement vehicles;
    sending wirelessly over the network, by the server, information on the advertisement event, to the two or more identified advertisement vehicles;
    receiving over the network, at the server, real-time traffic density information comprising real-time vehicle density information or real-time people density information in the area in which the advertisement event is to be carried out by the at least two or more identified advertisement vehicles;
    determining, at the server, a starting location of the advertisement event, based on at least one of: the real-time traffic density information and location information of the at least two or more identified advertisement vehicles;
    sending wirelessly over the network, by the server, driving route guidance including the starting location of the advertisement event to the at least two or more identified advertisement vehicles such that the at least two or more identified advertisement vehicles can drive and convene at the starting location of the advertisement event, and
    providing wirelessly over the network, by the server, to the at least two or more identified advertisement vehicles, a driving order of the at least two or more identified advertisement vehicles for a carry-out of the advertisement event in the area,
    wherein the driving order of the at least two or more identified advertisement vehicles is determined based on at least one of: a vehicle type, a vehicle color, or identification of a preceding vehicle for the advertisement event.

2. The method of claim 1, wherein the driving route guidance is provided in real-time to the at least two or more identified advertisement vehicles, from the starting location to a destination location to carry out the advertisement event.

3. The method of claim 1, wherein the starting location of the advertisement event comprises a location with a lowest real-time vehicle density among multiple locations within the area in which the advertisement event is to be carried out.

4. The method of claim 1, wherein the starting location of the advertisement event comprises a location with a lowest real-time people density among multiple locations within the area in which the advertisement event is to be carried out.

5. The method of claim 2, wherein the driving route guidance further includes at least one of: driving speed information, lane information, and driving route information.

6. The method of claim 5, wherein the driving route guidance is provided in consideration of at least one of: a predetermined route or real-time traffic density information in the area in which the advertisement event is to be carried out.

7. The method of claim 2, wherein the driving order of the plurality of advertisement vehicles is determined according to an expected arrival order or waiting order of the advertisement vehicles at the starting location of the advertisement event in the area, based on the real-time location information of the plurality of advertisement vehicles.

8. The method of claim 2, wherein the driving order of the two or more identified advertisement vehicles is determined based on exchanges of messages among drivers of the plurality of advertisement vehicles.

9. The method of claim 2, wherein the driving order of the two or more advertisement vehicles is provided through at least one of: an external display or an external speaker of each advertisement vehicle.

10. The method of claim 1, wherein the advertisement event comprises a mission advertisement, a cluster advertisement, or an individual advertisement.

* * * * *